(12) United States Patent
Yamarthi et al.

(10) Patent No.: US 12,448,978 B2
(45) Date of Patent: Oct. 21, 2025

(54) LAYERED BARRIER CANS FOR PUMPS AND METHODS OF PRODUCING THE SAME

(71) Applicant: General Electric Company, Schenectady, NY (US)

(72) Inventors: David Raju Yamarthi, Bengaluru (IN); Sriram K, Bengaluru (IN); Mohandas Nayak, Bengaluru (IN); Anantharaman M, Bengaluru (IN); Mohan Kannaiah Raju, Bengaluru (IN); Prachi Anand Tappu, Bengaluru (IN); Deepak Ghiya, Bengaluru (IN); Adam Joseph Wangler, Evandale, OH (US)

(73) Assignee: General Electric Company, Evendale, OH (US)

( * ) Notice: Subject to any disclaimer, the term of this patent is extended or adjusted under 35 U.S.C. 154(b) by 389 days.

(21) Appl. No.: 17/840,416

(22) Filed: Jun. 14, 2022

(65) Prior Publication Data

US 2023/0358237 A1    Nov. 9, 2023

(30) Foreign Application Priority Data

May 3, 2022 (IN) .............................. 202211025722

(51) Int. Cl.
*F04D 25/02* (2006.01)
*F04D 13/02* (2006.01)
*F04D 29/02* (2006.01)
*H02K 49/10* (2006.01)

(52) U.S. Cl.
CPC ........... *F04D 25/026* (2013.01); *F04D 29/02* (2013.01); *F04D 13/025* (2013.01); *H02K 49/106* (2013.01)

(58) Field of Classification Search
CPC .. F04D 13/025; F04D 13/0626; F04D 29/026; F04D 29/02; F04D 25/026; H02K 49/106
See application file for complete search history.

(56) References Cited

U.S. PATENT DOCUMENTS

| 1,845,789 A | 2/1932 | Gilson |
| 2,029,011 A | 1/1936 | Bart |
| 2,556,854 A | 6/1951 | Spears et al. |
| 2,773,963 A | 12/1956 | Mathews |

(Continued)

FOREIGN PATENT DOCUMENTS

| CA | 3002246 | 11/2018 |
| CH | 688454 A5 | 9/1997 |

(Continued)

OTHER PUBLICATIONS

Machine English Translation of CN-101939161-A (Year: 2011).*

(Continued)

*Primary Examiner* — Nathan C Zollinger
(74) *Attorney, Agent, or Firm* — Hanley, Flight & Zimmerman, LLC

(57) ABSTRACT

Layered barrier cans and methods of producing the same are disclosed herein. An example shroud disclosed herein includes an inner shell including a first non-metallic material, an outer shell including the first non-metallic material or a second non-metallic material, and a metal core shell positioned between the inner shell and the outer shell.

20 Claims, 39 Drawing Sheets

(56) References Cited

U.S. PATENT DOCUMENTS

| | | |
|---|---|---|
| 3,734,637 A | 5/1973 | Beck |
| 3,951,573 A | 4/1976 | Dunning et al. |
| 4,020,634 A | 5/1977 | Bradley |
| 4,159,255 A | 6/1979 | Gainer |
| 4,167,295 A | 9/1979 | Glaser |
| 4,213,307 A | 7/1980 | Watson |
| 4,752,194 A | 6/1988 | Wienen et al. |
| 4,838,763 A | 6/1989 | Kraemer |
| 4,844,707 A | 7/1989 | Kletschka |
| 4,850,818 A * | 7/1989 | Kotera .................. F04D 13/027 416/241 A |
| 4,854,823 A * | 8/1989 | Hatting ............... F04D 15/0263 417/63 |
| 5,334,004 A | 8/1994 | Lefevre et al. |
| 5,857,348 A | 1/1999 | Conry |
| 5,895,203 A * | 4/1999 | Klein .................... F04D 13/026 415/142 |
| 6,065,297 A | 5/2000 | Tischer |
| 6,139,595 A | 10/2000 | Herman |
| 6,213,736 B1 | 4/2001 | Weisser |
| 6,293,772 B1 * | 9/2001 | Brown .................. F04D 13/025 417/420 |
| 6,461,260 B1 | 10/2002 | Higginbotham |
| 6,948,853 B2 | 9/2005 | Agrawal |
| 7,070,330 B2 | 7/2006 | Agrawal |
| 7,249,939 B2 * | 7/2007 | Yanagihara ........... F04D 29/026 417/420 |
| 7,293,917 B2 | 11/2007 | Jang et al. |
| 7,757,502 B2 | 7/2010 | Merritt et al. |
| 7,948,105 B2 | 5/2011 | Agrawal et al. |
| 8,764,417 B2 | 7/2014 | Kim et al. |
| 8,893,499 B2 | 11/2014 | Maier |
| 9,617,999 B2 | 4/2017 | Schneider et al. |
| 9,657,594 B2 | 5/2017 | Klusman |
| 9,689,277 B2 | 6/2017 | Klusman |
| 9,841,025 B2 | 12/2017 | Mischiatti et al. |
| 9,964,113 B2 | 5/2018 | Westberg et al. |
| 10,280,760 B2 | 5/2019 | Joshi et al. |
| 10,371,156 B2 | 8/2019 | Colson et al. |
| 10,385,915 B2 | 8/2019 | Himmelmann |
| 10,428,822 B1 | 10/2019 | Wang et al. |
| 10,774,874 B2 | 9/2020 | Binion et al. |
| 10,883,422 B2 | 1/2021 | Boujida et al. |
| 10,899,982 B2 | 1/2021 | Tian et al. |
| 10,927,843 B2 * | 2/2021 | Roach .................... F04D 29/023 |
| 10,982,713 B2 | 4/2021 | Ertas et al. |
| 11,009,085 B2 | 5/2021 | Klemen et al. |
| 11,015,534 B2 | 5/2021 | Smith et al. |
| 11,384,764 B2 | 7/2022 | Stuart |
| 11,396,907 B2 | 7/2022 | Ikeda et al. |
| 11,891,998 B2 | 2/2024 | Yamarthi et al. |
| 2007/0164626 A1 | 7/2007 | Taniguchi et al. |
| 2011/0234035 A1 * | 9/2011 | Wittschier ........... H02K 49/106 310/104 |
| 2011/0256389 A1 | 10/2011 | Dendis |
| 2012/0167577 A1 | 7/2012 | Pemmi et al. |
| 2016/0123328 A1 | 5/2016 | Drechsel |
| 2016/0222968 A1 | 8/2016 | Clements |
| 2016/0305433 A1 | 10/2016 | Eschner |
| 2016/0356310 A1 | 12/2016 | Yoshino |
| 2018/0320801 A1 | 11/2018 | Yang |
| 2019/0058374 A1 | 2/2019 | Enomoto et al. |
| 2019/0331027 A1 | 10/2019 | Fairman |
| 2020/0141324 A1 | 5/2020 | Nayak et al. |
| 2021/0013759 A1 | 1/2021 | Torrey et al. |
| 2021/0148283 A1 | 5/2021 | Niergarth et al. |
| 2021/0246901 A1 | 8/2021 | Eschner |
| 2021/0254547 A1 | 8/2021 | Deng |
| 2021/0301720 A1 | 9/2021 | Staubach et al. |
| 2021/0317729 A1 | 10/2021 | Sheth et al. |
| 2022/0154730 A1 | 5/2022 | Groeschel |
| 2023/0358247 A1 | 11/2023 | Yamarthi et al. |

FOREIGN PATENT DOCUMENTS

| | | | |
|---|---|---|---|
| CN | 101939161 A * | 1/2011 | ............... B05D 7/16 |
| CN | 203114905 U * | 8/2013 | |
| CN | 105308326 | 2/2016 | |
| CN | 105422474 A | 3/2016 | |
| CN | 205840927 U | 12/2016 | |
| CN | 107448246 A | 12/2017 | |
| CN | 112400065 | 2/2021 | |
| CN | 114151377 A | 3/2022 | |
| DE | 3831457 A1 | 3/1990 | |
| DE | 29508668 U1 * | 5/1995 | |
| DE | 202012006480 U1 | 8/2012 | |
| EP | 0268013 A2 | 5/1988 | |
| EP | 0704026 A1 | 4/1996 | |
| EP | 0268013 | 1/1997 | |
| EP | 2687703 A2 | 1/2014 | |
| EP | 2687703 B1 | 1/2018 | |
| EP | 3771833 A1 | 2/2021 | |
| EP | 3805529 A1 | 4/2021 | |
| FR | 2672636 A1 * | 8/1992 | ............. F01D 11/04 |
| JP | 2014001642 A | 1/2014 | |
| JP | 2020033875 A | 3/2020 | |
| WO | 2012122963 | 9/2012 | |
| WO | 2013157986 A1 | 10/2013 | |
| WO | 2014160257 A1 | 10/2014 | |
| WO | 2015035006 A2 | 3/2015 | |
| WO | 2015087677 A1 | 6/2015 | |
| WO | 2020200624 A1 | 10/2020 | |

OTHER PUBLICATIONS

English Machine Translation of CN-203114905-U (Year: 2013).*
English Machine Translation of FR-2672636-A1 (Year: 1992).*
United States Patent and Trademark Office, "Requirement for Restriction / Election," issued in connection with U.S. Appl. No. 17/840,410, dated Aug. 24, 2023, 7 pages.
United States Patent and Trademark Office, "Notice of Allowance and Fee(s) Due," issued in connection with U.S. Appl. No. 17/840,400, dated Oct. 3, 2023, 10 pages.
United States Patent and Trademark Office, "Non-Final Office Action," issued in connection with U.S. Appl. No. 17/840,410, dated Feb. 8, 2024, 10 pages.
United States Patent and Trademark Office, "Restriction Requirement," issued in connection with U.S. Appl. No. 17/840,406, dated May 16, 2024, 5 pages.
United States Patent and Trademark Office, "Requirement for Restriction / Election," issued in connection with U.S. Appl. No. 17/840,404, dated May 17, 2024, 9 pages.
United States Patent and Trademark Office, "Requirement for Restriction/Election," issued in connection with U.S. Appl. No. 17/840,414, dated May 23, 2024, 6 pages.
United States Patent and Trademark Office, "Final Office Action," issued in connection with U.S. Appl. No. 17/840,410, dated Sep. 5, 2024, 11 pages.
United States Patent and Trademark Office, "Requirement for Restriction," issued in connection with U.S. Appl. No. 17/840,404, dated Oct. 8, 2024, 6 pages.
United States Patent and Trademark Office, "Requirement for Restriction," issued in connection with U.S. Appl. No. 17/840,406, dated Oct. 21, 2024, 6 pages.
United States Patent and Trademark Office, "Final Office Action," issued in connection with U.S. Appl. No. 17/840,414, dated Nov. 18, 2024, 7 pages.
United States Patent and Trademark Office, "Requirement for Restriction," issued in connection with U.S. Appl. No. 18/191,631, dated Oct. 17, 2024, 8 pages.
United States Patent and Trademark Office, "Non-Final Office Action," issued in connection with U.S. Appl. No. 17/840,410, dated Jul. 11, 2018, 11 pages.
United States Patent and Trademark Office, "Non-Final Office Action," issued in connection with U.S. Appl. No. 17/840,404, dated Feb. 20, 2025, 12 pages.

(56) References Cited

OTHER PUBLICATIONS

United States Patent and Trademark Office, "Notice of Allowance and Fee(s) Due," issued in connection with U.S. Appl. No. 17/840,414, dated Feb. 26, 2025, 7 pages.

United States Patent and Trademark Office, "Corrected Notice of Allowability," issued in connection with U.S. Appl. No. 17/840,414, dated Mar. 12, 2025, 2 pages.

United States Patent and Trademark Office, "Non-Final Office Action," issued in connection with U.S. Appl. No. 17/840,406, dated Mar. 21, 2025, 12 pages.

United States Patent and Trademark Office, "Supplemental Notice of Allowability," issued in connection with U.S. Appl. No. 18/191,631, dated Apr. 9, 2025, 2 pages.

United States Patent and Trademark Office, "Non-Final Office Action," issued in connection with U.S. Appl. No. 17/840,414, dated Jul. 30, 2024, 9 pages.

* cited by examiner

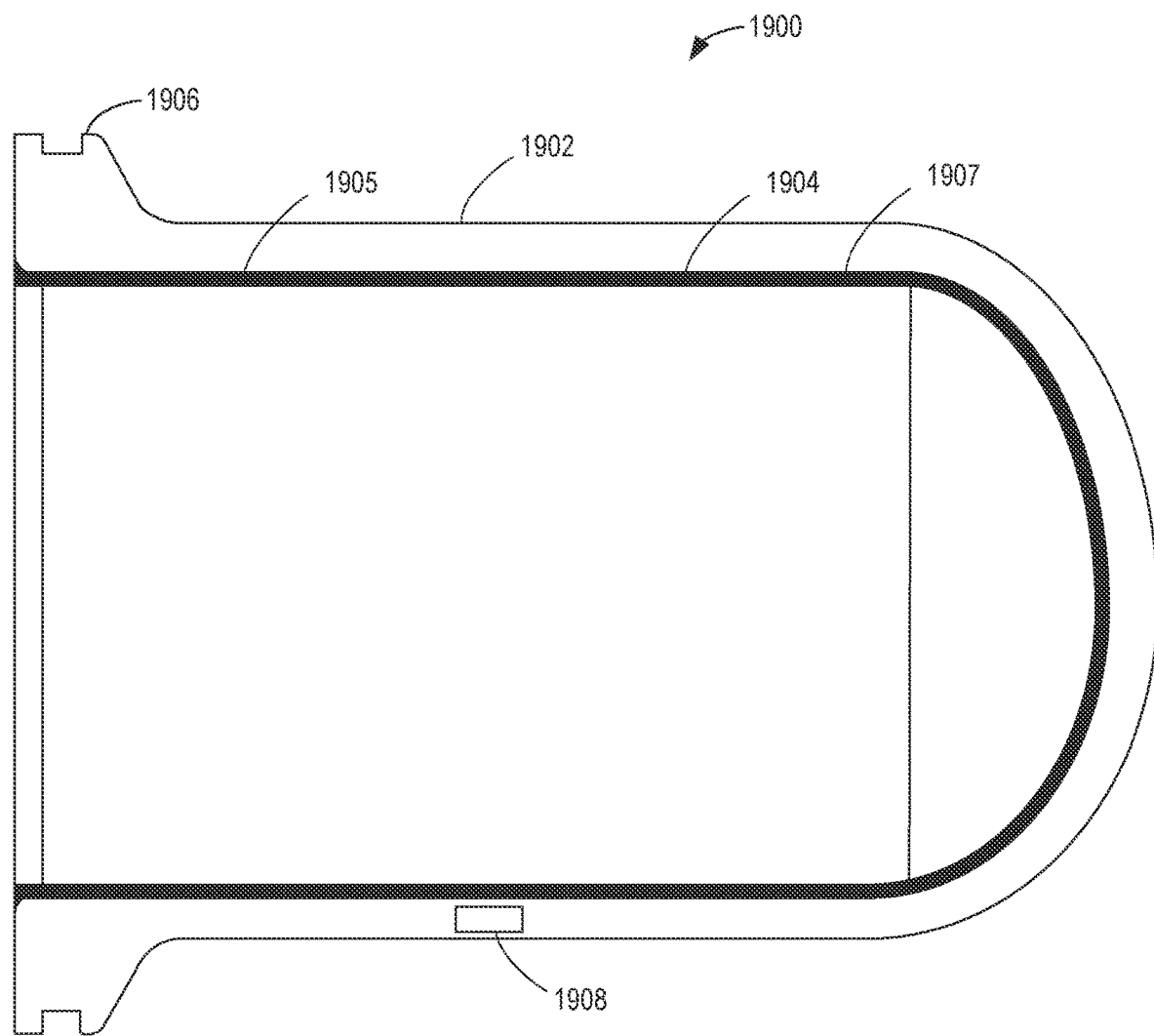
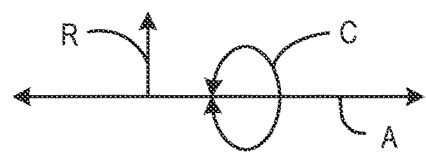
FIG. 19

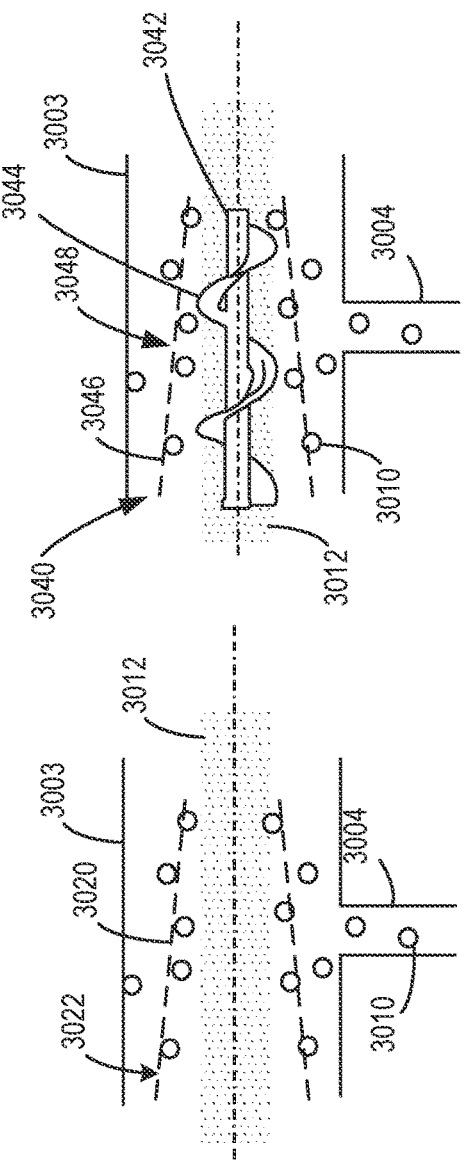

LAYERED BARRIER CANS FOR PUMPS AND METHODS OF PRODUCING THE SAME

RELATED APPLICATION

This patent claims the benefit of Indian Provisional Patent Application No. 202211025722, which was filed on May 3, 2022. Indian Provisional Patent Application No. 202211025722 is hereby incorporated herein by reference in its entirety. Priority to Indian Provisional Patent Application No. 202211025722 is hereby claimed.

FIELD OF THE DISCLOSURE

This disclosure relates generally to fluid pumps, and, more particularly, to layered barrier cans for pumps and methods of producing the same.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

FIG. 19 illustrates a second example barrier can in accordance with the teachings disclosed herein.

FIG. 30A illustrates a first example rotary separator that can be utilized in the pump systems of FIGS. 23-26 and 28.

FIG. 30B illustrates a second example rotary separator that can be utilized in the pump systems of FIGS. 23-26 and 28.

FIG. 30C illustrates a third example rotary separator that can be utilized in the pump systems of FIGS. 23-26 and 28.

The figures are not to scale. In general, the same reference numbers will be used throughout the drawing(s) and accompanying written description to refer to the same or like parts.

DETAILED DESCRIPTION

Figure 1:
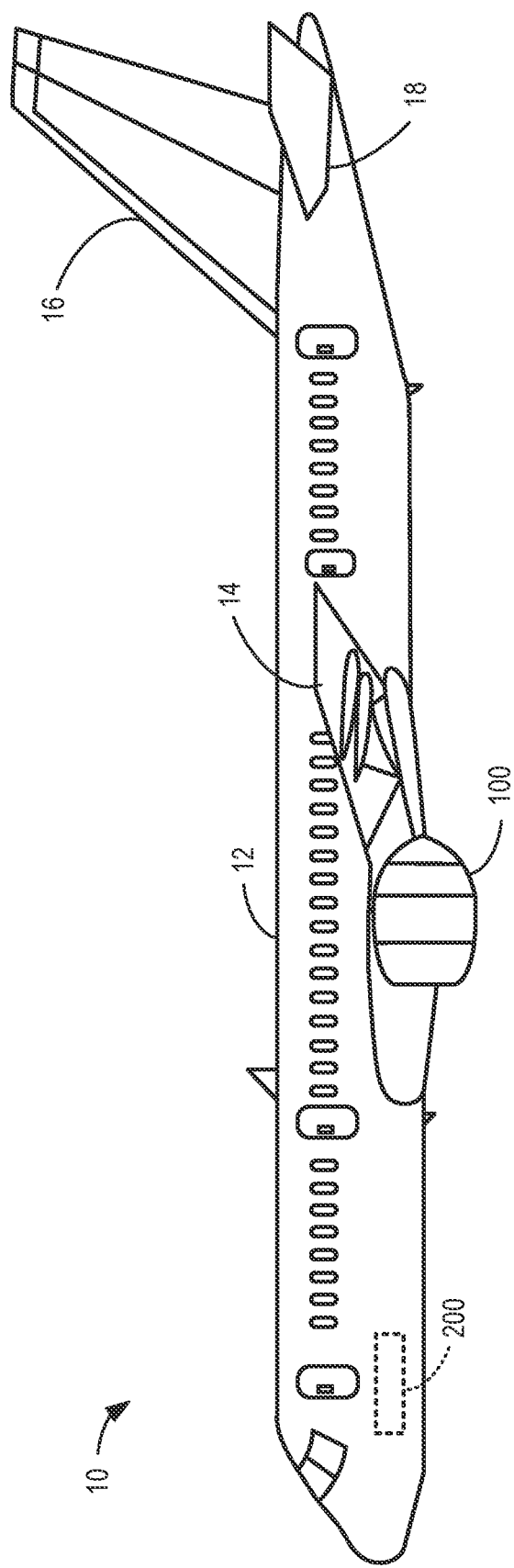
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this application, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "radially" is used to express a point or points along a radial vector originating at a central axis of a rotating body and pointing perpendicularly outward from the central axis. In some examples, two gears are said to be radially connected or coupled, meaning that the two gears are in physical contact with each other at point(s) along the circumferential outer edge surface of the gears via interlocking gear teeth. In some examples, two pulleys are said to be radially connected or coupled, meaning that the two pulleys are in physical contact with a drive belt at point(s) along the circumferential outer edge surface of the pulleys.

Centrifugal fluid pumps move fluid through systems by converting rotational kinetic energy of an impeller to hydrodynamic energy of a flowing fluid. In other words, the angular velocity of the impeller is directly proportional to the flow rate of the flowing fluid exiting the pump. The impeller is provided a change in rotational kinetic energy from an electric motor applying mechanical work to an impeller shaft coupled to the impeller and to the rotor of the electric motor. The rotor is provided a change in mechanical work over a period of time (i.e., mechanical power) from a stator in the electric motor applying electromagnetic forces to the rotor in the form of torque. If the motor supplies a constant amount of electrical energy to the stator, then the rotor will supply a constant amount of mechanical energy to the impeller. In this case, the mechanical power supplied to the pump by the electric motor would be equal to the quotient of the rotational kinetic energy and the amount of time the power is being supplied. In rotational systems, such as a centrifugal fluid pump, the mechanical power of the impeller is equal to the product of the torque and the angular velocity. If the rotor of the electric motor and the impeller shaft of the centrifugal fluid pump are coupled axially (e.g., by a magnetic coupling), then the torque and angular velocity of the rotor would transfer to the impeller, via the coupled shafts, and would be of the same values.

In some examples of fluid pump systems, a motor shaft (e.g., a rotor) can be axially coupled to an impeller shaft via a magnetic coupling. Magnetic couplings transfer torque between two shafts without physical contact between the shafts. In some examples, the magnetic coupling can be in the form of an inner hub fastened to a first shaft (e.g., an impeller shaft) and an outer hub fastened to a second shaft (e.g., a rotor shaft). In the example outer hub, there are a series of magnets (e.g., bar magnets) positioned to surround the example inner hub with each magnet having an opposite charge of the preceding magnet in the series. In the inner hub, a similar series of magnets are positioned around an axis of rotation of the first shaft. In some examples, the outer hub and inner hub have the same number of magnets. Because magnets of opposite charges are attracted to each other via magnetic fields, when the outer hub is positioned around the inner hub, a rotation of the outer hub causes the inner hub to rotate at the same rate. In other words, the example inner hub and the example outer hub are rotatably interlocked. This type of magnetic coupling can be referred to as a co-axial magnetic coupling. Because there is no physical contact between the inner hub and outer hub of the co-axial magnetic coupling, a containment barrier can be fastened to the housing surrounding the inner hub such that no fluid can pass from the inner hub side to the outer hub side.

Example Aircraft and Engines that May Implement the Examples Disclosed Herein

For the figures disclosed herein, identical numerals indicate the same elements throughout the figures. Referring now to the drawings, FIG. 1 is a side view of one embodiment of an aircraft 10. As shown, in several embodiments, the aircraft 10 includes a fuselage 12 and a pair of wings 14 (one is shown) extending outward from the fuselage 12. In the illustrated embodiment, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative embodiments, the aircraft 10 may include any other suitable configuration, such as any other suitable number or type of engines.

Furthermore, the aircraft 10 may include a thermal management system 200 for transferring heat between fluids supporting the operation of the aircraft 10. More specifically, the aircraft 10 may include one or more accessory systems configured to support the operation of the aircraft 10. For example, in some embodiments, such accessory systems include a lubrication system that lubricates components of the engines 100, a cooling system that provides cooling air to components of the engines 100, an environmental control system that provides cooled air to the cabin of the aircraft 10, and/or the like. In such embodiments, the thermal management system 200 is configured to transfer heat to and/or from one or more fluids supporting the operation of the aircraft 10 (e.g., the oil of the lubrication system, the air of the cooling system and/or the environmental control system, and/or the like) from and/or to one or more other fluids supporting the operation of the aircraft 10 (e.g., the fuel supplied to the engines 100). However, in alternative embodiments, the thermal management system 200 may be configured to transfer heat between any other suitable fluids supporting the operation of the aircraft 10.

The configuration of the aircraft 10 described above and shown in FIG. 1 is provided only to place the present subject matter in an exemplary field of use. Thus, the present subject matter may be readily adaptable to any manner of aircraft and/or any other suitable heat transfer application.

Figure 2:
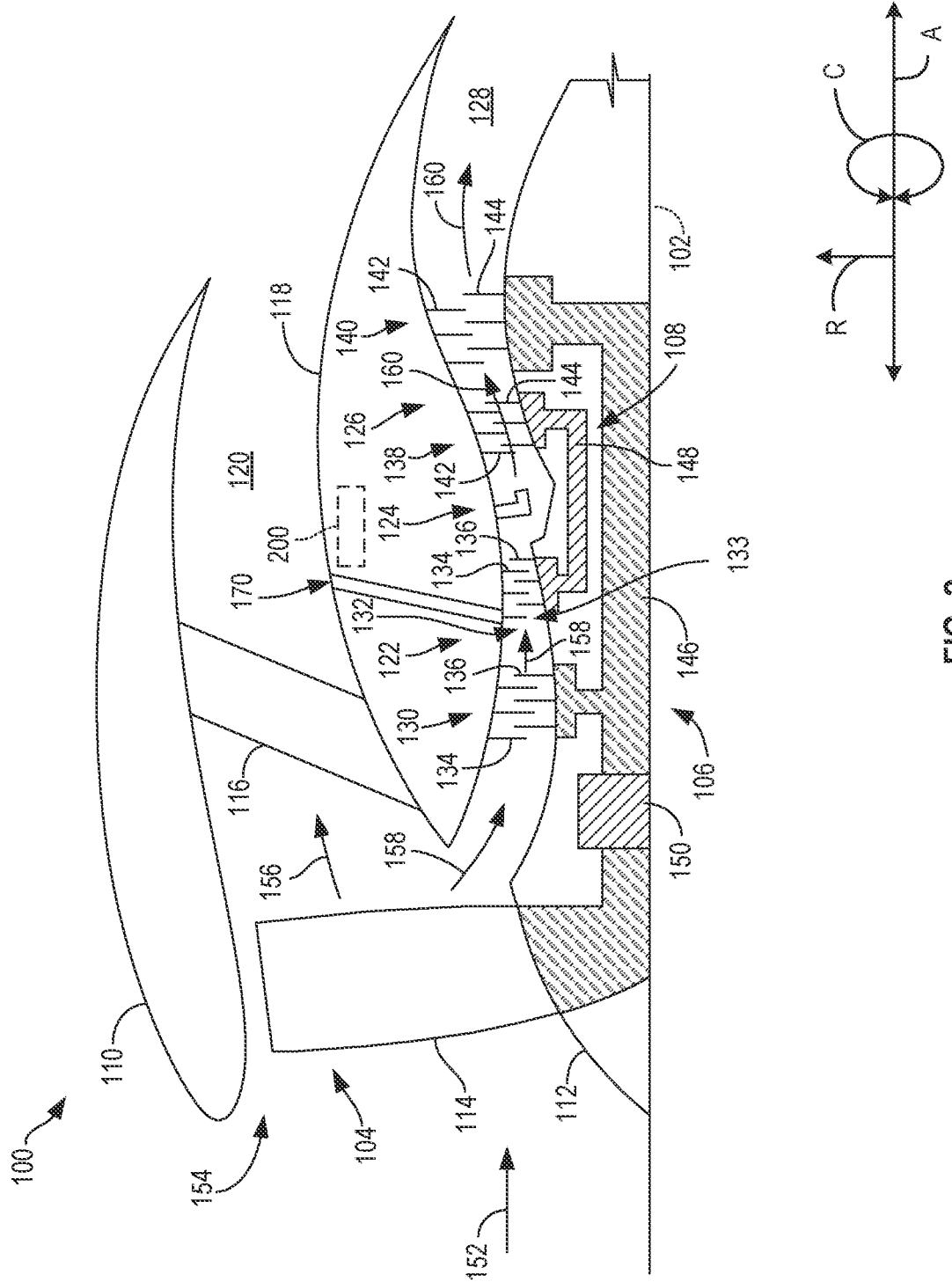
FIG. 2 is a schematic cross-sectional view of an example gas turbine engine of an aircraft.

FIG. 2 is a schematic cross-sectional view of one embodiment of a gas turbine engine 100. In the illustrated embodiment, the engine 100 is configured as a high-bypass turbofan engine. However, in alternative embodiments, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such embodiments, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, thereby driving the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

As mentioned above, the aircraft 10 may include a thermal management system 200 for transferring heat between fluids supporting the operation of the aircraft 10. In this respect, the thermal management system 200 may be positioned within the engine 100. For example, as shown in FIG. 2, the thermal management system 200 is positioned within the outer casing 118 of the engine 100. However, in alternative examples, the thermal management system 200 may be positioned at any other suitable location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows compressed a portion of the compressed air 158 from the compressor section 122 to bypass the combustion section 124. More specifically, in some examples, the third-stream flow path 170 may define a concentric or non-concentric passage relative to the compressed air flow path 170 downstream of one or more of the compressors 130, 132 or the fan 104. The third-stream flow path 170 may be configured to selectively remove a portion of compressed air 158 from the compressed air flow path 170 via one or more variable guide vanes, nozzles, or other actuable flow control structures. In addition, as will be described below, in some embodiments, the thermal management system 200 may transfer heat to the air flowing through the third-stream flow path 170. However, a pressure and/or a flow rate of a fluid (e.g., a heat exchange fluid such as a supercritical fluid (e.g., supercritical carbon dioxide ($sCO_2$), etc.)) within the thermal management system 200 limits a rate at which thermal energy is transferred between the air and the heat exchange fluid. Additionally, it is advantageous for the thermal management system 200 to produce the pressure and/or the flow rate with components (e.g., pump systems) that minimize and/or otherwise reduce a physical size of the thermal management system 200 and/or the components (e.g., pump systems) included therein. Moreover, the thermal management system 200 may ensure that the heat exchange fluid is free of contaminants when thermal energy is to be transferred.

The configuration of the gas turbine engine 100 described above and shown in FIG. 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
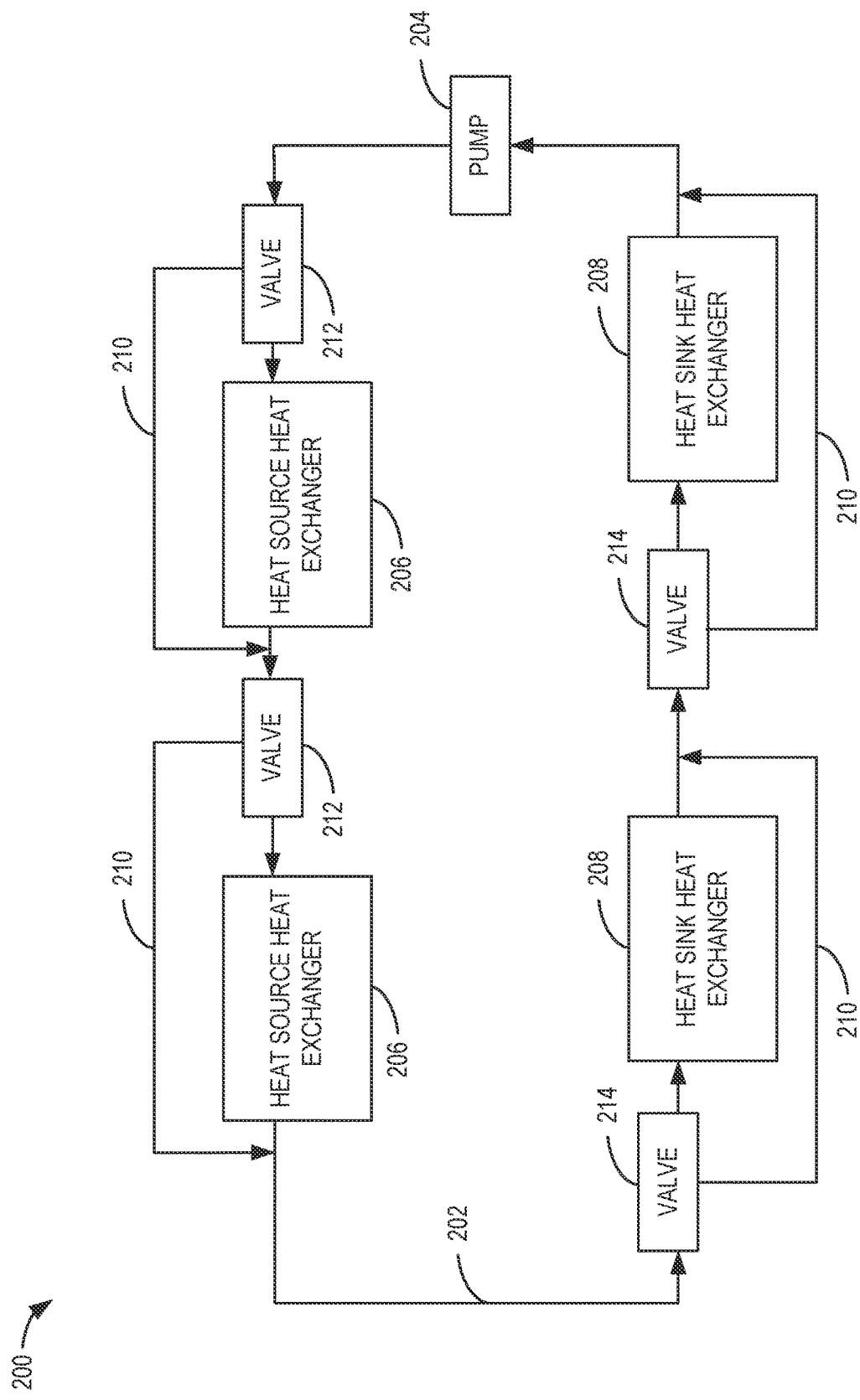
FIG. 3 is a schematic diagram of an example thermal management system for transferring heat between fluids.

Example Thermal Management Systems that May Implement the Examples Disclosed Herein FIG. 3 is a schematic view of an example implementation of the thermal management system 200 for transferring heat between fluids. In general, the thermal management system 200 will be discussed in the context of the aircraft 10 and the gas turbine engine 100 described above and shown in FIGS. 1 and 2. However, the disclosed thermal management system 200 may be implemented within any aircraft having any other suitable configuration and/or any gas turbine engine having any other suitable configuration.

As shown, the thermal management system 200 includes a thermal transport bus 202. Specifically, in several examples, the thermal transport bus 202 is configured as one or more fluid conduits through which a fluid (e.g., a heat exchange fluid) flows. As will be described below, the heat exchange fluid flows through various heat exchangers such that heat is added to and/or removed from the heat exchange fluid. In this respect, the heat exchange fluid may be any suitable fluid, such as supercritical carbon dioxide. Moreover, in such examples, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, thereby cooling the fluids supporting the operation of the aircraft 10. Thus, the heat source heat exchanger(s) 206 adds heat to the heat exchange fluid. Although FIG. 3 illustrates two heat source heat exchangers 206, the thermal management system 200 may include a single heat source heat exchanger 206 or three or more heat source heat exchangers 206.

The heat source heat exchanger(s) 206 may correspond to any suitable heat exchanger(s) that cool a fluid supporting the operation of the aircraft 10. For example, in one embodiment, at least one of the heat exchangers 206 is a heat exchanger(s) of the lubrication system(s) of the engine(s) 100. In such an example, this heat exchanger(s) 206 transfers heat from the oil lubricating the engine(s) 100 to the heat transfer fluid. In another example, at least one of the heat exchangers 206 is a heat exchanger(s) of the cooling system of the engine(s) 100. In such an example, this heat exchanger(s) 206 transfers heat from the cooling air bled from the compressor section(s) 122 (or a compressor discharge plenum) of the engine(s) 100 to the heat transfer fluid. However, in alternative examples, the heat source heat exchanger(s) 206 may correspond to any other suitable heat exchangers that cool a fluid supporting the operation of the aircraft 10.

Furthermore, the thermal management system 200 includes a plurality of heat sink heat exchangers 208 arranged along the thermal transport bus 202. More specifically, the heat sink heat exchangers 208 are fluidly coupled to the thermal transport bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, thereby heating the other fluids supporting the operation of the aircraft 10. Thus, the heat sink heat exchangers 208 remove heat from the heat exchange fluid. Although FIG. 3 illustrates two heat sink heat exchangers 208, the thermal management system 200 may include three or more heat sink heat exchangers 208.

The heat sink heat exchangers 208 may correspond to any suitable heat exchangers that heat a fluid supporting the operation of the aircraft 10. For example, at least of one of the heat exchangers 208 is a heat exchanger(s) of the fuel system(s) of the engine(s) 100. In such an example, the fuel system heat exchanger(s) 208 transfers heat from the heat transfer fluid to the fuel supplied to the engine(s) 100. In another embodiment, at least one of the heat exchangers 208 is a heat exchanger(s) in contact with the air 156 flowing through the bypass airflow passage(s) 120 of the engine(s) 100. In such an example, this heat exchanger(s) 208 transfers heat from the heat exchange fluid to the air 156 flowing through the bypass airflow passage(s) 120.

In several examples, one or more of the heat exchangers 208 are configured to transfer heat to the air flowing through the third-stream flow path 170. In such examples, the heat exchanger(s) 208 is in contact with the air flow through the third-stream flow path 170. Thus, heat from the heat exchange fluid flowing through the thermal transport bus 202 may be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, thereby allowing the heat exchanger(s) 208 to be smaller than heat exchangers relying on other heat sinks within the engine. Furthermore, in embodiments in which the engine 100 is unducted, using the third-stream flow path 170 as a heat sink does not increase drag on the engine 100 unlike the use of ambient air (e.g., a heat exchanger in contact with air flowing around the engine 100). However, in alternative embodiments, the heat sink heat exchangers 208 may correspond to any other suitable heat exchangers that heats a fluid supporting the operation of the aircraft 10.

Moreover, in several embodiments, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 3, each heat exchanger 206, 208 has a corresponding bypass conduit 210. However, in alternative embodiments, any number of heat exchangers 206, 208 may have a corresponding bypass conduit 210 so long as there is at least one bypass conduit 210.

Additionally, in several examples, the thermal management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transport bus 202 and a corresponding bypass conduit 210. As such, each valve 212, 214 may be moved between fully and/or partially opened and/or closed positions to selectively occlude the flow of heat exchange through its corresponding bypass conduit 210.

The valves 212, 214 are controlled based on the pressure of the heat exchange fluid within the thermal transport bus 202. More specifically, as indicated above, in certain instances, the pressure of the heat exchange fluid flowing through the thermal transport bus 202 may fall outside of a desired pressure range. When the pressure of the heat exchange fluid is too high, the thermal management system 200 may incur accelerated wear. In this respect, when the pressure of the heat exchange fluid within the thermal transport bus 202 exceeds a maximum or otherwise increased pressure value, one or more heat source valves 212 open. In such instances, at least a portion of the heat exchange fluid flows through the bypass conduits 210 instead of the heat source heat exchanger(s) 206. Thus, less heat is added to the heat exchange fluid by the heat source heat exchanger(s) 206, thereby reducing the temperature and, thus, the pressure of the fluid. In several embodiments, the maximum pressure value is between 3800 and 4000 pounds per square inch or less. In some embodiments, the maximum pressure value is between 2700 and 2900 pounds per square inch, such as 2800 pounds per square inch. In other embodiments, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transport bus 202, the pump 204, the heat exchangers 206, 208, the bypass conduit(s) 210, and/or the valves 212, 214. Some examples of pump 204 architecture that influence example maximum pressure capacities are described in greater detail below.

Conversely, when the pressure of the heat exchange fluid is too low, the pump 204 may experience operability problems and increased wear. As such, when the pressure of the heat exchange fluid within the thermal transport bus falls below a minimum or otherwise reduced pressure value, one or more thermal sink valves 214 open. In such instances, at least a portion of the heat exchange fluid flows through the bypass conduits 210 instead of the heat sink heat exchangers 208. Thus, less heat is removed from the heat exchange fluid by the heat sink heat exchangers 208, thereby increasing the temperature and, thus, the pressure of the fluid. In several embodiments, the minimum pressure value is 1070 pounds per square inch or more. In some embodiments, the minimum pressure value is between 1150 and 1350 pounds per square inch, such as 1250 pounds per square inch. In other embodiments, the minimum pressure value is between 2400 and 2600 pounds per square inch, such as 2500 pounds per square inch. Such minimum pressure values are generally utilized when the heat exchange fluid in a supercritical state (e.g., when the heat exchange fluid is carbon dioxide).

As such, the thermal management system 200 may be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In another embodiment, range extends from 2500 to 2800 pounds per square inch.

Accordingly, the operation of the pump 204 and the valves 212, 214 allows the disclosed thermal management system 200 to maintain the pressure of the heat exchange fluid within the thermal transport bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 may increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point upstream of the pump 204. If the example second flow rate is below a desired operating flow rate of the heat exchange fluid, then the pump 204 can either be of a different architecture that outputs a higher first flow rate, or one or more additional pumps 204 can be included in the thermal management system 200. Variations on example pump 204 architectures are described in greater detail below.

Figure 4:
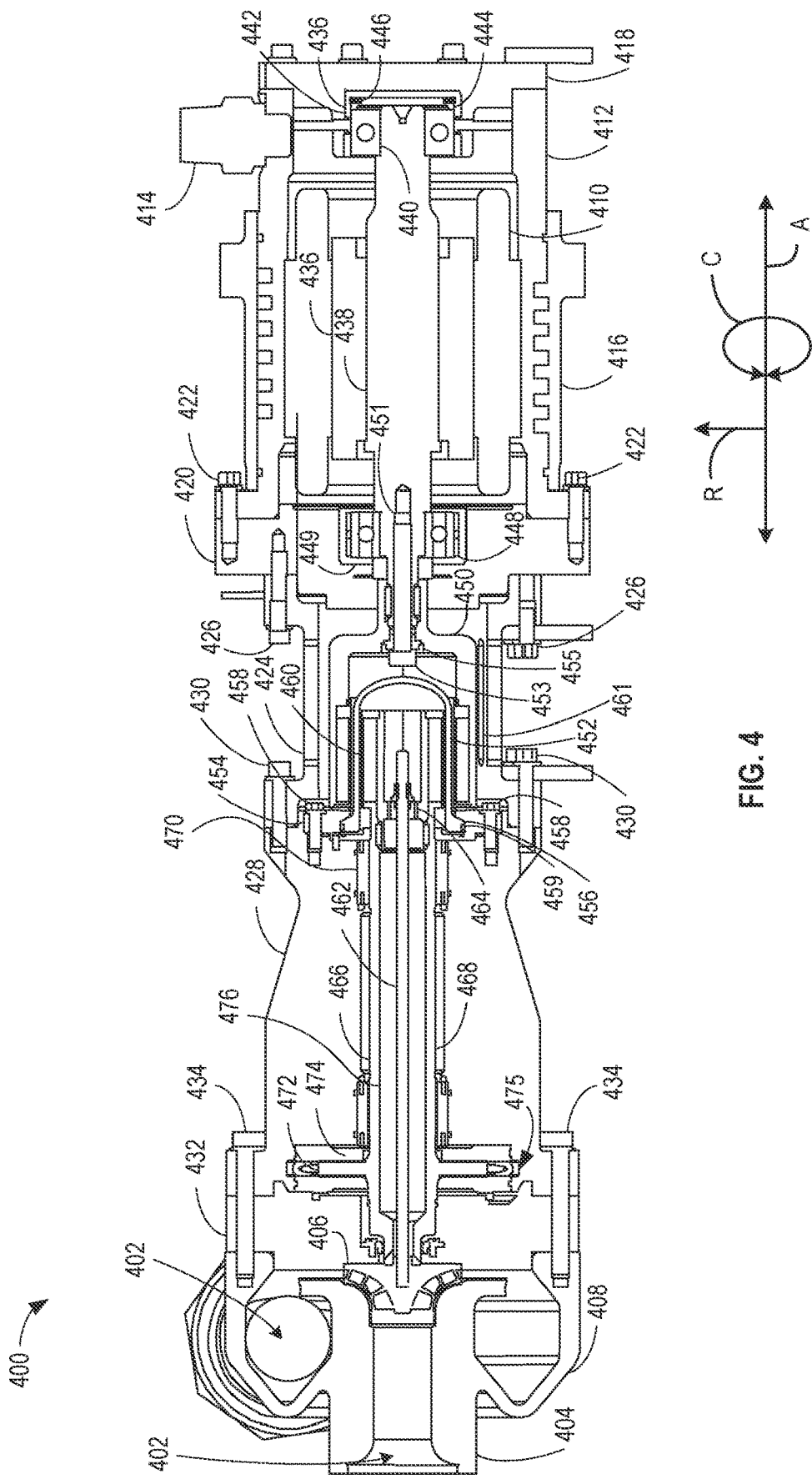
FIG. 4 illustrates an example thermal transport bus pump.

FIG. 4 illustrates an example thermal transport bus pump 400 (e.g., a magnetically driven pump, a canned motor pump, a fluid pump, a sCO$_2$ pump, the pump 204 of FIG. 3, etc.). In the illustrated example of FIG. 4, the thermal transport bus pump 400 drives a fluid (e.g., heat exchange fluid such as sCO$_2$, etc.) through one or more fluid conduits 402 connected to a flowline (e.g., the thermal transport bus 202 of FIG. 3). Specifically, the fluid flows through an inlet pipe 404 and encounters an impeller 406 (e.g., a compressor wheel) that rotates to drive the fluid through a compressor collector 408 (e.g., a volute housing) fluidly coupled to the fluid conduit(s) 402. In turn, the fluid conduit(s) 402 can feed the fluid to one or more heat exchangers (e.g., the heat source exchanger 206 and/or the heat sink exchanger 208 of FIG. 3). Accordingly, the thermal transport bus pump 400 can pump the fluid to manage a thermal energy of working fluids associated with the aircraft 10 of FIG. 1, the gas turbine engine 100 of FIG. 2, and/or any other suitable system.

In the illustrated example of FIG. 4, the thermal transport bus pump 400 includes a motor 410 positioned in a motor housing 412. The motor 410 indirectly drives a rotation of the impeller 406, as discussed in further detail below. In FIG. 4, the motor 410 is an induction motor operatively coupled to a variable frequency drive (VFD) (not shown) via a feedthrough connector 414 coupled to the motor housing 412. The VFD can be operatively coupled to controlling circuitry, such as a full authority digital engine control (FADEC) (not shown), that controls a rotational speed of the motor 410. For example, the controlling circuitry can operate the motor 410 based on a pressure and/or a temperature of the fluid in the fluid conduit(s) 402 and/or in the thermal transport bus pump 400. In some examples, the controlling circuitry can operate the motor 410 based on a pressure and/or a temperature of the working fluids affected by the fluid. Additionally or alternatively, the controlling circuitry can operate the motor 410 based on vibration measurements obtained by accelerometers operatively coupled to the thermal transport bus pump 400 and/or the fluid conduit(s) 402.

In FIG. 4, the motor housing 412 is at least partially surrounded by a cooling jacket 416 to prevent the motor 410 from overheating. An aft end of the motor housing 412 is coupled to an aft bearing housing 418. A forward end of the motor housing 412 is coupled to an intermediate bearing housing 420 via bolts 422. Further, the intermediate bearing housing 420 is coupled to a coupling housing 424 opposite the motor housing 412 via bolts 426. The coupling housing 424 is coupled to a forward bearing housing 428 opposite the intermediate bearing housing 420 via bolts 430. Moreover, the forward bearing housing 428 is coupled to a backplate 432 and the compressor collector 408 on an opposite side of the backplate 432 via bolts 434.

In the illustrated example of FIG. 4, a rotor 436 of the motor 410 is fixedly coupled to a shaft 438. As such, the motor 410 drives a rotation of the shaft 438. An aft end of the shaft 438 is supported by a first roller bearing 440 (e.g., a first rolling element bearing), which is coupled to the aft bearing housing 418. Specifically, the first roller bearing 440 is coupled to the aft bearing housing 418 via a first bearing cup 442 and a bearing shim 444 positioned between the first roller bearing 440 and the aft bearing housing 418. In the illustrated example of FIG. 4, a preload spring 446 is positioned between the first bearing cup 442 and the bearing shim 444. Similarly, a forward end of the shaft 438 is supported by a second roller bearing 448 (e.g., a second rolling element bearing) coupled to the intermediate bearing housing 420. Specifically, the second roller bearing 448 is coupled to the intermediate bearing housing 420 via a second bearing cup 449. The first roller bearing 440 and the second roller bearing 448 are packed with oil lubricant(s) (e.g., grease, motor oil, etc.) to reduce a resistance against the rotation of the shaft 438 and reduce wear encountered by the bearings 440, 448 as the shaft 438 rotates.

In the illustrated example of FIG. 4, the forward end of the shaft 438 extends at least partially through the intermediate bearing housing 420. An aft end of a first magnetic coupling 450 (e.g., a female magnetic coupling) is positioned around the forward end of the shaft 438. To couple the shaft 438 and the first magnetic coupling 450, a retention bolt 451 is inserted through the aft end of the first magnetic coupling 450 and the forward end of the shaft 438. Specifically, a width of a head 453 of the retention bolt 451 is greater than a width of an orifice 455 in the first magnetic coupling 450 through which the retention bolt 451 extends. As a result, the shaft 438 drives a rotation of the first magnetic coupling 450.

In the illustrated example of FIG. 4, the first magnetic coupling 450 is positioned around a barrier can 452 (e.g., a shroud). To couple the barrier can 452 to the forward bearing housing 428, a barrier can retainer 454 (e.g., a retainer ring) is positioned around a flange 456 of the barrier can 452 and coupled to an aft end of the forward bearing housing 428 via bolts 458. Further, an O-ring 459 is positioned between the flange 456 of the barrier can 452 and the barrier can retainer 454. The barrier can 452 hermetically seals the aft end of the forward bearing housing 428 and, in turn, prevents the fluid from escaping. As such, the barrier can 452 prevents the fluid from flowing past the coupling housing 424 and mixing with other fluids, such as the oil lubricant of the first roller bearing 440 and/or the second roller bearing 448, which would otherwise prevent thermal energy from being safely transferred between the fluid and a working fluid. Additionally or alternatively, the barrier can 452 can hermetically seal the motor housing 412 to prevent the oil lubricant from mixing with and contaminating the fluid.

In the illustrated example of FIG. 4, the barrier can 452 is positioned around a second magnetic coupling 460 (e.g., a male magnetic coupling), which is magnetically coupled to the first magnetic coupling 450. Specifically, opposite magnetic poles of the first magnetic coupling 450 and the second magnetic coupling 460 are aligned on opposite sides of the barrier can 452 to magnetically couple the first magnetic coupling 450 to the second magnetic coupling 460. As a result, the first magnetic coupling 450 and the second magnetic coupling 460 are rotatably interlocked. Accordingly, the first magnetic coupling 450 can drive a rotation of the second magnetic coupling 460. In some examples, the coupling housing 424 includes a vent 461 to enable a fluid (e.g., hydrogen, air, etc.) to circulate into and out of the coupling housing 424. In turn, as the barrier can 452 produces thermal energy as a result of encountering the rotating magnetic fields produced by the first magnetic coupling 450 and the second magnetic coupling 460, the fluid can absorb the heat from the barrier can 452 to prevent the barrier can 452 from melting. In some examples, a fan drives the fluid circulation through the vent 461 in the coupling housing 424. In some other examples, the vent 461 is open to atmospheric air, or another fluid enclosure, which provides the fluid to absorb thermal energy from the barrier can 452.

In the illustrated example of FIG. 4, the second magnetic coupling 460 is coupled to a tie rod 462 via a top hat 464.

The tie rod 462 extends through the forward bearing housing 428 and the backplate 432 to couple to the impeller 406. Additionally, the second magnetic coupling 460 is coupled to and/or extends from a shaft 466 positioned around the tie rod 462. Similarly, the shaft 466 extends through the forward bearing housing 428 and the backplate 432 to couple to the impeller 406. As a result, the tie rod 462 and the shaft 466 cause the impeller 406 to rotate with the second magnetic coupling 460 and pump the fluid.

In the illustrated example of FIG. 4, an axial portion 468 of the shaft 466 is supported by journal bearing assemblies 470. Further, a radial portion 472 of the shaft 466 is supported by a thrust bearing assembly 474. For example, the journal bearing assemblies 470 and/or the thrust bearing assembly 474 can include foil bearings. In some examples, the journal bearing assemblies 470 and the thrust bearing assembly 474 are coupled to the forward bearing housing 428 via bolts. Additionally or alternatively, the thrust bearing assembly 474 can be coupled to one of the journal bearing assemblies 470.

In the illustrated example of FIG. 4, the thermal transport bus pump 400 includes a secondary flow network having an inlet 475 in the forward bearing housing 428. Specifically, in the secondary flow network, the fluid enters the forward bearing housing 428 and flows between the radial portion 472 of the shaft 466 and the thrust bearing assembly 474. Further, in the secondary flow network, a first portion of the fluid flows around the shaft 466 and into the compressor collector 408 between the impeller 406 and the backplate 432. A second portion of the fluid in the secondary flow network flows around the shaft 466 towards the barrier can 452. A separation between an aft end of the second magnetic coupling 460 and the barrier can 452 enables the fluid to flow past the second magnetic coupling 460 and back through the shaft 466 towards the impeller 406. Further, the shaft 466 includes a duct 476 that guides the fluid flowing therethrough between the backplate 432 and the impeller 406 causing the fluid to enter the compressor collector 408. Accordingly, as the motor 410 drives the rotation of the shaft 438, the impeller 406 pumps the fluid through the fluid conduit(s) 402.

In some examples, the thermal transport bus pump 400 includes means for housing a fluid. For example, the means for housing may be implemented by the compressor collector 408, the forward bearing housing 428, and/or the backplate 432.

In some examples, the thermal transport bus pump 400 includes means for compressing the fluid. For example, the means for compressing the fluid may be implemented by the impeller 406.

In some examples, the thermal transport bus pump 400 includes means for sealing the means for housing. For example, the means for sealing may be implemented by the barrier can 452.

Radially Coupled Pump Systems for Pressurizing Fluid in Closed Loop Systems

The operations of some example fluid pump systems and centrifugal fluid pump systems have an electric motor aligned axially with an impeller (e.g., impeller 406) as described in reference to FIG. 4 above. In such example fluid pumps, the torque and angular velocity of a motor shaft (e.g., rotor shaft 438) is transferred directly to an impeller shaft (e.g., impeller shaft 466), and ultimately, to the impeller. For example, if a motor (e.g., motor 410) supplies 2000 Watts (W) of mechanical power to the rotor shaft, and the rotor shaft is spinning at an angular rate of 3600 rotations per minute (rpm), then the torque the rotor generates is 5.31 Newton-meters (Nm). In this example, since the rotor is axially aligned with and coupled to the impeller via the impeller shaft, the impeller will also have an angular velocity of 3600 rpm (378 radians per second (rad/s)) and a torque of 5.31 Nm.

In some examples, fluid pumps in an axial configuration, such as thermal transport bus pump 400 ("axially-coupled pump 400") of FIG. 4 described above, are limited in the amount of angular velocity the impeller can convert to a fluid flow rate. The example angular velocity of the impeller is limited based on the available mechanical power the electric motor supplies to the pump system (e.g., axially coupled pump 400). In other words, the electric motor induces a first angular velocity of the rotor shaft that is substantially similar to (e.g., within one percent of) a second angular velocity of the impeller. Therefore, the power of the motor limits the flow rate of a fluid (e.g., a heat exchange fluid such as a supercritical fluid (e.g., supercritical carbon dioxide ($sCO_2$), etc.) exiting the pump 400. For example, the thermal management system 200 of FIG. 3 on an aircraft (e.g., aircraft 10 of FIG. 1) may include the axially coupled pump 400 to pressurize the fluid up to a first pressure (e.g., 1450 force pounds per square inch (psi), 1475 psi, 1500 psi, etc.) associated with a first angular velocity (e.g., 4800 rpm, 5000 rpm, 5200 rpm, etc.) of the impeller. However, the axially coupled pump 400 of the above example might not be able to pressurize the example $sCO_2$ to a pressure that is sufficient to maintain the supercritical state of the fluid due to thermal energy losses in the example thermal management system 200. A larger and more powerful motor would have to be incorporated into the axially coupled pump 400, which would take up more space and add additional weight to the system. If the axially coupled pump 400 of the above example is able to pressurize the heat exchange fluid up to a second pressure (e.g., 1550 psi, 1575 psi, 1600 psi, etc.) associated with the first angular velocity of the impeller, then the motor (e.g., motor 410) of the axially coupled pump 400 might require maintenance or replacement after a first time period (e.g., one year) of operation.

In the examples disclosed herein, a radially coupled pump system can output a higher angular velocity of an impeller with a same (e.g., substantially similar) motor and/or same power output as the motor 410 of the axially coupled pump 400. In the examples disclosed herein, the radially coupled pump system can also output a same (e.g., substantially similar) angular velocity of the impeller with a smaller motor and/or smaller power output as the motor 410 of the axially coupled pump 400. In the examples disclosed herein, the radially coupled pump system can also decrease the axial length of the pump relative to the axially coupled pump 400, thereby saving space in a system (e.g., the thermal management system 200 of FIG. 3) that uses the radially coupled pump system.

Figure 5:
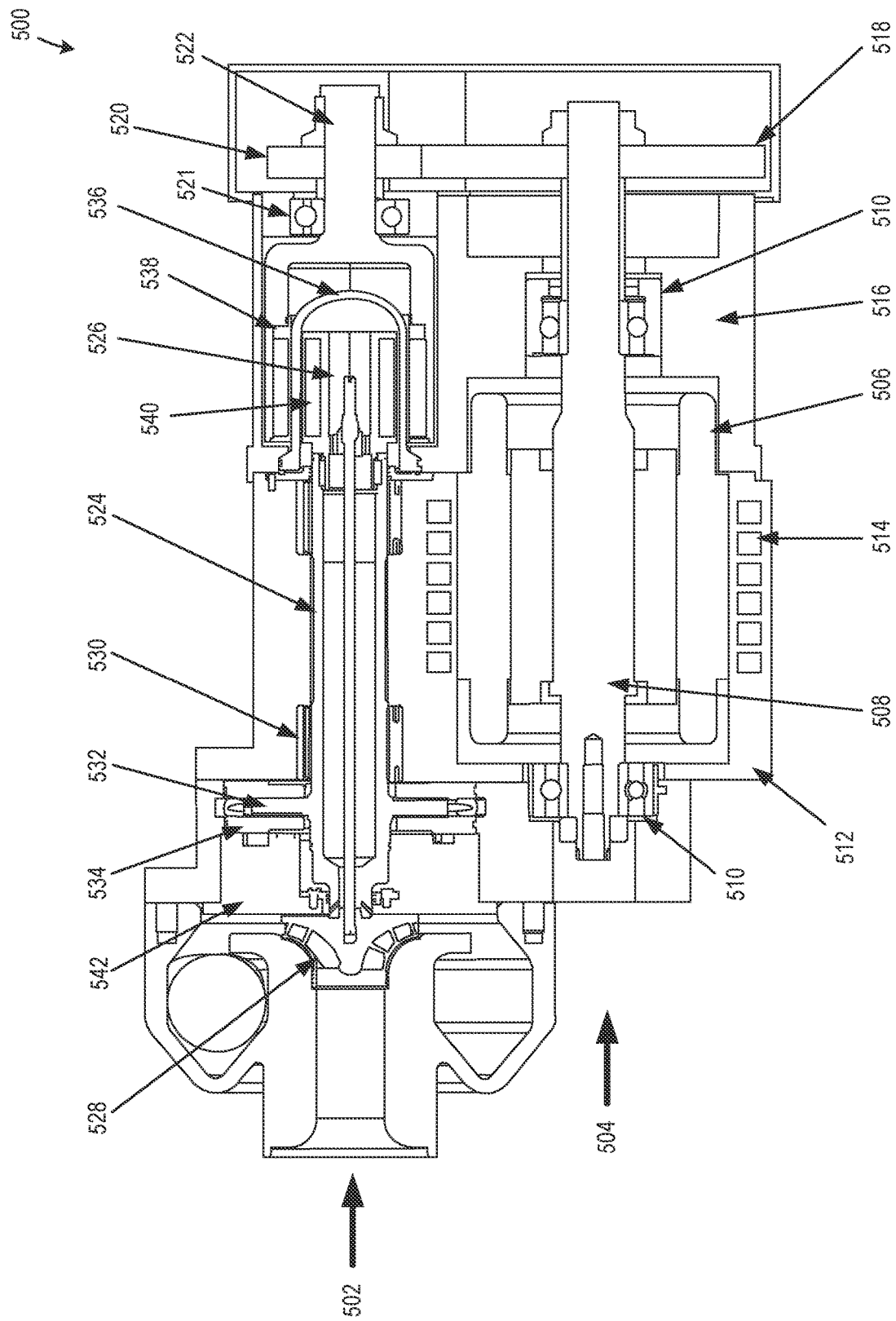
FIG. 5 illustrates a first example radially coupled fluid pump system in accordance with the teachings disclosed herein.

FIG. 5 illustrates a cross-sectional view of a radially coupled pump system 500 for pressurizing fluid (e.g., a heat exchange fluid such as a supercritical fluid (e.g., $sCO_2$, etc.)) in a system (e.g., thermal management system 200 of FIG. 3). As shown in FIG. 5, the radially coupled pump system 500 ("pump system 500") includes a pump 502 and an electric motor 504. In some examples, the pump system 500 is used to pump $sCO_2$ through a thermal management system on an aircraft (e.g., aircraft 10 of FIG. 1) and/or a gas turbine engine (e.g., gas turbine engine 100 of FIG. 2). In some examples, the electric motor 504 of the pump system 500 includes a stator 506, a rotor 508, radial motor bearing(s) 510, a motor housing 512, a cooling jacket 514, a coupling housing 516, and a driver wheel 518.

The example electric motor 504 of pump system 500 illustrated in FIG. 5 includes the stator 506 and the rotor 508. In some examples, the stator 506 includes field magnets (e.g., electromagnets or permanent magnets) that generate magnetic field(s) based on an electric current (e.g., direct current or alternating current) passing through various the electromagnets of the stator 506. The example stator 506 generates a first set of magnetic fields that apply a force (e.g., Lorentz force) on a second set of magnetic fields that the rotor 508 generates. The example rotor 508 generates the second set of magnetic fields via permanent magnets or electromagnets. Since the stator 506 is stationary and fixed in place, the force causes the example rotor 508 to rotate and to produce a torque.

The example electric motor 504 of pump system 500 includes radial motor bearings 510 that support a weight of the rotor shaft 508 and keep the rotor 508 in radial and/or axial alignment. The example radial motor bearings 510 support a radial load (e.g., weight) and a thrust load of the rotor 508. In some examples, the radial motor bearings 510 are rolling element bearings, such as angular contact ball bearings, hybrid ceramic bearings, taper roller bearings, deep groove single ball bearings, duplex ball bearings, spherical bearings, etc. In some examples, the radial motor bearings 510 use liquid lubricant(s) (e.g., grease, oil, etc.) to reduce friction and wear in rotating elements of the radial motor bearings 510. In some examples, the radial motor bearings 510 use a solid lubricant (e.g., silver coating) to reduce friction and wear of the rotating elements of the radial motor bearings 510. In some examples, the radial motor bearings 510 are foil bearings that use pressurized air to create a non-contact barrier between the rotor shaft and a sleeve of the radial motor bearings 510 at sufficiently high rotational speeds. Although the electric motor 504 illustrated in FIG. 5 includes two radial motor bearings 510, one or more radial motor bearings 510 can be used in the electric motor 504.

The example electric motor 504 of pump system 500 includes the motor housing 512 to frame and/or otherwise support the stator 506, radial motor bearing(s) 510, etc. In some examples, the motor housing 512 is additively manufactured (e.g., via direct metal laser sintering (DMLS), three-dimensional printing, etc.) to accommodate custom geometries and configurations of the stator 506, the radial motor bearing(s) 510, the cooling jacket 514, etc.

Since the example stator 506 uses electromagnets to generate Eddy currents, the example pump system 500 illustrated in FIG. 5 includes the cooling jacket 514 to dissipate heat that the stator 506 generates during operation. In some examples, the cooling jacket 514 is mechanically fixed to the motor housing 512 and includes cooling fins, vents, channels, etc., to transfer heat from the stator 506 to air, water, gas coolant, liquid coolant, etc. The example motor housing 512 illustrated in FIG. 5 is an additively manufactured structure that includes the cooling jacket 514 as an additively manufactured portion of the motor housing 512 such that the cooling jacket 514 and the motor housing 512 are the same additively manufactured part. The example cooling jacket 514 illustrated in FIG. 5 is manufactured in conjunction with the motor housing 512 to surround the stator 506 and transfer heat from the stator 506 to air, water, gas coolant, liquid coolant, etc., via cooling fins, vents, channels, etc.

The example electric motor 504 of the pump system 500 includes the coupling housing 516 to support the radial motor bearing(s) 510 and/or other parts of the pump system 500. The example parts of the pump system 500 that the coupling housing 516 supports are described in greater detail below. In some examples, the coupling housing 516 is manufactured separately from the motor housing 512 and is fixed to the motor housing 512 via bolts, dowels, interference fits, and/or adhesives. In some examples, the coupling housing 516 is additively manufactured as a portion of the motor housing 512, such that the coupling housing 516 and the motor housing 512 are the same additively manufactured part.

The example electric motor 504 of the pump system 500 includes the driver wheel 518 coupled to the rotor shaft 508. The example driver wheel 518 of the pump system 500 illustrated in FIG. 5 is connected to the rotor shaft 508 via one or more bolts such that there is a direct transference of torque from the rotor shaft 508 to the driver wheel 518. For example, if the stator 506 generates a first torque to turn the rotor 508 at a first angular velocity, then the driver wheel 518 also rotates at the first angular velocity. The example driver wheel 518 is radially coupled to a follower wheel 520 to convert the first torque and the first angular velocity to a second torque and a second angular velocity that the follower wheel 520 outputs.

The example pump 502 of the pump system 500 illustrated in FIG. 5 includes the follower wheel 520, radial coupling bearing(s) 521, a coupling shaft 522, an impeller shaft 524, a magnetic coupling 526, an impeller 528, radial pump bearing(s) 530, a thrust shaft 532, a thrust bearing 534, a barrier can 536, an outer hub 538, an inner hub 540, and a backplate 542. The driver wheel 518 and the follower wheel 520 of the pump system 500 illustrated in FIG. 5 can be gears (e.g., spur gears, helical gears, double helical gears, etc.) radially connected via interlocking gear teeth or pulleys radially connected via a drive belt. In some examples, the gear teeth of the driver wheel 518 generate a force on the gear teeth of the follower wheel 520. In some examples, the drive belt contacting the driver wheel 518 generates a tension force that acts on the outer surface of the follower wheel 520. The example force, tension force, and/or the example first torque that the driver wheel 518 generates and the example first angular velocity at which the driver wheel 518 rotates are based on the mechanical power output of the motor 504.

Equation 1 below represents instantaneous mechanical power of the driver wheel 518 and/or the follower wheel 520 in terms of torque and angular velocity:

$$P = \tau \omega. \quad \text{(Eq. 1)}$$

In Equation 1, P is power, $\tau$ is torque, and $\omega$ is angular velocity. Since power is conserved and since the driver wheel 518 and the follower wheel 520 are radially coupled via gearing teeth and/or the drive belt, the instantaneous power of the driver wheel 518 ($P_1$) is substantially similar to (e.g., within 1% of) the instantaneous power of the follower wheel 520 ($P_2$). Thus, assuming there is no energy loss (e.g., 100% efficiency) between the driver wheel 518 and the follower wheel 520 due to heat, vibration, bending, friction, drive belt creep, etc., the transmission of torque and angular velocity between the driver wheel 518 and the follower wheel 520 can be expressed with the following Equation 2:

$$P_1 = P_2$$
$$\tau_1 \omega_1 = \tau_2 \omega_2 \quad \text{(Eq. 2)}$$

In Equation 2, $\tau_1$ is the torque output of the driver wheel 518, $\omega_1$ is the angular velocity of the driver wheel 518, $\tau_2$ is the torque output of the follower wheel 520, and $\omega_2$ is the angular velocity of the follower wheel 520.

The example driver wheel 518 generates the first torque ($\tau_1$) and the example follower wheel 520 generates the second torque ($\tau_2$). The following Equation 3 is used to determine the torque output of a rotating wheel:

$$\tau = F \times L = F \times \frac{D}{2}. \quad \text{(Eq. 3)}$$

In Equation 3, F is the tangential force that the driver wheel 518 and/or the follower wheel 520 produce, L is the length from axis of rotation of the driver wheel 518 and/or the follower wheel 520 to the point where the force (F) acts (e.g., the radius of the driver wheel 518 and/or the follower wheel 520), and D is the diameter of the driver wheel 518 and/or the follower wheel 520. The force F that the driver wheel 518 generates is the substantially similar (e.g., within 1%) to the force value F that the follower wheel 520 generates due to Newton's third law with some loss due to heat, vibration, bending, friction, drive belt creep, etc. Thus, assuming no such loss occurs (e.g., 100% efficiency), Equation 2 and Equation 3 can be combined and reduced into Equation 4 shown below:

$$\begin{aligned} \tau_1 \omega_1 &= \tau_2 \omega_2 \\ \left(F \times \frac{D_1}{2}\right)\omega_1 &= \left(F \times \frac{D_2}{2}\right)\omega_2 \\ \omega_2 &= \omega_1 \frac{D_1}{D_2} \end{aligned} \quad \text{(Eq. 4)}$$

Equation 4 can be used to determine the angular velocity of the follower wheel 520 and the impeller 528 based on the driver wheel 518 angular velocity $\omega_1$, the driver wheel 518 diameter $D_1$, and the follower wheel 520 diameter $D_2$. Therefore, if the driver wheel 518 has a greater diameter than the follower wheel 520, the impeller 528 rotates at a greater rate than the rotor shaft 508 since the impeller 528 is axially coupled to the follower wheel 520 via the impeller shaft 524, the magnetic coupling 526, etc.

In the illustrated example of FIG. 5, the driver wheel 518 has a larger diameter than the follower wheel 520 to make the second angular velocity higher than the first angular velocity according to Equation 4. The follower wheel 520 is fixed (e.g., via one or more bolts) to the coupling shaft 522. The example radial coupling bearing(s) 521 support a weight that the coupling shaft 522 and other parts connected to the coupling shaft 522 produce. The example coupling shaft 522 is configured such that the coupling shaft 522 is axially coupled to the impeller shaft 524 via the magnetic coupling 526. The example impeller shaft 524 is also axially connected to the impeller 528 via one or more fastenings (e.g., bolts, rods, interference fits, etc.). Since the coupling shaft 522, the magnetic coupling 526, and the impeller shaft 524 connect the follower wheel 520 to the impeller 528, the second angular velocity of the follower wheel 520 is transferred directly to the impeller 528. In other words, the impeller 528 and the follower wheel 520 are rotatably interlocked and rotate at the same rate.

The example pump 502 of the pump system 500 includes the radial pump bearing(s) 530 to support a radial load that the impeller shaft 524 produces. In some examples, the radial pump bearing(s) 530 are rolling element bearings similar to the radial motor bearing(s) 510. In the example pump system 500 illustrated in FIG. 5, the radial pump bearing(s) 530 are foil bearings. In some examples, the radial pump bearing(s) 530 include a spring-loaded foil lining inside of a bearing sleeve. The example spring-loaded foil lining supports the weight of the impeller shaft 524 as the impeller shaft 524 begins to rotate. As the second angular velocity of the impeller shaft 524 increases, the air pressure between the impeller shaft 524 and the spring-loaded foil lining increases. As the second angular velocity continues to increase, the air pressure also increases until the air pressure pushes the spring-loaded foil lining outward from the axis of rotation. The example air gap that forms in the radial pump bearing 530 between the impeller shaft 524 and a sleeve of the radial pump bearing 530 is what then supports the weight of the impeller shaft 524.

The example radial pump bearing(s) 530 do not use fluid lubrication (e.g., oil lubricants) that can contaminate the heat exchange fluid. However, the example radial pump bearing(s) 530 (e.g., foil bearings) cannot support axial loads that the follower wheel 520, the coupling shaft 522, and/or the impeller shaft 524 generate. The example motor housing 512 and the backplate 542 illustrated in FIG. 5 frame the thrust bearing 534 such that thrust bearing 534 supports the thrust load that the impeller shaft 524 generates. The example thrust shaft(s) 532 are fixed to the impeller shaft 524 and/or are otherwise rigidly extending from the impeller shaft 524 perpendicular to the axis of rotation of the impeller shaft 524. As the impeller shaft 524 rotates and transfers an axial and/or thrust load to the thrust shaft(s) 532, the thrust bearing 534 counteracts the axial load from the thrust shaft(s) 532 while allowing the impeller shaft 524 to rotate with limited (e.g., less than 1%) energy loss. While two thrust shafts 532 and one thrust bearing 534 are illustrated in FIG. 5, there can be two or more thrust shafts 532 and/or one or more thrust bearings 534 in the pump system 500. In some examples, the thrust bearing 534 can be a thrust ball bearing, a cylindrical thrust roller bearing, a tapered roller thrust bearing, a spherical roller thrust bearing, a magnetic bearing, etc.

The example pump 502 of the pump system 500 illustrated in FIG. 5 includes the magnetic coupling 526 to connect the coupling shaft 522 and the impeller shaft 524. The example magnetic coupling 526 includes the outer hub 538 and the inner hub 540 both including permanent magnets that alternate in polarity around the axis of rotation. The example inner hub 540 is the male component of the magnetic coupling 526 and fits within the outer hub 538 (e.g., the female component). The magnetic forces of the permanent magnets cause the coupling shaft 522 to transfer torque directly to the impeller shaft 524 such that the impeller shaft 524 and the impeller 528 rotate at the same second angular velocity as the follower wheel 520. The coupling shaft 522 is magnetically coupled to the impeller shaft 524 such that a gap exists between the male and female components. The example barrier can 536 (e.g., barrier can 452) is designed to fit within the gap without physically and/or magnetically interfering with the magnetic coupling 526.

The example barrier can 536 is fixed in the magnetic coupling 526, the coupling housing 516, and/or the motor housing 512 to hermetically seal the follower wheel 520, the coupling shaft 522, and the motor 504 from the fluid (e.g., a heat exchange fluid such as a supercritical fluid (e.g., $sCO_2$, etc.)). The example barrier can 536 also hermetically seals example oil(s) that the radial motor bearing(s) 510, the driver wheel 518, the follower wheel 520, and/or the motor 504 use as lubricant from contaminating the heat exchange fluid. In some examples, the barrier can 536 is of the same structure, materials, design, etc. as the barrier can 452 of FIG. 4. In some examples, the barrier can 536 of FIG. 5 is also fixed to the coupling housing 516 and/or the motor housing 512 in the same manner as the barrier can 452 of FIG. 4, such as via a flange, a barrier can retainer ring, and/or bolts.

In some examples, the barrier can 536 includes an inner shell, a middle layer, and an outer layer. In some examples, the inner layer and outer layer are composed of various combinations of ceramic, polymer, or composite, and the middle layer is composed of metal electroformed over the inner layer mandrel. Some further examples of the barrier can 536 including materials, structure, design, etc. are described in greater detail in other sections of this document.

A radially coupled pump system 500 is disclosed herein. The examples disclosed herein include an electric motor 504 to drive a pump 502 via a driver wheel 518 axially connected to a rotor shaft 508. The examples disclosed herein further include a follower wheel 520 radially coupled to the driver wheel 518 via gearing or a drive belt. The examples disclosed herein further include that the follower wheel 520 is axially connected to an impeller shaft 524 via a magnetic coupling 526. The examples disclosed herein further include that the driver wheel 518 has a first diameter and the follower wheel 520 has a second diameter that is smaller than the first diameter. Thus, the examples disclosed herein further include that the driver wheel 518 rotates at a first angular velocity and that the follower wheel 520 rotates at a second angular velocity that is greater than the first angular velocity. The examples disclosed herein allow the motor 504 to be mounted above or below portions of the pump 502 such that the pump system 500 saves space in the axial direction relative to pump systems that are axially coupled and aligned (e.g., pump 400 of FIG. 4). The examples disclosed herein operate the electric motor 504 more efficiently, increase the lifetime of the motor 504, increase the power density of the pump system 500, and increase the maximum angular velocity of the impeller 528 relative to those of the example pump 400 of FIG. 4 because the electric motor 504 can output less mechanical power than the motor 410 to achieve the same angular velocity of the impeller 406.

Figure 6:
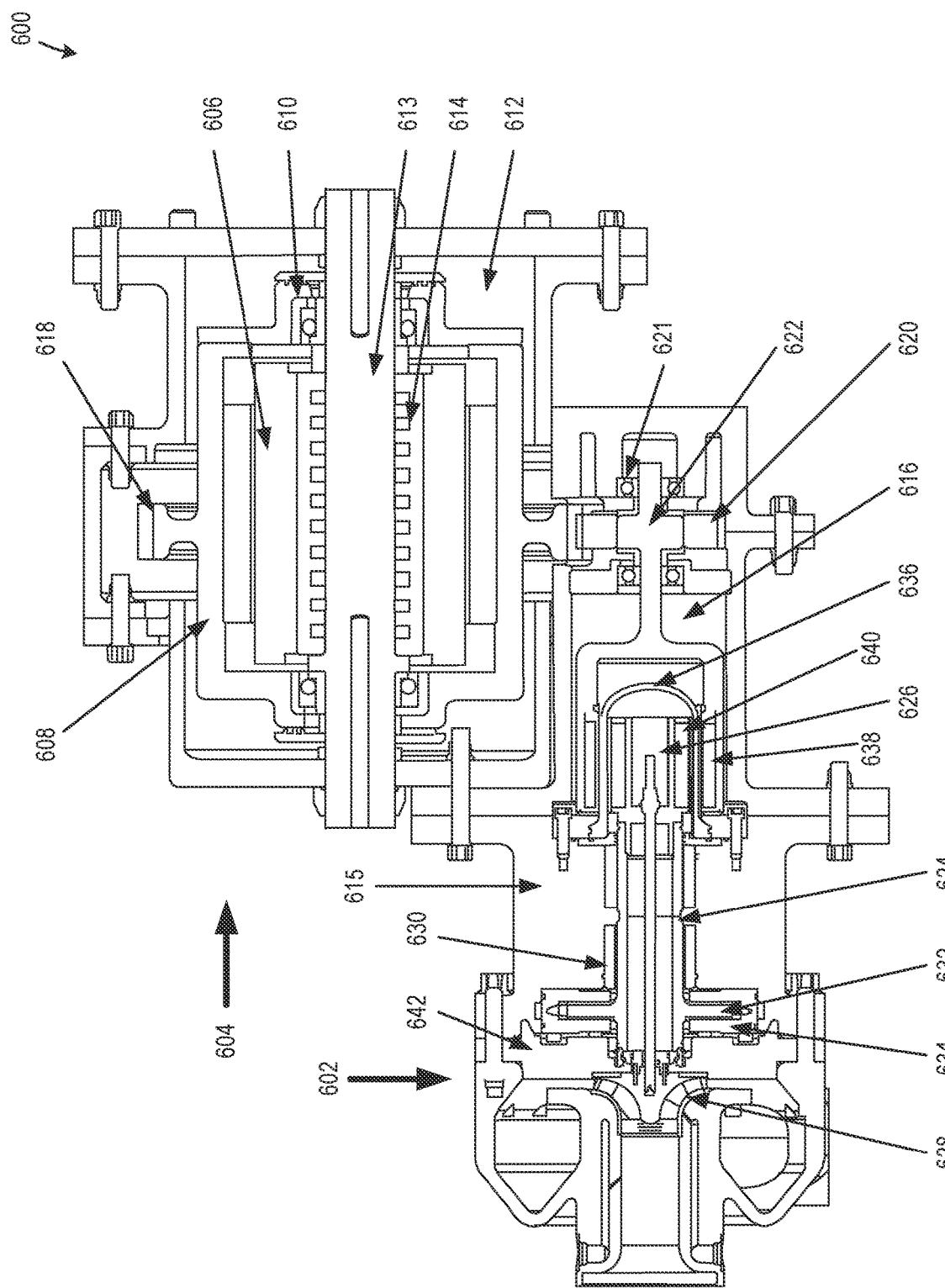
FIG. 6 illustrates a second example radially coupled fluid pump system in accordance with the teachings disclosed herein.

FIG. 6 illustrates a cross-sectional view of a radially coupled pump system 600 for pressurizing fluid (e.g., a heat exchange fluid such as a supercritical fluid (e.g., $sCO_2$, etc.)) in a system (e.g., thermal management system 200 of FIG. 3). As shown in FIG. 6, the radially coupled pump system 600 ("pump system 600") includes a pump 602 and an electric motor 604. In some examples, the pump system 600 is used to pump $sCO_2$ through a thermal management system on an aircraft (e.g., aircraft 10 of FIG. 1) and/or a gas turbine engine (e.g., gas turbine engine 100 of FIG. 2). In some examples, the electric motor 604 of the pump system 600 includes a stator 606, a rotor 608, radial motor bearing(s) 610, a motor housing 612, a mounting rod 613, a cooling jacket 614, and a driver wheel 618.

The example electric motor 604 of pump system 600 illustrated in FIG. 6 includes the stator 606 and the rotor 608. In some examples, the stator 606 includes field magnets (e.g., electromagnets or permanent magnets) that generate magnetic field(s) based on an electric current (e.g., direct current or alternating current) passing through various the electromagnets of the stator 606. The example stator 606 generates a first set of magnetic fields that apply a force (e.g., Lorentz force) on a second set of magnetic fields that the rotor 608 generates. The example rotor 608 generates the second set of magnetic fields via permanent magnets or electromagnets. Since the stator 606 is stationary and fixed in place, the force causes the example rotor 508 to rotate and to produce a torque.

The example stator 606 of the pump system 600 is structurally configured to be fixed in place inside of the rotor 608. The example rotor 608 rotates at a first angular velocity with a first torque similarly to the rotor 508 of FIG. 5. However, the rotor 608 encases the stator 606, whereas the stator 506 encases the rotor 508 of FIG. 5. The example stator 606 is fixed to the mounting rod 613. The example mounting rod 613 is fixed to the motor housing 612 via one or more bolts. The example mounting rod 613 also supports the radial motor bearing(s) 610 such that an inner sleeve of the radial motor bearing(s) 610 is statically attached to the mounting rod 613.

The example electric motor 604 of pump system 600 includes radial motor bearing(s) 610 that support a weight of the rotor shaft 608 and/or the driver wheel 618. The example radial motor bearing(s) 610 also keep the rotor 608 and/or the driver wheel 618 in radial and/or axial alignment. The example radial motor bearing(s) 610 support a radial load (e.g., weight) and a thrust load that the rotor 608 generates. In some examples, the radial motor bearings 610 are rolling element bearings, such as angular contact ball bearings, hybrid ceramic bearings, taper roller bearings, deep groove single ball bearings, duplex ball bearings, spherical bearings, etc. In some examples, the radial motor bearings 610 use liquid lubricant(s) (e.g., grease, oil, etc.) to reduce friction and wear in rotating elements of the radial motor bearings 610. In some examples, the radial motor bearings 610 use a solid lubricant (e.g., silver coating) to reduce friction and wear of the rotating elements of the radial motor bearings 610. In some examples, the radial motor bearings 610 are foil bearings that use pressurized air to create a non-contact barrier between the rotor shaft and a sleeve of the radial motor bearings 610 at sufficiently high rotational speeds. Although the electric motor 604 illustrated in FIG. 6 includes two radial motor bearings 610, one or more radial motor bearings 610 can be used in the electric motor 604.

The example electric motor 604 of pump system 600 includes the motor housing 612 to frame and/or otherwise support mounting rod 613, which in turn supports the stator 606, radial motor bearing(s) 510, etc. In some examples, the motor housing 612 is additively manufactured (e.g., via direct metal laser sintering (DMLS), three-dimensional printing, etc.) to accommodate custom geometries and configurations of the mounting rod 613, the stator 606, the radial motor bearing(s) 610, the cooling jacket 614, the rotor 608, the driver wheel 618, etc. The example motor housing 612 illustrated in FIG. 6 can be additively manufactured to include the mounting rod 613 and/or the cooling jacket 614 in the same fabricated part. Alternatively, the motor housing 612 can be additively manufactured separate from the mounting rod 613 and/or the cooling jacket 614 such that the geometric dimensions and tolerances of the motor housing 612 can appropriately accommodate the various parts of the motor 604, including the mounting rod 613 and/or the cooling jacket 614. Additionally or alternatively, the motor housing 612, the mounting rod 613, and/or the cooling jacket 614 can be fabricated separately via subtractive manufacturing methods.

Since the example stator 606 uses electromagnets to generate Eddy currents, the example pump system 600 illustrated in FIG. 6 includes the cooling jacket 614 to dissipate heat that the stator 606 generates during operation. In some examples, the cooling jacket 614 is mechanically fixed to the stator 606 and/or the mounting rod 613 and includes cooling fins, vents, channels, etc. to transfer heat from the stator 606 to air, water, gas coolant, liquid coolant, etc. The example mounting rod 613 illustrated in FIG. 6 can be an additively manufactured structure that includes the cooling jacket 614 as an additively manufactured portion of the mounting rod 613 such that the cooling jacket 514 and the mounting rod 613 are the same additively manufactured part. The example cooling jacket 614 illustrated in FIG. 5 can be manufactured in conjunction with the mounting rod 613 such that the stator 606 precisely fits around and/or couples to the cooling jacket 614. In some examples, the cooling jacket 614 is manufactured in conjunction with the stator 606 such that the cooling jacket 614 and the stator 606 are the same part, and such that the cooling jacket 614 transfers heat from the stator 606 to air, water, gas coolant, liquid coolant, etc. via cooling fins, vents, channels, etc.

The example electric motor 604 of the pump system 600 includes the driver wheel 618 coupled to the rotor shaft 608. The example driver wheel 618 of the pump system 600 illustrated in FIG. 6 is connected to the rotor shaft 608 such that there is a direct transference of torque from the rotor shaft 608 to the driver wheel 618. For example, if the stator 606 generates a first torque to turn the rotor 608 at a first angular velocity, then the driver wheel 618 also rotates at the first angular velocity. The example driver wheel 618 is of a shell configuration that surrounds the rotor 608 and is fixed to the rotor via one or more fastening techniques (e.g., bolts, pins, interference fits, adhesives, etc.). In some examples, the driver wheel 618 is additively manufactured to include one ore more components of the rotor 608 (e.g., the permanent magnets). The example driver wheel 618 is radially coupled to a follower wheel 620 (e.g., via gearing or drive belt(s)) to convert the first torque and the first angular velocity to a second torque and a second angular velocity that the follower wheel 620 outputs.

The example pump 602 of the pump system 600 illustrated in FIG. 6 includes a pump housing 615, a coupling housing 616, the follower wheel 620, radial coupling bearing(s) 621, a coupling shaft 622, an impeller shaft 624, a magnetic coupling 626, an impeller 628, radial pump bearing(s) 630, a thrust shaft 632, a thrust bearing 634, a barrier can 636, an outer hub 638, an inner hub 640, and a backplate 642. The example pump 602 of pump system 600 includes the coupling housing 616 to support the radial couplings bearing(s) 621. The example radial coupling bearings 621 support a weight that the coupling shaft 622 and other parts connected to the coupling shaft 622 produce. In some examples, the coupling housing 616 is manufactured separately from the motor housing 612 and is fixed to the motor housing 612 via bolts, fasteners, adhesives, etc. In some examples, the coupling housing 616 is additively manufactured as a portion of the motor housing 612, such that the coupling housing 616 and the motor housing 612 are the same additively manufactured part.

The driver wheel 618 and the follower wheel 620 of the pump system 600 illustrated in FIG. 6 are gears (e.g., spur gears, helical gears, double helical gears, etc.) radially connected via interlocking gear teeth or pulleys radially connected via a drive belt. In some examples, the gear teeth of the driver wheel 618 generate a force on the gear teeth of the follower wheel 620. In some examples, the drive belt contacting the driver wheel 618 generates a tension force that acts on the outer surface of the follower wheel 620. The example force, tension force, and/or the example first torque that the driver wheel 618 generates and the example first angular velocity at which the driver wheel 618 rotates are based on the mechanical power output of the motor 604. As described above, Equation 1 represents instantaneous mechanical power of the driver wheel 618 and/or the follower wheel 620 in terms of torque and angular velocity.

Since power is conserved and since the driver wheel 618 and the follower wheel 620 are radially coupled via gearing teeth and/or the drive belt, the instantaneous power of the driver wheel 618 ($P_1$) is substantially similar to (e.g., within 1% of) the instantaneous power of the follower wheel 620 ($P_2$). Thus, assuming there is no energy loss (e.g., 100% efficiency) between the driver wheel 618 and the follower wheel 620 due to heat, vibration, bending, friction, drive belt creep, etc., the transmission of torque and angular velocity between the driver wheel 618 and the follower wheel 620 can be expressed with Equation 2, as described above.

The example driver wheel 618 generates the first torque ($\tau_1$) and the example follower wheel 620 generates the second torque ($\tau_2$). As described above, Equation 3 is used to determine the torque output of a rotating wheel. The force F that the driver wheel 618 generates is the substantially similar (e.g., within 1%) to the force value F that the follower wheel 620 generates due to Newton's third law with some loss due to heat, vibration, bending, friction, drive belt creep, etc. Thus, assuming no such loss occurs (e.g., 100% efficiency), Equation 2 and Equation 3 can be combined and reduced into Equation 4, as described above, and Equation 4 can be used to determine the angular velocity of the follower wheel 620 and the impeller 628. Therefore, if the driver wheel 618 has a greater diameter than the follower wheel 620, the impeller 628 will rotate at a greater rate than the rotor shaft 608 since the impeller 628 is axially coupled to the follower wheel 620 via the impeller shaft 624, the magnetic coupling 626, etc.

In the illustrated example of FIG. 6, the driver wheel 618 has a larger diameter than the follower wheel 620 to make the second angular velocity higher than the first angular velocity according to Equation 4. The follower wheel 620 is fixed (e.g., via one or more bolts) to the coupling shaft 622. The example coupling shaft 622 is configured such that it is axially coupled to the impeller shaft 624 via the magnetic coupling 626. The example impeller shaft 624 is also axially connected to the impeller 628 via one or more fastenings (e.g., bolts, rods, interference fits, etc.). Since the coupling shaft 622, the magnetic coupling 626, and the impeller shaft 624 connect the follower wheel 620 to the impeller 628, the second angular velocity of the follower wheel 620 is transferred directly to the impeller 628. In other words, the impeller 628 and the follower wheel 620 are rotatably interlocked and rotate at the same rate.

The example pump 602 of the pump system 600 includes the pump housing 615 to frame and/or otherwise support the radial pump bearings 630 and the thrust bearing 634. In some examples, the pump housing 615 is additively manufactured to fit a specific configuration and/or geometry of the one or more radial pump bearings 630, the thrust bearing 634, and/or the impeller shaft 624. In some examples, the pump housing 615 is additively manufactured with the coupling housing 616 and/or the motor housing 612 such that the pump housing 615 is the same part as the coupling housing 616 and/or the motor housing 612. The example pump housing 615 as illustrated in FIG. 6 is fabricated (e.g., additively manufactured) separately from the coupling housing 616 and the motor housing 612. The example pump housing 615 as illustrated in FIG. 6 is fastened to the coupling housing 616 and the motor housing 612 via one or more bolts. In some examples, the pump housing 615 is fastened to the coupling housing 616 and the motor housing 612 via one or more bolts, dowels, interference fits, and/or adhesives.

The example pump 602 of the pump system 600 includes the radial pump bearing(s) 630 to support a radial load that the impeller shaft 624 produces. In some examples, the radial pump bearing(s) 630 are rolling element bearings similar to the radial motor bearing(s) 610 and/or the radial coupling bearing(s) 621. In the example pump system 600 illustrated in FIG. 6, the radial pump bearing(s) 630 are foil bearings. In some examples, the radial pump bearing(s) 630 include a spring-loaded foil lining inside of a bearing sleeve. The example spring-loaded foil lining supports the weight of the impeller shaft 624 as the impeller shaft 624 begins to rotate. As the second angular velocity of the impeller shaft 624 increases, the air pressure between the impeller shaft 624 and the spring-loaded foil lining increases. As the second angular velocity continues to increase, the air pressure also increases to the point where the air pressure pushes the spring-loaded foil lining perpendicularly outward from the axis of rotation. The example air gap that forms in the radial pump bearing 630 between the impeller shaft 624 and a sleeve of the radial pump bearing 630 is what then supports the weight of the impeller shaft 624.

The example radial pump bearing(s) 630 do not use fluid lubrication (e.g., oil lubricants) that can contaminate the fluid. However, the example radial pump bearing(s) 630 (e.g., foil bearings) cannot support axial loads that the follower wheel 620, the coupling shaft 622, and/or the impeller shaft 624 generate. The example pump housing 615 and the backplate 642 illustrated in FIG. 6 frame the thrust bearing 634 such that thrust bearing 634 supports the thrust load that the impeller shaft 624 generates. The example thrust shaft(s) 632 are fixed to the impeller shaft 624 and/or are otherwise rigidly extending from the impeller shaft 624 perpendicular to the axis of rotation of the impeller shaft 624. As the impeller shaft 624 rotates and transfers an axial and/or thrust load to the thrust shaft(s) 632, the thrust bearing 634 counteracts the axial load from the thrust shaft(s) 632 while allowing the impeller shaft 624 to rotate with limited (e.g., less than 1%) energy loss. While two thrust shafts 632 and one thrust bearing 634 are illustrated in FIG. 5, there can be two or more thrust shafts 632 and/or one or more thrust bearings 634 in the pump system 600. In some examples, the thrust bearing 634 can be a thrust ball bearing, a cylindrical thrust roller bearing, a tapered roller thrust bearing, a spherical roller thrust bearing, a magnetic bearing, etc.

The example pump 602 of the pump system 600 illustrated in FIG. 6 includes the magnetic coupling 626 to connect the coupling shaft 622 and the impeller shaft 624. The example magnetic coupling 626 includes the outer hub 638 and the inner hub 640 both including permanent magnets that alternate in polarity around the axis of rotation. The example inner hub 640 is the male component of the magnetic coupling 626 and fits within the outer hub 638 (e.g., the female component). The magnetic forces of the permanent magnets cause the coupling shaft 622 to transfer torque directly to the impeller shaft 624 such that the impeller shaft 624 and the impeller 628 rotate at the same second angular velocity as the follower wheel 620. The coupling shaft 622 is magnetically coupled to the impeller shaft 624 such that a gap exists between the male and female components. The example barrier can 636 (e.g., barrier can 452) is designed to fit within the gap without physically and/or magnetically interfering with the magnetic coupling 626.

The example barrier can 636 is fixed in the magnetic coupling 626, the coupling housing 616, and/or the pump housing 615 to hermetically seal the follower wheel 620, the coupling shaft 622, and the motor 604 from the fluid. The example barrier can 636 also hermetically seals example oil(s) that the radial motor bearing(s) 610, the driver wheel 618, the follower wheel 620, and/or the motor 604 use as lubricant from contaminating the fluid. In some examples, the barrier can 636 is of the same structure, materials, design, etc. as the barrier can 452 of FIG. 4. In some examples, the barrier can 636 of FIG. 6 is also fixed to the coupling housing 616 and/or the motor housing 612 in the same manner as the barrier can 452 of FIG. 4, such as via a flange, a barrier can retainer ring, and/or bolts.

In some examples, the barrier can 636 includes an inner shell, a middle layer, and an outer layer. In some examples, the inner layer and outer layer are composed of various combinations of ceramic, polymer, or composite, and the middle layer is composed of metal electroformed over the inner layer mandrel. Some further examples of the barrier can 636 including materials, structure, design, etc., are described in greater detail in other sections of this document.

A radially coupled pump system 600 is disclosed herein. The examples disclosed herein include an electric motor 604 with a stator 606 that is mounted inside of a cylindrical rotor shaft 608 that rotates around the outside of the stator 606. The examples disclosed herein include a driver wheel 618 that surrounds and is fixed to the rotor 608 such that the rotor 608 transfers a first torque output of the rotor 608 directly to the driver wheel 618. The examples disclosed herein include that the driver wheel 618 is radially coupled to a follower wheel 620 via gearing or a drive belt. The examples disclosed herein further include that the follower wheel 620 is axially connected to an impeller shaft 624 via a magnetic coupling 626 to drive a pump 602. The examples disclosed herein further include that the driver wheel 618 has a first diameter and the follower wheel 620 has a second diameter that is smaller than the first diameter. Thus, examples disclosed herein further include that the driver wheel 618 rotates at a first angular velocity and that the follower wheel 620 rotates at a second angular velocity, wherein the second angular velocity is greater than the first angular velocity. Examples disclosed herein allow the motor 604 to be mounted above or below portions of the pump 602 such that the pump system 600 saves space in the axial direction relative to pump systems that are axially coupled and aligned (e.g., pump 400 of FIG. 4). Examples disclosed herein operate the electric motor 604 more efficiently, increase the lifetime of the motor 604, increase the power density of the pump system 600, and increase the maximum angular velocity of the impeller 628 relative to those of the example pump 400 of FIG. 4 because the electric motor 604 can output less mechanical power than the motor 410 to achieve the same angular velocity as the impeller 406.

Figure 7:
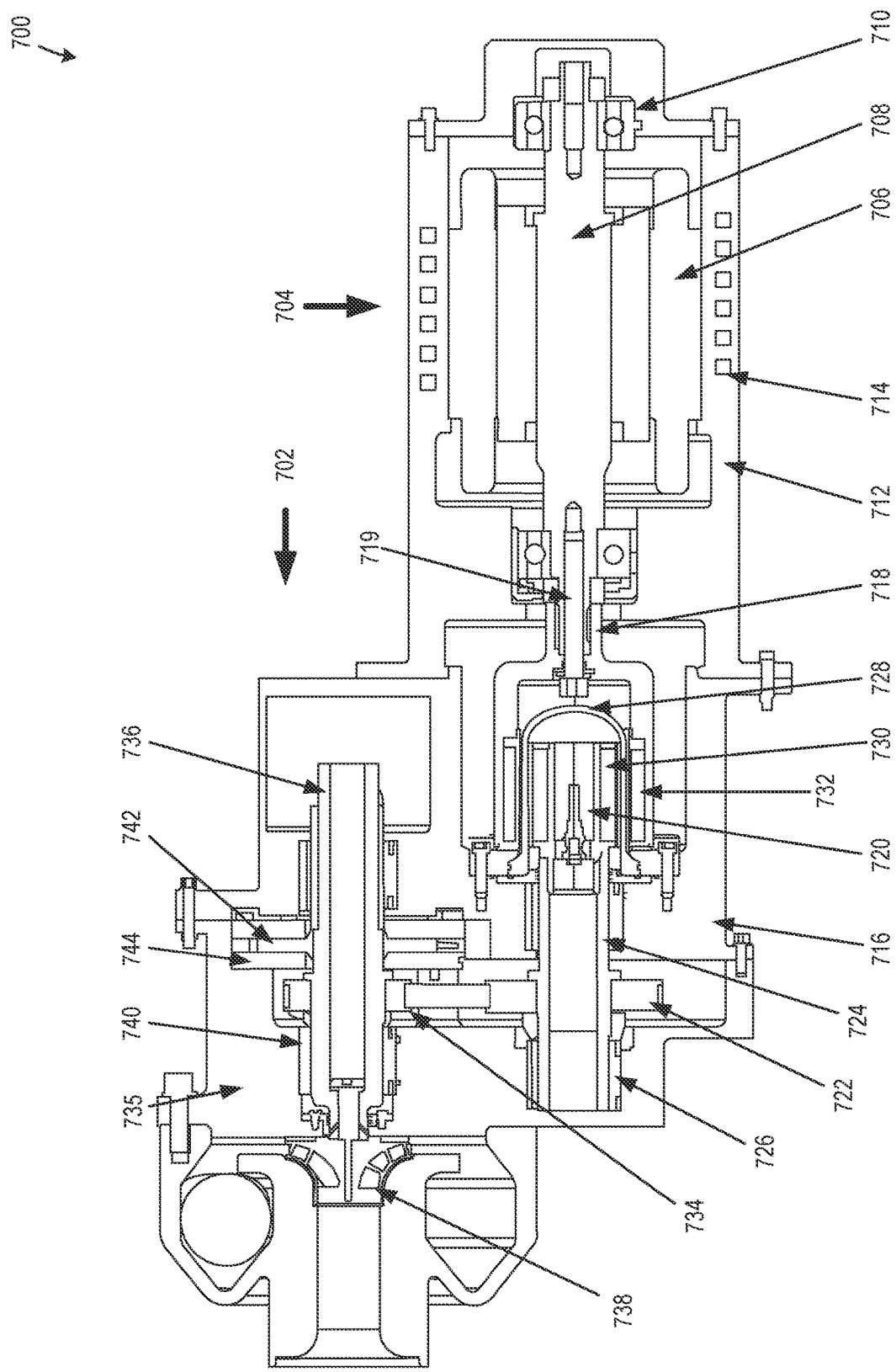
FIG. 7 illustrates a third example radially coupled fluid pump system in accordance with the teachings disclosed herein.

FIG. 7 illustrates a cross-sectional view of a radially coupled pump system 700 for pressurizing fluid (e.g., a heat exchange fluid such as a supercritical fluid (e.g., $sCO_2$, etc.)) in a system (e.g., thermal management system 200 of FIG. 3). As shown in FIG. 7, the radially coupled pump system 700 ("pump system 700") includes a pump 702 and an electric motor 704. In some examples, the pump system 700 is used to pump $sCO_2$ through a thermal management system on an aircraft (e.g., aircraft 10 of FIG. 1) and/or a gas turbine engine (e.g., gas turbine engine 100 of FIG. 2). In some examples, the electric motor 704 of the pump system 700 includes a stator 706, a rotor 708, radial motor bearing(s) 710, a motor housing 712, a cooling jacket 714, a coupling housing 716, a coupling shaft 718, a coupling bolt 719, a magnetic coupling 720, a driver wheel 722, a driver wheel shaft 724, radial driver wheel shaft bearings 726, a barrier can 728, an inner hub 730, and an outer hub 732.

The example electric motor 704 of pump system 700 illustrated in FIG. 7 includes the stator 706 and the rotor 708. In some examples, the stator 706 includes field magnets (e.g., electromagnets or permanent magnets) that generate magnetic field(s) based on an electric current (e.g., direct current or alternating current) passing through various the electromagnets of the stator 706. The example stator 706 generates a first set of magnetic fields that apply a force (e.g., Lorentz force) on a second set of magnetic fields that the rotor 708 generates. The example rotor 708 generates the second set of magnetic fields via permanent magnets or electromagnets. Since the stator 706 is stationary and fixed in place, the force causes the example rotor 708 to rotate and to produce a torque.

The example electric motor 704 of pump system 700 includes radial motor bearings 710 that support a weight of the rotor shaft 708 and keep the rotor 708 in radial and/or axial alignment. The example radial motor bearings 710 support a radial load (e.g., weight) and a thrust load of the rotor 708. In some examples, the radial motor bearings 710 are rolling element bearings, such as angular contact ball bearings, hybrid ceramic bearings, taper roller bearings, deep groove single ball bearings, duplex ball bearings, spherical bearings, etc. In some examples, the radial motor bearings 710 use liquid lubricant(s) (e.g., grease, oil, etc.) to reduce friction and wear in rotating elements of the radial motor bearings 710. In some examples, the radial motor bearings 710 use a solid lubricant (e.g., silver coating) to reduce friction and wear of the rotating elements of the radial motor bearings 710. In some examples, the radial motor bearings 710 are foil bearings that use pressurized air to create a non-contact barrier between the rotor shaft and a sleeve of the radial motor bearings 710 at sufficiently high rotational speeds. Although the electric motor 704 illustrated in FIG. 7 includes two radial motor bearings 710, one or more radial motor bearings 710 can be used in the electric motor 704.

The example electric motor 704 of pump system 700 includes the motor housing 712 to frame and/or otherwise support the stator 706, radial motor bearing(s) 710, etc. In some examples, the motor housing 712 is additively manufactured (e.g., via direct metal laser sintering (DMLS), three-dimensional printing, etc.) to accommodate custom geometries and configurations of the stator 706, the radial motor bearing(s) 710, the cooling jacket 714, etc.

Since the example stator 706 uses electromagnets to generate Eddy currents, the example pump system 700 illustrated in FIG. 7 includes the cooling jacket 714 to dissipate heat that the stator 706 generates during operation. In some examples, the cooling jacket 714 is mechanically fixed to the motor housing 712 and includes cooling fins, vents, channels, etc. to transfer heat from the stator 706 to air, water, gas coolant, liquid coolant, etc. The example motor housing 712 illustrated in FIG. 7 is an additively manufactured structure that includes the cooling jacket 714 as an additively manufactured portion of the motor housing 712 such that the cooling jacket 714 and the motor housing 712 are the same additively manufactured part. The example cooling jacket 714 illustrated in FIG. 7 is manufactured in conjunction with the motor housing 712 to surround the stator 706 and transfer heat from the stator 706 to air, water, gas coolant, liquid coolant, etc. via cooling fins, vents, channels, etc.

The example electric motor 704 of pump system 700 includes the coupling housing 716 to support the driver wheel shaft bearing(s) 726, the barrier can 728, etc. In the illustrated example of FIG. 7, the coupling housing 716 is manufactured separately from the motor housing 712 and is fixed to the motor housing 712 via one or more bolts. In some examples, the coupling housing 716 is manufactured separately (via additive manufacturing or subtractive manufacturing) from the motor housing 712 and is fixed to the motor housing 712 via bolts, dowels, interference fits, and/or adhesives. In some examples, the coupling housing 716 is additively manufactured as a portion of the motor housing 712, such that the coupling housing 716 and the motor housing 712 are the same additively manufactured part.

The example electric motor 704 of the pump system 700 includes the driver wheel 722 coupled to the rotor shaft 708. The example driver wheel 722 of the pump system 700 illustrated in FIG. 7 is connected to the rotor shaft 708 via the coupling shaft 718 and the magnetic coupling 720 such that there is a direct transference of torque from the rotor shaft 708 to the driver wheel 722. For example, if the stator 706 generates a first torque to turn the rotor 708 at a first angular velocity, then the driver wheel 722 also rotates at the first angular velocity. The example driver wheel 722 is radially coupled to a follower wheel 734 to convert the first torque and the first angular velocity to a second torque and a second angular velocity that the follower wheel 734 outputs.

The example motor 704 of the pump system 700 illustrated in FIG. 7 includes the magnetic coupling 720 to connect the coupling shaft 718 and the driver wheel shaft 724. The example coupling shaft 718 is rigidly connected to the rotor shaft 708 via the coupling bolt 719 aligned with axes of rotation of the rotor shaft 708 and the coupling shaft 718. The example magnetic coupling 720 includes the outer hub 732 and the inner hub 730 both including permanent magnets that alternate in polarity around the axis of rotation. The example inner hub 730 is the male component of the magnetic coupling 720 and fits within the outer hub 732 (e.g., the female component). The magnetic forces of the permanent magnets cause the coupling shaft 718 to transfer torque directly to the driver wheel shaft 724 such that the driver wheel shaft 724 and the driver wheel 722 rotate at the same second angular velocity as the rotor shaft 708. The coupling shaft 718 is magnetically coupled to the driver wheel shaft 724 such that a gap exists between the male and female components. The example barrier can 728 (e.g., barrier can 452) is designed to fit within the gap without physically and/or magnetically interfering with the magnetic coupling 720.

The example barrier can 728 is fixed in the magnetic coupling 720 and/or the coupling housing 716 to hermetically seal the motor 504 from the fluid. The example barrier can 728 also hermetically seal example oil(s) that the radial motor bearing(s) 710, the rotor shaft 708, and/or the motor 704 use as lubricant from contaminating the fluid. In some examples, the barrier can 728 is of the same structure, materials, design, etc. as the barrier can 452 of FIG. 4. In some examples, the barrier can 728 of FIG. 7 is also fixed to the coupling housing 716 in the same manner as the barrier can 452 of FIG. 4, such as via a flange, a barrier can retainer ring, and/or bolts.

In some examples, the barrier can 728 includes an inner shell, a middle layer, and an outer layer. In some examples, the inner layer and outer layer are composed of various combinations of ceramic, polymer, or composite, and the middle layer is composed of metal electroformed over the inner layer mandrel. Some further examples of the barrier can 728 including materials, structure, design, etc. are described in greater detail in other sections of this document.

The example motor 704 of the pump system 700 includes the radial driver wheel shaft bearings 726 to support a radial load that the driver wheel shaft 724 produces. In some examples, the radial driver wheel shaft bearings 726 are rolling element bearings similar to the radial motor bearing(s) 710. In the example pump system 700 illustrated in FIG. 7, the radial driver wheel shaft bearings 726 are foil bearings. In some examples, the radial driver wheel shaft bearings 726 include a spring-loaded foil lining inside of a bearing sleeve. The example spring-loaded foil lining supports the weight of the driver wheel shaft 724 as the driver wheel shaft 724 begins to rotate. As the first angular velocity of the driver wheel shaft 724, the coupling shaft 718, and the rotor shaft 708 increases, the air pressure between the driver wheel shaft 724 and the spring-loaded foil lining increases. As the first angular velocity continues to increase, the air pressure also increases to the point where the air pressure pushes the spring-loaded foil lining outward from the axis of rotation. The example air gap that forms in the radial driver wheel shaft bearings 726 between the driver wheel shaft 724 and a sleeve of the radial driver wheel shaft bearings 726 is what then supports the weight of the driver wheel shaft 724.

The example radial driver wheel shaft bearings 726 do not use fluid lubrication (e.g., oil lubricants) that can contaminate the fluid. However, the example radial driver wheel shaft bearings 726 (e.g., foil bearings) cannot support an axial load that the driver wheel 722 and/or the driver wheel shaft 724 generate. In the illustrated pump system 700 of FIG. 7, the magnetic coupling 720 supports the axial load (e.g., thrust load). In some examples, the driver wheel shaft 724 can include one or more thrust shafts fixed and/or otherwise radially extending outward from the driver wheel shaft 724 perpendicular to an axis of rotation of the driver wheel shaft 724. In some examples, the coupling housing 716 and/or a pump housing 735 frame one or more thrust bearings that support the one or more example thrust shafts that can be included with the driver wheel shaft 724.

The example pump 702 of the pump system 700 illustrated in FIG. 7 includes the follower wheel 734, the pump housing 735, an impeller shaft 736, an impeller 738, radial pump bearing(s) 740, thrust shaft(s) 742, and a thrust bearing 744. The driver wheel 722 and the follower wheel 734 of the pump system 700 illustrated in FIG. 7 can be gears (e.g., spur gears, helical gears, double helical gears, etc.) radially connected via interlocking gear teeth or pulleys radially connected via a drive belt. In some examples, the gear teeth of the driver wheel 722 generate a force on the gear teeth of the follower wheel 734. In some examples, the drive belt contacting the driver wheel 722 generates a tension force that acts on the outer surface of the follower wheel 734. The example force, tension force, and/or the example first torque that the driver wheel 722 generates and the example first angular velocity at which the driver wheel 722 rotates are based on the mechanical power output of the motor 704. As described above, Equation 1 represents instantaneous mechanical power of the driver wheel 722 and/or the follower wheel 734 in terms of torque and angular velocity.

Since power is conserved and since the driver wheel 722 and the follower wheel 734 are radially coupled via gearing teeth and/or the drive belt, the instantaneous power of the driver wheel 722 ($P_1$) is substantially similar to (e.g., within 1% of) the instantaneous power of the follower wheel 734 ($P_2$). Thus, assuming there is no energy loss (e.g., 100% efficiency) between the driver wheel 722 and the follower wheel 734 due to heat, vibration, bending, friction, drive belt creep, etc., the transmission of torque and angular velocity between the driver wheel 722 and the follower wheel 734 can be expressed with Equation 2, as described above.

The example driver wheel 722 generates the first torque ($\tau 1$) and the example follower wheel 734 generates the second torque ($\tau_2$). As described above, Equation 3 is used to determine the torque output of a rotating wheel. The force F that the driver wheel 722 generates is the substantially similar (e.g., within 1%) to the force value F that the follower wheel 734 generates due to Newton's third law with some loss due to heat, vibration, bending, friction, drive belt creep, etc. Thus, assuming no such loss occurs (e.g., 100% efficiency), Equation 2 and Equation 3 can be combined and reduced into Equation 4, as described above, and Equation 4 can be used to determine the angular velocity of the follower wheel 734 and the impeller 738. Therefore, if the driver wheel 722 has a greater diameter than the follower wheel 734, the impeller 738 will rotate at a greater rate than the rotor shaft 708 since the impeller 738 is axially coupled to the follower wheel 734 via the impeller shaft 736.

In the illustrated example of FIG. 7, the driver wheel 722 has a larger diameter than the follower wheel 734 to make the second angular velocity higher than the first angular velocity according to Equation 4. The follower wheel 734 is fixed (e.g., via one or more bolts, welds, adhesives, interference fits, etc.) to the impeller shaft 736. The example impeller shaft 736 is axially connected to the impeller 738 via one or more fastenings (e.g., bolts, rods, interference fits, etc.). Since the impeller shaft 736 connects the follower wheel 734 to the impeller 738, the second angular velocity of the follower wheel 734 is transferred directly to the impeller 738. In other words, the impeller 738 and the follower wheel 734 are rotatably interlocked and rotate at the same rate.

The example pump 702 of the pump system 700 includes the radial pump bearing(s) 740 to support a radial load that the impeller shaft 736 produces. In some examples, the radial pump bearing(s) 740 are rolling element bearings similar to the radial motor bearing(s) 710. In the example pump system 700 illustrated in FIG. 7, the radial pump bearing(s) 740 are foil bearings. In some examples, the radial pump bearing(s) 740 include a spring-loaded foil lining inside of a bearing sleeve. The example spring-loaded foil lining supports the weight of the impeller shaft 736 as the impeller shaft 736 begins to rotate. As the second angular velocity of the impeller shaft 736 increases, the air pressure between the impeller shaft 736 and the spring-loaded foil lining increases. As the second angular velocity continues to increase, the air pressure also increases to the point where the air pressure pushes the spring-loaded foil lining outward from the axis of rotation. The example air gap that forms in the radial pump bearing 740 between the impeller shaft 736 and a sleeve of the radial pump bearing 740 is what then supports the weight of the impeller shaft 736.

The example radial pump bearing(s) 740 do not use fluid lubrication (e.g., oil lubricants) that can contaminate the fluid. However, the example radial pump bearing(s) 740 (e.g., foil bearings) cannot support axial loads that the follower wheel 734 and/or the impeller shaft 736 generate. The example pump 702 of the pump system 700 includes thrust shaft(s) 742 to interface with the thrust bearing 744. The example pump housing 735 and the coupling housing 716 illustrated in FIG. 7 frame the thrust bearing 744 such that thrust bearing 744 supports the thrust load that the thrust shaft(s) 742 generates. The example thrust shaft(s) 742 are fixed to the impeller shaft 736 and/or are otherwise rigidly extending from the impeller shaft 736 perpendicular to the axis of rotation of the impeller shaft 736. As the impeller shaft 736 rotates and transfers an axial and/or thrust load to the thrust shaft(s) 742, the thrust bearing 744 counteracts the axial load from the thrust shaft(s) 742 while allowing the impeller shaft 736 to rotate with limited (e.g., less than 1%) energy loss. While two thrust shafts 742 and one thrust bearing 744 are illustrated in FIG. 7, there can be two or more thrust shafts 742 and/or one or more thrust bearings 744 in the pump system 700. In some examples, the thrust bearing 744 can be a thrust ball bearing, a cylindrical thrust roller bearing, a tapered roller thrust bearing, a spherical roller thrust bearing, a magnetic bearing, etc.

A radially coupled pump system 700 is disclosed herein. The examples disclosed herein include an electric motor 704 to drive a pump 702 via a driver wheel 722 axially connected to a motor shaft 708 via a magnetic coupling 720. The examples disclosed herein further include a follower wheel 734 radially coupled to the driver wheel 722 via gearing or a drive belt. The examples disclosed herein further include that the follower wheel 734 is axially connected to an impeller shaft 736. The examples disclosed herein further include that the driver wheel 722 has a first diameter and the follower wheel 734 has a second diameter that is smaller than the first diameter. Thus, the examples disclosed herein further include that the driver wheel 722 rotates at a first angular velocity and that the follower wheel 734 rotates at a second angular velocity that is greater than the first angular velocity. The examples disclosed herein allow the motor 704 to be mounted above or below portions of the pump 702 such that the pump system 700 saves space in the axial direction relative to pump systems that are axially coupled and aligned (e.g., pump 400 of FIG. 4). The examples disclosed herein operate the electric motor 704 more efficiently, increase the lifetime of the motor 704, increase the power density of the pump system 700, and increase the maximum angular velocity of the impeller 738 relative to those of the example pump 400 of FIG. 4 because the electric motor 704 can output less mechanical power than the motor 410 to achieve the same angular velocity as the impeller 406.

Figure 8:
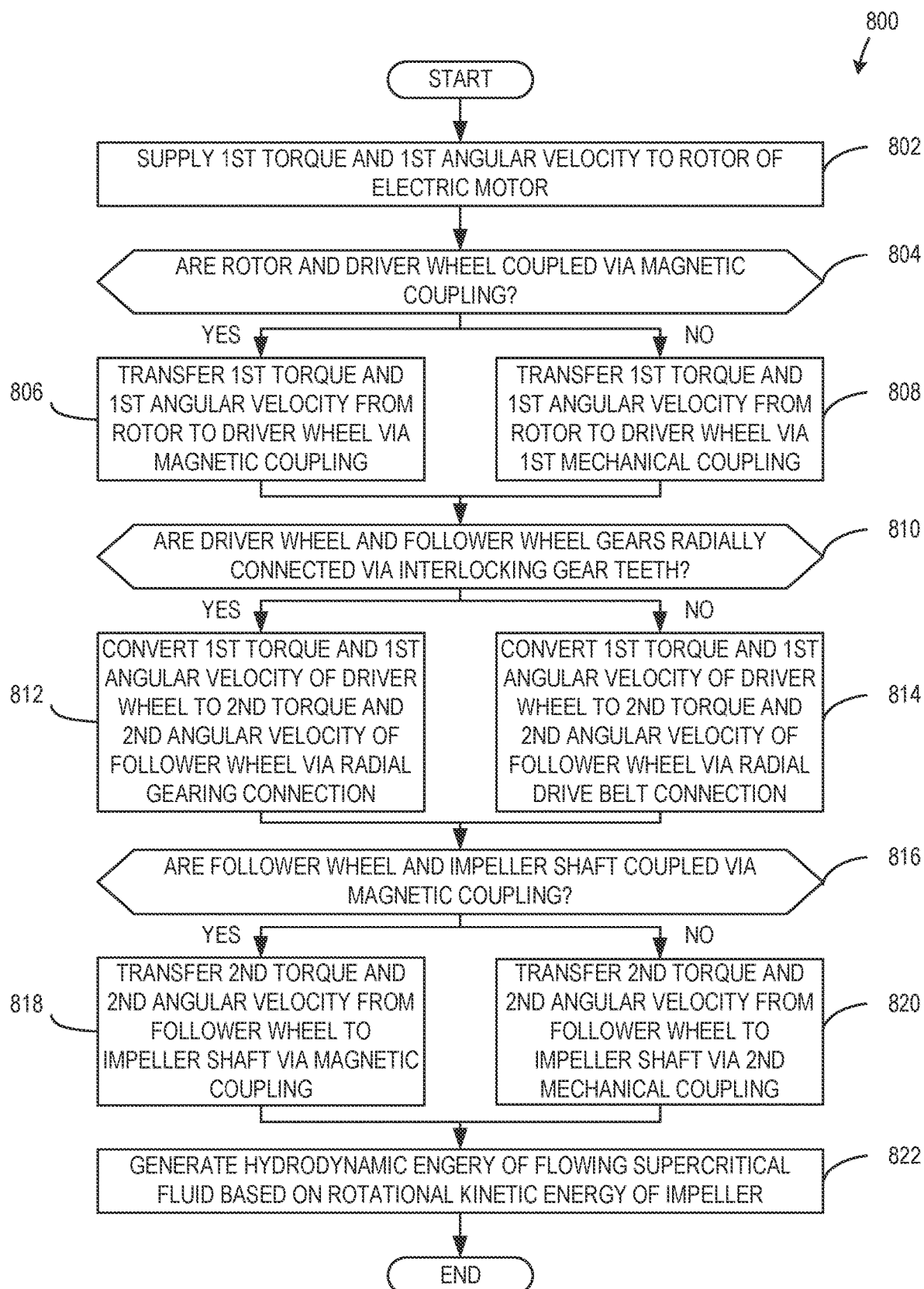
FIG. 8 is a flow diagram illustrating an operation of the radially coupled fluid pump system.

FIG. 8 is a flow diagram illustrating an example process or operation 800 that the pump systems 500 (FIG. 5), 600 (FIG. 6), 700 (FIG. 7) may follow as disclosed herein to pressurize a fluid (e.g., a heat exchange fluid such as a supercritical fluid (e.g., supercritical carbon dioxide ($sCO_2$), etc.)) in a thermal management system transport bus (e.g., the thermal transport bus 202 of FIG. 2). While the operation 800 is described with primary reference to pumping the fluid with the pump systems 500, 600, 700 of FIGS. 5-7 within a thermal management system transport bus, the operation 800 can be used to pump the fluid within any other closed loop transport bus.

At block 802, an electric motor 504, 604, 704 generates a first torque and a first velocity on a rotor shaft 508, 608, 708. For example, an electrical current is supplied to electromagnets of a stator 506, 606, 706 to induce magnetic fields that are perpendicular to the axis of rotation of the rotor 508, 608, 708. The electromagnets of the stator 506, 606, 706 are charged sequentially with varying flow directions of electrical current such that the varying polarities of magnetic fields are activated to attract permanent magnets in the rotor 508, 608, 708. The magnetic forces between the electromagnets in the stator 506, 606, 706 and the permanent magnets in the rotor 508, 608, 708 provide the first torque and the first angular velocity to the rotor shaft 508, 608, 708.

At block 804, the process or operation 800 proceeds to either block 806 or block 808 depending on the location and/or configuration of a magnetic coupling 526, 626, 720 in the pump system 500, 600, 700. If the rotor shaft 508, 608, 708 and a driver wheel 518, 618, 722 are coupled via the magnetic coupling 526, 626, 720, then the process or operation 800 proceeds to block 806 where the rotor 508, 608, 708 directly transfers the first torque and the first angular velocity to the driver wheel 518, 618, 722 via the magnetic coupling 526, 626, 720. If the rotor shaft 508, 608, 708 and the driver wheel 518, 618, 722 are not coupled via the magnetic coupling 526, 626, 720, then the process or operation 800 proceeds to block 808 where the rotor 508, 608, 708 directly transfers the first torque and the first angular velocity to the driver wheel 518, 618, 722 via a first mechanical connection (e.g., bolt(s), dowel(s), adhesive(s), interference fit, etc.).

At block 810, the process or operation 800 proceeds to either block 812 or block 814 depending on the design, structure, and/or configuration of the driver wheel 518, 618, 722 and a follower wheel 520, 620, 734. If the driver wheel 518, 618, 722 and the follower wheel 520, 620, 734 are both gears that are radially coupled via interlocking gear teeth, then then the process or operation 800 proceeds to block 812 at which the first torque and the first angular velocity of the driver wheel 518, 618, 722 are converted to a second torque and a second angular velocity of the follower wheel 520, 620, 734 via the interlocking gear teeth. One or more gear teeth of the driver wheel 518, 618, 722 exert a force on one or more gear teeth of the follower wheel 520, 620, 734. The force transfers to the follower wheel 520, 620, 734 and creates the second torque and the second angular velocity.

At block 814, if the driver wheel 518, 618, 722 and the follower wheel 520, 620, 734 are not both gears that are radially coupled via interlocking gear teeth, then the first torque and the first angular velocity of the driver wheel 518, 618, 722 are converted to the second torque and the second angular velocity of the follower wheel 520, 620, 734 via a drive belt connection between the driver wheel 518, 618, 722 and the follower wheel 520, 620, 734. The drive belt is designed and/or assembled to have a non-slip contact with the driver wheel 518, 618, 722 and the follower wheel 520, 620, 734. The driver wheel 518, 618, 722 exerts a tension force on the drive belt, and the tension force transfers to an area on the follower wheel 520, 620, 734 where the drive belt contacts the follower wheel 520, 620, 734. The transference of the tension force creates the second torque and the second angular velocity of the follower wheel 520, 620, 734.

At block 816, the process or operation 800 proceeds to either block 818 or block 820 depending on the location and configuration of the magnetic coupling 526, 626, 720 in the pump system 500, 600, 700. If the follower wheel 520, 620, 734 and an impeller shaft 524, 624, 736 are coupled via the magnetic coupling 526, 626, 720, then the process or operation 800 proceeds to block 818 where the follower wheel 520, 620, 734 directly transfers the second torque and the second angular velocity to the impeller shaft 524, 624, 736 via the magnetic coupling 526, 626, 720 and/or a coupling shaft 522, 622, 718. If the follower wheel 520, 620, 734 and the impeller shaft 524, 624, 736 are not coupled via the magnetic coupling 526, 626, 720, then the process or operation 800 proceeds to block 820 where the follower wheel 520, 620, 734 directly transfers the second torque and the second angular velocity to the impeller shaft 524, 624, 736 via a second mechanical connection (e.g., bolt(s), dowel(s), adhesive(s), interference fit, etc.).

At block 822, an impeller 528, 628, 738 connected to the impeller shaft 524, 624, 736 generates hydrodynamic energy of the fluid based on a rotational kinetic energy of the impeller 528, 628, 738. Since the impeller 528, 628, 738 is axially coupled and/or connected to the impeller shaft 524, 624, 736, the impeller 528, 628, 738 also rotates at the second angular velocity. The rotational kinetic energy of the impeller 528, 628, 738 is based on the second angular velocity and a moment of inertia of the impeller 528, 628, 738. The rotational energy is converted into hydrodynamic energy based on the law of conservation of energy and a design of the impeller 528, 628, 738.

In some examples, the pump systems 500, 600, 700 include means for rotating. For example, the means for rotating may be implemented by the motors 504, 604, 704, the stators 506, 606, 706, and/or the rotor shafts 508, 608, 708 of FIGS. 5, 6, and/or 7. In some examples, the means for rotating may include an electric motor, such as a DC motor, an AC motor, a brushed DC motor, a brushless DC motor, etc.

In some examples, the pump systems 500, 600, 700 include means for accelerating. For example, the means for accelerating may be implemented by the impellers 528, 628, 738 and/or the impeller shafts 524, 624, 736 of FIGS. 5-8. In some examples, the means for increasing may include an electric motor, an impeller shaft, and/or an impeller.

In some examples, the pump systems 500, 600, 700 include means for converting. For example, the means for converting may be implemented by the driver wheels 518, 618, 722 and/or the follower wheels 520, 620, 734 of FIGS. 5-7. In some examples, the means for converting may include gears in contact via interlocking gear teeth or pulley wheels in contact with a drive belt.

In some examples, the pump systems 500, 600, 700 include means for connecting. For example, the means for connecting may be implemented by the magnetic couplings 526, 626, 720 of FIGS. 5-7. In some examples, the means for connecting may include a magnetic coupling, an inner hub, an outer hub, a coupling shaft, and/or permanent magnets.

In some examples, the pump systems 500, 600, 700 include means for framing. For example, the means for framing may be implemented by the motor housings 512, 612, 712, the coupling housings 516, 616, 716, and/or the pump housings 615, 735 of FIGS. 5, 6, and/or 7. In some examples, the means for framing may include a housing, shell, support structure, etc. manufactured via additive manufacturing (e.g., binder jetting, directed energy deposition, powder bed infusion, direct metal laser sintering etc.).

Integrated Bearing Systems for Dynamically Supporting Shafts in Pump Systems

The operations of some example fluid pump systems and centrifugal fluid pump systems have an electric motor (e.g., motor 410) connected axially to an impeller (e.g., impeller 406) via an impeller shaft (e.g., impeller shaft 466) as described in reference to FIG. 4 above. The example rotor shaft 438 illustrated in FIG. 4 is connected to the example impeller shaft 466 via a first magnetic coupling 450 and a second magnetic coupling 460. In some examples, a rotor shaft is connected directly to the impeller in a pump system without a magnetic coupling to connect the rotor shaft and an impeller shaft. In some examples, a foil bearing is used to support a radial load that the rotor shaft generates during operation of the pump system. A foil bearing is a form of air bearing that uses a spring-loaded foil between a shaft and a journal lining to support the shaft at low startup speeds. Once the shaft is rotating at a high enough rate (depending on the architecture of the foil bearing) a working fluid (e.g., air, nitrogen, argon, etc.) is pulled into the foil bearing due to the viscosity effects of the working fluid. Thus, the working fluid pressure increases in the foil bearing, pushes the foil outward from the shaft, and supports the radial load that the shaft generates creating a frictionless bearing with no liquid lubricants. Since the foil bearing does not use liquid lubricants, a hermetic sealing (e.g., a magnetic coupling) may not be used to prevent lubricants from contaminating a fluid (e.g., heat exchange fluid such as a supercritical fluid (e.g., $sCO_2$, etc.)) that the pump system pressurizes.

In some examples, the foil bearing used to support the radial load that the rotor shaft produces experiences wear during the start-up and stopping of the pump system. More specifically, the spring-loaded foil that supports the weight of the rotor shaft at lower speeds (start-up and stopping rotational speeds) experiences damage over time due to frictional erosion. In the examples disclosed herein, integrated bearing systems include a foil bearing, a rolling element bearing, and a disengaging-type sprag clutch to support a rotor shaft in a pump system. The example sprag clutch engages the rolling-element bearing prior to operation of the pump system and at lower operating speeds of the pump system such that the rolling-element bearing supports the weight (e.g., the total weight and/or a majority of the weight) of the rotor shaft during start-up and stopping speeds of the pump system. In the examples disclosed herein, when the pump system reaches a first operational speed range (e.g., a foil bearing lift off speed (e.g., 10 to 50 meters per second (m/s) tangential velocity of the foil bearing)), the sprag clutch disengages from the rolling element bearing, and the foil bearing supports the weight of the rotor shaft. Thus, the examples disclosed herein reduce the radial load that the foil bearing supports during start-up and stopping of the pump system, reduce the wear of the foil bearings due to less frictional erosion, and increase the lifespan (e.g., usable life) of the foil bearings.

Figure 9:
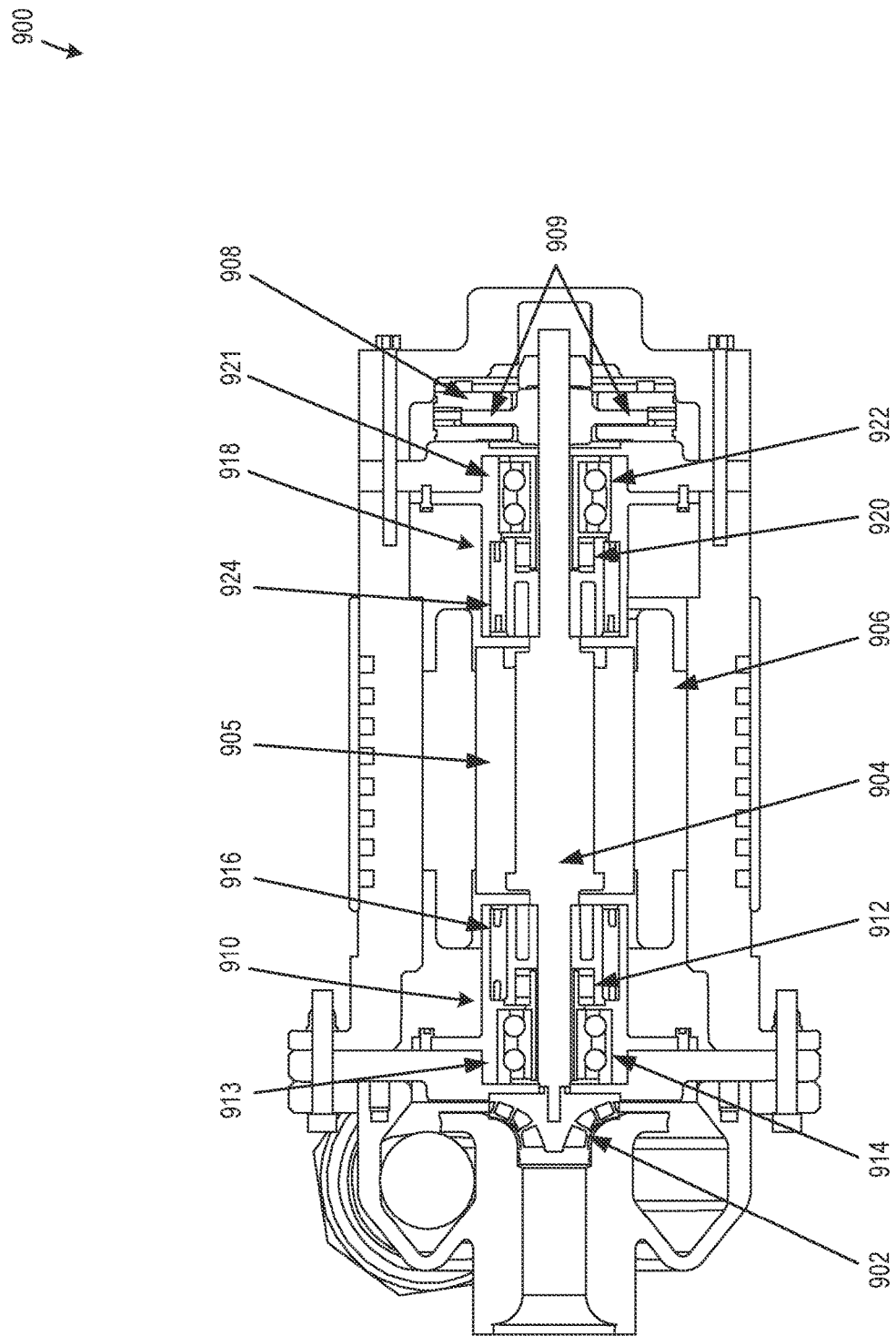
FIG. 9 illustrates example integrated bearing systems for dynamically supporting a rotating shaft in an example pump system in accordance with the teachings of this disclosure.

For the figures disclosed herein, identical numerals indicate the same elements throughout the figures. FIG. 9 illustrates a cross-sectional view of a pump system 900 for pressurizing fluid (e.g., a heat exchange fluid such as a supercritical fluid (e.g., $sCO_2$, etc.)) in a system (e.g., thermal management system 200 of FIG. 3). In some examples, the pump system A100 is used to pump $sCO_2$ through a thermal management system on an aircraft (e.g., aircraft 10 of FIG. 1) and/or a gas turbine engine (e.g., gas turbine engine 100 of FIG. 2). As shown in FIG. 9, the pump system 900 includes an impeller 902, a rotor shaft 904, a rotor 905, a stator 906, a thrust bearing 908, radial shafts 909, a first integrated bearing system 910, a first sprag clutch 912, a first bearing housing 913, a first rolling-element bearing 914, a first foil bearing 916, a second integrated bearing system 918, a second sprag clutch 920, a second bearing housing 921, a second rolling-element bearing 922, and a second foil bearing 924.

The example pump system 900 illustrated in FIG. 9 includes the impeller 902 to pressurize the fluid (e.g., $sCO_2$) in the system (e.g., the thermal management system 200 of FIG. 3). The example impeller 902 is a component of the pump system 900 that is connected to the rotor shaft 904 and rotates at a same rotational speed as the rotor shaft 904. In some examples, the impeller 902 is same as or similar to impellers used in centrifugal pumps and includes vanes and/or blades to deflect flow of the incoming fluid radially outward into outlet flowlines. The example impeller 902 converts mechanical power of the motor (e.g., the rotor shaft 904 and the stator 906) into hydrodynamic power of the fluid flow.

The example pump system 900 illustrated in FIG. 9 includes the stator 906 to apply a torque on the rotor 905, which is coupled to the rotor shaft 904. Since the example rotor 905 is connected to the rotor shaft 904 (e.g., via bolts, adhesives, interference fit, etc.), the stator 906 causes the rotor shaft 904 to rotate while the stator 906 remains stationary. The example stator 906, the example rotor 905, and the example rotor shaft 904 are included as parts of an electric motor that is familiar to those with skill in the art. In some examples, the stator 906 includes field magnets (e.g., electromagnets or permanent magnets) that generate magnetic field(s) based on an electric current (e.g., direct current or alternating current) passing through various the electromagnets of the stator 906. The example stator 906 generates a first set of magnetic fields that apply a force (e.g., Lorentz force) on a second set of magnetic fields that the rotor 905 generates. The example rotor 905 generates the second set of magnetic fields via permanent magnets or electromagnets. Since the example stator 906 is stationary and fixed in place, the force causes the example rotor 905 to rotate and to produce a torque. Since the example rotor shaft 904 is connected to the example rotor 905, the rotor shaft 904 produces the same torque and rotates at a same angular velocity as the rotor 905.

The example pump system 900 illustrated in FIG. 9 includes the thrust bearing 908 to support the thrust load (axial load) that the rotor shaft 904 generates during operation. The example thrust bearing 908 illustrated in FIG. 9 is a foil bearing that includes a spring-loaded foil and a journal lining, similar to the foil bearing architecture described above. The example rotor shaft 904 is connected to two or more radial shafts 909 that are positioned perpendicular to the axis of rotation of the rotor shaft 904. In some examples, the radial shafts 909 are connected to the rotor shaft via bolts, adhesives, interference fits, etc.

The example pump system 900 illustrated in FIG. 9 includes two radial shafts 909, however, more radial shafts 909 may be connected to the rotor shaft 904. In some examples, the thrust bearing 908 includes an inner lining that interfaces with the radial shafts 909 and the spring-loaded foil. In some examples, the radial shafts 909 is a disk that is connected to the rotor shaft 904 and interacts directly with the spring-loaded foil of the thrust bearing 908.

The example pump system 900 of FIG. 9 includes the first integrated bearing system 910 to support the radial loads of the rotor shaft 904 during operation of the pump system 900. The example first integrated bearing system 910 includes the first sprag clutch 912, the bearing housing 913, the first rolling-element bearing 914, and the first foil bearing 916. The example pump system 900 of FIG. 9 also includes the second integrated bearing system 918 to similarly support the radial loads of the rotor shaft 904. The second integrated bearing system 918 includes the second sprag clutch 920, the second rolling-element bearing 922, and the second foil bearing 924. In some examples, the pump system 900 includes one integrated bearing system. In some examples, the pump system 900 includes one or more integrated bearing systems. The example first integrated bearing system 910 and the example second integrated bearing system 918 of the example pump system 900 illustrated in FIG. 9 are substantially similar. Thus, references and descriptions regarding the first integrated bearing system 910 ("bearing system 910"), the first sprag clutch 912 ("sprag clutch 912"), the first bearing housing 913 ("bearing housing 913"), the first rolling-element bearing 914 ("rolling-element bearing 914"), and the first foil bearing 916 ("foil bearing 916") can also be applied to the second integrated bearing system 918, the second sprag clutch 920, the second bearing housing 921, the second rolling-element bearing 922, and the second foil bearing 924, respectively.

The example pump system 900 illustrated in FIG. 9 includes the sprag clutch 912 to engage and disengage the rolling-element bearing 914 and the foil bearing 916 from one another during operation of the pump system 900. The example sprag clutch 912 is a disengaging-type sprag clutch that resembles a rolling-element bearing but includes non-revolving asymmetric sprag elements instead of revolving symmetric cylinders, spheres, etc. The example sprag clutch 912 includes an inner race and an outer race between which the sprag elements fit in place. The example sprag clutch 912 also includes a spring ribbon to produce a pre-loaded spring force on the sprag elements to engage the sprag clutch with the inner race and the outer race during non-operation. Due to the asymmetric figure-eight shaped geometry of the sprag elements, when the sprag elements rotate and wedge between the outer race and the inner race, the fiction force that occurs between the components of the sprag clutch 912 cause the inner race to rotate at the same angular velocity as the outer race. When the example sprag clutch 912, inner race, and outer race rotate at a first operational speed range, the sprag elements of the sprag clutch 912 remain engaged with the outer race and the inner race due to the pre-loaded spring force and a resulting spring moment. When the example sprag clutch 912, inner race, and outer race rotate at a second operational speed range, the sprag elements of the sprag clutch 912 become disengaged with the outer race and the inner race due to a centrifugal force and resulting centrifugal moment counteracting and surpassing the spring moment. Further descriptions of the example sprag clutch 912 and the operations thereof are provided below.

The example pump system 900 illustrated in FIG. 9 includes the rolling-element bearing 914 to support the radial load of the rotor shaft 904 at the first operational speed range. Some examples of the first operational speed range include a first tangential speed range of the rotor shaft 904 and/or the foil bearing 916 from 0 m/s to 50 m/s, a first fluid flow speed range exiting the pump system 900 from 0 m/s to 10 m/s, etc. The example rolling-element bearing 914 includes an inner race, an outer race, and rolling elements (e.g., balls, spheres, cylinders, etc.). The inner race and outer race of the example rolling-element bearing 914 are able to rotate freely in either direction. In some examples, the rolling-element bearing 914 includes liquid lubricant (e.g., oil, grease, etc.) to reduce the friction forces within the rolling-element bearing 914 and increase the lifespan of the rolling-element bearing 914. If the example pump system 900 uses liquid lubricants for the rolling-element bearing 914, then an example oil separator may be included in the pump system 900 to help ensure the fluid does not get contaminated. Some examples of oil separators that can be utilized in the examples disclosed herein are described in further detail below. In some examples, the rolling-element bearing 914 includes an inorganic grease (e.g., silicone grease, bentonite clay, polyurea, etc.) as a lubricant. The example rolling-element bearing 914 illustrated in FIG. 9 uses a solid lubricant (e.g., silver coating, graphite, molybdenum disulfide, etc.) to reduce friction in the rolling-element bearing 914 and to increase the lifespan of the rolling-element bearing 914 while removing the risk of contaminating the fluid with liquid lubricants. The rolling-element bearing 914 can be one of many types of rolling-element bearings familiar to those with skill in the art, such as cylindrical rolling-element bearings, angular contact ball bearings, hybrid ceramic bearings, tapered rolling-element bearings, deep groove single ball bearings, duplex ball bearings, spherical ball bearings, or any combination thereof. In some examples, the rolling-element bearing 914 is hermetically sealed from the example fluid via one or more hermetic seals (e.g., piston seals, epoxy seal, ceramic-to-metal seal, etc.). The example rolling-element bearing 914 may have a lifespan of 1000 hours or more depending on the type of rolling-element bearing, the type of lubricant, and/or the effectiveness of the hermetic sealing. In some examples, the rolling-element bearing 914 is externally cooled via conductive heat exchange from the rolling-element bearing 914 to fuel, oil, air, and/or the thermal transport bus 202 of FIG. 2. Additionally or alternatively, an evaporative cooling system may be used to cool the example rolling-element bearing 914.

The example pump system 900 illustrated in FIG. 9 includes the foil bearing 916 to support the radial load of the rotor shaft 904 at the second operational speed range. Some examples of the second operational speed range include a second tangential speed range of the rotor shaft 904 and/or the foil bearing 916 from 50 m/s to 200 m/s, a second fluid flow speed range exiting the pump system 900 from 10 m/s to 100 m/s, etc. The example foil bearing 916 includes an inner lining, a spring-loaded lining, and a journal lining as described above. The inner lining and journal lining of the example foil bearing 916 are able to rotate freely in either direction. The example foil bearing 916, the example rolling-element bearing 914, the example sprag clutch 912, and, in general, the example integrated bearing system 910 are described in greater detail below.

The example pump system 900 illustrated in FIG. 9 includes the bearing housing 913 to support the rolling-element bearing 914 and the foil bearing 916. In some examples, the bearing housing 913 is an additively manufactured part that is designed to fit dimensions of the rolling-element bearing 914 and the foil bearing 916. In some examples, the bearing housing 913 is fabricated via subtractive manufacturing to fit dimensions of the rolling-element bearing 914 and the foil bearing 916. In some examples, the bearing housing 913 securely supports the rolling-element bearing 914 and the foil bearing 916 via bolts, dowels, pins, adhesives, and/or interference fits.

Figure 10:
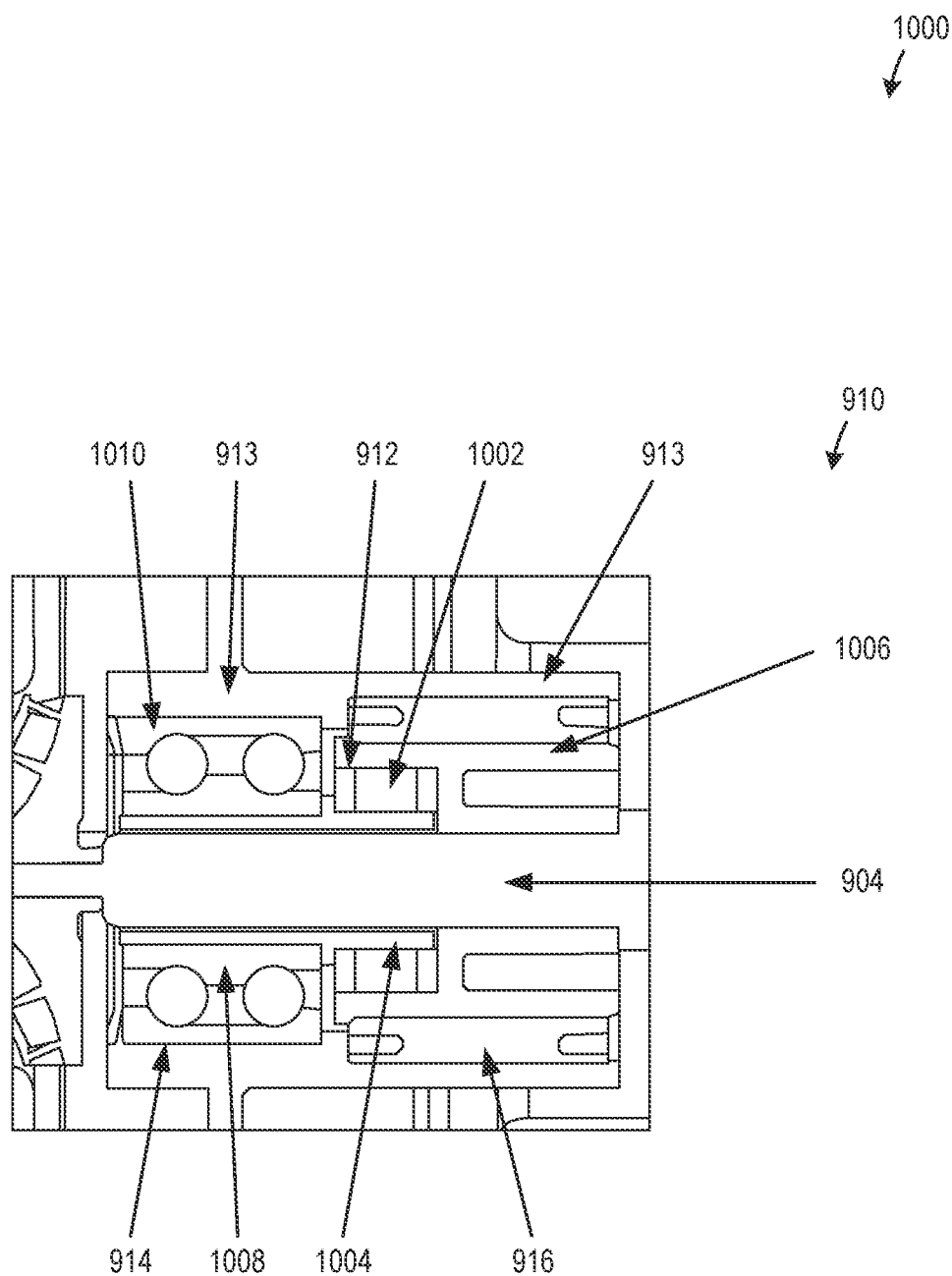
FIG. 10 illustrates an example integrated bearing system for dynamically supporting the rotating shaft in the example pump system in accordance with the teachings of this disclosure.

FIG. 10 illustrates an enlarged view 1000 of the example integrated bearing system 910 of the pump system 900 for supporting radial loads that the rotor shaft 904 generates during operation of the pump system 900. As shown in FIG. 10, the enlarged view 1000 includes the rotor shaft 904, the integrated bearing system 910, the sprag clutch 912, the bearing housing 913, the rolling-element bearing 914, the foil bearing 916, sprag elements 1002, a first inner race 1004, a first outer race 1006, a second inner race 1008, and a second outer race 1010. As mentioned earlier, the example components of the integrated bearing system 910 illustrated in FIG. 10 can be included in the example second integrated bearing system 918 illustrated in FIG. 9. The example enlarged view 1000 of FIG. 10 illustrates the rotor shaft 904, the integrated bearing system 910, the sprag clutch 912, the bearing housing 913, the rolling-element bearing 914, and the foil bearing 916 as previously described in reference to FIG. 9.

The example integrated bearing system 910 as illustrated in FIG. 10 includes the sprag elements 1002 to engage the first inner race 1004 and the first outer race 1006 such that the first inner race 1004 and the first outer race 1006 rotate simultaneously and with the same torque output. Although two sprag elements 1002 are illustrated in FIG. 10, the example integrated bearing system 910 can include two or more sprag elements 1002. As mentioned previously, the example sprag elements 1002 are asymmetrically shaped such that when the sprag elements 1002 rotate about an axis of rotation in a first direction, the sprag elements wedge between the first inner race 1004 and the first outer race 1006 and create friction forces between the components. The friction forces that the example sprag elements 1002 create occur between the sprag elements 1002 and the first inner race 1004 as well as between the sprag elements 1002 and the first outer race 1006. The friction forces that the sprag elements 1002 create cause the first inner race 1004 and the first outer race 1006 to rotate at a same angular velocity. As mentioned previously, the asymmetric shape of the sprag elements 1002 also allow the first inner race 1004 and the first outer race 1006 to rotate freely in either direction when the sprag elements 1002 rotate about the axis of rotation in a second direction opposite from the first direction. The sprag elements 1002 and the operations thereof are described in greater detail below.

The example integrated bearing system 910 as illustrated in FIG. 10 includes the first inner race 1004 to engage with the sprag elements 1002 and the rolling-element bearing 914 at the first operational speed range (e.g., tangential speed range of the rotor shaft 904 and/or the foil bearing 916 from 0 m/s to 50 m/s, fluid flow speed range exiting the pump system 900 from 0 m/s to 10 m/s, etc.). The example first inner race 1004 illustrated in FIG. 10 is a hollow shaft that envelops the rotor shaft 904 and is connected to the second inner race 1008 of the rolling-element bearing 914 via bolts, adhesives, interference fits, etc. In some examples, the first inner race 1004 is manufactured (e.g., subtractive machining or additive manufacturing) as the same part as the second inner race 1008. The example first inner race 1004 is longer than the second inner race 1008 and the second outer race 1010 such that the first inner race 1004 interfaces with the second inner race 1008 and the sprag elements 1002.

The example integrated bearing system 910 as illustrated in FIG. 10 includes the first outer race 1006 to engage with the sprag elements 1002 and the foil bearing 916 at the second operational speed range (e.g., tangential speed range of the rotor shaft 904 and/or the foil bearing 916 from 50 m/s to 200 m/s, fluid flow speed range exiting the pump system 900 from 10 m/s to 100 m/s, etc.). The example first outer race 1006 illustrated in FIG. 10 is a shaft that is connected to the rotor shaft 904 via bolts, adhesives, interference fits, etc. In some examples, the first outer race 1006 is manufactured (e.g., subtractive machining or additive manufacturing) as the same part as the rotor shaft 904. The example first outer race 1006 is designed such that the first outer race 1006 interfaces with the sprag elements 1002 and the inner lining of the example foil bearing 916.

Figure 11:
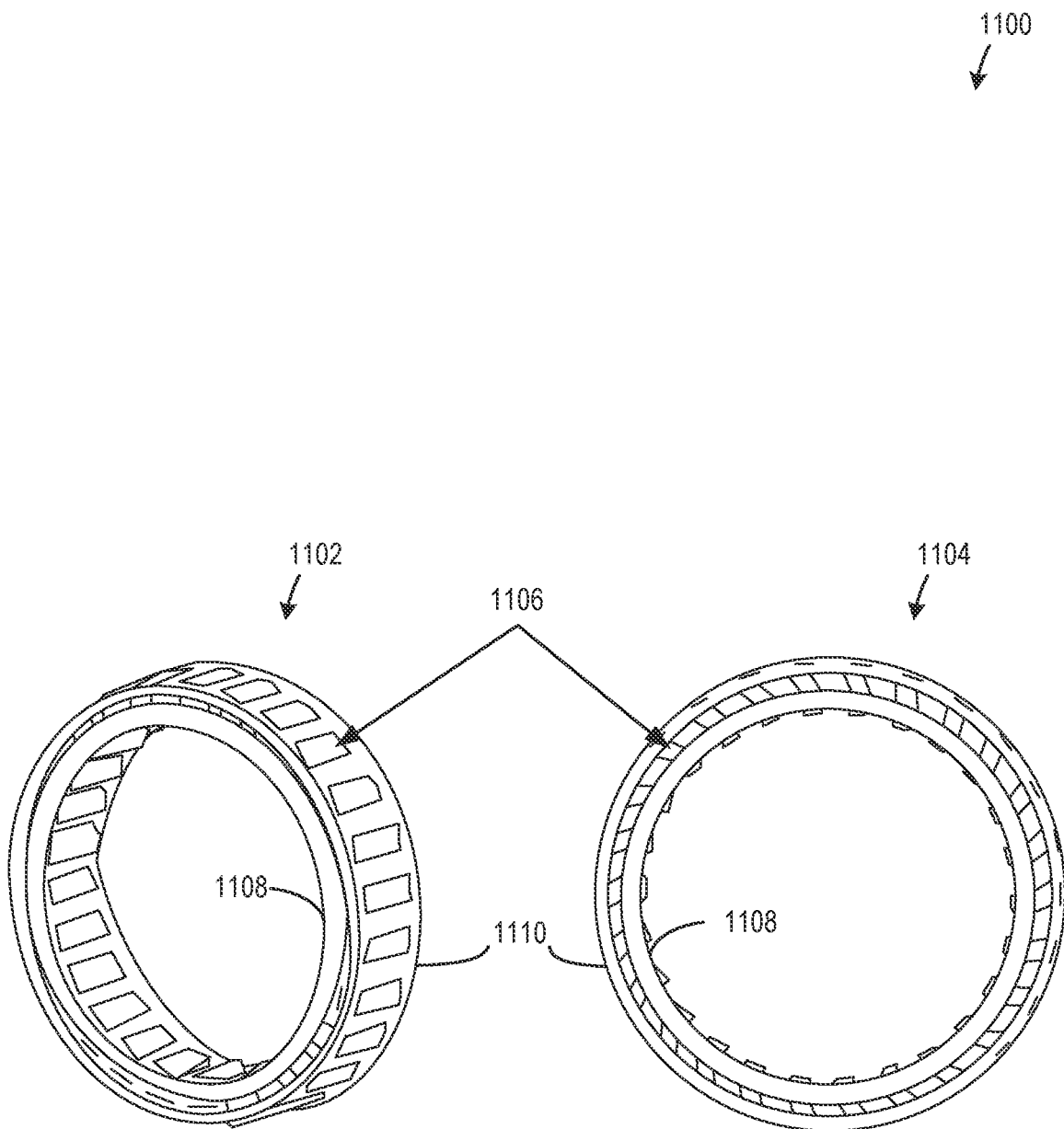
FIG. 11 illustrates an example sprag clutch for engaging and disengaging bearings in the example integrated bearing system in accordance with the teachings of this disclosure.

FIG. 11 illustrates an example disengaging-type sprag clutch 1100 (e.g., sprag clutch 912 of FIGS. 9 and/or 10) of the example integrated bearing system 910 for engaging and/or disengaging an example rolling-element bearing (e.g., rolling-element bearing 914 of FIGS. 9 and/or 10) and/or an example foil bearing (e.g., foil bearing 916 of FIGS. 9 and/or 10). The example sprag clutch 1100 illustrated in FIG. 11 is shown from an isometric viewpoint 1102 and from a front-facing viewpoint 1104. The example sprag clutch 1100 illustrated in FIG. 11 includes sprag elements 1106 (e.g., sprag elements 1002 of FIG. 10), an inner ring 1108, and an outer ring 1110. Although the front-face viewpoint 1104 of the example sprag clutch 1100 illustrates twenty-six sprag elements 1106, more or less than twenty-six sprag elements can be included in the example sprag clutch 1100 of FIG. 11 and/or the example sprag clutch 912 of FIGS. 9 and/or 10.

The example sprag clutch 1100 illustrated in FIG. 11 includes the inner ring 1108 and the outer ring 1110. The example inner ring 1108 is ring-shaped and includes slots that are shaped to fit a bottom portion of the sprag elements 1106. The example outer ring 1110 is also ring-shaped and includes slots that are shaped to fit an upper portion of the sprag elements 1106. The slots included in the example inner ring 1108 and the example outer ring 1110 are designed such that the asymmetrical figure-eight shape of the sprag elements 1106 hook into the slots. The example sprag elements 1106, inner ring 1108, and outer ring 1110 are also designed such that the top and bottom surfaces of the sprag elements 1106 are protruding outward from the outer ring 1110 and inward from the inner ring 1108. In some examples, the inner ring 1108 and/or the outer ring 1110 are coupled to the sprag elements 1106 via rods, pins, screws, etc. to retain the position of the sprag elements 1106 in between an inner race (e.g., the first inner race 1004) and an outer race (e.g., the first outer race 1006). In some examples, the inner ring 1108 and/or the outer ring 1110 retain the position of the sprag elements 1106 without fasteners (e.g., bolts, pins, rods, etc.). In some examples, the sprag elements 1106, the inner ring 1108, and/or the outer ring 1110 are manufactured separately and are assembled together to form the sprag clutch 1100. In some examples, the sprag elements 1106, the inner ring 1108, and/or the outer ring 1110 are manufactured via additive manufacturing, such as direct metal laser sintering, either separately as parts to be assembled or as a fabricated assembly. In some examples, the sprag clutch 1100 includes a spring ribbon to apply a pre-loaded spring force on the sprag elements 1106 causing the sprag elements 1106 to engage with the inner ring 1108 and the outer ring 1110 prior to operation and while the example pump system 900 is operating within the first operation speed range.

Figure 12A:
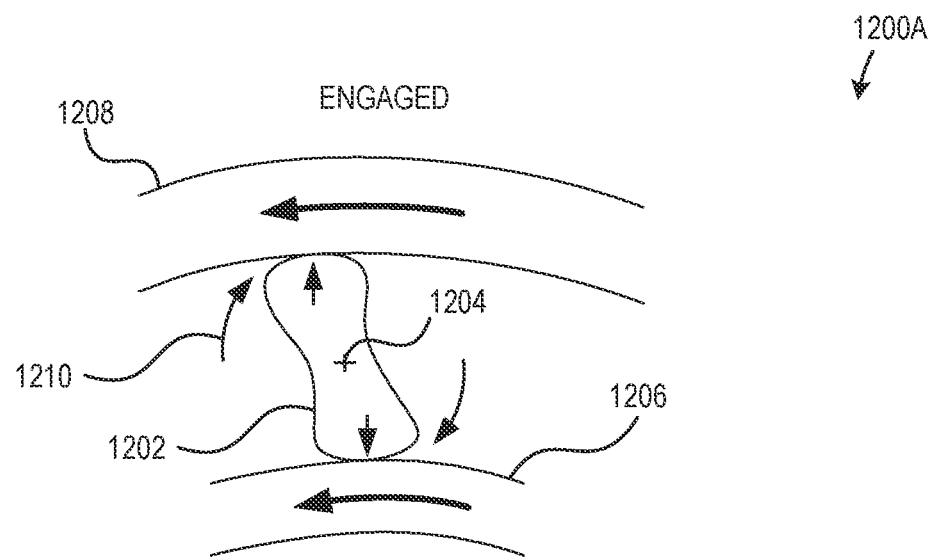
FIG. 12A illustrates an example engaged state of an example sprag element of the example integrated bearing system in accordance with the teachings of this disclosure.

FIG. 12A illustrates an example engaged state 1200A of an example sprag element 1202 (e.g., sprag element 1002 and/or one of the sprag elements 1106). The example engaged state 1200A illustrated in FIG. 12A shows the sprag element 1202 with a sprag axis of rotation 1204 about which the sprag element 1202 rotates. In some examples, the sprag axis of rotation 1204 is also a location of a center of gravity (CG) of the sprag element 1202. The example sprag element 1202 engages with an inner race 1206 (e.g., inner race 1004) and an outer race 1208 (e.g., outer race 1006) prior to operation of the pump system 900 due to a pre-loaded spring force acting on the sprag element 1202. In some examples, a spring ribbon is included in the sprag clutch (e.g., sprag clutch 1100) to apply the pre-loaded spring force on the left side of the sprag element 1202 above the sprag axis of rotation 1204, relative to the orientation illustrated in FIG. 12A. The pre-loaded spring force acting on the sprag element 1202 creates a spring moment 1210 on the sprag element 1202. The example spring moment 1210 causes the sprag element 1202 to wedge and/or jam between the inner race 1206 and the outer race 1208 prior to operation of the pump system 900. When the pump system 900 begins operation, and the outer race 1208 is rotating in a counterclockwise direction (relative to the orientation illustrated in FIG. 12A), and friction forces are generated between the sprag element 1202, the outer race 1208, and the inner race 1206 causing the inner race 1206 to rotate counterclockwise at a same rate as the outer race 1208. The example spring ribbon is designed to create a large enough spring moment 1210 to counteract frictional moment(s) on the sprag element 1202 acting in a counterclockwise direction, opposing the spring moment 1210. At this point in the operation of the example pump system 900, a point of contact between the sprag element 1202 and the outer race 1208 is to the right of the sprag axis of rotation 1204 and the CG of the sprag element 1202. The example point of contact is also the location at which the frictional force and a resulting frictional moment act on the sprag element 1202. During operation of the example pump system 900 at the first operational speed range, a centrifugal force is acting on the sprag element 1202 at the sprag axis of rotation 1204 and/or the CG of the sprag element 1202. Since the sprag axis of rotation 1204 and/or the CG of the sprag element 1202 is to the left of the point of contact at the first operational speed range, the centrifugal force creates a first centrifugal moment acting in the same direction as the spring moment, opposing the frictional moment(s). Thus, while an example shaft (e.g., rotor shaft 904) drives the rotation of the outer race 1208 at the first operational speed range via a mechanical connection (e.g., bolts, adhesives, interference fit, etc.), the sprag element 1202 remains engaged with the outer race 1208 and the inner race 1206, which causes the inner race 1206 to rotate at the same rate as the outer race 1208. The example sprag element 1202 remains engaged with the inner race 1206 and the outer race 1208 as long as the outer race 1208 continues to rotate at an angular velocity within the first operational speed range (e.g., less than the foil bearing liftoff speed (e.g., rotor shaft 904 and/or foil bearing 916 tangential velocity of 10 m/s to 50 m/s)) due to the design, shape, structure, materials, etc. of the example spring ribbon.

Figure 12B:
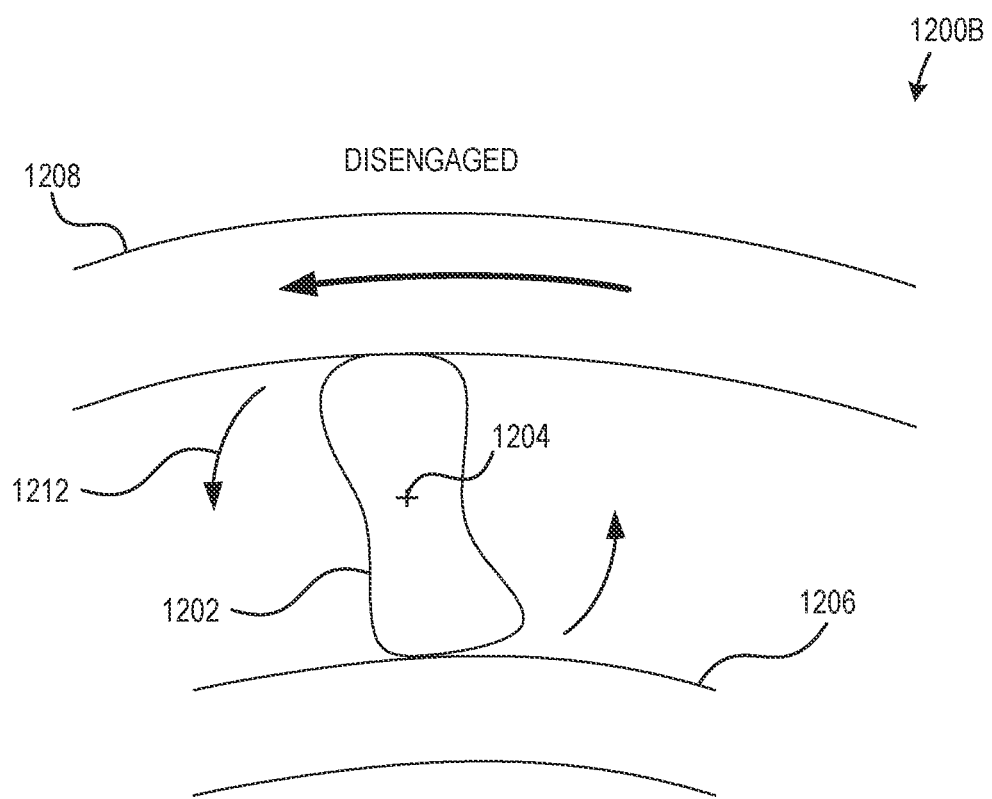
FIG. 12B illustrates an example disengaged state of the example sprag element of the example integrated bearing system in accordance with the teachings of this disclosure.

FIG. 12B illustrates an example disengaged state 1200B of the example sprag element 1202 (e.g., sprag element 1002 and/or one of the sprag elements 1106). The example disengaged state 1200B illustrated in FIG. 12B shows the same sprag element 1202 with the same sprag axis of rotation 1204 and/or CG about which the sprag element 1202 rotates. The example disengaged state 1200B illustrated in FIG. 12B includes the same inner race 1206 and the same outer race 1208 as FIG. 12A. In the illustrated disengaged state 1200B of FIG. 12B, the outer race 1208 (e.g., outer race 1006) is connected to the example shaft (e.g., rotor shaft 904) and is rotating at a rate that is within the second operational speed range (e.g., greater that the foil bearing liftoff speed (e.g., tangential velocity of 10 m/s to 50 m/s)). Once the outer race 1208 and the shaft (e.g., rotor shaft 904) are rotating at a rate within the second operational speed range, the sprag element 1202 disengages from the outer race 1208 and the inner race 1206 and counter rotates in a counterclockwise direction. As the example pump system 900 increases the operational speed closer to the lower limit of the second operational speed range, the frictional forces and frictional moments acting on the sprag element 1202 increase. The frictional moments acting on the sprag element 1202 counteract the spring moments 1210. Once the operational speed of the pump system 900 reaches the lower limit of the second operational speed range, the frictional moment is able to counteract the spring moment 1210 enough such that the sprag axis of rotation 1204 and/or the CG of the sprag element 1202 moves to the right of the point of contact between the sprag element and the outer race 1208. Once the example point of contact shifts to the left of the sprag axis of rotation 1204 and/or the CG of the sprag element 1202, the first centrifugal moment switches directions and becomes a second centrifugal moment 1212 that complements the frictional moment and opposes the spring moment 1210. Once the summation of the frictional moments and the second centrifugal moment 1212 surpass the spring moment 1210, the sprag element 1202 disengages from the inner race 1206 and the outer race 1208. Thus, in response to an example shaft (e.g., rotor shaft 904) driving the outer race 1208 to rotate at the second operational speed range via the mechanical connection (e.g., bolts, adhesives, interference fit, etc.), the sprag element 1202 disengages from the outer race 1208 and the inner race 1206, which causes the inner race 1206 to rotate freely from the outer race 1208.

Figure 13:
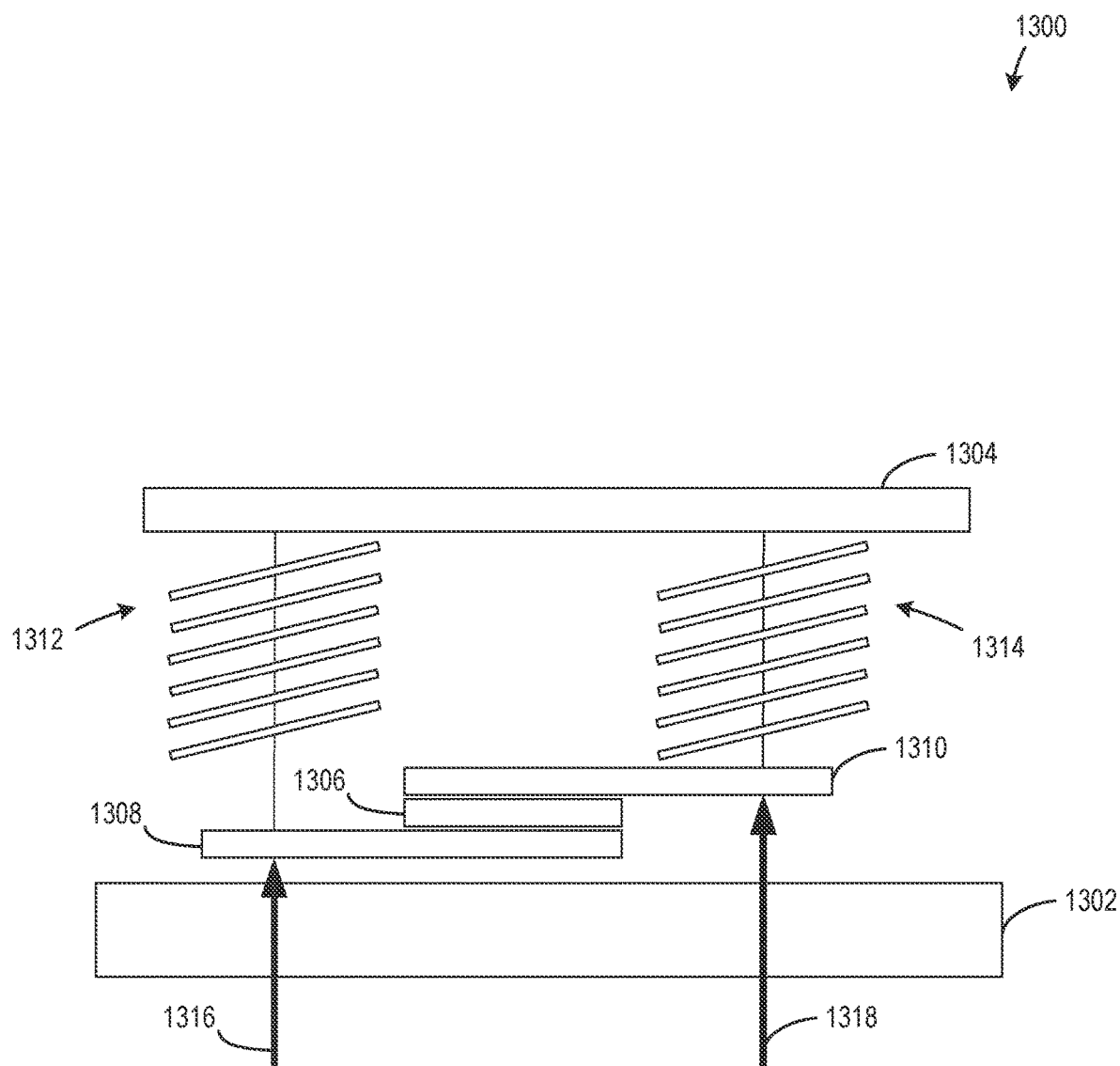
FIG. 13 illustrates example load paths that the example integrated bearing systems support during operation of the example pump system in accordance with the teachings of this disclosure.

FIG. 13 illustrates an example integrated bearing system 1300 (e.g., integrated bearing system 910 of FIGS. 9 and 10) and example load paths that the integrated bearing system 1300 supports during at different points during an operation of an example pump system (e.g., pump system 900 of FIG. 9). The example integrated bearing system 1300 includes a shaft 1302 (e.g., rotor shaft 904 of FIGS. 9 and/or 10), a bearing housing 1304 (e.g., bearing housing 913 of FIGS. 9 and/or 10), a sprag clutch 1306 (e.g., sprag clutch 912 of FIGS. 9 and/or 10), an inner race 1308 (e.g., inner race 1004 of FIG. 10 and/or inner race 1206 of FIGS. 12A and/or 12B), an outer race 1310 (e.g., outer race 1006 of FIG. 10 and/or outer race 1208 of FIGS. 12A and/or 12B), a rolling-element bearing 1312 (e.g., rolling-element bearing 914 of FIGS. 9 and/or 10), a foil bearing 1314 (e.g., foil bearing 916 of FIGS. 9 and/or 10), a first load path 1316, and a second load path 1318. The example first load path 1316 and the example second load path 1318 are representations of forces acting upon the example inner race 1308 and the example outer race 1310, respectively, and are not physical objects.

As described previously and illustrated in FIGS. 9 and/or 10, the example outer race 1310 is connected to the example shaft 1302 via mechanical fasteners (e.g., bolts, screws, dowels, adhesives, interference fits, etc.). As also previously described, the example bearing housing 1304 securely supports the example rolling-element bearing 1312 and the example foil bearing 1314 in place during operation via mechanical fasteners (e.g., bolts, screws, dowels, adhesives, interference fits, etc.). As the example shaft 1302 rotates at a first angular velocity associated with a first tangential velocity that does not satisfy the foil bearing liftoff speed (e.g., tangential velocity of 10 m/s to 50 m/s), the example sprag clutch 1306 engages with the example outer race 1310 and the example inner race 1308. In response to the example sprag clutch 1306 engaging with the inner race 1308 and the outer race 1310 at the first operational speed range, the shaft 1302 generates the example first load path 1316 which acts on the inner race 1308 and the rolling-element bearing 1312. Thus, at the first operational speed range, the example rolling-element 1312 supports a weight of the shaft 1302.

As described previously and illustrated in FIGS. 12A and 12B, the example sprag clutch 1306 disengages from the inner race 1308 and the outer race 1310 at a second angular velocity associated with a second tangential velocity that satisfies the foil bearing liftoff speed (e.g., tangential velocity of 10 m/s to 50 m/s). In response to the sprag clutch 1306 disengaging from the inner race 1308 and the outer race 1310 at the second tangential velocity, the shaft 1302 generates the example second load path 1318 which acts on the inner outer race 1310 and the foil bearing 1314. Thus, at the second operational speed range, the example foil bearing 1314 supports the weight of the shaft 1302. In some examples, the first load path 1316 and the second load path 1318 are of a same force value which is sufficiently similar to the weight of the shaft 1302.

Figure 14:
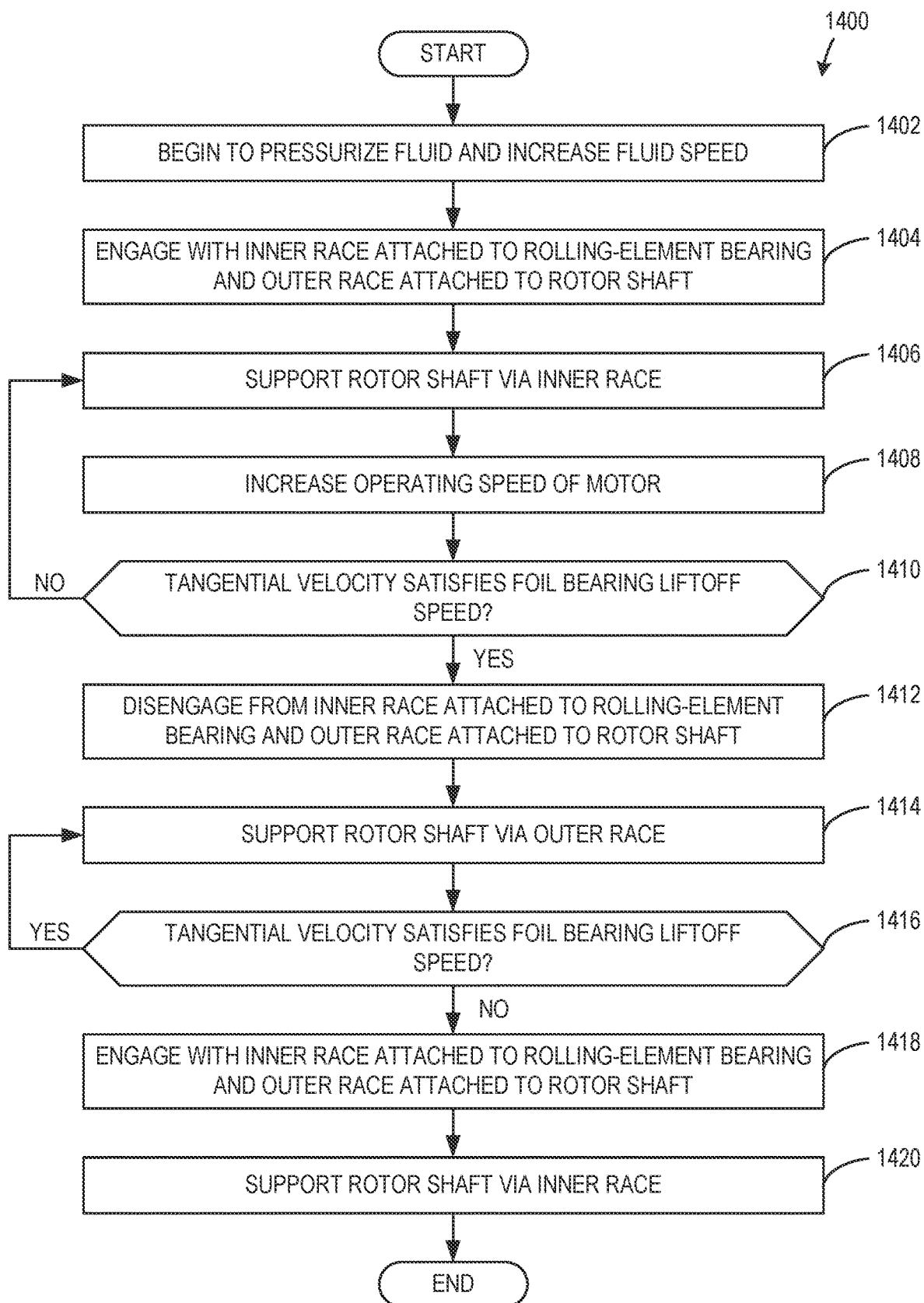
FIG. 14 is a flow diagram illustrating an example operation of the example integrated bearing systems of the example pump system.

FIG. 14 is a flow diagram illustrating an example process or operation 1400 that the integrated bearing system 910 may follow as disclosed herein to dynamically support a rotor shaft 904 in a pump system 900. While the operation 1400 is described with primary reference to dynamically supporting the rotor shaft 904 in the pump system 900 of FIG. 9, the operation 1400 can be used to support another rotating shaft in another pump system with the integrated bearing system 910. While the operation 1400 is described with primary reference to dynamically supporting the rotor shaft 904 with the integrated bearing system 910, another integrated bearing system (e.g., integrated bearing system 918) can use the operation 1400 to dynamically support the rotor shaft 904 or another rotor shaft.

At block 1402, a pump system 900 begins to pressurize a fluid (e.g., heat exchange fluid, supercritical fluid, supercritical carbon dioxide ($sCO_2$), etc.) flowing through a thermal management system and increase the flow rate of the fluid exiting the pump system 900. For example, an electrical current is supplied to a stator 906 in a motor of the pump system 900 which causes electromagnets in the stator 906 to produce one or more magnetic fields that alternate polarities over time based on the direction of electric current flowing through the stator 906. The magnetic field(s) produced are perpendicular to an axis of rotation of a rotor 905 in the motor. The rotor 905 is attached to the rotor shaft 904 and includes permanent magnets that are attracted to and/or repelled from the alternating polarities of the electromagnets in the stator 906. As the rotor shaft 904 rotates with increasing angular velocity, so does an impeller 902 which is coupled to the rotor shaft 904. The impeller 902 includes vanes or blades that causes the fluid pressure and flowrate to increase.

At block 1404, the integrated bearing system 910 of the pump system 900 engages with an inner race 1004 attached to a rolling-element bearing 914 and an outer race 1006 attached to the rotor shaft 904. For example, a sprag clutch 912 of the integrated bearing system 910 includes sprag elements 1002 (e.g., sprag elements 1106 of FIG. 11) that are engaged with the inner race 1004 and the outer race 1006 due to a pre-loaded spring force acting on the sprag elements 1002. When the sprag elements 1002 wedge between the outer race 1006 and the inner race 1004, reaction forces and frictional forces are generated that cause the inner race 1004 to rotate at a same rate as the outer race 1006.

At block 1406, the integrated bearing system 910 of the pump system 900 supports the rotor shaft 904 via the inner race 1004. For example, the outer race 1006 rotates at the same rate as the rotor shaft 904, the sprag clutch 912 engages with the outer race 1006 and the inner race 1004, the inner race 1004 rotates at the same rate as the outer race 1006 and the rotor shaft 904, and the rolling-element bearing 914 supports the radial load of the rotor shaft 904 via the inner race 1004.

At block 1408, the pump system 900 increases the operating speed of the motor. For example, electric current is supplied to the stator 906 at a greater rate causing the electromagnets in the stator 906 to alternate in polarity at a greater rate. As the electromagnets of the stator 906 alternate at a greater rate, the angular velocity of the rotor 905 increases at the same rate. As the angular velocity of the rotor 905 and the connected rotor shaft 904 increases, the tangential velocity of the rotor shaft 904 and the outer race 1006 also increases.

At block 1410, if the tangential velocity of the rotor shaft A104 and/or the outer race 1006 satisfies a foil bearing liftoff speed (e.g., 10 m/s to 50 m/s), then operation 1400 proceeds to block 1412. If the tangential velocity of the rotor shaft A104 and/or the outer race 1006 does not satisfy the foil bearing liftoff speed, then operation 1400 returns to block 1406, at which the rolling-element bearing 914 continues to support the weight of the rotor shaft 904 via the inner race 1004.

At block 1412, the integrated bearing system 910 disengages from the inner race 1004 and the outer race 1006. For example, once the tangential velocity of the rotor shaft A104 and/or the outer race 1006 are high enough as to satisfy the foil bearing liftoff speed, the centrifugal forces and frictional forces acting on the sprag elements 1002 of the sprag clutch 912 counteract and surpass spring moment forces, causing the sprag elements 1002 to counter rotate and disengage from the inner race 1004 and the outer race 1006.

At block 1414, the integrated bearing system 910 supports the radial load that the rotor shaft A104 produces via the outer race 1006. For example, once the sprag elements 1002 disengage from the outer race 1006 and the inner race 1004, the foil bearing 916 supports the total weight and/or the majority of the weight of the rotor shaft A104 via the outer race 1006 which is connected to the rotor shaft 904 and interacts with the foil bearing 916. The foil bearing 916 continues to support the total and/or the majority of the radial load of the rotor shaft A104 as long as the foil bearing liftoff speed is satisfied.

At block 1416, if the tangential velocity of the rotor shaft A104 and/or the foil bearing 916 continues to satisfy the foil bearing liftoff speed, then the operation 1400 returns to block 1414, at which the integrated bearing system 910 continues to support the radial load of the rotor shaft 904 via the outer race 1006. If the operational speed of the pump system 900 slows down such that the tangential velocity of the rotor shaft 904 and/or the foil bearing 916 does not satisfy the foil bearing liftoff speed, then operation 1400 proceeds to block 1418.

At block 1418, the integrated bearing system 910 of the pump system 900 engages with the inner race 1004 attached to the rolling-element bearing 914 and the outer race 1006 attached to the rotor shaft 904. For example, the spring moment forces acting on the sprag elements surpasses opposing frictional forces and centrifugal forces, and the sprag clutch 912 of the integrated bearing system 910 engages with the inner race 1004 and the outer race 1006. At block 1420, the integrated bearing system 910 supports the radial load of the rotor shaft 904 via the inner race 1004. For example, sprag clutch 912 of the integrated bearing system 910 engages with the inner race 1004 attached to the rolling-element bearing 914, and the rolling-element bearing 914 supports the total and/or the majority of the radial load of the rotor shaft 904 via the inner race 1004. The operation 1400 continues at block 1420 until the pump system 900 stops operating, at which point the operation 1400 of FIG. 14 ends.

In some examples, the pump system 900 includes means for increasing kinetic energy. For example, the means for increasing may be implemented by the impeller 902, the rotor shaft 904, the rotor 905, and/or the stator 906 of FIG. 9. In some examples, the means for increasing may include an electric motor, an impeller shaft, and an impeller.

In some examples, the pump system 900 includes means for providing torque. For example, the means for providing may be implemented by the stator 906 and/or the rotor 905 of FIG. 9. In some examples, the means for providing may include an electric motor.

In some examples, the pump system 900 includes means for first supporting. For example, the means for first supporting may be implemented by the first integrated bearing system 910 of FIGS. 9 and/or 10, the second integrated bearing system 918 of FIG. 9, the first rolling-element bearing 914 of FIGS. 9 and/or 10, the second rolling-element bearing 922 of FIG. 9, the integrated bearing system 1300 of FIG. 13, and/or the rolling-element bearing 1312 of FIG. 13. In some examples, the means for first supporting may include an angular contact ball bearing, a hybrid ceramic bearing, a taper roller bearing, a deep groove single ball bearing, a duplex ball bearing, and/or a spherical bearing.

In some examples, the pump system 900 includes means for second supporting. For example, the means for second supporting may be implemented by the first integrated bearing system 910 of FIGS. 9 and/or 10, the second integrated bearing system 918 of FIG. 9, the first foil bearing 916 of FIGS. 9 and/or 10, the second foil bearing 924 of FIG. 9, the integrated bearing system 1300 of FIG. 13, and/or the foil bearing 1314 of FIG. 13. In some examples, the means for second supporting may include an air foil bearing and/or a fluid static foil bearing.

In some examples, the pump system 900 includes means for engaging. For example, the means for engaging may be implemented by the first integrated bearing system 910 of FIGS. 9 and/or 10, the second integrated bearing system 918 of FIG. 9, the first sprag clutch 912 of FIGS. 9 and/or 10, the second sprag clutch 920 of FIG. 10, the sprag elements 1002 of FIG. 10, the sprag clutch 1100 of FIG. 11, the sprag elements 1106 of FIG. 11, the sprag element(s) 1202 of FIGS. 12A-12B, and/or the sprag clutch F506 of FIG. 13. In some examples, the means for engaging may include a clutch and/or one or more asymmetrically-shaped rotating elements.

In some examples, the pump system 900 includes means for separating. For example, the means for separating may be implemented by an oil separator. Further descriptions on example oil separators that may be implement the means for separating are discussed in greater detail below.

Example integrated bearing systems for dynamically supporting shafts in pump systems are disclosed herein. The example integrated bearing system disclosed herein includes a sprag clutch, an inner race attached to a rolling-element bearing, and an outer race attached to a foil bearing and a rotor shaft. The example integrated bearing system disclosed herein includes the sprag clutch to engage with the inner race and the outer race at a first operational speed range (e.g., tangential speed range from 0 m/s to 10 m/s and/or 50 m/s). Thus, the example rolling-element bearing supports a radial load that the example rotor shaft generates while operating within the first operational speed range. The example integrated bearing system disclosed herein also includes the sprag clutch to disengage with the inner race and the outer race at a second operational speed range (e.g., tangential speed range from 10 m/s and/or 50 m/s to 200 m/s) due to centrifugal forces acting on sprag elements of the sprag clutch. Thus, the example foil bearing supports the radial load that the example rotor shaft generates while operating within the second operational speed range. The example integrated bearing systems disclosed herein reduce wear of the foil bearings in the example pump systems (relative to example pump systems without the integrated bearing systems) because the rolling-element bearings support the majority of and/or the total radial loads of the rotor shaft during start-up and stopping speeds of the pump system. The example integrated bearing systems disclosed herein allow the foil bearings to operate longer periods of time without damage and/or maintenance (relative to foil bearings in pump systems without the example integrated bearing systems) since the example foil bearings support the majority of and/or the total radial loads of the rotor shaft with air pressure in the foil bearings (not a spring-loaded foil within the foil bearings) while the foil bearing is operating at the second operational speed range.

Layered Barrier Cans for Magnetic Couplings and Methods of Producing the Same

In some known pumps, to reduce an impact of a barrier can (e.g., the barrier can 452 of FIG. 4) on the magnetic fields produced by the magnetic couplings (e.g., the first magnetic coupling 450 and the second magnetic coupling 460 of FIG. 4), a non-metallic material is utilized for the barrier can. For instance, the barrier can may include a plastic. However, a plastic barrier can include a bulky thickness to provide sufficient structural strength and still is often not strong enough to withstand high pressures (e.g., pressures over 1,000 pounds-per-square-inch absolute (PSIA)). Additionally, the non-metallic material may deform under higher temperatures. As such, usage of non-metallic materials for barrier cans limits potential operating pressures and/or temperatures of the associated pump. Accordingly, the non-metallic barrier can limits a rate at which the fluid can be driven through the thermal transport bus 202 and, in turn, limits a rate at which thermal energy can be transferred between the fluid and a working fluid.

In some pumps, to enable the barrier can to withstand increased pressures (e.g., pressures over 1,000 PSIA), the barrier can is formed of titanium. However, the titanium barrier can causes eddy current loss between the rotating magnetic fields produced by the magnetic couplings. Further, such eddy current loss is increased when the titanium barrier can includes a greater thickness to withstand higher pressures. As such, the titanium barrier can may limit a rate at which the magnetic couplings can rotate while staying magnetically coupled. Accordingly, the titanium barrier can affect the torque transferred between a motor shaft and an impeller shaft. Moreover, to overcome the eddy current loss, the titanium barrier may require larger magnets to be utilized for the magnetic couplings, which increases a size and/or a cost of the pump, requires a larger motor to drive the rotation of the magnetic couplings, and/or requires a cooling arrangement to relieve heat generated by the magnetic couplings during rotation.

Figure 15:
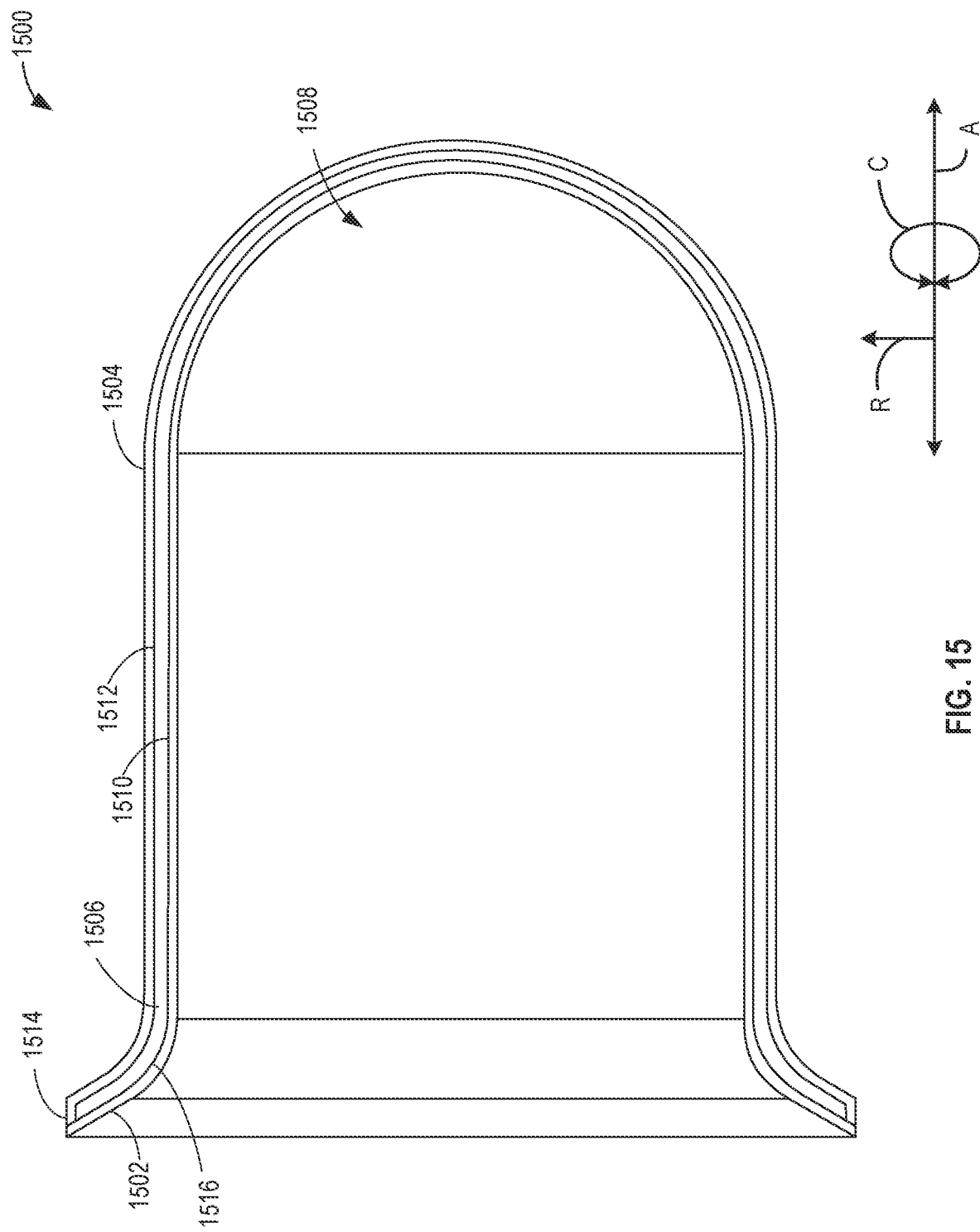
FIG. 15 illustrates a first example barrier can in accordance with the teachings disclosed herein.

FIG. 15 illustrates a first example shroud 1500 (e.g., a barrier can) that can be utilized in the thermal transport bus pump 400 (e.g., the barrier can 452 of FIG. 4), the pump system 500 of FIG. 5 (e.g., the barrier can 536 of FIG. 5), the pump system 600 of FIG. 6 (e.g., the barrier can 636 of FIG. 6), the pump system 700 of FIG. 7, and/or any other pump systems disclosed herein that utilize a barrier can or shroud to contain a flow of fluid. In the illustrated example of FIG. 15, the shroud 1500 includes an inner shell 1502, an outer shell 1504, and a core shell 1506 (e.g., a metal core shell, a metallic core layer, etc.) positioned between the inner shell 1502 and the outer shell 1504. The shroud 1500 defines a cavity 1508. Accordingly, when the shroud 1500 is implemented in the thermal transport bus pump 400, one magnetic coupling (e.g., the second magnetic coupling 460 of FIG. 4) can be positioned in the cavity 1508 and another magnetic coupling (e.g., the first magnetic coupling 450 of FIG. 4) can be positioned around the shroud 1500. Accordingly, the inner shell 1502 can be in contact with a first fluid (e.g., a heat exchange fluid such as a supercritical fluid (e.g., sCO$_2$, etc.)) and the outer shell 1504 can be in contact with a second fluid (e.g., air, hydrogen, etc.).

In the illustrated example of FIG. 15, an inner surface 1510 of the core shell 1506 is fully in contact with the inner shell 1502. Similarly, an outer surface 1512 of the core shell 1506 is fully in contact with the outer shell 1504. Specifically, the inner shell 1502 and the outer shell 1504 provide insulating layers that surround the core shell 1506. As a result, the continuous surface contact that the core shell 1506 has with the inner shell 1502 and the outer shell 1504 can help the core shell 1506 dissipate heat generated as of result of the core shell 1506 encountering rotating magnetic fields. Specifically, the inner shell 1502 can transfer thermal energy between the first fluid and the core shell 1506. Further, the outer shell 1504 can transfer thermal energy between the second fluid and the core shell 1506. The thermal transport bus pump 400 can cause the first fluid to be recirculated to increase a rate at which the thermal energy is transferred between the core shell 1506 and the first fluid through the inner shell 1502. Moreover, the vent 461 (FIG. 4) can enable the second fluid to circulate in the coupling housing 424 (FIG. 4). In some examples, a fan drives the second fluid into and/or out of the coupling housing to increase a rate at which the thermal energy is transferred between the core shell 1506 and the second fluid through the outer shell 1504. In some other examples, the coupling housing 424 and/or the motor housing 412 (FIG. 4) is filled with the second fluid, which enables the second fluid to circulate and cool the shroud 1500 when the coupling housing 424 does not include the vent 461.

In FIG. 15, the shroud 1500 can include a thickness between 0.090 inches (in.) and 0.125 in. In some examples, the inner shell 1502 includes a first thickness (e.g., between 0.005 in. and 0.040 in.), the outer shell 1504 includes the first thickness or a second thickness (e.g., between 0.005 in. and 0.040 in.), and the core shell 1506 includes a third thickness (e.g., between 0.005 in. and 0.090 in.). In some examples, the third thickness is greater than the first thickness and the second thickness. However, the third thickness could alternatively be smaller than the first thickness and/or the second thickness or approximately equivalent to the first thickness and/or the second thickness. The thickness of the shroud 1500 and, more specifically, the inner shell 1502, the outer shell 1504, and the core shell 1506 can be based on pressures encountered during operations of an associated pump (e.g., the thermal transport bus pump 400). For example, the shroud 1500 can include a first thickness (e.g., 0.125 in.) when the pump 400 is to operate with a first maximum pressure, and the shroud 1500 can include a second thickness (e.g., 0.090 in.) when the pump 400 is to operate with a second maximum pressure less than the first maximum pressure.

In the illustrated example of FIG. 15, the inner shell 1502, the outer shell 1504, and the core shell 1506 respectively include uniform thicknesses. In some examples, the inner shell 1502, the outer shell 1504, and/or the core shell 1506 respectively include non-uniform thicknesses, as discussed in further detail below.

The inner shell 1502 and the outer shell 1504 include a non-metallic material, such as a ceramic material, a polymer material, and/or a composite material. In some examples, the ceramic material is aluminum(I) oxide (Al$_2$O), aluminum(II) oxide (AlO) (e.g., aluminum monoxide), aluminum(III) oxide (Al$_2$O$_3$) (e.g., aluminum oxide, alumina), zirconia (e.g., zirconia toughened alumina), and/or silicon carbide. In some examples, the polymer material and/or the composite material includes a carbon fiber composite and/or a polyimide (e.g., T650-35, PMR-15, MVK-14 standard modulus, etc.). The carbon fiber composite can include short carbon fibers, long carbon fibers, and/or endless carbon fibers. Accordingly, the inner shell 1502 defines a first non-metallic layer of the shroud 1500 and the outer shell 1504 defines a second non-metallic layer of the shroud 1500. In some examples, the inner shell 1502 and the outer shell 1504 both include the ceramic material. In some examples, the inner shell 1502 and the outer shell 1504 both include the polymer. In some examples, the inner shell 1502 and the outer shell 1504 both include the composite material. In some examples, the inner shell 1502 includes a first material, such as the ceramic material, and the outer shell 1504 includes a second material different from the first material, such as the polymer or the composite material. Further, the core shell 1506 includes nickel and/or cobalt. Additionally or alternatively, the core shell 1506 can include a different metal.

In FIG. 15, the shroud 1500 includes a flange portion 1514. In FIG. 4, the inner shell 1502, the outer shell 1504, and the core shell 1506 extend circumferentially outward to form the flange portion 1514. Accordingly, the O-ring 459 of FIG. 4 can be positioned around the flange portion 1514. Further, the flange portion 1514 can be pressed against the aft end of the forward bearing housing 428 of FIG. 4 via the barrier can retainer 454 and the bolts 458 of FIG. 4. As the inner shell 1502 and the outer shell 1504 enclose the core shell 1506, the O-ring 459 presses against the outer shell 1504 to enable the shroud 1500 to hermetically seal off the aft end of the forward bearing housing 428.

The inner shell 1502 can be formed via molding and/or slurry-based processing techniques, such as additive manufacturing (e.g., thermal spraying, cold spraying, etc.) and/or sintering. In some examples, when the inner shell 1502 is formed via thermal spraying and/or cold spraying, there is an initial mandrel upon which the inner shell 1502 is sprayed and subsequently separated from. In some examples, when the inner shell 1502 is formed via thermal spraying and/or cold spraying, an initial portion (e.g., an inner or outer portion) of the inner shell 1502 can be formed via another manufacturing technique, such as slurry-based processing, and a remainder of the inner shell 1502 can be sprayed onto the initial portion. Further, the initial portion of the inner shell 1502 can be machined to a certain thickness in advance of the thermal spraying and/or cold spraying. In some examples, the inner shell 1502 can be formed via other manufacturing techniques, such as casting (e.g., slip casting, tape casting, etc.) and/or pressing.

In turn, the core shell 1506 is electroformed (e.g., electrodeposited) on an outer surface 1516 of the inner shell 1502. That is, the inner shell 1502 serves as a mandrel on which the core shell 1506 is formed. Advantageously, electroforming the core shell 1506 enables the thickness of the core shell 1506 to be reduced compared to thicknesses providable by conventional manufacturing techniques utilized to shape metals.

Further, the outer shell 1504 can be formed via thermal spraying or cold spraying on the core shell 1506. Accordingly, the electroformed layer of the core shell 1506 can serve as a bond coating for the outer shell 1504. In some examples, the inner shell 1502 can be formed via other manufacturing techniques, such as a composite lay-up process (e.g., composite layer laying), molding (e.g., injection molding), slip casting, pressing, and/or tape casting.

For example, the inner shell 1502 can be molded, the core shell 1506 electroformed on the inner shell 1502, and the outer shell 1504 thermal sprayed on the core shell 1506. In some examples, the core shell 1506 is electroformed on an inner surface of the outer shell 1504 instead of the outer surface of the inner shell 1502. In turn, the inner shell 1502 can be thermal sprayed or cold sprayed on the core shell 1506. Furthermore, the shroud 1500 can be finished via machining or grinding to maintain a thickness of the shroud 1500 within a certain tolerance range and define a uniform contour along the inner surface of the inner shell 1502 and/or an outer surface of the outer shell 1504.

Advantageously, the core shell 1506 enables the first example shroud 1500 to withstand an increased pressure without rupturing and, in turn, enables the thermal transport bus pump 400 to drive the fluid at higher pressures. Specifically, the first example shroud 1500 enables the speed of the motor 410 to be increased to increase an output (e.g., a volumetric flowrate) produced by the impeller 406. As a result, the thermal transport bus pump 400 can provide more of the fluid to areas of the aircraft 10 of FIG. 1 and/or the gas turbine engine 100 of FIG. 2 over a shorter period to enable heat transfer between the fluid and the working fluids in the aircraft 10 of FIG. 1 and/or the gas turbine engine 100 to occur at a faster rate. Further, a geometry of the inner shell 1502, the outer shell 1504, and/or the core shell 1506 can be non-cylindrical to increase a stiffness of the first shroud 1500 and, in turn, increase a pressure that the shroud 1500 is able to withstand.

Moreover, electroforming the core shell 1506 enables the core shell 1506 to be formed with a reduced thickness that conventional manufacturing techniques are unable to produce. As a result, when the first shroud 1500 is implemented in the thermal transport bus pump 400, the core shell 1506 causes a reduced eddy current loss compared to known barrier cans that include metal. Accordingly, the reduced eddy current loss enables a size of the motor 410, the first magnetic coupling 450, and the second magnetic coupling 460 to be reduced. Moreover, the reduced eddy current loss reduces thermal energy generated by the core shell 1506 as a result of the rotating magnetic fields produced by the first magnetic coupling 450 and the second magnetic coupling 460 of FIG. 4. As such, electroforming the core shell 1506 prevents a need for a cooling sleeve around the coupling housing 424. Additionally, the core shell 1506 increases a temperature range that the shroud 1500 is able to withstand.

Similarly, thermal spraying enables the inner shell 1502 and/or the outer shell 1504 to be formed with a reduced thickness. Thus, an overall thickness of the first shroud 1500 is minimized or otherwise reduced, which enables a gap between the first magnetic coupling 450 and the second magnetic coupling 460 to be minimized or otherwise reduced. As such, torque can be transferred between the motor shaft 438 and the impeller shaft 466 more efficiently with smaller magnets and/or a smaller motor to reduce a size and/or a cost of the thermal transport bus pump 400. Additionally, the reduced thickness of the inner shell 1502 and/or the outer shell 1504 and/or the continuous surface contact that the core shell 1506 has with the inner shell 1502 and the outer shell 1504 enables the inner shell 1502 and/or the outer shell 1504 to transfer thermal energy between encountered fluids and the core shell 1506 more efficiently. Accordingly, the inner shell 1502 and/or the outer shell 1504 can help the core shell 1506 dissipate heat. Furthermore, the reduced eddy current loss caused by the shroud 1500 and the reduced thickness of the shroud 1500 can enable an increased separation between the shroud 1500 and the magnetic couplings 450, 460 such that fluids can flow between the shroud 1500 and the magnetic couplings 450, 460 at an increased flow rate to increase a rate at which thermal energy is transferred between the shroud 1500 and the fluids.

Furthermore, reducing the thickness of the first shroud 1500 and reducing the eddy current loss caused by the shroud 1500 enables the rotation of the first magnetic coupling 450 and the second magnetic coupling 460 to remain interlocked at greater rotational speeds. Accordingly, the first shroud 1500 enables the thermal transport bus pump 400 to drive the fluid with an increased flow rate and/or an increased pressure.

Figure 16:
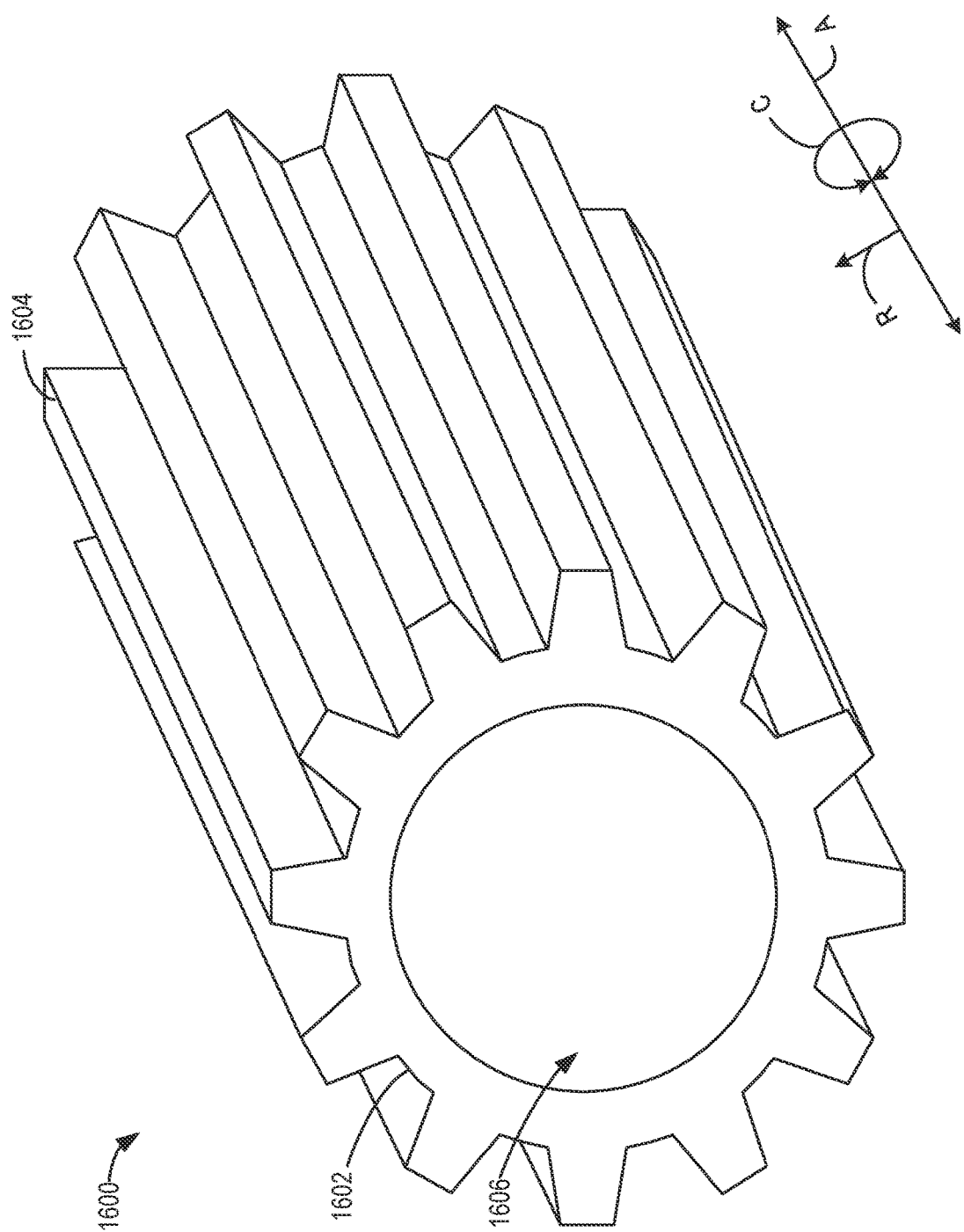
FIG. 16 illustrates an example inner shell that can be utilized in the first example barrier can of FIG. 15.

FIG. 16 illustrates another example inner shell 1600 that can be utilized in the first example shroud 1500 of FIG. 15 (e.g., the inner shell 1502 of FIG. 15). In FIG. 16, the inner shell 1600 includes a base portion 1602 and ribs 1604 (e.g., ridges) radially protruding from the base portion 1602. Specifically, the ribs 1604 extend away from a cavity 1606 (e.g., the cavity 1508) defined by the base portion 1602. Accordingly, a first portion of the inner shell 1600 includes a first thickness defined by the base portion 1602 and a second portion of the inner shell 1600 includes a second thickness defined by the base portion 1602 and the ribs 1604. In some examples, the second thickness is between 0.75 inches and 1.0 inches. Advantageously, the ribs 1604 enable the shroud 1500 of FIG. 15 to provide an increased structural stiffness and, thus, increases a maximum pressure that the shroud 1500 is able to withstand.

In the illustrated example of FIG. 16, the ribs 1604 are spaced apart along a circumference of the base portion 1602. Further, the circumferentially spaced ribs 1604 extend along the base portion 1602 in an axial direction A defined by the inner shell 1600. In the illustrated example of FIG. 16, the ribs 1604 extend in straight lines along the axial direction A. However, it should be understood that the ribs 1604 can extend along the base in any shape to increase a stiffness of the shroud 1500 of FIG. 15. For example, the ribs 1604 can extend from the base portion 1602 in straight lines not defined by the axial direction (e.g., where a circumferential position of a first end of a ridge varies from a circumferential position of a second end of the ridge). In some examples, the ribs 1604 extend along the base portion 1602 in a spiral along the axial direction A. In some examples, the ribs 1604 extend along the base portion 1602 in a circumferential direction C defined by the inner shell 1600. In some examples, the ribs 1604 includes waves such that positions of the ribs 1604 vary in the circumferential direction C as the ribs 1604 extend in the axial direction A along the base portion 1602.

Furthermore, the core shell 1506 of FIG. 15 can be electroformed on the inner shell 1600. Accordingly, the core shell 1506 of FIG. 15 is layered on the base portion 1602 and the ribs 1604 of the inner shell 1600. As a result, the core shell 1506 of FIG. 15 can include a first portion fixed to the base portion 1602 and a second portion fixed to the ribs 1604. Accordingly, the first portion of the core shell 1506 of FIG. 15 can include a first inner diameter and a first outer diameter and the second portion of the core shell 1506 can include a second inner diameter and a second outer diameter greater than the first inner diameter and the first outer diameter. In turn, a geometry of the core shell 1506 can further increase the structural stiffness of the shroud 1500.

Figure 17A:
FIG. 17A illustrates a cross-section of the first example barrier can after a first example manufacturing operation.
Figure 17B:
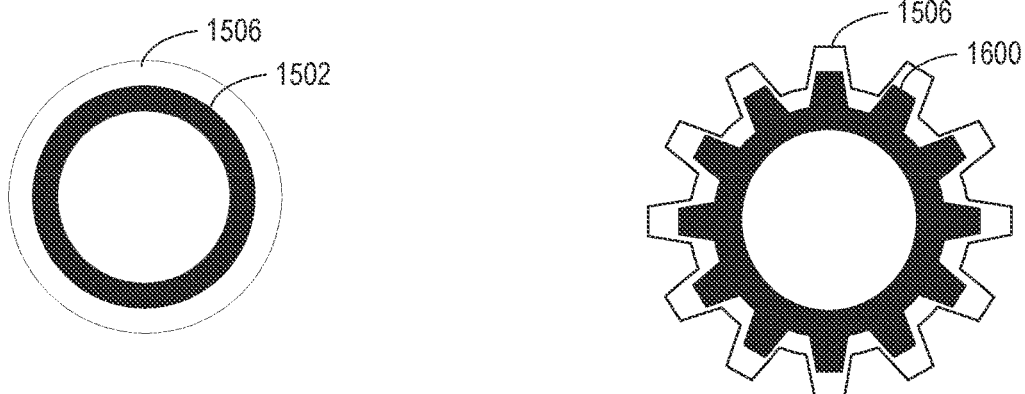
FIG. 17B illustrates a cross-section of the first example barrier can after a second example manufacturing operation.
Figure 17C:
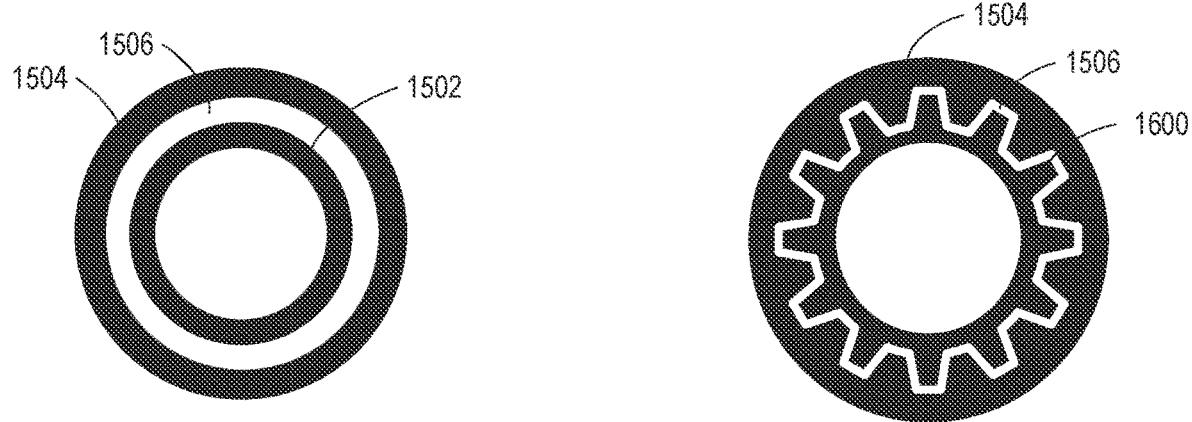
FIG. 17C illustrates a cross-section of the first example barrier can after a third example manufacturing operation.

FIGS. 17A-C illustrate steps of an example manufacturing process utilized to form the first shroud 1500. Specifically, FIGS. 17A-C illustrate the steps of the manufacturing process in the context of the first shroud 1500 including the first inner shell 1502 of FIG. 15 and the second inner shell 1600 of FIG. 16. In FIG. 17A, the inner shell 1502, 1600 is formed. For example, the inner shell 1502, 1600 can be formed via molding, thermal spraying, and/or cold spraying. In FIG. 17B, the core shell 1506 is electroformed on the inner shell 1502, 1600. In FIG. 17C, the outer shell 1504 is thermal sprayed or cold sprayed on the core shell 1506.

Figure 18:
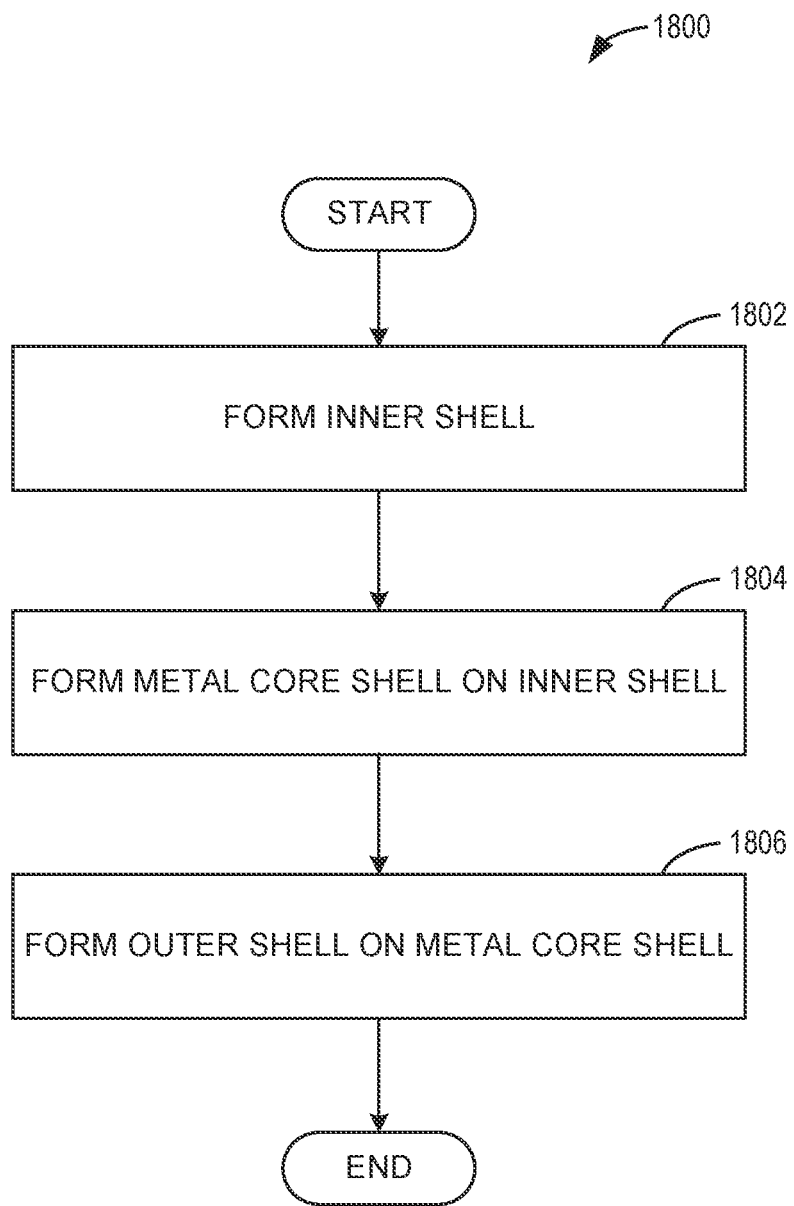
FIG. 18 is a flowchart representative of an example method to manufacture the first example barrier can of FIGS. 15 and 17A-C.
Figure 20:
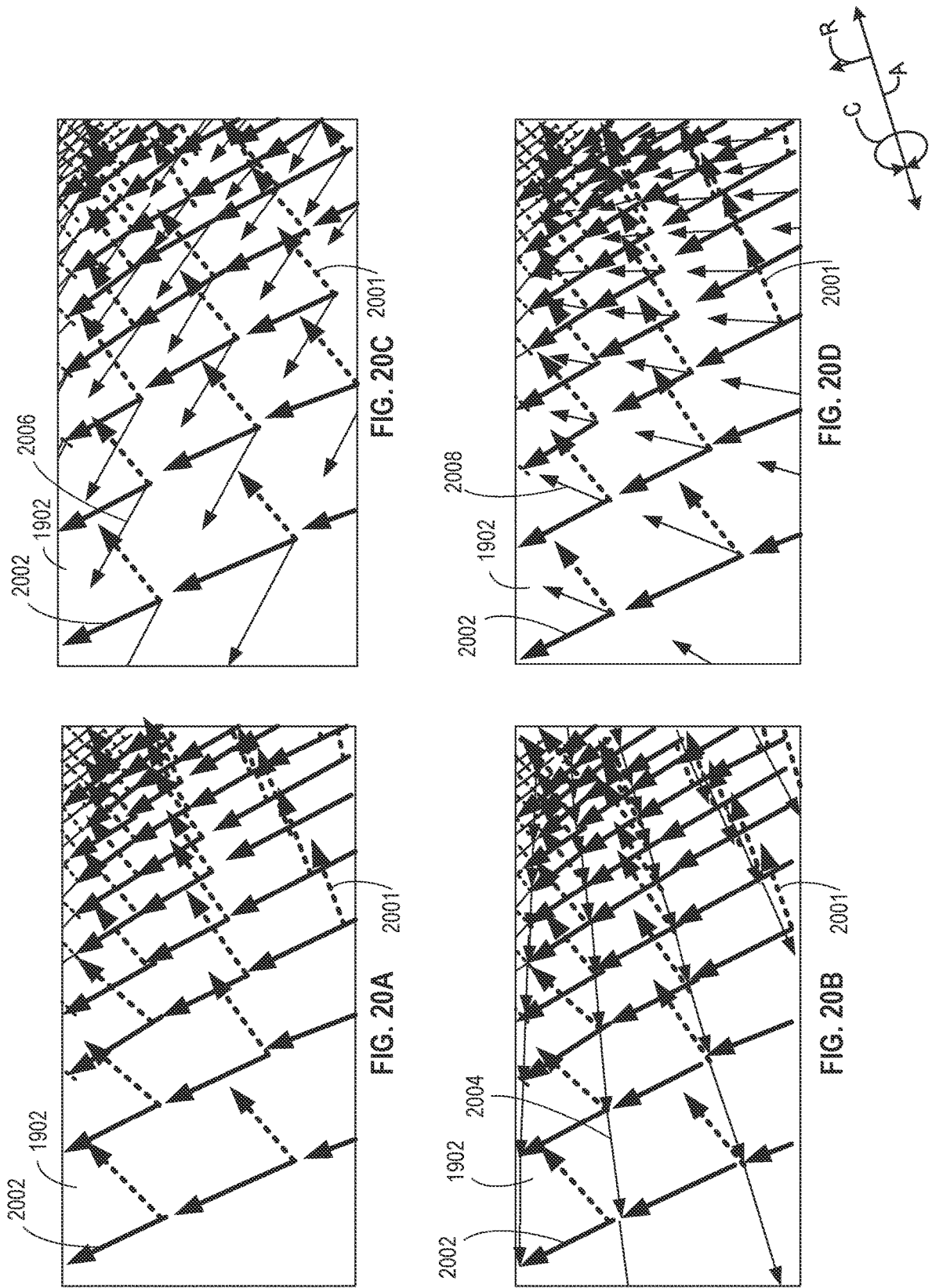
FIG. 20A illustrates first example fibers of the second example barrier can of FIG. 19.
FIG. 20B illustrates second example fibers of the second example barrier can of FIG. 19.
FIG. 20C illustrates third example fibers of the second example barrier can of FIG. 19.
FIG. 20D illustrates fourth example fibers of the second example barrier can of FIG. 19.

FIG. 18 is a flowchart representative of an example method 1800 to manufacture a barrier can, such as the shroud 1500 of FIGS. 15 and/or 17C. In some examples, at least a portion of the example method 1800 is representative of example machine readable instructions that may be executed and/or instantiated by processor circuitry in communication with manufacturing equipment to manufacture the shroud 1500.

Additionally or alternatively, the method 1800 of FIG. 18 may utilize an Application Specific Integrated Circuit (ASIC) and/or a Field Programmable Gate Array (FPGA) structured to cause operations corresponding to the method 1800 to be performed by manufacturing equipment.

The example method 1800 of FIG. 18 begins at block 1802, at which the inner shell 1502, 1600 is formed. For example, the inner shell 1502, 1600 can be formed via molding and/or slurry-based manufacturing techniques, such as additive manufacturing (e.g., thermal spraying or cold spraying) and/or sintering.

At block 1804, the core shell 1506 is formed on the inner shell 1502, 1600. For example, the core shell 1506 can be electroformed on an outer surface of the inner shell 1502, 1600. Accordingly, the inner shell 1502, 1600 serves as a mandrel for the electroforming of the core shell 1506. As a result, an inner surface of the core shell 1506 is fully in contact with the inner shell 1502, 1600.

At block 1806, the outer shell 1504 is formed on the core shell 1506. For example, the outer shell 1504 can be thermal sprayed and/or cold sprayed on the core shell 1506. In some examples, the outer shell 1504 is thermal sprayed and/or cold sprayed on a portion (e.g., an edge) of the inner shell 1502 such that the outer shell 1504 and the inner shell 1502 encapsulate the core shell 1506. As a result, an outer surface of the core shell 1506 is fully in contact with the outer shell 1504.

In some examples, the shroud 1500 includes first means for insulating. For example, the first means for insulating may be implemented by the inner shell 1502 of FIGS. 15 and 17A-C or the inner shell 1600 of FIGS. 16 and 17A-C. In some examples, the first means for insulating may include a ceramic, a polymer, or a composite. For instance, the first means for insulating may include aluminum(I) oxide ($Al_2O$), aluminum(II) oxide (AlO) (e.g., aluminum monoxide), aluminum(III) oxide ($Al_2O_3$) (e.g., aluminum oxide, alumina), zirconia (e.g., zirconia toughened alumina), and/or silicon carbide.

In some examples, the shroud 1500 includes second means for insulating. For example, the second means for insulating may be implemented by the outer shell 1504 of FIGS. 15 and 17A-C. In some examples, the second means for insulating may include a ceramic, a polymer, or a composite. For instance, the first means for insulating may include aluminum(I) oxide ($Al_2O$), aluminum(II) oxide (AlO) (e.g., aluminum monoxide), aluminum(III) oxide ($Al_2O_3$) (e.g., aluminum oxide, alumina), zirconia (e.g., zirconia toughened alumina), and/or silicon carbide.

In some examples, the shroud 1500 includes means for supporting the first means for insulating and the second means for insulating. The means for supporting can fill an area defined between the first means for insulating and the second means for insulating. For example, the means for supporting may be implemented by the core shell 1506. In some examples, the means for supporting includes nickel, cobalt, and/or one or more other metals.

In some examples, the shroud 1500 includes means for stiffening. For example, the means for stiffening can be implemented by the ribs 1604 in the inner shell 1600 of FIGS. 16 and 17A-17C and/or the core shell 1506 positioned around the ribs 1604.

Example layered magnetic coupling shrouds or barrier cans are disclosed herein. The example layered magnetic coupling shrouds or barrier cans can include an inner shell, an outer shell, and a metal core shell between the inner shell and the outer shell. The inner shell or the outer shell can serve as a mandrel upon which the metal core shell is formed. Electroforming the metal core shell enables the metal core shell to a reduced thickness (e.g., as small as 2 mils) compared to other manufacturing techniques. In turn, the metal core shell can cause less eddy current loss between magnetic couplings positioned within and around the layered shroud or barrier can while providing structural support that can withstand higher pressures (e.g., pressures greater than 6,400 PSI). Furthermore, the inner shell and the outer shell can insulate the metal core shell from the fluid to prevent the metal core shell from encountering oxidation and/or being affected by certain extreme temperatures. Moreover, the inner shell and/or the outer shell can be formed via thermal spraying and/or cold spraying to further reduce a thickness of the barrier can and, thus, enable the barrier can or shroud to cause less eddy current loss and/or enable a size of the magnetic couplings to be reduced.

High Pressure Magnetic Coupling Shroud and Methods of Producing the Same

FIG. 19 illustrates another example shroud 1900 (e.g., a barrier can) that can be utilized in the thermal transport bus pump 400 (e.g., the barrier can 452 of FIG. 4), the pump system 500 of FIG. 5 (e.g., the barrier can 536 of FIG. 5), the pump system 600 of FIG. 6 (e.g., the barrier can 636 of FIG. 6), the pump system 700 of FIG. 7 (e.g., the barrier can 728 of FIG. 7), and/or any other pump systems disclosed herein that utilize a barrier can or shroud to contain a flow of fluid. In the illustrated example of FIG. 19, the shroud 1900 includes an outer shell 1902 (e.g., an outer layer) and an inner shell 1904 (e.g., a liner) fixed to the outer shell 1902.

In FIG. 19, a thickness of the outer shell 1902 is between 25 mils and 150 mils. The outer shell 1902 includes a composite material to provide structural strength and withstand a pressure encountered by the shroud 1900. The composite material can include carbon fibers, graphite fibers, and/or an epoxy resin. The epoxy resin can bind the fibers in a certain position and/or orientation to increase the structural strength of the outer shell 1902. In turn, the outer shell 1902 can provide the structural strength of a metallic material at a reduced weight. Moreover, utilizing the composite material in the outer shell 1902 as opposed to a metal improves (e.g., reduces) an eddy current loss encountered between the first magnetic coupling 450 and the second magnetic coupling 460. Advantageously, the reduced eddy current loss that results from utilizing the outer shell 1902 increases a maximum speed at which the magnetic couplings 450, 460 can operate while remaining rotationally interlocked and improves an efficiency with which torque is transferred between the first magnetic coupling 450. Further, the reduced eddy current loss enables a size of the first magnetic coupling 450, the second magnetic coupling 460, and/or the motor 410 of FIG. 4 to be reduced. Additionally, the reduced eddy current loss prevents a need for a cooling sleeve around the coupling housing 424 as thermal energy generated by rotation of the first magnetic coupling 450 and the second magnetic coupling 460 is reduced.

In FIG. 19, the carbon fibers and/or the graphite fibers are positioned in more than one orientation, as discussed in further detail below. For example, the fibers can be positioned in a first orientation, a second orientation different from the first orientation, a third orientation different from the first orientation and the second orientation, and a fourth orientation different from the first orientation, the second orientation, and the third orientation. In some examples, the first orientation is in an axial direction A defined by the shroud 1900 and the second orientation is in a circumferential direction C defined by the shroud 1900. Accordingly, the first orientation is substantially orthogonal to the second orientation. The third orientation can be approximately 45° from the first orientation and the second orientation in a first direction. The fourth orientation can be approximately 45° from the first orientation and the second orientation in a second direction substantially orthogonal to the first direction. Accordingly, the third orientation is substantially orthogonal to the fourth orientation.

In the illustrated example of FIG. 19, the composite material that forms the outer shell 1902 is porous. As such, the inner shell 1904 covers an inner surface of the outer shell 1902 to prevent fluid from escaping through pores of the outer shell 1902 and, in turn, enable the shroud 1900 to hermetically seal the forward bearing housing 428 and prevent the fluid from becoming contaminated. A thickness of the inner shell 1904 can be as small as 2 mils. The inner shell 1904 includes a thermoplastic composite and/or a metallic material. In some examples, the inner shell 1904 includes Torlon®. Advantageously, temperature and structural strength properties associated with Torlon® enable the shroud 1900 of 6,400 PSIA when the inner shell 1904 is only 5 mils thick. Additionally, given that Torlon® does not include a metallic material, the Torlon® enables the inner shell 1904 to minimize or otherwise reduce an eddy current loss caused by the shroud 1900. In some examples, the inner shell 1904 includes a thermoplastic composite other than Torlon®, such as polyetheretherketone (PEEK). In some examples, the inner shell 1904 includes a nickel based alloy to maximize or otherwise increase a pressure that the shroud 1900 is able to withstand. For example, the inner shell 1904 can include a nickel-chromium based alloy, such as a nickel-chromium-molybdenum alloy (e.g., INCO718).

In FIG. 19, the outer shell 1902 is formed via a composite lay-up process. For example, the composite lay-up process can include laying composite layers ply by ply such that a first composite ply of the outer shell 1902 is formed on a second composite ply, which is formed on a third composite ply, etc. Accordingly, the composite layers include carbon fibers and/or graphite fibers in an epoxy resin. The carbon fibers and/or the graphite fibers are layered in certain positions and/or orientations with the epoxy resin and, in turn, thermosetting can be utilized to enable the epoxy resin to bind the fibers in place. Specifically, the fibers are layered on top of each other in the first orientation, the second orientation, the third orientation, and the fourth orientation. For example, a first set of fibers can be set in the first orientation, a second set of fibers can be set on top of the first set of fibers (e.g., around a circumference defined by the first set of fibers) in the second orientation, a third set of fibers can be set on top of the second set of fibers in the third orientation, and a fourth set of the fibers can be set on top of the third set of fibers in the fourth orientation. Moreover, layers of the first, second, third, and fourth set of fibers can be stacked such that the fibers define a certain thickness. For example, the thickness can be based on a pressure at which an associated pump (e.g., the thermal transport bus pump 400 of FIG. 4) is to operate. Additionally, the sets of fibers can be stacked in another arrangement or in multiple arrangements. For example, the outer shell 1902 can include the third set of fibers stacked on the first set of fibers, the second set of fibers stacked on the third set of fibers, and the fourth set of fibers stacked on the second set of fibers. Further, a first group of the sets of fibers can be stacked in a different arrangement from a second group of the sets of fibers that is positioned around the first group. Additionally, the inner shell 1904 can include short fibers for structural reinforcement.

Accordingly, the outer shell 1902 can be formed via the composite lay-up process such that the outer shell 1902 includes a first thickness. In some examples, an inner surface 1905 of the outer shell 1902 can be machined down to cause the outer shell 1902 to have a second thickness that provides room for the inner shell 1904 while maintaining the shroud 1900 within a certain thickness range. In some examples, a thickness of the outer shell 1902 can be up to 0.125 in.

In FIG. 19, when the inner shell 1904 is to include the nickel based alloy, the inner shell 1904 is formed on the inner surface 1905 of the outer shell 1902 via electroforming. When the inner shell 1904 is to include the Torlon® or another thermoplastic composite (e.g., PEEK), the inner shell 1904 can be formed via machining rods of the Torlon® or PEEK, for example. In turn, the outer shell 1902 can be layered on an outer surface 1907 of the inner shell 1904. In some examples, a flange portion 1906 of the shroud 1900 is formed completely via the outer shell 1902.

FIGS. 20A-D illustrate example orientations of the fibers of the outer shell 1902 of FIG. 19. In FIGS. 20A-D, the composite layers can be laid layer by layer in a direction 2001 normal to the inner shell 1904 of FIG. 19 and/or an inner composite layer of the outer shell 1902.

FIG. 20A illustrates example first fibers (e.g., a first set of fibers) of the outer shell 1902 positioned in a first orientation 2002, which extends along a circumferential direction C defined by the shroud 1900 of FIG. 19. Accordingly, ones of the first fibers are wrapped circumferentially around a cavity defined by the shroud 1900 of FIG. 19. Further, the ones of the first fibers are spaced apart along an axial direction A defined by the shroud 1900 of FIG. 19.

FIG. 20B illustrates example second fibers (e.g., a second set of fibers) of the outer shell 1902 positioned in a second orientation 2004, which extends along the axial direction A defined by the shroud 1900 of FIG. 19. Accordingly, the second fibers extend in the axial direction A and wrap around an aft end of the cavity defined by the shroud 1900 of FIG. 19. In other words, the second fibers wrap around the cavity in a U-shape. As such, the second orientation 2004 is substantially orthogonal to the first orientation 2002. Moreover, ones of the second fibers are spaced apart along the circumferential direction C defined by the shroud 1900. Accordingly, respective ends of ones of the second fibers are positioned directly opposite each other (e.g., 180° from each other) across the cavity of the shroud 1900.

FIG. 20C illustrates example third fibers (e.g., a third set of fibers) of the outer shell 1902 positioned in a third orientation 2006, which extends approximately 45° between the first orientation 2002 and the second orientation 2004 in a first direction. Accordingly, the third fibers extend in both the axial direction A and the circumferential direction C defined by the shroud 1900 of FIG. 19. In other words, the third fibers wrap around the cavity defined by the shroud 1900 of FIG. 19 in an oblong shape. Moreover, ones of the third fibers are spaced apart along the axial direction A defined by the shroud 1900 of FIG. 19.

FIG. 20D illustrates example fourth fibers (e.g., a fourth set of fibers) of the outer shell 1902 positioned in a fourth orientation 2008, which extends approximately 45° between the first orientation and the second orientation in a second direction. Specifically, the fourth orientation 2008 is substantially orthogonal to the third orientation 2006. That is, the fourth orientation 2008 extends in both the axial direction A and the circumferential direction C defined by the shroud 1900 of FIG. 19. Accordingly, the fourth fibers wrap around the cavity defined by the shroud 1900 of FIG. 19 in an oblong shape. Moreover, ones of the fourth fibers are spaced apart along the axial direction A defined by the shroud 1900 of FIG. 19.

Figure 21:
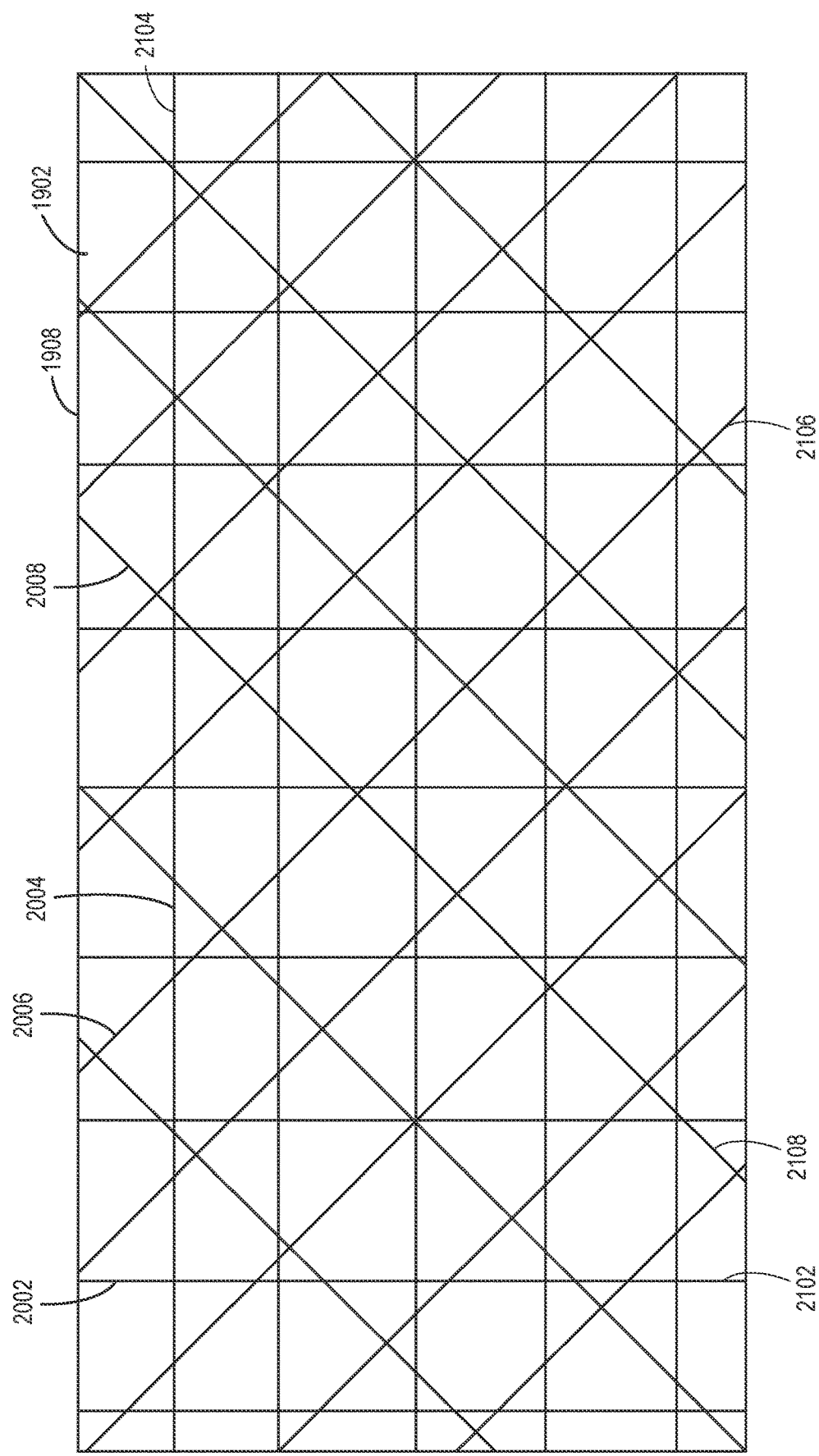
FIG. 21 illustrates a magnified view of a portion of the second example barrier can of FIG. 19.

FIG. 21 illustrates an example overlay of the carbon and/or graphite fibers positioned in the first orientation 2002, the second orientation 2004, the third orientation 2006, and the fourth orientation 2008 in a portion 1908 of the outer shell 1902, as identified in FIG. 19. In FIG. 21, the outer shell 1902 includes first fibers 2102 in the first orientation 2002, second fibers 2104 in the second orientation 2004, third fibers 2106 in the third orientation 2006, and fourth fibers 2108 in the fourth orientation 2008. Specifically, the first fibers 2102 extend in the circumferential direction C around the cavity defined by the shroud 1900 of FIG. 19. Further, the second fibers 2104 extend substantially orthogonal to the first fibers 2102 in the axial direction A defined by the shroud 1900 of FIG. 19. The third fibers 2106 extend approximately 45° between the first fibers 2102 and the second fibers 2104. Moreover, the fourth fibers 2108 extend substantially orthogonal to the third fibers 2106.

Figure 22A:
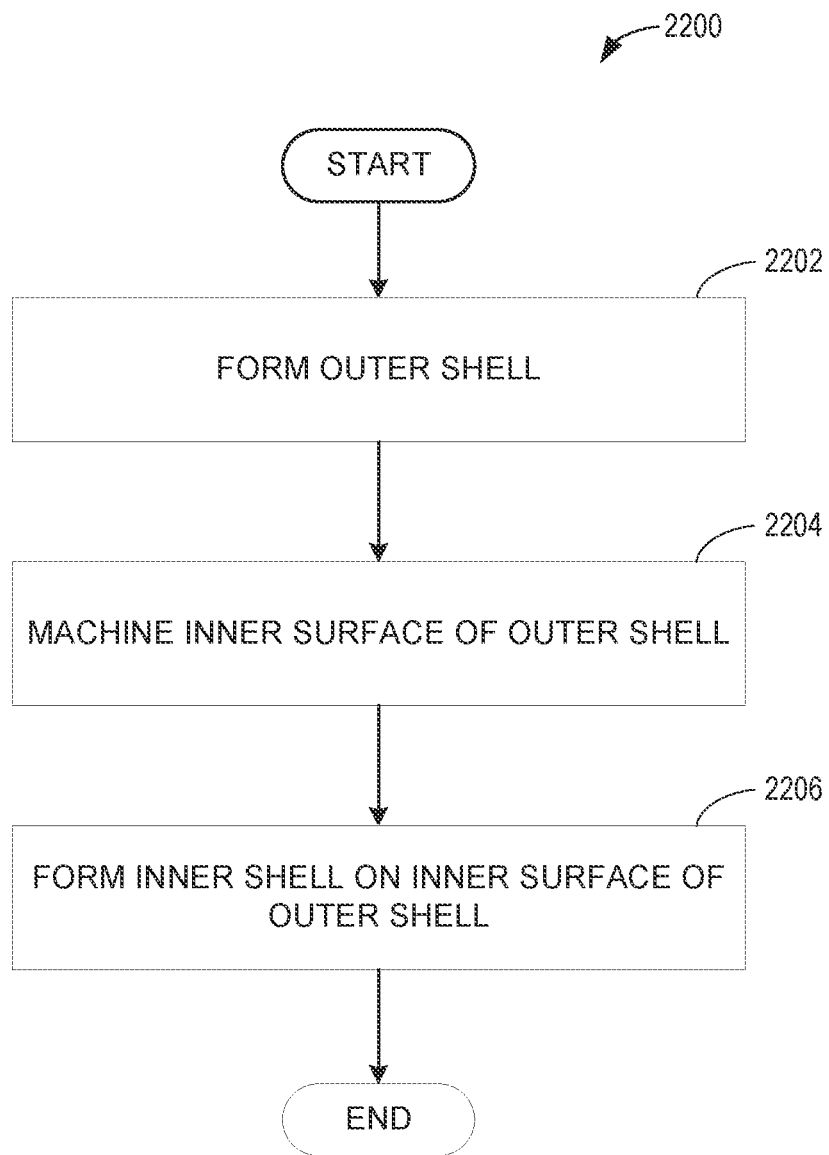
FIG. 22A is a flowchart representative of an example method to manufacture the second example barrier can of FIGS. 19, 20A-D, and 21.

FIG. 22A is a flowchart representative of a first example method 2200 to manufacture a barrier can, such as the shroud 1900 of FIG. 19. In some examples, at least a portion of the example method 2200 is representative of example machine readable instructions that may be executed and/or instantiated by processor circuitry in communication with manufacturing equipment to manufacture the shroud 1900. Additionally or alternatively, the method 2200 of FIG. 22A may utilize an Application Specific Integrated Circuit (ASIC) and/or a Field Programmable Gate Array (FPGA) structured to cause manufacturing operations corresponding to the method 2200 to be performed by manufacturing equipment.

The example method 2200 of FIG. 22A begins at block 2202, at which the outer shell 1902 (FIGS. 19-21) is formed. For example, the outer shell 1902 can be formed via a composite lay-up process and/or a thermosetting process. Specifically, the first fibers 2102 (FIG. 21) are positioned in the first orientation 2002 (FIGS. 20A and 21), the second fibers 2104 (FIG. 21) are positioned in the second orientation 2004 (FIGS. 20B and 21) substantially orthogonal to the first orientation 2002, the third fibers 2106 (FIG. 21) are positioned in the third orientation 2006 (FIGS. 20C and 21), and the fourth fibers 2108 (FIG. 21) are positioned in the fourth orientation 2008 (FIGS. 20D and 21) in an epoxy resin. Further, the first fibers 2102, the second fibers 2104, the third fibers 2106, and the fourth fibers 2108 can alternate in respective layers. In turn, the layers define a thickness of the outer shell 1902. In some examples, the respective layers of the fibers 2102, 2104, 2106, 2108 can be thermoset such that the epoxy resin holds the fibers 2102, 2104, 2106, 2108 in the respective orientations 2002, 2004, 2006, 2008.

At block 2204, an inner surface of the outer shell 1902 is machined. For example, the inner surface of the outer shell 1902 can be grinded or machined such that a thickness of the outer shell 1902 is reduced. Accordingly, machining the outer shell 1902 to the reduced thickness can provide space for the inner shell 1904 (FIG. 19) such that the second magnetic coupling 460 does not contact the inner shell 1904.

At block 2206, the inner shell 1904 is formed on the inner surface of the outer shell 1902. For example, when the inner shell 1904 includes a metallic material, the inner shell 1904 can be formed on the inner surface of the outer shell 1902 via electroforming. Further, when the inner shell 1904 includes a thermoplastic composite, such as Torlon® and/or PEEK, the inner shell 1904 can be formed on the inner surface of the outer shell 1902 via additive manufacturing. Accordingly, forming the inner shell 1904 via additive manufacturing or electroforming enables the inner shell 1904 to be formed with a reduced thickness that provides space for the second magnetic coupling 460 in the cavity defined by the shroud 1900 (FIG. 19) while sealing the inner surface of the outer shell 1902.

Figure 22B:
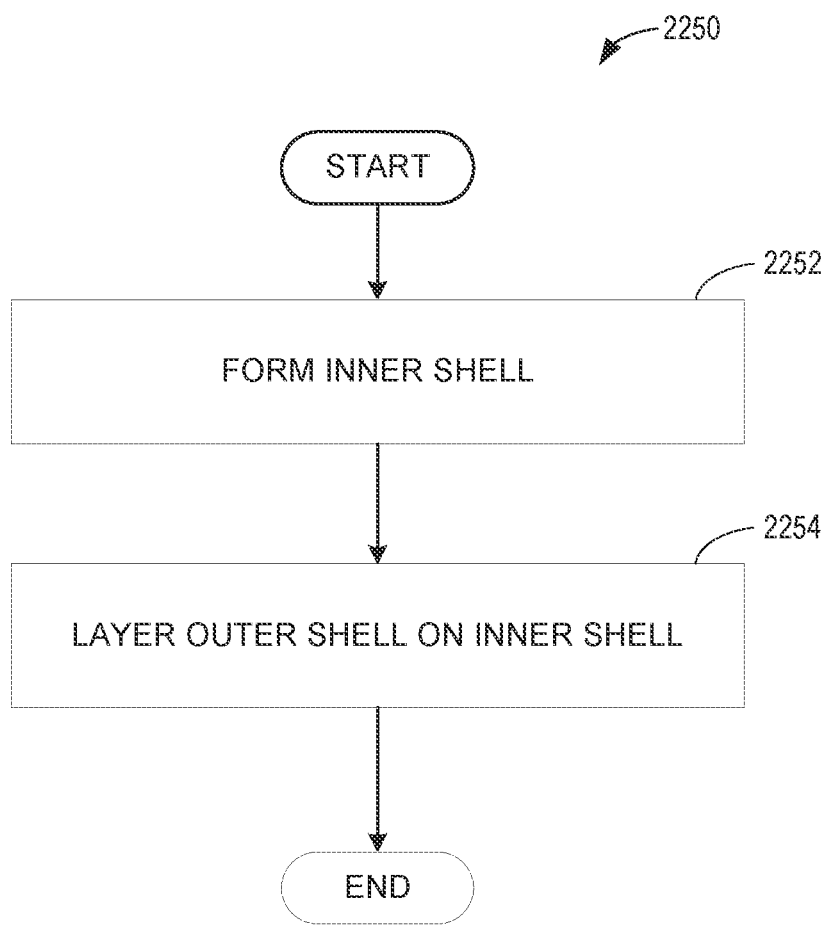
FIG. 22B is a flowchart representative of another example method to manufacture the second example barrier can of FIGS. 19, 20A-D, and 21.

FIG. 22B is a flowchart representative of a second example method 2250 to manufacture a barrier can, such as the shroud 1900 of FIG. 19. In some examples, at least a portion of the example method 2250 is representative of example machine readable instructions that may be executed and/or instantiated by processor circuitry in communication with manufacturing equipment to manufacture the shroud 1900. Additionally or alternatively, the method 2250 of FIG. 22B may utilize an Application Specific Integrated Circuit (ASIC) and/or a Field Programmable Gate Array (FPGA) structured to cause manufacturing operations corresponding to the method 2250 to be performed by manufacturing equipment.

The example method 2250 of FIG. 22B begins at block 2252, at which the inner shell 1904 (FIG. 19) is formed. For example, the inner shell 1904 can be machined from rods of Torlon® or another thermoplastic composite (e.g., PEEK). In some examples, when the inner shell 1904 includes a metallic material, the inner shell 1904 is electroformed on a mandrel and subsequently separated from the mandrel.

At block 2254, the outer shell 1902 (FIGS. 19-21) is layered on the inner shell 1904. For example, the outer shell 1902 can be formed via a composite lay-up process. Specifically, a first layer of the outer shell 1902 including at least one set of the fibers 2102, 2104, 2106, 2108 can be layered on the outer surface 1907 (FIG. 19) of the inner shell 1904. Further, a second layer of the outer shell 1902 including at least one set of the fibers 2102, 2104, 2106, 2108 can be layered on the first layer. In some examples, the first layer is thermoset in advance of the second layer being applied. Accordingly, the outer shell 1902 is formed in layers on the inner shell 1904.

Example layered magnetic coupling shrouds or barrier cans are disclosed herein. The example layered magnetic coupling shrouds or barrier cans can include an outer shell to provide structural support than can withstand higher pressures (e.g., a pressure of at least 6,400 PSI). Furthermore, the example layered magnetic coupling shrouds or barrier cans can include an inner shell formed on an inner surface of the outer shell to prevent fluid from leaking through pores of the outer shell. Advantageously, no eddy current loss occurs when Torlon® or another thermoplastic (e.g., PEEK), is utilized to form the inner shell 1904. Furthermore, when the inner shell includes the metallic material, a ratio of the eddy current loss (in kilowatts (kW)) to inner shell thickness (in mils (e.g., thousands of an inch)) can be less than 0.06. As a result, the example layered magnetic coupling shrouds and/or barrier cans enable magnetic couplings to remain magnetically engaged and, in turn, rotationally interlocked at higher angular velocities. Accordingly, the example layered magnetic coupling shrouds or barrier cans enable an impeller in an associated pump to be driven with a higher angular velocity to increase a pressure and/or flow rate of a fluid (e.g., a heat exchange fluid such as a supercritical fluid (e.g., $sCO_2$, etc.)) and, thus, enable the fluid to transfer more thermal energy to and/or from a working fluid in an associated aircraft and/or engine.

Oil Lubricated Supercritical Fluid Pump with Oil Separator

As mentioned above, in order for thermal energy to be transferred between the fluid (e.g., a heat exchange fluid such as a supercritical fluid (e.g., $sCO_2$, etc.)) and a working fluid without negatively impacting components of the aircraft 10 and/or the gas turbine engine 100, the fluid should be free of contamination with foreign substances in areas where the fluid is to transfer thermal energy. That is, the fluid should not be contaminated with oil, water (e.g., vapor), and/or ambient air when passing through the heat source heat exchangers 206 and the heat sink heat exchangers 208 of FIG. 2.

As discussed above, the rolling element bearings 440, 448 that support the shaft 438 of the motor 410 require an oil lubrication that is not the fluid. In turn, the barrier can 452 of FIG. 4 separates the fluid from the motor housing 412 to prevent the fluid from becoming contaminated by the oil lubrication of the rolling element bearings 440, 448 in the pump 400. However, utilizing separate housings, such as the motor housing 412, the aft bearing housing 418, the intermediate bearing housing 420, and the coupling housing 424 and, increases a size, a weight, and/or a cost of the pump 400. Moreover, driving a rotation of the impeller 406 via the magnetic couplings 450, 460 may result in an eddy current loss that limits a rotational velocity with which the magnetic couplings 450, 460 can drive the impeller 406.

Example oil separators that enable the fluid to mix with oil and subsequently be separated from the oil are disclosed herein. Accordingly, the example oil separators enable the fluid to flow through a housing that includes oil lubricated bearings to mount a motor shaft (e.g., the shaft 438 of FIG. 4). As a result, the oil separators enable a size, a weight, and/or a cost of the pump 204 of FIG. 3 to be reduced. Additionally, the oil separators can enable a quantity of components in the pump 204 to be reduced. For example, by enabling the fluid to mix with oil, the oil separators remove a need for a barrier can (e.g., the barrier can 452 of FIG. 4), magnetic couplings (e.g., the magnetic couplings 450, 460 of FIG. 4), and/or distinct housings to hold oil lubricated parts separate from the fluid. Further, the example oil separators enable the pump 204 to drive an impeller without magnetic couplings, which increases a rotational velocity at which the impeller can operate and, thus, increases a maximum pressure and/or flow rate with which the pump 204 can drive the fluid through the thermal transport bus 202.

Specifically, an example pump system to pressurize a fluid (e.g., a heat exchange fluid such as a supercritical fluid (e.g., $sCO_2$, etc.)) within a closed loop transport bus (e.g., the thermal transport bus 202) includes a pump housing and a duct fluidly coupled to the pump housing. During an operation of the example pump system, a first portion of the duct includes a mixture of an oil and a supercritical fluid (e.g., supercritical carbon dioxide) and a second portion of the duct includes the supercritical fluid by itself. Accordingly, a separator (e.g., an oil separator) is positioned in a third portion of the duct between the first portion of the duct and the second portion of the duct such that the separator can separate the oil in the mixture from the supercritical fluid. Accordingly, the separator enables the supercritical fluid to flow within the pump housing and mix with oil from lubricated bearings that, for example, mount and/or support a shaft of a motor that drives an impeller.

In some examples, the pump system includes more than one separator. The example separators can be static (e.g., stationary) or dynamic (e.g., moveable, rotatable, etc.). In some examples, a dynamic or rotatable separator includes a rotatable shaft and vanes or ridges extending radially outward from the rotatable shaft. In some examples, the rotatable separator includes a conical casing that is rotatable. In some such examples, the conical casing includes open axial ends and apertures facing a surrounding duct. In some examples, the conical casing is positioned around the rotatable shaft. In some such examples, the rotatable shaft can rotate in a first direction and the conical casing can be stationary or rotate in a second direction opposite the first direction.

Accordingly, when the vanes and/or conical casing rotate, oil molecules in the mixture experience more centrifugal force than particles of the supercritical fluid because of the higher density of oil compared to the supercritical fluid. In turn, the greater centrifugal force encountered by the oil causes the oil particles to stick to an inner surface of the casing, to stick to the surrounding duct, to be driven through the apertures in the casing, and/or to be driven through an oil recirculating flow path that guides the oil back to the pump 204 or an oil storage supply (e.g., an oil tank). Furthermore, the reduced centrifugal force encountered by the supercritical fluid particles enables the supercritical fluid to flow in a middle portion of the duct and/or through the conical casing as the oil is driven radially outward.

In some examples, a static or stationary separator includes an oil absorbent material. For example, the oil absorbent material can include a polymer (e.g., polyurethane, polypropylene, polyethylene, cross-linked polymers, etc.) and/or a powder (e.g., talc, aluminum starch, rice starch, silica, etc.). In some examples, the stationary separator includes baffles that eliminate or otherwise reduce any straight line flow path for the supercritical fluid through the third portion of the duct. Specifically, the baffles include the oil absorbent material. As a result, the baffles cause the oil particles that are mixed with the supercritical fluid to contact the stationary separator and, in turn, be absorbed by the oil absorbent material. Accordingly, the stationary separator serves as a filter that collects the oil and allows the supercritical fluid to pass therethrough. Further, the higher density of oil and the pressure of the fluid flowing through the stationary separator can cause the oil to fall through pores (e.g., channels of pores) in the baffles such that the oil particles enter the oil recirculating flow path.

The baffles can be formed in various shapes with different thicknesses and/or porosities to enable a pressure drop encountered by the supercritical fluid in the third portion of the duct to be controlled. In some examples, a structure of the baffles can be formed with sheet metals and/or via additive manufacturing. The example stationary separator can be disposed horizontally or vertically in the third portion of the duct.

In some examples, the static oil separator includes a first duct (e.g., a main duct) fluidly coupled to a second duct (e.g., an oil collection duct) positioned underneath the first duct. In some examples, the second duct is fluidly coupled to the first duct at multiple distinct locations. Because of the higher density of oil compared to the supercritical fluid, the oil can fall from the first duct and enter the second duct. Further, the first duct can include baffles that cause the mixture of supercritical fluid and oil to flow with a downward velocity when the mixture encounters a point at which the first duct is fluidly coupled to the second duct. In turn, the downward velocity and the higher density of the oil can cause the oil particles to fall out of the first duct and into the second duct. Further, the baffles formed by the first duct can cause the mixture to flow upwards towards the end of the connection between the ducts such that the first duct causes the fluids in the mixture to change from the downward velocity to an upward velocity. Accordingly, the change from the downward velocity to the upward velocity is easier for the supercritical fluid because of the lower density of the supercritical fluid. As a result, a composition of the oil in the first duct is reduced at each connection point that fluidly couples the first duct to the second duct. In turn, the oil can be completely separated from the supercritical fluid in the first duct at or before a last connection point between the ducts. Moreover, the second duct can form or be fluidly coupled to the oil recirculating flow path.

Figure 23:
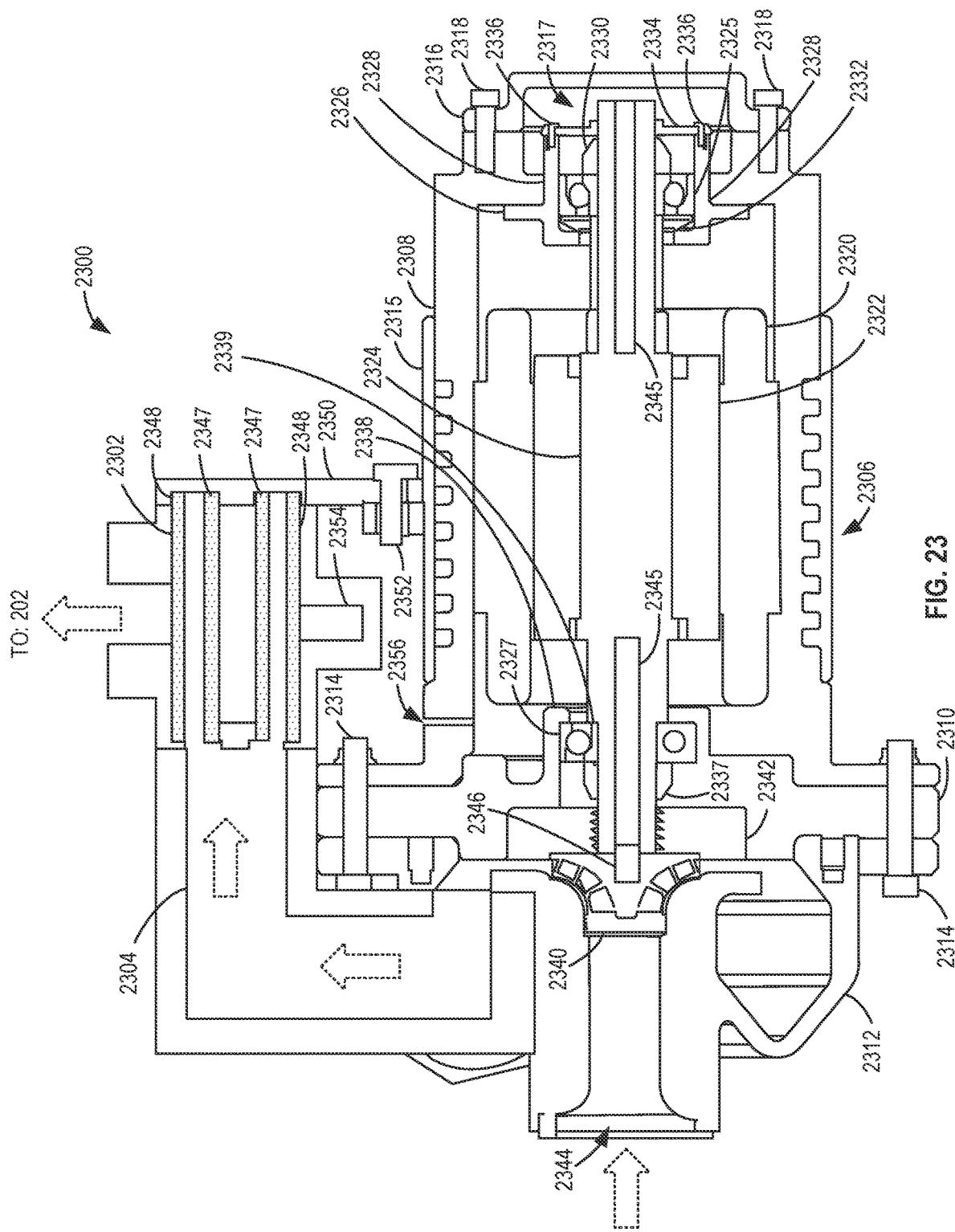
FIG. 23 illustrates an example pump system including a first example oil separator in accordance with the teachings disclosed herein.

FIG. 23 illustrates an example pump system 2300 including a first example separator 2302 (e.g., a first stationary separator, a barrel filter, etc.) to separate a supercritical fluid (e.g., supercritical carbon dioxide) from oil in a duct 2304 (e.g., a discharge duct) through which the supercritical fluid is driven (e.g., prior to entering the thermal transport bus 202 of FIG. 2 or within the thermal transport bus 202 prior to the heat exchangers 206, 208). In the illustrated example of FIG. 23, the pump system 2300 includes a pump housing 2306. Specifically, the pump housing 2306 is formed by a motor housing 2308, a backplate 2310, and a compressor collector 2312 coupled together via bolts 2314. The pump housing 2306 further includes a cap 2316 fixedly coupled to an aft end of the motor housing 2308 via bolts 2318. The pump housing 2306 is fluidly coupled to the duct 2304 such that fluid can flow through the motor housing 2308, the backplate 2310, the compressor collector 2312, and the duct 2304.

In the illustrated example of FIG. 23, the pump system 2300 includes a motor 2320 positioned in the motor housing 2308. In FIG. 23, a rotor 2322 of the motor 2320 is fixed to a shaft 2324 (e.g., a motor shaft). Accordingly, the motor 2320 drives a rotation of the shaft 2324. The pump system 2300 further includes a cooling jacket 2315 wrapped around the motor housing 2308 to prevent the motor 2320 from overheating.

The shaft 2324 is supported by a first rolling element bearing 2325 (e.g., an aft rolling element bearing) and a second rolling element bearing 2327 (e.g., a forward rolling element bearing) both of which are lubricated with oil. In the illustrated example of FIG. 23, the oil lubricating the first rolling element bearing 2325 and the second rolling element bearing 2327 is mixed with an additive. Specifically, the additive increases a viscosity of the oil and, thus, improves cohesion and adhesion properties associated with the oil.

In the illustrated example of FIG. 23, an aft end of the shaft 2324 extends past an aft end of the motor housing 2308. Accordingly, the cap 2316 includes an indent or a cavity 2317 in which the aft end of the shaft 2324 is disposed. The first rolling element bearing 2325 is positioned in a bearing cup 2326 disposed in the motor housing 2308. Specifically, the bearing cup 2326 can be press fitted in the bearing cup 2326 and supported by shoulders 2328 of the motor housing 2308. To help interlock the first rolling element bearing 2325 on the shaft 2324, the first rolling element bearing 2325 includes a collar clamp 2330 that extends from an aft side of the first rolling element bearing 2325 and clamps around the shaft 2324. Additionally, a preloaded spring 2332 is positioned between the bearing cup 2326 and a forward side of the first rolling element bearing 2325 to help maintain a position of the first rolling element bearing 2325 within the bearing cup 2326. Furthermore, a sub-cap 2334 is coupled to an aft end of the bearing cup 2326 via screws 2336. Accordingly, the sub-cap 2334 includes an orifice through which the shaft 2324 extends.

The second rolling element bearing 2327 is press fitted in the backplate 2310. To maintain a position of the second rolling element bearing 2327 on the shaft 2324, the second rolling element bearing 2327 includes a collar clamp 2337 that extends from a forward side of the second rolling element bearing 2327 and clamps around the shaft 2324. An aft end of the second rolling element bearing 2327 is positioned against shoulders 2338 of the backplate 2310 and ridges 2339 in the shaft 2324.

In the illustrated example of FIG. 23, an impeller 2340 is coupled to a forward end of the shaft 2324 such that the impeller 2340 rotates with the shaft 2324 to pump fluid through the duct 2304. Specifically, to couple the impeller 2340 to the shaft 2324, a portion of an aft end of the impeller 2340 is wedged in, and fixed to, an internal slot of the shaft 2324. Alternatively, the aft end of the impeller 2340 can include a slot and the shaft 2324 can extend into the slot of the impeller 2340 to rotatably couple the shaft 2324 and the impeller 2340. Additionally, the aft end of the impeller 2340 is coupled to a support plate 2342. In some examples, the support plate 2342 screws onto the shaft 2324 to further increase a strength of the coupling between the impeller 2340 and the shaft 2324.

Accordingly, both the impeller 2340 and the rotor 2322 of the motor 2320 are mounted on the shaft 2324. As a result, a size of the pump system 2300 and/or a quantity of components utilized to drive the impeller 2340 are minimized or otherwise reduced. Furthermore, an output of the pump system 2300 (e.g., an output pressure and/or flow rate of the fluid exiting the pump system 2300) can be increased as the rotation of the impeller 2340 is independent of magnetic couplings that encounter increased eddy current loss at higher rotational speeds.

During operation, the supercritical fluid (e.g., sCO$_2$, etc.) flows through an inlet 2344 of the pump system 2300 and is driven by the impeller 2340. Specifically, the impeller 2340 drives the supercritical fluid toward the duct 2304. As the supercritical fluid encounters higher pressures, a portion of the supercritical fluid escapes into the motor housing 2308. For example, the supercritical fluid can flow between the support plate 2342 and the backplate 2310. In turn, the supercritical fluid can pass through the second rolling element bearing 2327 where the supercritical fluid mixes with oil lubricating the second rolling element bearing 2327 before dispersing throughout the motor housing 2308. Accordingly, the supercritical fluid can further mix with oil lubricating the first rolling element bearing 2325. As a result, a mixture of the supercritical fluid and the oil is formed in the motor housing 2308. Moreover, as supercritical fluid continues to flow into the motor housing 2308, pressure builds up and the mixture is pushed back into the compressor collector 2312. In some examples, the mixture flows through a slot 2345 in the shaft 2324, which aligns with a slot 2346 in the impeller 2340 to enable the mixture to flow into the compressor collector 2312 and be driven into the duct 2304 by the impeller 2340. Additionally or alternatively, the mixture can flow into the compressor collector 2312 between the support plate 2342 and the backplate 2310.

In FIG. 23, in response to being pumped into the duct 2304, the mixture of the supercritical fluid and the oil encounters the first separator 2302. In FIG. 23, the separator 2302 is a barrel filter including an inner cylinder 2347 and an outer cylinder 2348. Specifically, the first separator 2302 includes interconnected concentric cylinders 2347, 2348 formed at least partially by an oil absorbent material. In some examples, the oil absorbent material includes at least one powder, such as talc, aluminum starch, rice starch, silica, etc. In some examples, the oil absorbent material includes at least one polymer, such as polyurethane, polypropylene, polyethylene, cross-linked polymers, etc. The inner cylinder 2347 and the outer cylinder 2348 can include baffles to increase a rate at which oil in the mixture contacts a surface of the separator 2302. The separator 2302 is manufactured via forming of sheet metals and/or additive manufacturing, for example.

In some examples, the separator 2302 includes a first conduit and a second conduit. For example, the first conduit can be positioned above and fluidly coupled to the second fluid conduit. Moreover, the first fluid conduit can include baffles and the second fluid conduit can include the oil absorbent material, as discussed in further detail below.

In some examples, the first separator 2302 includes separate cylindrical filters positioned in series or in parallel in the duct 2304. For example, the first separator 2302 can include a first cylindrical filter positioned above a second cylindrical filter.

As the mixture of the supercritical fluid and the oil flows through the separator 2302, the separator 2302 absorbs the oil. As a result, the duct 2304 only carries the supercritical fluid into the thermal transport bus 202. In FIG. 1, an aft end of the separator 2302 is positioned against a plate 2350. Specifically, the plate 2350 includes grooves in which the separator 2302 is positioned. Further, the plate 2350 is coupled to an exterior of the motor housing 2308 via one or more bolts 2352. Additionally or alternatively, the plate 2350 can be coupled to the duct 2304. When an operation of the pump system 2300 is stopped or paused, the plate 2350 can be removed to allow the separator 2302 to be cleaned and/or replaced.

Furthermore, the oil that is separated from the supercritical fluid by the first separator 2302 can fall into a secondary duct 2354 (e.g., an oil collection duct) positioned below the first separator 2302. The secondary duct 2354 is in fluid connection with an inlet 2356 in the motor housing 2308. Accordingly, the oil can be returned to the motor housing 2308 to provide lubrication for the first and second rolling element bearings 2325, 2327.

As a result, the first separator 2302 enables the supercritical fluid to mix with oil without impacting the thermal energy transfer capabilities of the supercritical fluid. In turn, a quantity of components in the pump system 2300, a size of the pump system 2300, and/or a cost of the pump system 2300 can be minimized or otherwise reduced. Furthermore, the first separator 2302 enables the motor 2320 to directly drive the impeller 2340 via the shaft 2324, which can enable the impeller 2340 to operate at higher rotational velocities and, thus, increase a pressure and/or a flow rate with which the supercritical fluid is driven through the thermal transport bus 202. Accordingly, the first separator 2302 can increase a rate at which the supercritical fluid is to be transported through the thermal transport bus and, in turn, increase a rate at thermal energy is transferred between the supercritical fluid and the working fluid.

Figure 24:
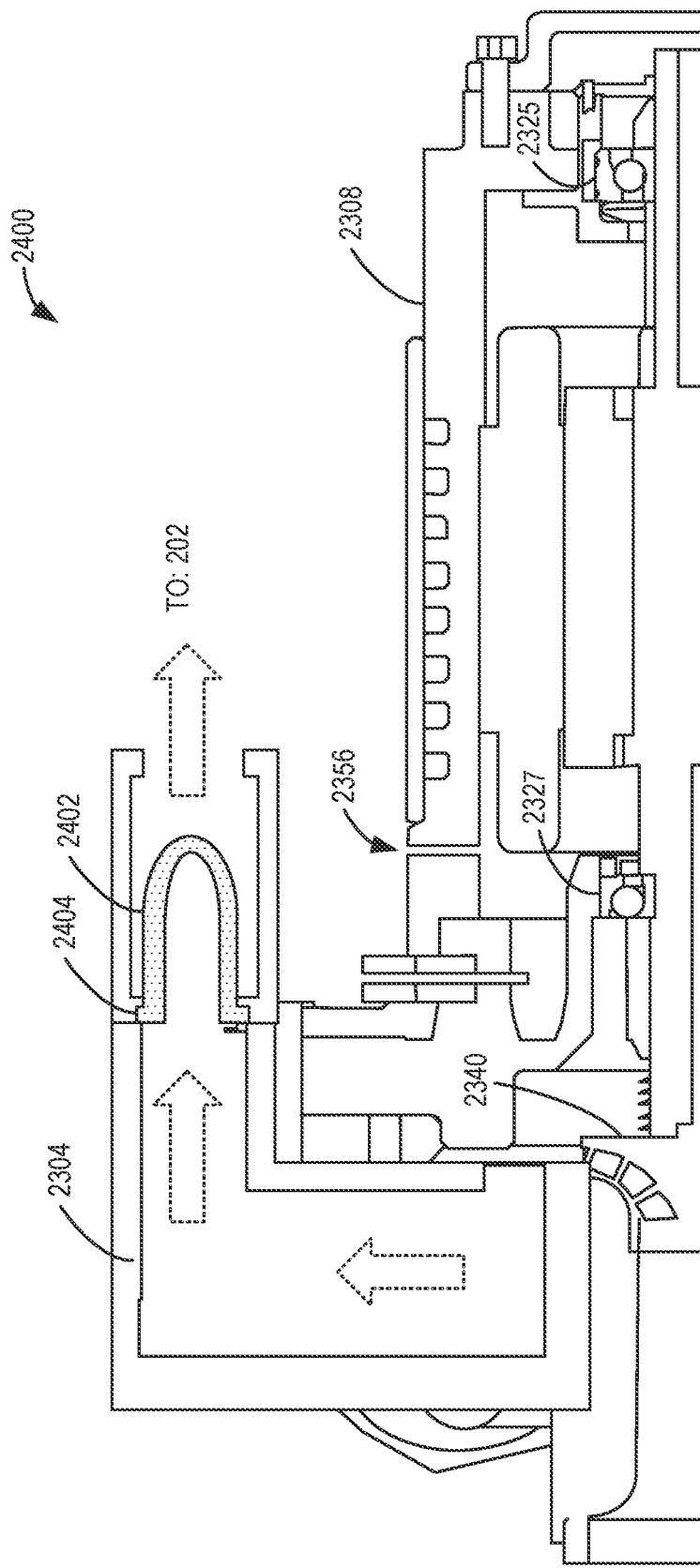
FIG. 24 illustrates another example pump system including a second example oil separator in accordance with the teachings disclosed herein.

FIG. 24 illustrates another example pump system 2400 including a second example separator 2402 (e.g., a second stationary separator, a cone filter, etc.). In FIG. 24, the second separator 2402 includes the oil absorbent material formed in a conical geometry instead of the cylindrical geometry of the first separator 2302 of FIG. 23. The second separator 2402 can be positioned horizontally or vertically in the duct 2304 depending on a position of the thermal transport bus 202 relative to the duct 2304. In FIG. 2, to maintain a position of the second separator 2402, a flange 2404 of the second separator 2402 is press fitted into the duct

2304. Alternatively, the second separator 2402 can be coupled to the duct 2304 via screws and/or any other means for coupling.

In FIG. 24, in response to the supercritical fluid and the oil lubricating the first and second rolling element bearings 2325, 2327 mixing in the motor housing 2308, the impeller 2340 drives the mixture through the second separator 2402, which absorbs the oil in the mixture while enabling the supercritical fluid to pass into the thermal transport bus 202. As such, the second separator 2402 enables the duct 2304 to provide solely the supercritical fluid to the thermal transport bus 202 despite the supercritical fluid being previously contaminated with oil from the first and second rolling element bearings 2325, 2327.

Similar to the first example separator 2302 of FIG. 23, the second separator 2402 includes baffles through which the mixture flows. Accordingly, the baffles prevent the mixture from having a straight line flow path through the second separator 2402 and, thus, ensures that the oil in the mixture contacts the oil absorbent material in the baffles. In some examples, an oil collection duct is positioned below the second separator 2402 to enable the oil to be returned to an oil storage supply and/or the motor housing 2308 via the inlet 2356 in the motor housing 2308. Specifically, a density of the oil causes the oil to fall through the baffles in the second separator 2402 and into the oil collection duct, as discussed in further detail below.

Figure 25:
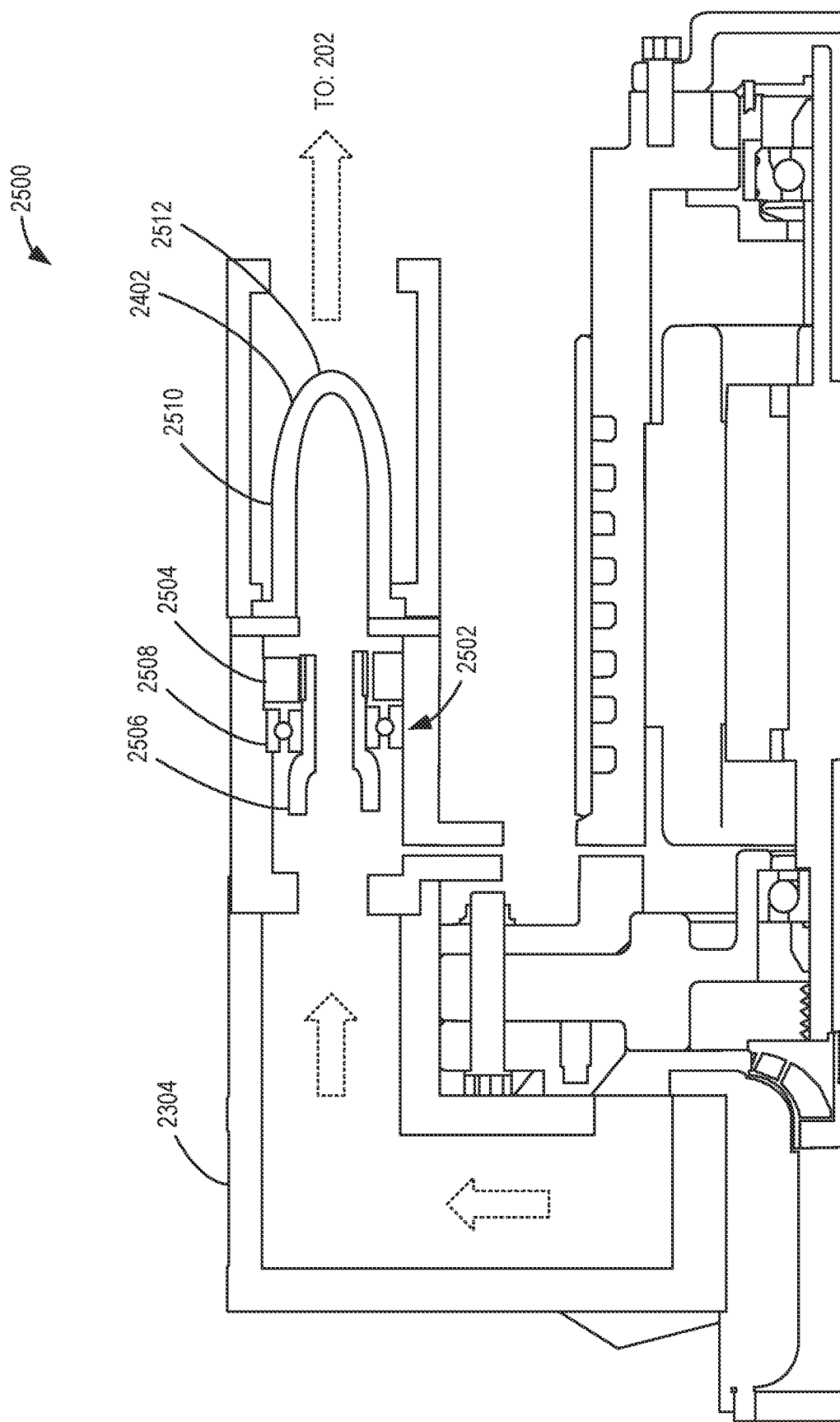
FIG. 25 illustrates another example pump system including the second example oil separator and a third example oil separator in accordance with the teachings disclosed herein.

FIG. 25 illustrates another example pump system 2500 including the second example separator 2402 and a third example separator 2502 (e.g., a dynamic separator, a rotary separator, a swirler, etc.) positioned in the duct 2304. In FIG. 25, the third separator 2502 is positioned in series with the second separator 2402 in the duct 2304. Specifically, the third separator 2502 is positioned in the duct 2304 upstream of (e.g., forward of) the second separator 2402 and, thus, encounters the mixture of the supercritical fluid and the oil in advance of the second separator 2402.

In FIG. 25, the third separator 2502 includes a motor 2504 and a swirler 2506. Further, the swirler 2506 is mounted on a rolling element bearing 2508 coupled to the duct 2304. In some examples, the rolling element bearing 2508 includes solid lubricants (e.g., silver coating, graphite, molybdenum disulfide, etc.) to avoid adding oil to the mixture. In some examples, the swirler 2506 is mounted via a foil bearing or any other bearing that enables the swirler to rotate without utilizing a lubricant.

Accordingly, the motor 2504 drives a rotation of the swirler 2506. In turn, the rotation of the swirler 2506 causes oil droplets in the mixture to encounter a centrifugal force. Specifically, the rotation of the swirler 2506 causes the oil droplets in the mixture to encounter an increased centrifugal force compared to the supercritical fluid because of the higher density of oil compared to the supercritical fluid. Moreover, the swirler 2506 includes holes or orifices that face a perimeter of the duct 2304, as discussed in further detail below. As a result, the third separator 2502 causes the oil droplets to move towards an inner surface of the swirler 2506 and/or the perimeter of the duct 2304 while the supercritical fluid remains within a middle portion of the duct 2304. In turn, the third separator 2502 can cause the oil droplets to stick to an inner surface of the duct 2304. In some examples, the oil droplets contact and lubricate the rolling element bearing 2508. In some examples, the third separator 2502 is implemented in the duct 2304 without the second separator 2402. In such examples, the third separator 2502 causes the oil to be removed from the mixture by itself.

In FIG. 25, oil droplets that advance past the third separator 2502 in the duct 2304 are absorbed by the second separator 2402. Advantageously, a shape of the second separator 2402 provides a greater surface area for the oil absorbent material towards a perimeter of the duct 2304. As such, the higher centrifugal force encountered by the oil droplets drives the oil droplets into an outer portion 2510 of the second separator 2402, which is larger than a tip portion 2512 of the second separator 2402. As a result, the tip portion 2512 remains relatively unblocked, which reduces an impact of the second separator 2402 on flow properties of the supercritical fluid as the supercritical fluid enters the thermal transport bus 202.

Figure 26:
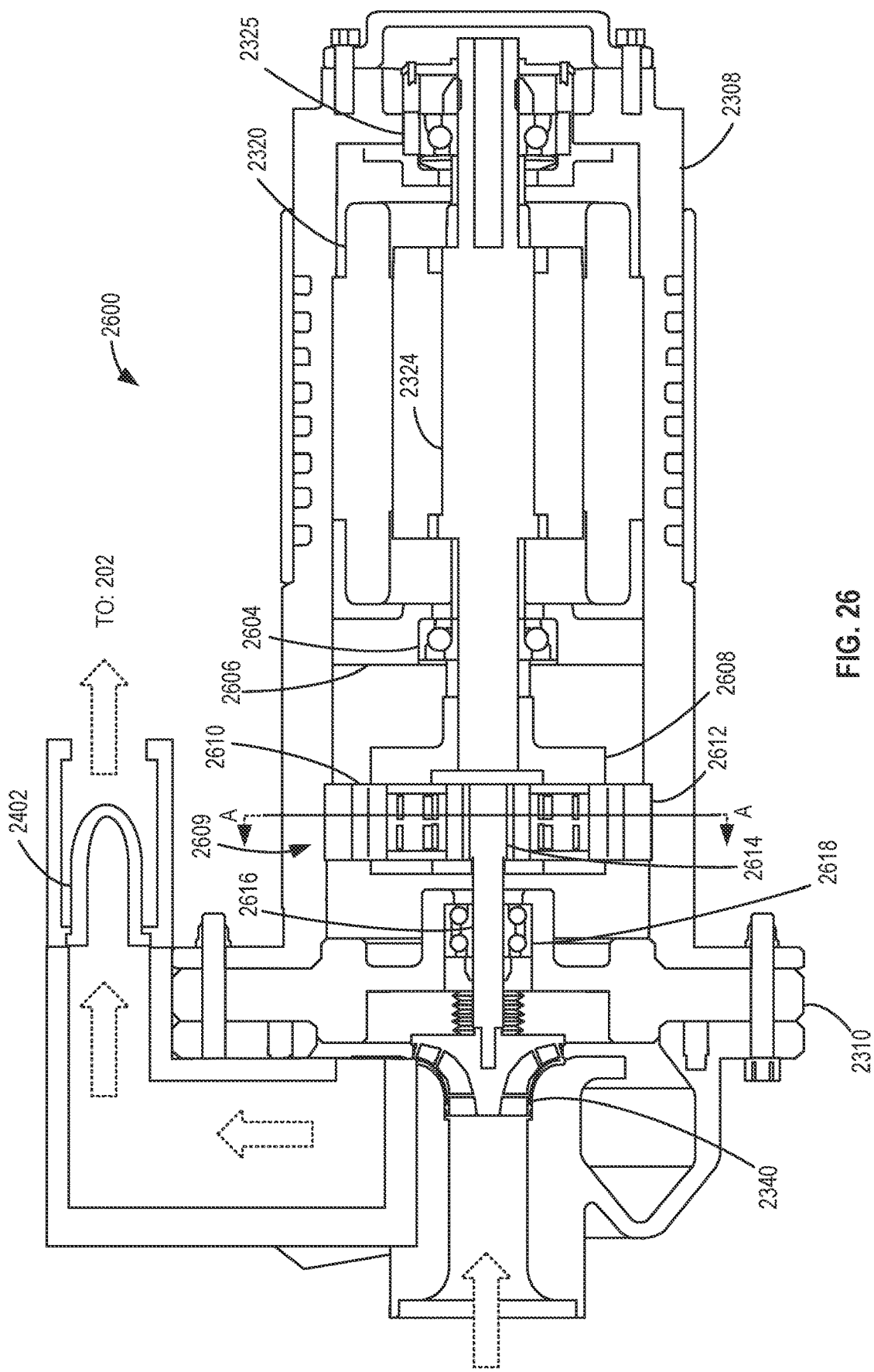
FIG. 26 illustrates another example pump system including a planetary gearbox in accordance with the teachings disclosed herein.

FIG. 26 illustrates another example pump system 2600 including the second example separator 2402. Additionally or alternatively, the pump system 2600 can include the first separator 1902 and/or the third separator 2502. In FIG. 26, the pump system 2600 includes a first shaft 2602 (e.g., a motor shaft) coupled to the rotor 2322 of the motor 2320. The first shaft 2602 is mounted in the motor housing via the first rolling element bearing 2325 and a second rolling element bearing 2604 (e.g., an intermediate rolling element bearing). In FIG. 26, the second rolling element bearing 2604 is positioned in a bearing holder 2606 fixed within the motor housing 2308.

Further, the pump system 2600 includes a carrier shaft 2608 coupled to a forward end of the first shaft 2602 that extends past the second rolling element bearing 2604. Specifically, an aft end of the carrier shaft 2608 is concentrically positioned around the forward end of the first shaft 2602. The carrier shaft 2608 can be coupled to the first shaft 2602 via a clamp, a press fit, or any other means for coupling. Further, a forward end of the carrier shaft 2608 extends through a gearbox 2609 (e.g., a planetary gearbox). The gearbox 2609 includes the carrier shaft 2608, planet gears 2610, a ring gear 2612, and a sun gear 2614, as discussed further in association with FIG. 27.

The carrier shaft 2608 extends radially outward from the first shaft 2602 and is rotatably coupled to the planet gears 2610 of the gearbox 2609. Accordingly, the carrier shaft 2608 drives a rotation of the planet gears 2610, which, in turn, causes the sun gear 2614 to rotate. Furthermore, the ring gear 2612 enables the planet gears 2610 to transfer greater torque onto the sun gear 2614. The ring gear 2612 is fixedly positioned in the motor housing 2308. For examples, the ring gear 2612 can be integral with the motor housing 2308 or coupled to the motor housing 2308 via a press fit, screws, or any other means for coupling.

The sun gear 2614 is defined in an aft end of a second shaft 2616 (e.g., an impeller shaft) that is coupled to the impeller 2340. In FIG. FIG. 26, the second shaft 2616 is supported by a third rolling element bearing 2618 (e.g., a forward rolling element bearing) positioned in the backplate 2310. For example, the third rolling element bearing 2618 can be clamped onto the second shaft 2616 and coupled to the backplate 2310 via a press fit.

Accordingly, the planet gears 2610 drive a rotation of the impeller 2340. As a result, the carrier shaft 2608, the planet gears 2610, the ring gear 2612, and the sun gear 2614 provide gear reductions that enable the impeller 2340 to be driven with a rotational velocity greater than that of the first shaft 2602. In turn, the gearbox 2609 enables a flow rate output and/or a pressure output of the pump system 2600 to be increased to enable improved thermal energy transfer between the supercritical fluid and the working fluid. Further, the second separator 2402, and/or the first separator 2302 and/or the third separator 2502 when implemented in the pump system 2600, enables magnetic couplings to be avoided while still using the rolling element bearings 2325, 2604, 2618 and, in turn, enables the gearbox 2609 to provide the gear reductions that cause the impeller 2340 to operate at higher angular velocities.

Figure 27:
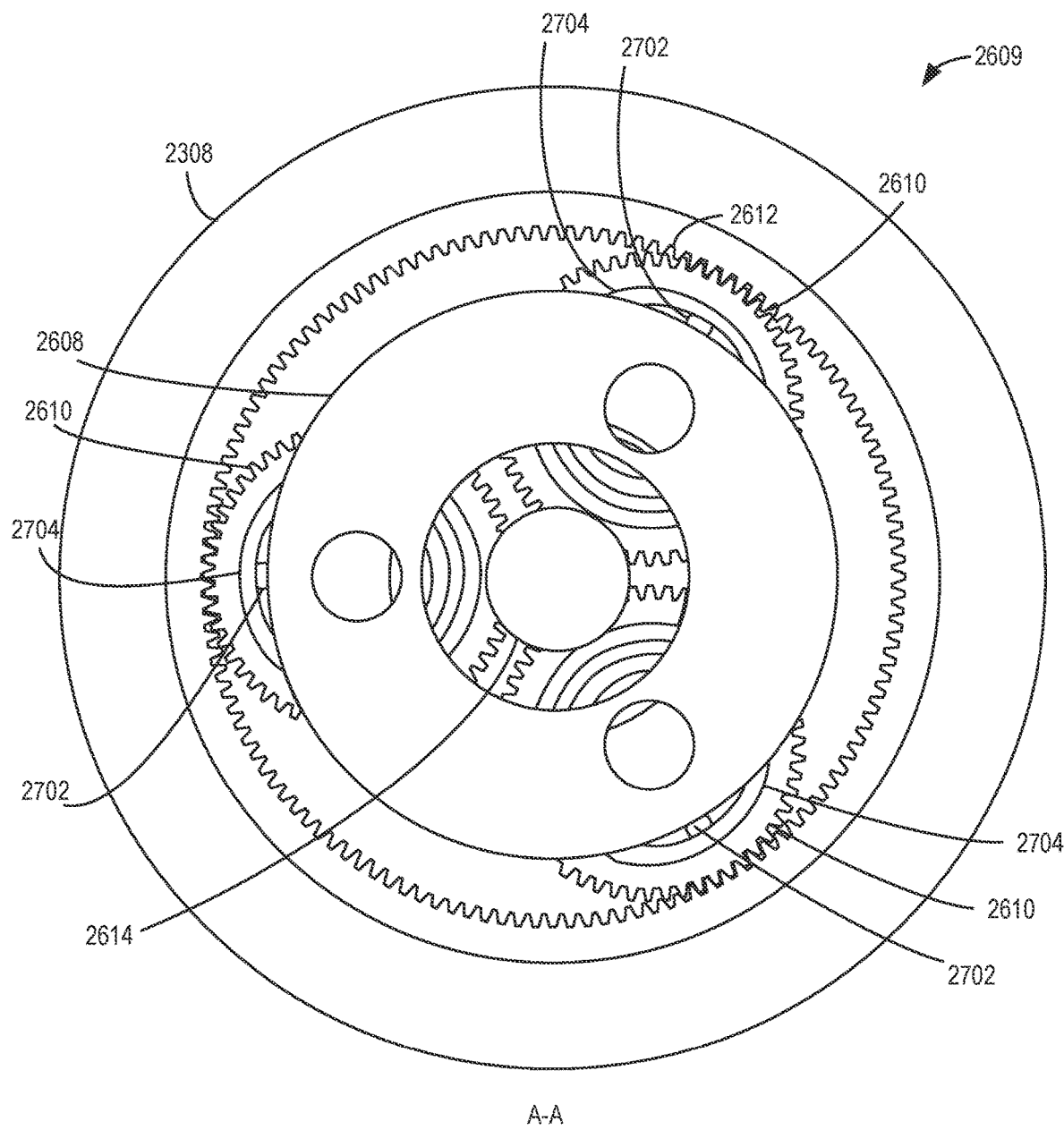
FIG. 27 illustrates a cross-section of the planetary gearbox of FIG. 26.

FIG. 27 illustrates a cross-section A-A of the gearbox 2609 of FIG. 26. In FIG. 27, the carrier shaft 2608 is coupled to the planet gears 2610 via respective brackets 2702 and rings 2704 rotatably coupled to an inner circumference of the planet gears 2610. Accordingly, the brackets 2702 and the ring 2704 cause the planet gears 2610 to revolve around the sun gear 2614. Furthermore, the planet gears 2610 are able to rotate relative to the respective rings 2704. Thus, as the carrier shaft 2608 causes the planet gears 2610 to revolve around the sun gear 2614, the ring gear 2612 causes the planet gears 2610 to rotate relative to the respective rings 2704. In FIG. 27, the ring gear 2612 is fixedly coupled to the inner surface of the motor housing 2308 and, thus, does not rotate within the motor housing 2308. For example, the ring gear 2612 can be fixed within the motor housing 2308 via a press fit, screws, or any other means for coupling.

In some examples, the brackets 2702 and the rings 2704 can be rotatably coupled to the carrier shaft 2608 and, in turn, be fixedly coupled to the planet gears 2610. In such examples, the brackets 2702 and the rings 2704 rotate with the planet gears 2610 as the carrier shaft 2608 causes the planet gears 2610 to move around the sun gear 2614.

During operation, the rotor 2322 of the motor 2320 of FIG. 26 drives a rotation of the first shaft 2602. Further, the first shaft 2602 drives a rotation of the carrier shaft 2608, which causes the planet gears 2610 to rotate. In turn, the planet gears 2610 cause the sun gear 2614 to rotate. Moreover, the engagement between the planet gears 2610 and the ring gear 2612 enables the planet gears 2610 to transfer more torque onto the sun gear 2614 without encountering slippage. Accordingly, the gearbox 2609 enables the impeller 2340 of FIG. 26 to rotate with a greater velocity as a result of a gear reduction provided by the gearbox 2609.

Figure 28:
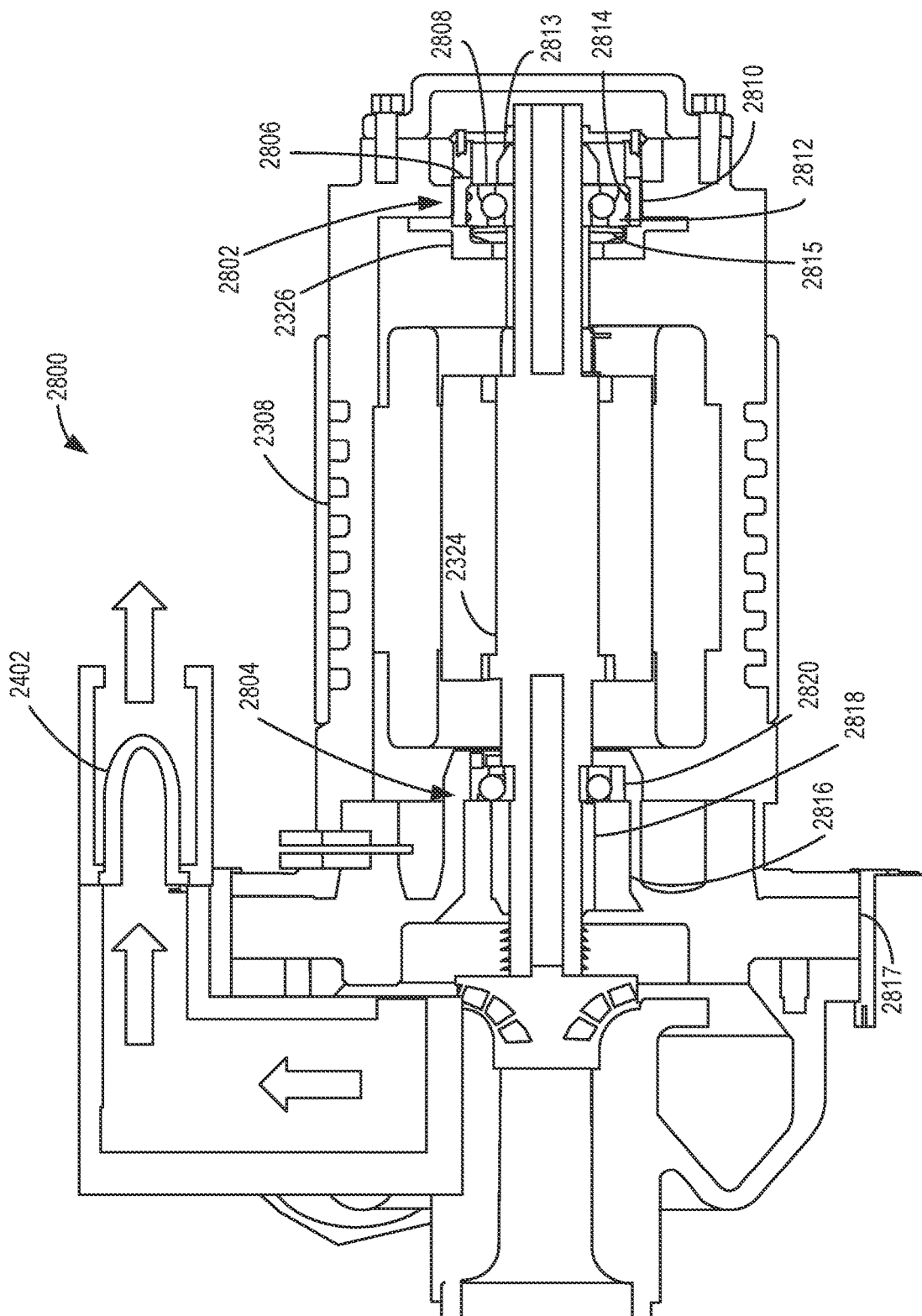
FIG. 28 illustrates another example pump system including bearing assemblies in accordance with the teachings disclosed herein.

FIG. 28 illustrates another example pump system 2800 including the second example separator 2402. Additionally or alternatively, the pump system 2600 can include the first separator 2302 and/or the third separator 2502. In FIG. 28, the pump system 2800 includes a first bearing assembly 2802 and a second bearing assembly 2804 to support the shaft 2324 that drives a rotation of the impeller 2340.

The first bearing assembly 2802 is positioned in the bearing cup 2326 and, in turn, supports an aft portion of the shaft 2324. The first bearing assembly 2802 includes a damper 2806 (e.g., a squeeze film damper) and a first rolling element bearing 2808 positioned between the damper 2806 and the shaft 2324. Specifically, the damper 2806 includes an outer race 2810 coupled to the bearing cup 2326. For example, the outer race 2810 can be coupled to the bearing cup 2326 via press fit, screws, and/or any other means for coupling. Further, the damper 2806 includes an inner race 2812 and piston rings 2814 positioned between the outer race 2810 and the inner race 2812. Specifically, the piston rings 2814 include squeeze film to dampen movements of the inner race 2812 relative to the outer race 2810. Furthermore, the inner race 2812 defines an outer portion of the first rolling element bearing 2808 that is coupled to the shaft 2324. Additionally, an inner portion of the first rolling element bearing 2808 can be coupled to the shaft 2324 via a clamp 2813 extending from an aft side of the first rolling element bearing 2808. Furthermore, the first rolling element bearing 2808 can be supported within the bearing cup 2326 via a preloaded disc spring 2815.

The second bearing assembly 2804 is positioned in a backplate 2817 coupled to the motor housing 2308. The second bearing assembly 2804 includes spring fingers 2816, a squirrel cage 2818, and a second rolling element bearing 2820. In FIG. 28, cylindrical rolling elements of the squirrel cage 2818 are in contact with and, thus, support the shaft 2324. Furthermore, the spring fingers 2816 are coupled to the backplate 2817 and a non-rotating portion of the squirrel cage 2818. Accordingly, the spring fingers 2816 provide damping against non-rotational movements of the shaft 2324. The second rolling element bearing 2820 is positioned aft of the squirrel cage 2818. Specifically, a non-rotating portion of the second rolling element bearing 2820 (e.g., an outer portion of the second rolling element bearing 2820) is coupled to the non-rotating portion of the squirrel cage 2818. For example, the squirrel cage 2818 can be coupled to the second rolling element bearing 2820 via a press fit, screws, and/or any other means for coupling.

As a result, the first bearing assembly 2802 and the second bearing assembly 2804 provide damping support for an aft portion of the shaft 2324 and a forward portion of the shaft 2324, respectively. Accordingly, the first bearing assembly 2802 and the second bearing assembly 2804 reduce vibratory movements of the shaft 2324 that may otherwise arise when the rotor 2322 drives the shaft 2324 at higher speeds.

Figure 29:
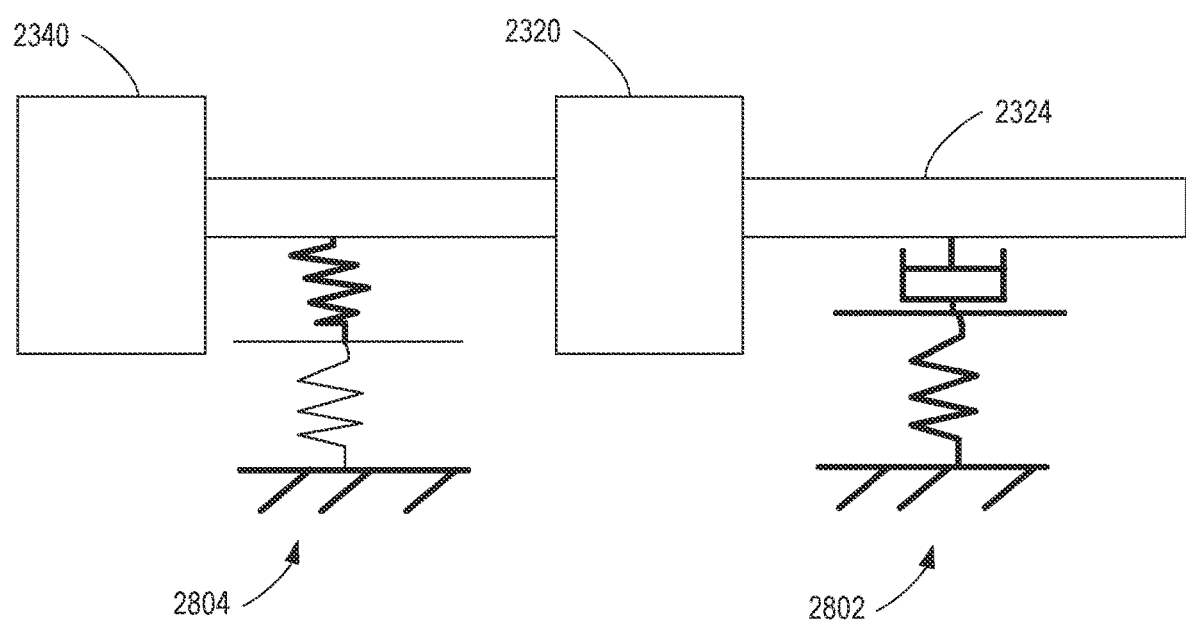
FIG. 29 is a schematic representation of support provided by the bearing assemblies of FIG. 28.

FIG. 29 is a schematic representation of the support provided by the first bearing assembly 2802 and the second bearing assembly 2804 of FIG. 28. In FIG. 29, the first bearing assembly 2802 supports a portion of the shaft 2324 disposed aft of the motor 2320 with a first stiffness. Further, the second bearing assembly 2804 supports a portion of the shaft 2324 disposed between the motor 2320 and the impeller 2340 with a second stiffness less than the first stiffness. Specifically, the first bearing assembly 2802 provides support with a greater stiffness to stabilize an aft end of the shaft 2324. Further, the second bearing assembly 2804 provides support with less centripetal force against the shaft 2324 to minimize or otherwise reduce a resistance that the second bearing assembly 2804 causes against a rotational velocity of the shaft 2324. Accordingly, the first bearing assembly 2802 may serve as a stabilizer while the second bearing assembly 2804 serves as a guide for the shaft 2324. As such, the first bearing assembly 2802 and the second bearing assembly 2804 provide support that can dampen non-rotational movements of the shaft 2324 while also reducing a resistance against the rotational velocity of the shaft 2324.

FIGS. 30A-C illustrate example implementations of rotary separators (e.g., the third separator 2502) that can be implemented in the pump system 2500 of FIG. 25 and/or any other thermal transport pump system.

FIG. 30A illustrates a first example rotary separator 3002 (e.g., a first swirler, the third separator 2502 of FIG. 25) positioned in a duct 3003 (e.g., the duct 2304). In FIG. 30A, the duct 3003 is fluidly coupled to a secondary duct 3004 that is in connection with an oil supply, as discussed in further detail below. In FIG. 30A, the first rotary separator 3002 includes a shaft 3006 and vanes 3008 extending radially outward from the shaft 3006. During an operation of the first rotary separator 3002, a motor (e.g., the motor 2504) can drive a rotation of the shaft 3006 and the vanes 3008. As a result, the vanes 3008 cause oil 3010 (e.g., oil droplets) to encounter an increased centrifugal force compared to a supercritical fluid 3012 (e.g., supercritical carbon dioxide) flowing through the duct 3003. Accordingly, while the first rotary separator 3002 allows the supercritical fluid 3012 to flow through a middle portion of the duct 2304, the rotation of the vanes 3008 causes the oil 3010 to move towards a perimeter of the duct 3003. Thus, the first rotary separator 3002 causes the oil 3010 to separate from the flow of the supercritical fluid 3012. Further, the first rotary separator 3002 causes at least a portion of the oil 3010 to move into the secondary duct 3004 where the oil 3010 can be collected and/or recirculated to lubricate bearings, such as the first and second rolling element bearings 2325, 2327, 2808, 2820 of FIGS. 23-26 and/or 28. In some examples, the rotational velocity of the first rotary separator 3002 is based on a flow rate(s) within the duct 3003 and/or a pressure(s) within the duct 3003.

FIG. 30B illustrates a second example rotary separator 3020 (e.g., a second swirler, a conical swirler, the third separator 2502 of FIG. 25, etc.) positioned in the duct 3003. The second rotary separator 3020 is a rotatable cone with holes 3022. Specifically, axial ends of the second rotary separator 3020 are open to enable the supercritical fluid 3012 to flow through the middle portion of the duct 3003. As the second rotary separator 3020 rotates, the higher density of oil compared to the supercritical fluid 3012 causes the oil 3010 to encounter a greater centrifugal force than the supercritical fluid 3012. As a result, the second rotary separator 3020 removes the oil 3010 from a flow path of the supercritical fluid 3012. Specifically, the increased centrifugal force can cause the oil 3010 to stick to the second rotary separator 3020 while the supercritical fluid 3012 flows through the second rotary separator 3020. Additionally or alternatively, a swirl velocity created by the holes 3022 as the second rotary separator 3020 rotates can cause the oil 3010 to flow through the holes 3022 in the second rotary separator 3020 and stick to the duct 3003 and/or flow through the secondary duct 3004 while the supercritical fluid 3012 flows through the second rotary separator 3020.

A size and/or a shape of the holes 3022 can be based on flow rates to be encountered in the duct 3003, pressures to be encountered in the duct 3003, a rotational velocity of the second rotary separator 3020, a position of the respective holes 3022 relative to an inner surface of the duct 3003, and/or a position of the holes 3022 relative to the secondary duct 3004. Additionally or alternatively, the rotational velocity of the second rotary separator 3020 can be based on the flow rates encountered in the duct 3003 and/or the pressures encountered in the duct 3003. For example, the size of the holes 3022, the shape of the holes 3022, and/or the rotational velocity of the second rotary separator 3020 can increase a likelihood that the centrifugal force and the swirl velocity encountered by the oil 3010 causes the oil 3010 to be driven into the secondary duct 3004. Similar to the first rotary separator 3002 of FIG. 30A, the second rotary separator 3020 can be driven by a motor (e.g., the motor 2504).

FIG. 30C illustrates a third example rotary separator 3040 (e.g., a third swirler, the third separator 2502 of FIG. 25) positioned in the duct 3003. The third rotary separator 3040 includes a shaft 3042, helical vanes 3044 extending from the shaft 3042, and a conical casing 3046 positioned around the shaft 3042. Similar to the second rotary separator 3020, the conical casing 3046 includes holes 3048. In FIG. 30C, the shaft 3042 and, in turn, the helical vanes 3044 are rotatable. In some examples, the conical casing 3046 is stationary. In some examples, the conical casing 3046 is rotatable in an opposite direction from a rotational direction of the shaft 3042. That is, the shaft 3042 can be rotatable in a first direction (e.g., clockwise) and the conical casing 3046 can be stationary or rotatable in a second direction opposite the first direction (e.g., counterclockwise).

In FIG. 30C, the rotation of the shaft 3042, the helical vanes 3044, and/or the conical casing 3046 and a density of the oil 3010 relative to the supercritical fluid 3012 causes the oil 3010 to encounter a first centrifugal force greater than a second centrifugal force encountered by the supercritical fluid 3012. Furthermore, the holes 3048 in the conical casing 3046 cause the oil 3010 to encounter a swirl velocity. Accordingly, the swirl velocity can cause the oil 3010 to pass through the holes 3048 at a greater velocity and, in turn, stick to the duct 3003 with greater force. In some examples, the swirl velocity encountered by the oil 3010 increases a likelihood that the oil 3010 enter the secondary duct 3004. For example, the greater velocity of the oil 3010 that results from the swirl velocity can enable the oil 3010 to move the secondary duct 3004 at a faster rate. Specifically, a size, a shape, and/or a quantity of the holes 3048 can cause the oil 3010 to be driven on a path directly into the secondary duct 3004. Moreover, the swirl velocity minimizes or otherwise reduces movement of the oil 3010 caused by the flow of the supercritical fluid 3012 in the duct 3003.

Figures 31A, 31B:
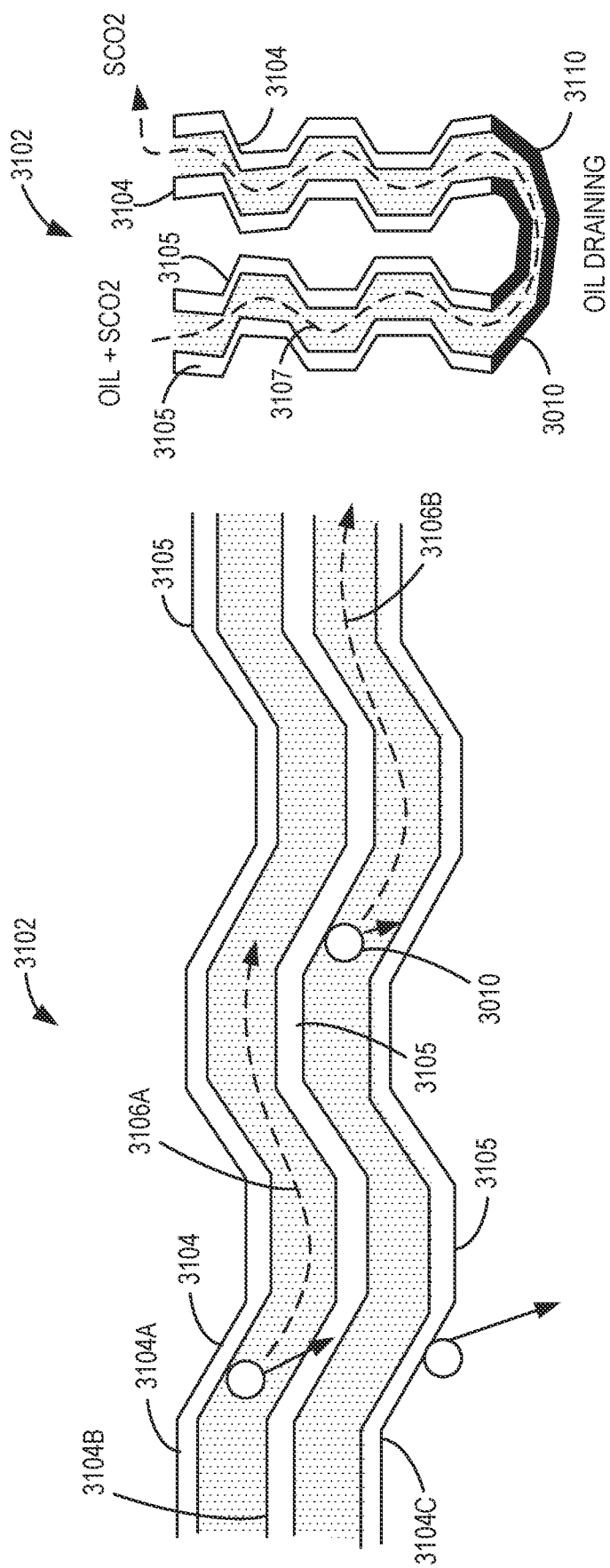
FIG. 31A illustrates a first example stationary separator that can be utilized in the pump systems of FIGS. 23-26 and 28.
FIG. 31B illustrates another example orientation of the first example stationary separator of FIG. 31A.
Figure 31C:
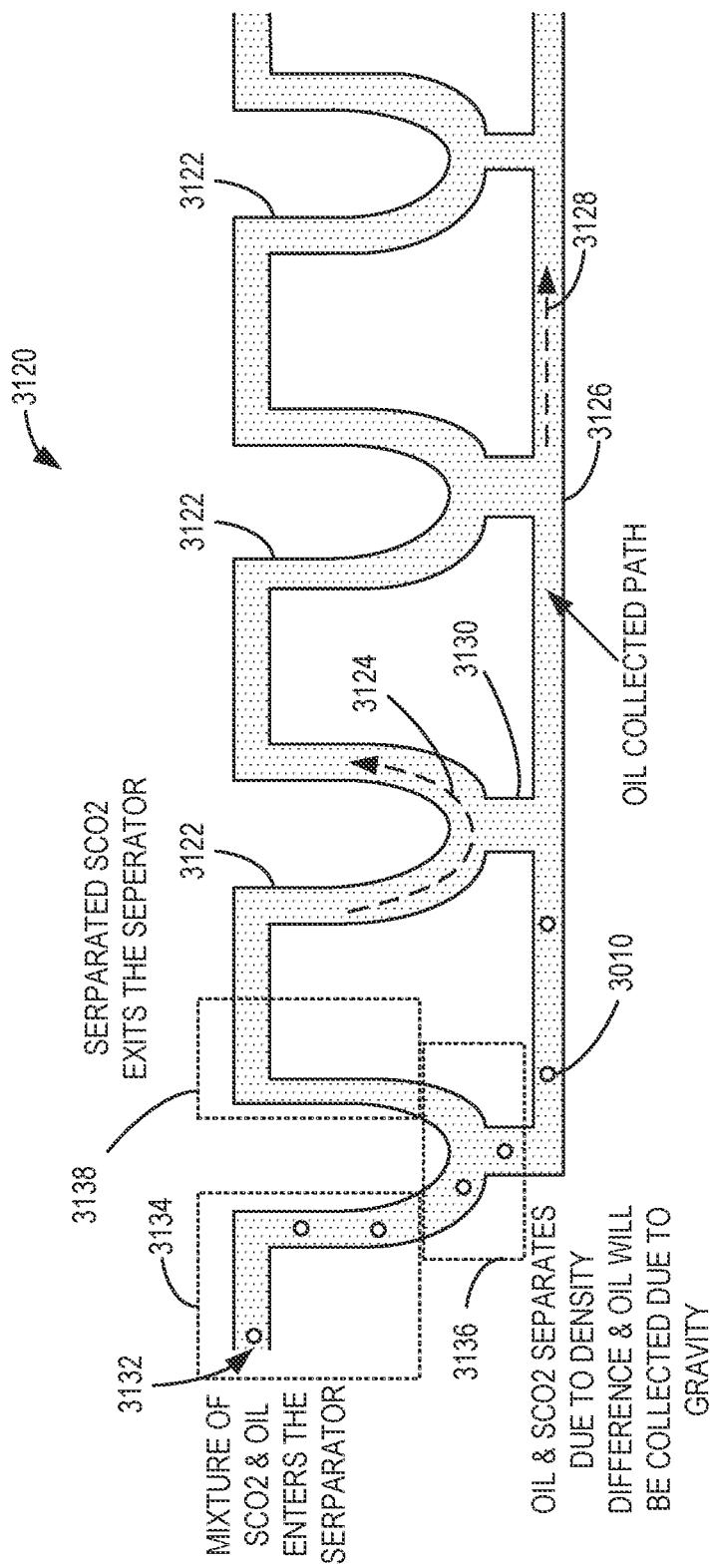
FIG. 31C illustrates a second example stationary separator that can be utilized in the pump systems of FIGS. 23-26 and 28.

FIGS. 31A-C illustrate example implementations of static separators (e.g., the first separator 2302, the second separator 2402) that can be implemented in the pump systems 2300, 2400, 2500 of FIGS. 23-25 and/or any other thermal transport pump system.

FIG. 31A illustrates at least a portion of a first example static separator 3102 (e.g., a first example filter, the first separator 2302, the second separator 2402). The first static separator 3102 includes baffles 3104 that define at least one flow path through the first static separator 3102. The baffles 3104 can be formed via sheet metals and/or additive manufacturing. The baffles 3104 include an oil absorbent material 3105, such as polyurethane, polypropylene, polyethylene, cross-linked polymers, talc, aluminum starch, rice starch, and/or silica.

In the illustrated example of FIG. 31A, the baffles 3104 define a first flow path 3106A and a second flow path 3106B through which the mixture of the supercritical fluid 3012 and the oil 3010 can flow. In particular, the first flow path 3106A is defined between a first baffle 3104A and a second baffle 3104B. Further, the second flow path 3106B is defined between the second baffle 3104B and a third baffle 3104C. In FIG. 31A, the first flow path 3106A is adjacent to the second flow path 3106B in a circumferential direction defined by the first static separator 3102. Additionally or alternatively, the first flow path 3106A can be adjacent to the second flow path 3106B in a radial direction defined by the first static separator 3102. When the oil 3010 contacts the baffles 3104, the oil absorbent material 3105 of the baffles 3104 causes the oil 3010 to stick to the baffles 3104 as the supercritical fluid 3012 continues to flow between the baffles 3104.

In some examples, a weight of the oil 3010 eventually causes the oil 3010 to fall from the baffles 3104. For example, as the oil 3010 accumulate in the baffles 3104, the oil 3010 can fuse together, which increases the weight of the oil 3010 and, in turn, causes the oil 3010 to fall from the baffles 3104. Specifically, the oil absorbent material 3105 of the baffles 3104 can include an additive that mixes with oil to cause the oil 3010 to become more viscous. Additionally or alternatively, the rolling element bearings that utilize the oil may include the additive that makes the oil 3010 more viscous. Thus, the baffles 3104 can cause cohesion and adhesion properties associated with the oil 3010 to be improved to increase a likelihood that the oil droplets 3010 bond together in response to contacting the baffles 3104.

Accordingly, one or more ducts in fluid connection with an oil supply and/or the motor housing 2308 (e.g., the secondary duct 3004) can be positioned below the baffles 3104 to enable the oil 3010 to be re-utilized. Furthermore, a position of the duct(s) can be based on a geometry of the baffles 3104 such that the oil 3010 that departs from the baffles 3104 falls directly into the duct(s). For example, gravity can cause the oil 3010 to accumulate in the baffles 3104 at one or more points of lower elevation and, in turn, the oil 3010 can drip from the lower elevation point(s) into the duct(s). Additionally or alternatively, one or more distinct portions of the baffles 3104 may include the oil absorbent material 3105 and, in turn, a position(s) of the duct(s) can be based on a location(s) of the portion(s) of the baffles 3104 that include the oil absorbent material 3105 and, thus, collect the oil 3010.

In some examples, when the oil 3010 is to be collected and maintained in the first static separator 3102 until the first static separator 3102 encounters maintenance or replacement, the oil absorbent material of the baffles 3104 does not include the additive that makes the oil 3010 more viscous. In such examples, the baffles 3104 reduce a likelihood that the weight of the oil droplets 3010 increases and, in turn, minimizes or otherwise reduces a likelihood that the oil droplets 3010 fall from the baffles 3104. Furthermore, to prevent the oil 3010 from escaping from the first static separator 3102, the first static separator 3102 can include an increased quantity of circumferential layers defined by the baffles 3104. As such, outer circumferential layers defined by the baffles 3104 can catch oil 3010 that manages to fall from respective inner circumferential layers of the baffles 3104. Additionally or alternatively, a collection container can be positioned at least partially around an outermost layer of the baffles 3104 (e.g., around a bottom portion of the outermost layer) such that the collection container can catch the oil 3010 that passes through and fall from the baffles 3104. Thus, the first static separator 3102 can prevent the oil 3010 from escaping.

FIG. 31B illustrates another example implementation of the first static separator 3102. In FIG. 31B, the first static separator 3102 includes the baffles 3104 oriented vertically instead of horizontally, as shown in FIG. 31A. The baffles 3104 form a flow path 3107 that prevents the oil 3010 from flowing through the first static separator 3102 without contacting the oil absorbent material 3105. Accordingly, as the mixture of the supercritical fluid 3012 and the oil 3010 flows between the baffles 3104, the oil absorbent material 3105 absorbs the oil 3010. Furthermore, a weight of the oil 3010 and the vertical orientation of the baffles 3104 enables the absorbed oil 3010 to collect at a bottom portion 3110 of the baffles 3104. As such, a location where the oil 3010 would fall from the baffles 3104 is limited by a size of the bottom portion 3110 of the baffles 3104. In turn, an oil collection duct (e.g., the secondary duct 3004) can be positioned below the bottom portion 3110 of the baffles 3104 to collect the oil 3010 that falls from the baffles 3104. Accordingly, the collected oil 3010 can be rerouted to an oil storage tank for storage and/or the motor housing 2308 for usage as lubrication, as discussed below in association with FIG. 35.

FIG. 31C illustrates a second example static separator 3120 (e.g., a second filter, the first separator 2302, the second separator 2402). The second static separator 3120 includes baffles 3122 that form a primary flow path 3124. Further, the second static separator 3120 includes an oil collection duct 3126 that forms a secondary flow path 3128 below the baffles 3122. The secondary flow path 3128 can be in connection with an oil supply and/or can recirculate the oil 3010 back to the motor housing 2308 such that the oil 3010 can return to the rolling element bearings 2325, 2327, 2808, 2820 of FIGS. 23-26 and/or 28 for lubrication through an oil duct, as discussed below in association with FIG. 35.

In FIG. 31C, connector ducts 3130 connect the secondary flow path 3128 to the primary flow path 3124. In some examples, the oil collection duct 3126 is in direct connection with one or more lowermost elevation points of the baffles 3122. In such examples, the second static separator 3120 does not require the connector ducts 3130 to couple the secondary flow path 3128 to the primary flow path 3124.

In FIG. 31C, the mixture of the supercritical fluid 3012 and the oil 3010 enters an inlet 3132 of the primary flow path 3124. A first portion 3134 of the baffles 3122 causes the mixture to flow downward. Further, a second portion 3136 of the baffles 3122 causes the mixture to transition from the downward flow to a horizontal flow. The second portion 3136 of the baffles 3122 includes the lowermost point of the respective baffles 3122, which the connector ducts 3130 extend from. In turn, gravity and a higher density of the oil 3010 compared to the supercritical fluid 3012 cause the oil 3010 to continue flowing downward through the second portion 3136 of the baffles 3122 while the supercritical fluid 3012 transitions to the horizontal flow. As a result, the oil 3010 flows through the connector ducts 3130 and into the oil collection duct 3126, which enables the oil 3010 to be collected and/or reutilized. Moreover, a third portion 3138 of the baffles 3122 can cause the supercritical fluid 3012 separated from the oil 3010 to flow upwards. Although the illustrated example of FIG. 31C utilizes four of the baffles 3122, any quantity of the baffles 3122 can be utilized to separate the supercritical fluid 3012 from the oil 3010 given operating parameters of the associated pump system 2300, 2400, 2500, 2600, 2800.

Figure 32:
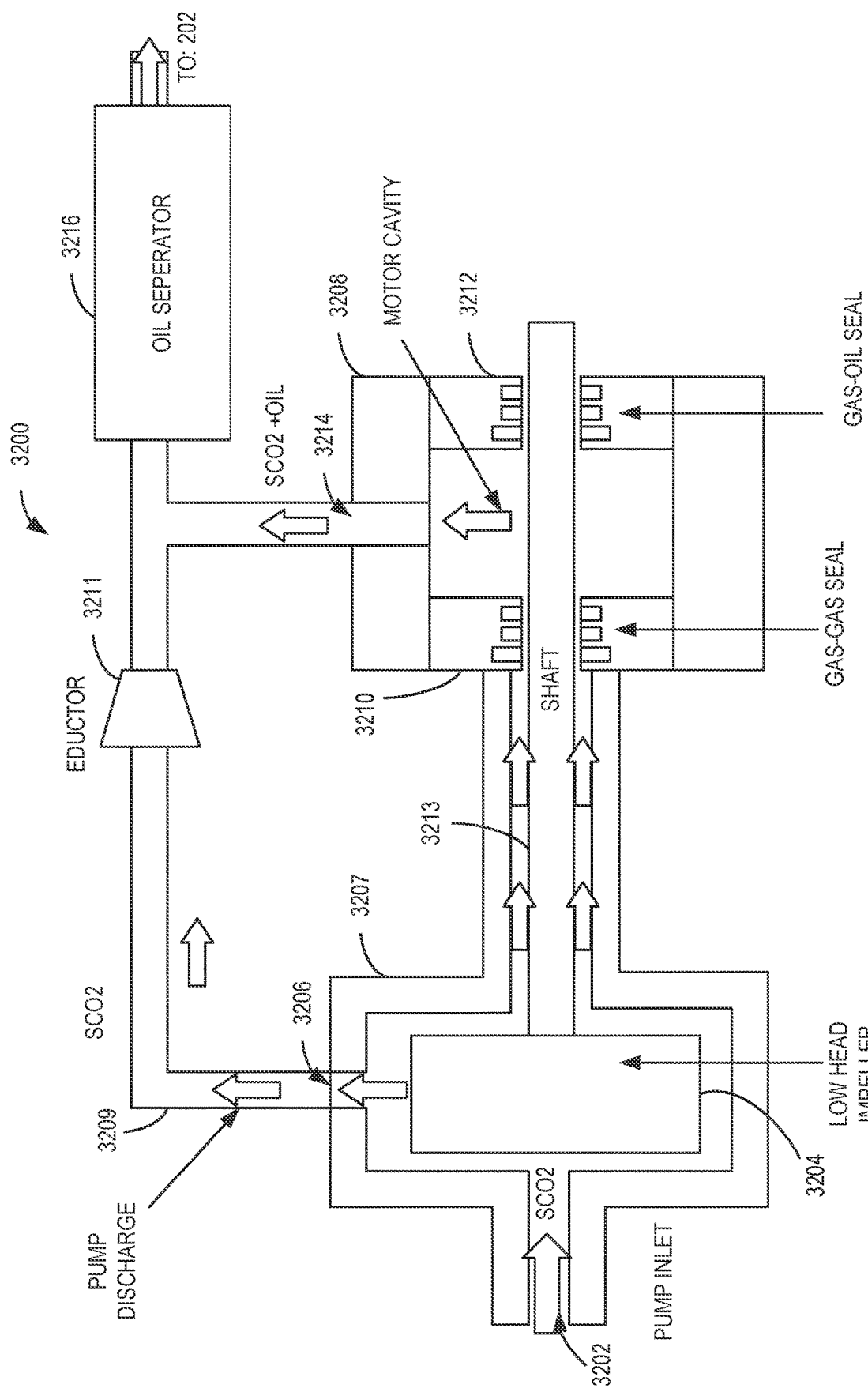
FIG. 32 is a schematic representation of a first example layout that can be associated with the pump systems of FIGS. 23-26 and 28.

FIG. 32 is a schematic representation of a first example layout 3200 that can be utilized for the pump systems 2300, 2400, 2500, 2600, 2800 of FIGS. 23-26 and/or 28. In FIG. 32, supercritical fluid flowing through a pump inlet 3202 is driven by an impeller 3204 (e.g., a low-head impeller). A first portion of the supercritical fluid flows through an outlet 3206 of a compressor housing 3207 and into a duct 3209. In turn, an eductor 3211 helps pull the supercritical fluid through the duct 3209 towards a downstream thermal transport bus (e.g., the thermal transport bus 202 of FIG. 3).

Furthermore, a second portion of the supercritical fluid flows past the impeller 3204, around a shaft 3213 and into a motor housing 3208. Accordingly, the second portion of the supercritical fluid flows through mixes with oil used to lubricate rolling element bearings utilized to support the shaft 3213. Furthermore, the second portion of the supercritical fluid flows through a gas-gas seal 3210 before flow is stopped by a gas-oil seal 3212. In turn, a mixture of the supercritical fluid and the oil collected by the supercritical fluid exits through an outlet 3214 of the motor housing 3208 and is merged with the first portion of the supercritical fluid in the duct 3209. An oil separator 3216 (e.g., the first separator 2302 of FIG. 23, the second separator 2402 of FIGS. 24-26 and 28, the third separator of FIG. 25, the first, second, and third rotary separators 3002, 3020, 3040 of FIGS. 30A-C, and/or the first and second static separators 3102, 3120 of FIGS. 31A-C) positioned in the duct 3209 then separates the oil in the mixture from the supercritical fluid and enables the supercritical fluid to continue through the duct 3209 toward the thermal transport bus 202 while withholding the oil. In some examples, another duct can be positioned below the oil separator 3216 to transport oil collected by the oil separator 3216 back to an oil supply and/or to the motor housing 3208 where it can be used to lubricate the rolling element bearings, as discussed below in association with FIG. 35.

Figure 33:
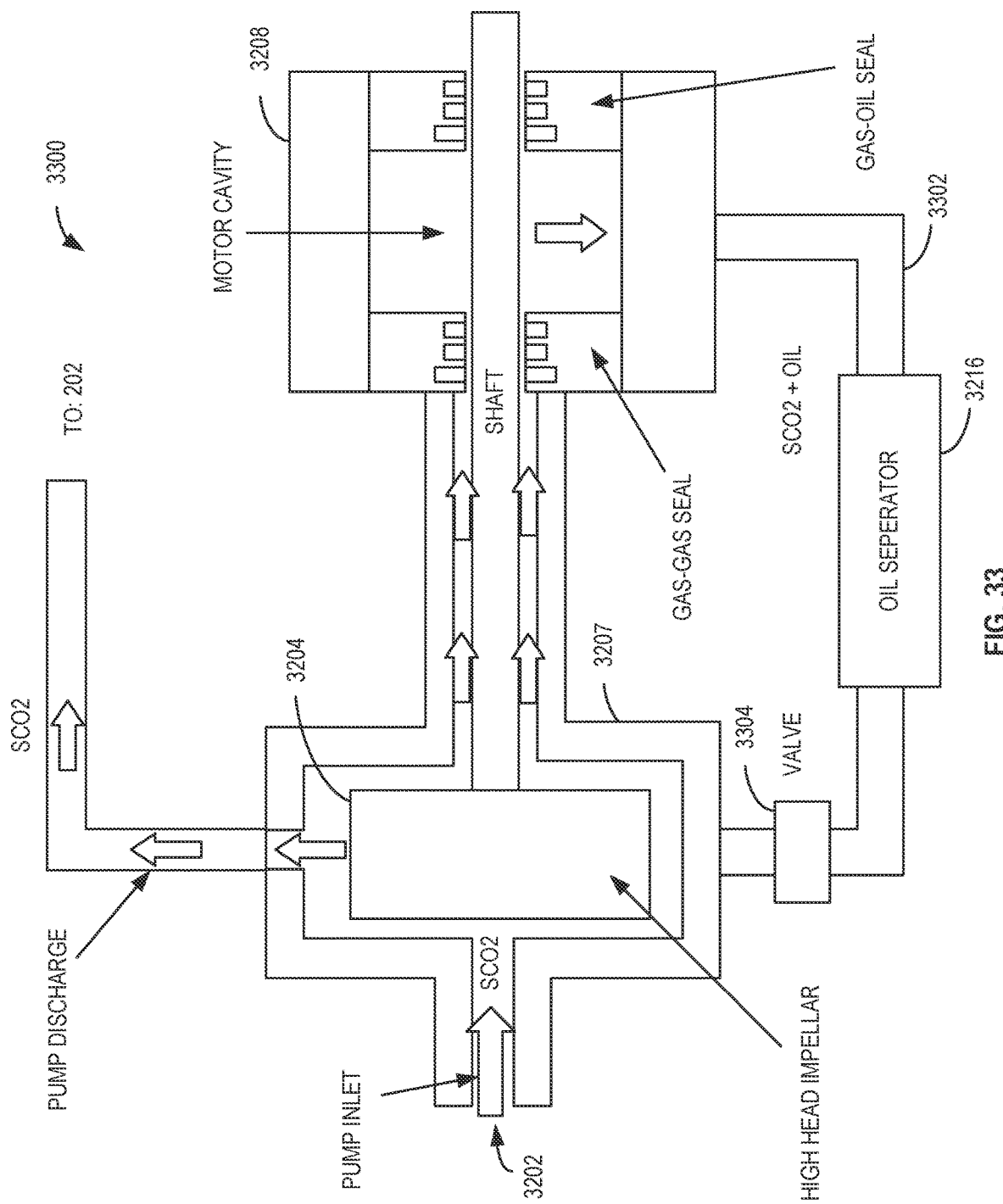
FIG. 33 is a schematic representation of a second example layout that can be associated with the pump systems of FIGS. 23-26 and 28.

FIG. 33 is a schematic representation of a second example layout 3300 that can be utilized for the pump systems 2300, 2400, 2500, 2600, 2800 of FIGS. 23-26 and/or 28. In the second example layout 3300, the oil separator 3216 is positioned in a return duct 3302 that is in fluid connection with the motor housing 3208 and the compressor housing 3207 at the pump inlet 3202. Accordingly, the mixture of the second portion of the supercritical fluid and the oil flows through the return duct 3302 where the oil separator 3216 causes the oil to separate from the supercritical fluid. Accordingly, the supercritical fluid can flow back into the compressor housing 3207 and, in turn, be driven by the impeller 3204. Moreover, a valve 3304 is positioned in the return duct 3302 to prevent the supercritical fluid that enters through the inlet 3202 from flowing through the return duct 3302.

Figure 34:
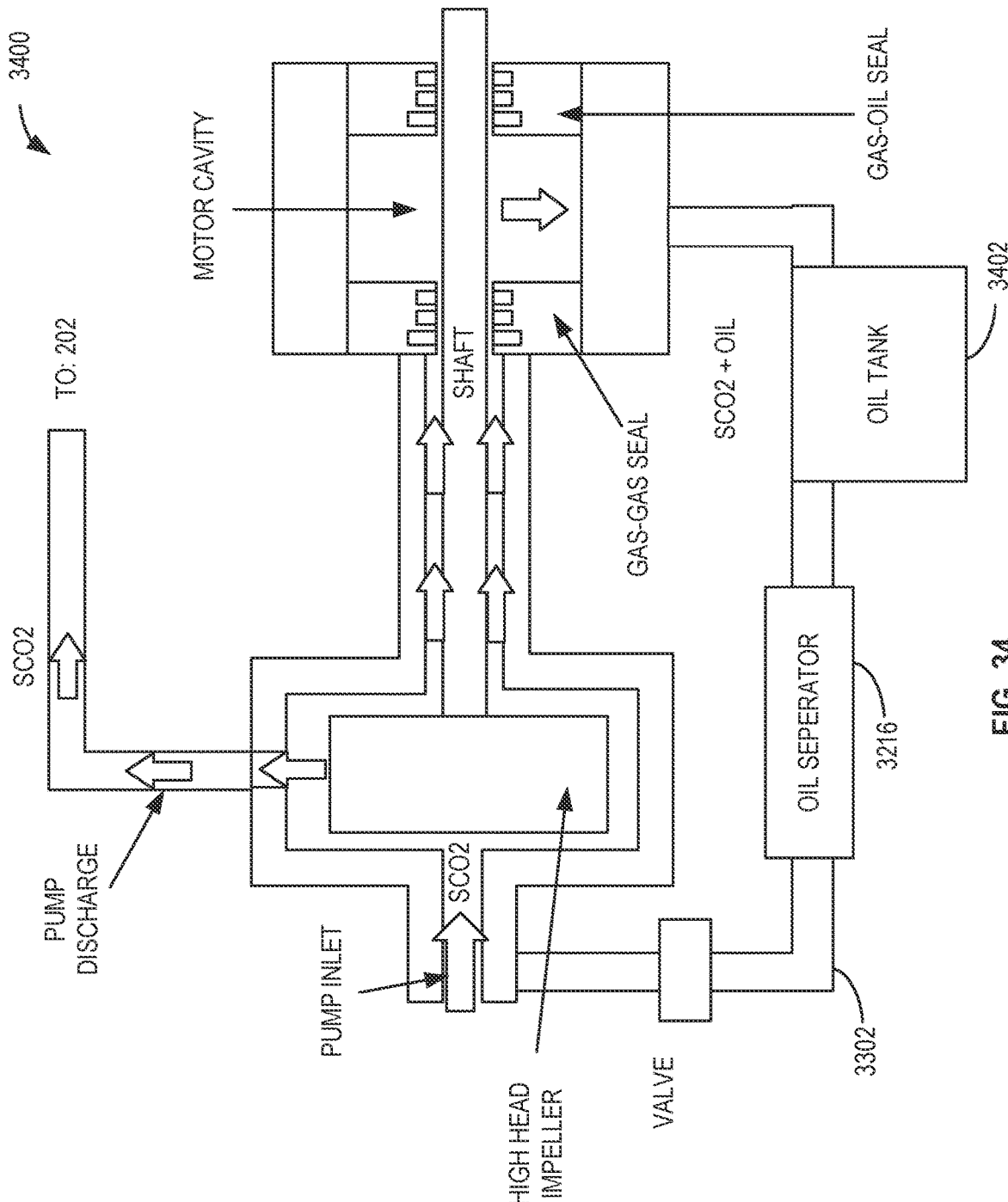
FIG. 34 is a schematic representation of a third example layout that can be associated with the pump systems of FIGS. 23-26 and 28.

FIG. 34 is a schematic representation of a third example layout 3400 of the pump systems 2300, 2400, 2500, 2600, 2800 of FIGS. 23-26 and/or 28. In the third example layout 3400, the return duct 3302 includes an oil tank 3402 upstream of the oil separator 3216. Accordingly, as the oil in the mixture flows through the oil tank 3402, the oil in the mixture can be attracted to oil stored in the oil tank 3402. Specifically, the oil in the mixture may be mixed with the aforementioned additive (e.g., within the rolling element bearings 2325, 2327, 2808, 2820 of FIGS. 23-26 and/or 28 that can be utilized to mount the shaft 3213) that increases the adhesion and cohesion properties of the oil. As a result, the increased adhesion and cohesion of the oil in the mixture can enable the oil in the mixture to be pulled into the stored oil. Furthermore, the stored oil may be positioned below the return duct 3302 such that gravity helps move the oil in the mixture into the oil tank 3402 while the second portion of the supercritical fluid continues to flow through the return duct 3302.

Figure 35:
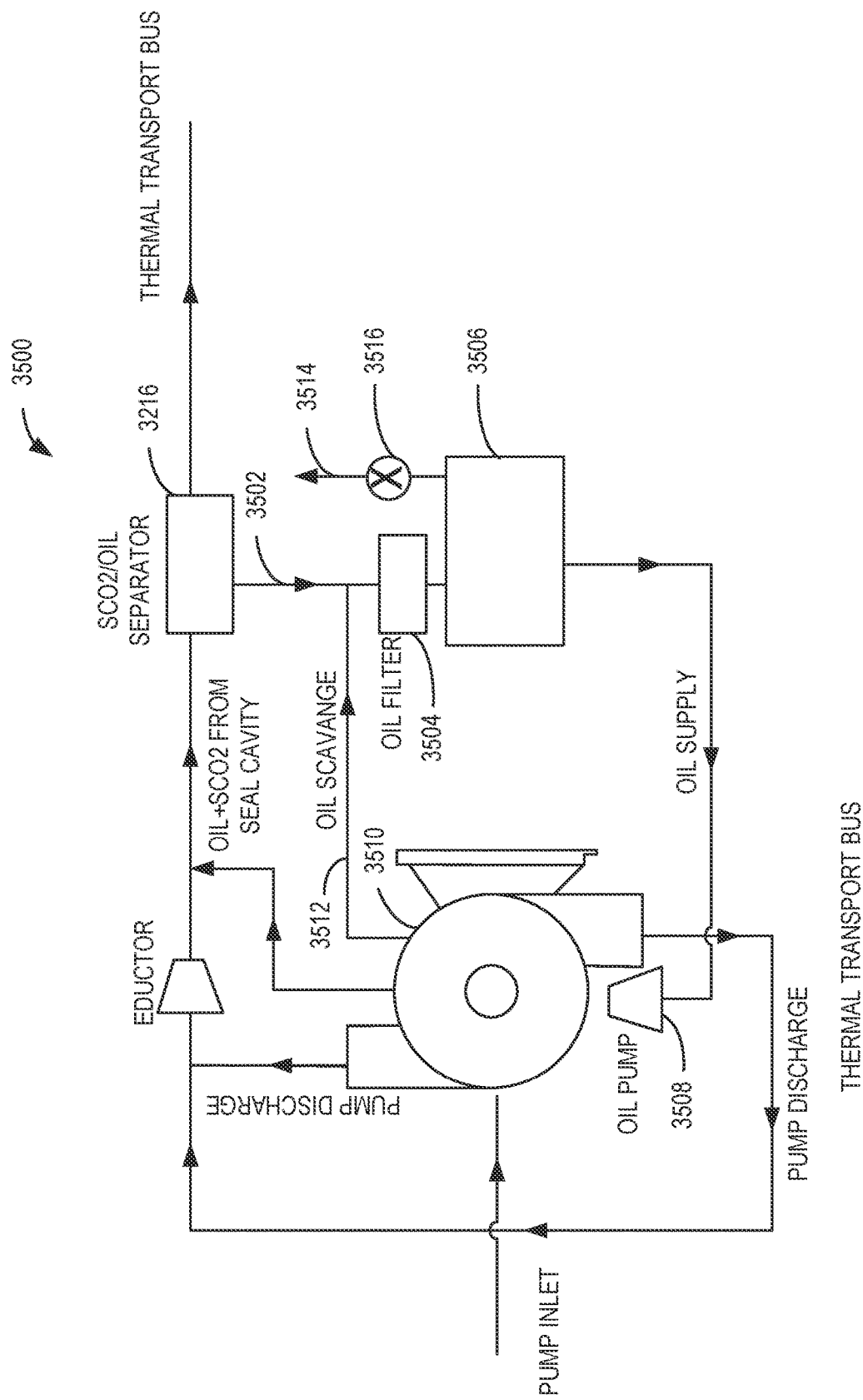
FIG. 35 is a schematic representation of a fourth example layout that can be associated with the pump systems of FIGS. 23-26 and 28.

FIG. 35 is a schematic representation of a fourth example layout 3500 of the pump systems 2300, 2400, 2500, 2600, 2800 of FIGS. 23-26 and 28. In the fourth example layout 3500, the oil that is separated from the supercritical fluid by the oil separator 3216 enters an oil duct 3502 (e.g., secondary flow path 3128 of FIG. 31C). In turn, the oil passes through an oil filter 3504 and into an oil supply 3506. Further, an oil pump 3508 can pump the fluid from the oil supply 3506 into the pump 3510 where it can lubricate bearings (e.g., the rolling element bearings 2325, 2327, 2808, 2820 of FIGS. 23-26 and/or 28). Moreover, an oil scavenge duct 3512 can carry a portion of the mixture from the pump 3510 to the oil filter 3504. For example, the oil scavenge duct 3512 can be fluidly coupled to the oil collection duct 3126 (FIG. 31C) to receive the oil flowing through the secondary flow path 3128 (FIG. 31C). Additionally or alternatively, the oil scavenge duct 3512 can be positioned to receive the oil 3010 (FIGS. 31A-C) that falls from the baffles 3104, 3104A, 3104B, 3104C (FIGS. 31A-B) of the first example static separator 3102. As a result, the oil can pass into the oil supply 3506. Additionally, a release duct 3514 in connection with the oil supply 3506 allows any supercritical fluid that enters the oil supply 3506 to be released into the atmosphere. Specifically, the release duct 3514 includes a release valve 3516 that allows fluids to be released in response to encountering a pressure greater than a pressure threshold.

In some examples, the pump systems 2300, 2400, 2500, 2600, 2800 include means for compressing fluid. For example, the means for compressing fluid may be implemented by the impeller 406 of FIG. 4, the impeller 2340 of FIGS. 23-26 and/or 28, the impeller 3204 of FIG. 32-33, and/or any other impellers described herein.

In some examples, the pump systems 2300, 2400, 2500, 2600, 2800 include means for housing the means for compressing. For example, the means for housing may be implemented by the compressor collector 408 of FIG. 4, the pump housing 2306 of FIGS. 23-26 and/or 28, the motor housing 2308 of FIGS. 23-4 and/or 28, the compressor housing 3207 of FIGS. 32-33, and/or the motor housing 3208 of FIGS. 32-33.

In some examples, the pump systems 2300, 2400, 2500, 2600, 2800 include means for transporting fluid. For example, the means for transporting the fluid may be implemented by the thermal transport bus 202 of FIG. 2, the fluid conduits 402 of FIG. 4, the duct 2304 of FIGS. 23-26, and 28, the duct 3003 of FIGS. 30A-C, the duct 3209 of FIG. 32, the duct 3302 of FIGS. 33-34, and/or any other pump output duct disclosed herein.

In some examples, the pump systems 2300, 2400, 2500, 2600, 2800 include means for separating supercritical fluid and oil. For example, the means for separating may be implemented by the first separator 2302 of FIG. 23, the second separator 2402 of FIGS. 24-26 and 28, the third separator 2506 of FIG. 25, the first, second, and/or third rotary separators 3002, 3020, 3040 of FIGS. 30A-C, and/or the first and/or second static separators 3102, 3120 of FIGS. 31A-C.

In some examples, the pump systems 2300, 2400, 2500, 2600, 2800 include means for rotating the means for compressing. For example, the means for rotating may be implemented by the motor 2320 of FIGS. 23-26 and/or 28 and/or the shaft 2324 of FIGS. 23-26 and/or 28.

In some examples, the pump systems 2300, 2400, 2500, 2600, 2800 include means for increasing an angular velocity of the means for compressing relative to the means for rotating. For example, the means for increasing the angular velocity of the means for compressing may be implemented by the gearbox 2609 of FIGS. 26-27.

In some examples, the pump systems 2300, 2400, 2500, 2600, 2800 include first means for radially supporting the means for rotating. The first means for radially supporting can include a first stiffness. For example, the first means for radially supporting may be implemented by the first bearing assembly 2802 of FIGS. 28 and/or 29.

In some examples, the pump systems 2300, 2400, 2500, 2600, 2800 include second means for radially supporting the means for rotating. The second means for radially supporting can include a second stiffness different from (e.g., less than) the first stiffness. For example, the second means for supporting may be implemented by the second bearing assembly 2804 of FIGS. 28 and/or 29.

Example oil lubricated pump architectures with one or more oil separators are disclosed herein. The example pump systems disclosed herein include oil separators to enable fluid (e.g., heat exchange fluid such as supercritical fluid (e.g., $sCO_2$, etc.)) to mix with oil and subsequently be separated from the oil. The oil separators enable the fluid to mix with oil while reducing safety risks associated with the thermal energy transfer that the fluid encounters. Accordingly, the oil separators enable an impeller to be directly driven by a motor without a shroud separating the fluid from the motor. Moreover, the oil separators enable a quantity and/or complexity of components in the pump system to be reduced.

Axial Flux Motor Driven Pump Systems for Pressurizing Fluid in Closed Loop Systems The operations of some example fluid pump systems and centrifugal fluid pump systems have an electric motor (e.g., motor 410) connected axially to an impeller (e.g., impeller 406) via an impeller shaft (e.g., impeller shaft 466) as described in reference to FIG. 4 above. The example motor 410 illustrated in FIG. 4 includes a stator to generate a torque on a rotor via magnetic forces. The example stator includes copper wire windings, referred to as electromagnetic coils, that are wrapped around iron magnetic cores, poles, and/or rods that are oriented perpendicular to the axis of rotation of the rotor. The electromagnetic coils are tightly wound around the poles such that they are running parallel to the axis of rotation of the rotor. According to Faraday's law of induction, when an electric current is running through the electromagnetic coils, a magnetic field is generated that flows around the electromagnetic coil perpendicular to the direction of the electric current flow. Therefore, if the electromagnetic coil is wound parallel to the axis of rotation of the motor, then the magnetic field that the electromagnetic coil generates flows perpendicular to the axis of rotation of the motor. Since the stator of the example motor 410 produces a magnetic field that runs perpendicular, or radial, to the axis of rotation of the motor 410, the example electric motor 410 that drives the rotor shaft 438 can be referred to as a radial flux motor.

In contrast to radial flux motors (e.g., electric motor 410), axial flux motors include electromagnetic coils and/or windings that are oriented perpendicular to the axis of rotation of the motor and/or the rotor. The orientation of the electromagnetic coil windings causes the electromagnetic coils to produce magnetic fields that flow parallel to the axis of rotation of the motor and/or the rotor. Since the direction of magnetic flux is parallel to the axis of rotation, the stator and the rotor in axial flux motors are designed as disks, plates, etc. that increase the distance the permanent magnets in the rotor are from the axis of rotation but also decrease the axial length of the axial flux motor. The stator and the rotor of radial flux motors use electromagnetic coils and permanent magnets that are axially longer than the electromagnetic coils and the permanent magnets in the axial flux motor because the radial flux motor relies on stronger magnetic forces to produce a same torque as the axial flux motor. Since the axial flux motor is able to apply magnetic forces to the rotor at greater distances from the axis of rotation that the radial flux motor, and since torque is a product of force and distance, the axial flux motor can produce the same torque on the rotor as the radial flux motor because the electromagnetic coils and the permanent magnets are further away from the axis of rotation. This means that the axial flux motor can be axially shorter but radially larger than the radial flux motor while still generating the same overall torque.

In examples disclosed herein, axial flux motors are used to drive pump systems that pressurize fluid in a closed loop system. In some examples, the fluid is a supercritical fluid. In some examples, the supercritical fluid is supercritical carbon dioxide (sCO2). In some examples, the closed loop system is a thermal management system (e.g., thermal management system 200 of FIG. 3) that uses the sCO2 to transfer thermal energy between heat exchangers (e.g., heat source heat exchanger 206 and/or heat sink heat exchanger 208 of FIG. 3). In examples disclosed herein, axial flux motor driven pump systems for pressurizing fluid in closed loop systems move a center of gravity (CG) of the pump system closer to a mounting flange used to mount the pump system to a mounting surface (e.g., a wall, a beam, a support structure, etc.) relative to radial flux motor driven pump systems (e.g., thermal transport bus pump 400). In examples disclosed herein, since the CG of the example axial flux motor driven pump system is closer to the mounting flange than the radial flux motor driven pump system, there is a smaller moment or torque acting on the pump system and the mounting flange due to gravity, which reduces vibration and damage over time for the axial flux motor drive pump systems relative to the radial flux motor driven pump systems. In examples disclosed herein, the axial flux motor pump system saves space in the axial direction within an example aircraft on which the example axial flux motor driven pump system may be used. In examples disclosed herein, the surface (e.g., wall, structure, beam, etc.) on which the axial flux motor driven pump system is mounted may be thinner than a surface on which the radial flux motor driven pump system is mounted due to the reduction in CG overhang. In examples disclosed herein, the axial flux motor driven pump system includes a pump housing, an impeller, impeller shaft, etc. as a separate line replaceable unit to optimize removal and/or maintenance of the pump, the motor, and/or other components of the axial flux motor driven pump system relative to the radial flux motor driven pump system.

Figure 36:
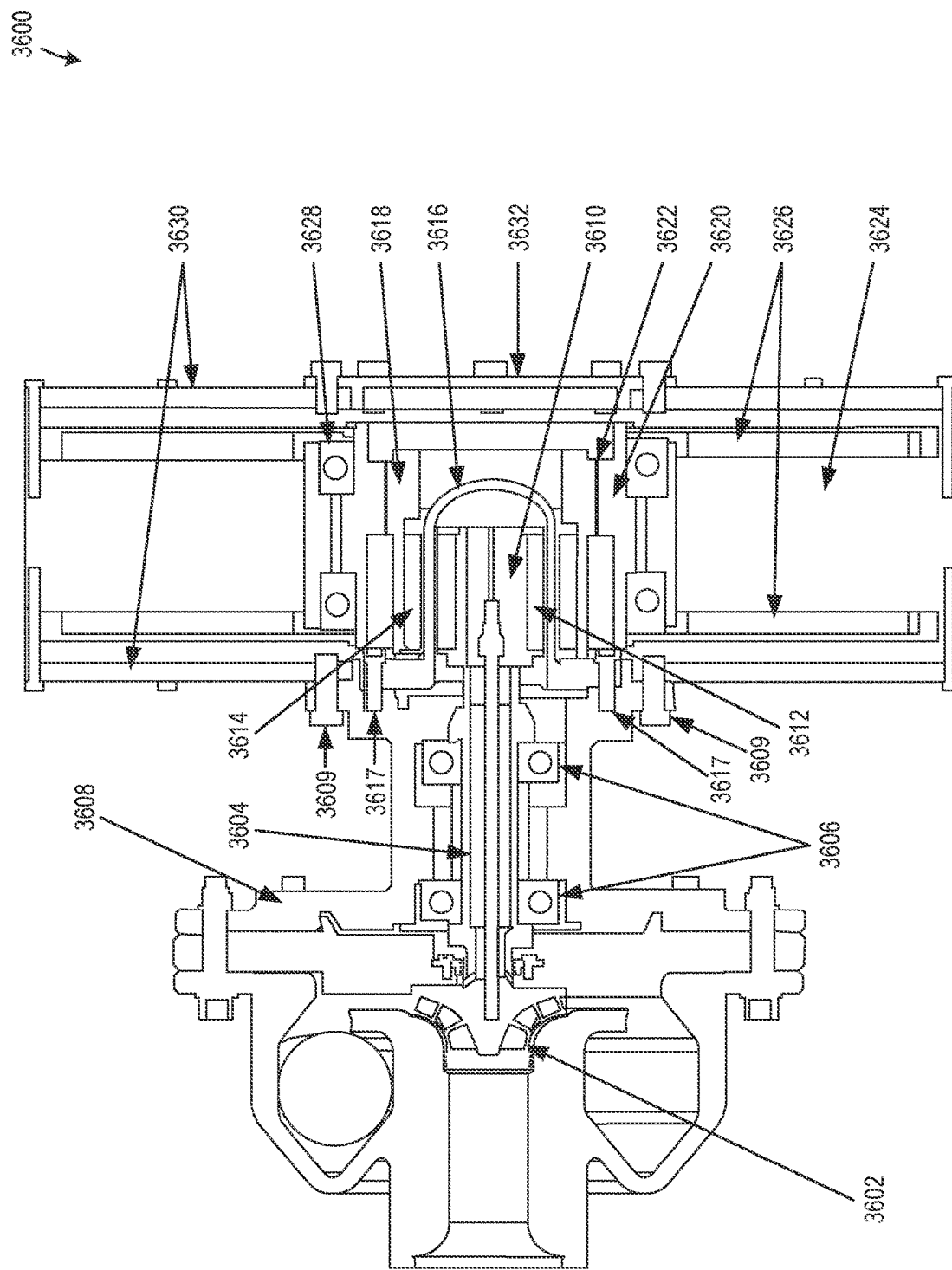
FIG. 36 illustrates a first example axial flux motor driven pump system for pressurizing fluid in closed loop systems in accordance with the teachings of this disclosure.

For the figures disclosed herein, identical numerals indicate the same elements throughout the figures. FIG. 36 illustrates a cross-sectional view of an axial flux motor driven pump system 3600 ("pump system 3600") for pressurizing fluid (e.g., supercritical fluid (sCO2)) in a closed loop system (e.g., thermal management system 200 of FIG. 3). In some examples, the pump system 3600 is used to pump sCO2 through a thermal management system on an aircraft (e.g., aircraft 10 of FIG. 1) and/or a gas turbine engine (e.g., gas turbine engine 100 of FIG. 2). As shown in FIG. 36, the pump system 3600 includes an impeller 3602, an impeller shaft 3604, radial impeller bearings 3606, a pump housing 3608, housing bolts 3609, a magnetic coupling 3610, an inner hub 3612, an outer hub 3614, a barrier can 3616, barrier can bolts 3617, a coupling shaft 3618, a rotor shaft 3620, a splined interface 3622, a stator 3624, rotors 3626, radial motor bearings 3628, a motor housing 3630, and a mounting flange 3632. Some of the architecture included in the example pump system 3600 can be used in other pump systems described above, such as pump system 900 of FIG. 9, pump system 2300-2600, 2800 of FIGS. 23-26, 28.

The example pump system 3600 illustrated in FIG. 36 includes the impeller 3602 to pressurize the example fluid (e.g., sCO2) in the example closed loop system (e.g., the thermal management system 200 of FIG. 3). The example impeller 3602 is a component of the pump system 3600 that is connected to the impeller shaft 3604 and rotates at a same rotational speed as the impeller shaft 3604. In some examples, the impeller 3602 is same as or similar to impellers used in centrifugal pumps and includes vanes and/or blades to deflect flow of the incoming fluid radially outward into outlet flowlines. The example impeller 3602 converts mechanical power of the motor (e.g., the stator 3624 and the rotors 3626) into hydrodynamic power of the flowing fluid.

The example pump system 3600 illustrated in FIG. 36 includes the impeller shaft 3604 to transfer torque from the motor (e.g., the stator 3624, the rotors 3626, and the rotor shaft 3620) to the impeller 3602. In some examples, the impeller shaft 3604 is a hollow shaft to conserve mass and includes a central rod along the axis of rotation of the impeller shaft 3604 to maintain axial alignment of the impeller shaft 3604. In some examples, the impeller shaft 3604 is manufactured with metallic materials (e.g., titanium, aluminum alloys, etc.) and/or composite materials (e.g., carbon fiber, Kevlar®, etc.) via additive manufacturing and/or subtractive manufacturing. The example impeller shaft 3604 is constructed as multiple parts included in an assembly, however, in some examples, the impeller shaft 3604 is fabricated as a single part and/or a preassembled structure.

The example pump system 3600 illustrated in FIG. 36 includes radial impeller bearings 3606 to support radial loads (e.g., weight, forced oscillations, etc.) of the impeller shaft 3604. The example radial impeller bearings 3606 illustrated in FIG. 36 are rolling-element bearings that include an inner race, an outer race, and rolling elements (e.g., balls, cylinders, etc.). The example radial impeller bearings 3606 can support the radial loads and thrust loads of the impeller shaft 3604 since the radial impeller bearings 3606 illustrated in FIG. 36 are rolling element bearings. For example, the impeller shaft 3604 may be attached to the inner races of the radial impeller bearings 3606 such that the impeller shaft 3604 could not move significantly far (e.g., less than one millimeter (mm)) in the axial direction. The example radial impeller bearings 3606 include dry lubricants (e.g., silver coating, graphite, molybdenum disulfide, etc.) to reduce frictional forces between the inner ring, the outer ring, and the rolling elements without a risk of contaminating the fluid that the pump system 3600 pressurizes. In some examples, the radial impeller bearings 3606 include liquid lubricants (e.g., oil-based lubricants, water-based lubricants, silicone-based lubricants, etc.) to reduce frictional forces between the inner ring, the outer ring, and the rolling elements, and the pump system 3600 includes an oil separator (e.g., oil separator 3216 of FIGS. 32-35) to remove liquid lubricants of the radial impeller bearings 3606 from the fluid (e.g., the sCO2).

In some examples, the radial impeller bearings 3606 are foil bearings that support the radial loads of the impeller shaft 3604. For examples in which the radial impeller bearings 3606 are foil bearings, the radial impeller bearings 3606 include a journal lining and a spring-loaded foil. For examples in which the radial impeller bearings 3606 are foil bearings, the spring-loaded foil supports the radial loads of the impeller shaft 3604 during start-up and stopping of the pump system 3600. For examples in which the radial impeller bearings 3606 are foil bearings, as the angular velocity of the impeller shaft 3604 increases, a working fluid (e.g., air, nitrogen, argon, etc.) gets pulled into the journal lining due to viscosity effects of the working fluid and a working fluid pressure within the example radial impeller bearings 3606 increases. For examples in which the radial impeller bearings 3606 are foil bearings, once the working fluid pressure within the journal lining increases to a certain threshold (e.g., 100 force-pounds per square inch (psi)), the spring-load foil gets pushed outward, and the working fluid pressure fully supports the radial loads of the impeller shaft 3604. For examples in which the radial impeller bearings 3606 are foil bearings, the radial impeller bearings 3606 do not support axial loads of the impeller shaft 3604, and no liquid lubricants are used. Therefore, if the example radial impeller bearings 3606 are foil bearings, the example impeller shaft 3604 includes one or more shafts and/or one or more disks attached to the impeller shaft 3604, oriented perpendicular to the axis of rotation, and protruding radially outward from the impeller shaft 3604, similar to thrust shafts 532, 632, 742 of FIGS. 5, 6, and/or 7. In some examples, if the radial impeller bearings 3606 are foil bearings, the example pump system 3600 includes thrust bearings (e.g., thrust bearings 534, 634, 744 of FIGS. 5, 6, and/or 7) to support axial loads of the impeller shaft via interfacing with the example thrust shafts.

The example pump system 3600 illustrated in FIG. 36 includes the pump housing 3608 to support the radial impeller bearings 3606. The example pump housing 3608 prevents the radial impeller bearings 3606 from moving significantly far (e.g., less than 0.1 mm) in the radial direction or axial direction. In the illustrated example of FIG. 36, the pump housing 3608 includes three separate parts assembled together via fasteners (e.g., bolts, screws, adhesives, etc.). In some examples, the parts of the pump housing 3608 are fabricated separately via additive manufacturing and/or subtractive manufacturing prior to assembly. In some examples, the pump housing 3608 is a single part fabricated via additive manufacturing and/or subtractive manufacturing. The example pump housing 3608 is fastened to the example motor housing 3630 via housing bolts 3609. Although two housing bolts 3609 are illustrated in FIG. 36, two or more housing bolts 3609 may be included in the pump system 3600.

The example pump system 3600 illustrated in FIG. 36 includes the magnetic coupling 3610 to connect the impeller shaft 3604 to the coupling shaft 3618. The example magnetic coupling 3610 of FIG. 36 is the same as and/or is similar to example magnetic couplings 526, 626, 720 illustrated in FIGS. 5, 6, and/or 7 and transfers torque from the coupling shaft 3618 to the impeller shaft 3604 via magnetic forces. In some examples, the inner hub 3612 of the magnetic coupling 3610 includes a first set of permanent magnets, and the outer hub 3614 of the magnetic coupling 3610 includes a second set of permanent magnets. The example first set of permanent magnets and the example second set of permanent magnets alternate in polarity about the axis of rotation of the impeller shaft 3604 and/or the coupling shaft 3618, and the attractive magnetic forces between the first set of magnets and the second set of magnets cause the outer hub 3614 to drive the rotation of the inner hub 3612.

The example pump system 3600 illustrated in FIG. 36 includes the barrier can 3616 to help prevent fluid from contacting the rotors 3626, the stator 3624, and/or other parts and/or components that affect the operability of the motor. The example barrier can 3616 illustrated in FIG. 36 includes metallic and/or non-metallic materials and may be the same as and/or similar to the example barrier cans 536, 636, 728 of FIGS. 5-7, 1500 of FIGS. 15, and/or 1900 of FIG. 19. The example barrier can 3616 fastens to the pump housing 3608 via barrier can bolts 3617. In some examples, the barrier can 3616 connects to the pump housing 3608 via the barrier can bolts 3617 and/or other fasteners, such as screws, dowels, rods, pins, adhesives, magnetic forces, interference fits, etc.

The example pump system 3600 illustrated in FIG. 36 includes the coupling shaft 3618 to house the outer hub 3614 of the magnetic coupling 3610 and to transfer torque from the rotor shaft 3620 to the impeller shaft 3604 via the magnetic coupling 3610. In some examples, the coupling shaft 3618 includes the outer hub 3614 and/or the second set of permanent magnets. The example coupling shaft 3618 of FIG. 36 interacts with the rotor shaft 3620 via the splined interface 3622. In some examples, the coupling shaft 3618 and the rotor shaft 3620 include splines (e.g., teeth, ridges, v-cuts, etc.) that physically interlock to create the splined interface 3622. The splined interface 3622 is a physical connection at which the rotor shaft 3620 splines apply a force to the coupling shaft 3618 splines and, in turn, transfer a torque from the rotor shaft 3620 to the coupling shaft 3618. The example splined interface 3622 causes the coupling shaft 3618 to rotate at a same rate as the rotor shaft 3620.

The example pump system 3600 illustrated in FIG. 36 includes the stator 3624, the rotors 3626, and the radial motor bearings 3628 to provide mechanical power to the pump system 3600. The stator 3624, the rotors 3626, and the radial motor bearings 3628 of the example pump system 3600 are included in an axial flux motor of the system, which operates in accordance with the previous description above. In some examples, the stator 3624 includes electromagnetic coils that are wrapped around cores of ferrous material (e.g., soft iron, nickel, cobalt, etc.) such that the electromagnetic coils run perpendicular to the axis of rotation and generate a magnetic flux parallel to the axis of rotation. The example stator 3624 supports and/or houses the example radial motor bearings 3628 such that the radial motor bearings 3628 do not move significantly far (e.g., less than 0.005 inches) from the intended position of the radial motor bearings 3628 in the pump system 3600 due to radial forces and/or axial forces that the rotors 3626 and/or the rotor shaft 3620 generate. The example rotors 3626 include a first rotor disk positioned on a front side of the stator 3624 and a second rotor disk positioned on a back side of the stator 3624. The example first rotor disk and the example second rotor disk include permanent magnets, and the magnetic flux(es) that the example stator 3624 generates attract and/or repel the permanent magnets. The example stator 3624 generates heat due to electrical resistances in the electromagnetic coils. In some examples, cooling channels, linings, pipes, jackets, etc. with flowing liquid coolants (e.g., water, oil, deionized water, inhibited glycol, dielectric fluids, heat exchange fluids such as supercritical fluids (e.g., sCO2, etc.)) are included in and/or surrounding the stator 3624 to transfer heat to the liquid coolants. In some examples, cooling fins and/or vents are fixed to the stator 3624 to transfer heat to ambient air.

The example rotors 3626 of the pump system 3600 are attached to the example rotor shaft 3620 via fasteners (e.g., bolts, pins, dowels, adhesives, magnetic forces, interference fits, etc.). In some examples, the rotors 3626 are also attached to an inner race and/or an outer race of the radial motor bearings 3628. The example pump system 3600 illustrated in FIG. 36 includes the example radial motor bearings 3628 to support radial loads (e.g., weight, forced oscillation, etc.) that the rotor shaft 3620 generates. The example radial motor bearings 3628 of FIG. 36 also support radial loads of the rotors 3626 via the mechanical connection(s) (e.g., fasteners, adhesives, magnetic forces, interference fits, etc.) between the rotors 3626 and the rotor shaft 3620. The example radial motor bearings 3628 are rolling-element bearings that use liquid lubricants (e.g., oil-based lubricants, water-based lubricants, silicone-based lubricants, etc.) to reduce friction between the inner race, the outer race, and/or rolling elements of the radial motor bearings 3628. The example rotors 3626 and/or the example rotor shaft 3620 produce radial loads and axial loads that the radial motor bearings 3628 support. Additionally or alternatively, thrust bearings may be used in the axial flux motor to support the axial loads that the rotors 3626 and/or the rotor shaft 3620 produce. Additionally or alternatively, the axial flux motor may include thrust bearings to support the axial loads that the rotors 3626 and/or the rotor shaft 3620 produce.

The example pump system 3600 illustrated in FIG. 36 includes the motor housing 3630 to support the stator 3624 and/or the pump housing 3608 of the pump system 3600. In some examples, the motor housing 3630 is one additively manufactured and/or subtractive manufactured part to accommodate the stator 3624, the rotors 3626, the radial motor bearings 3628, the rotor shaft 3620, the coupling shaft 3618, the barrier can 3616, the outer hub 3614, the inner hub 3612, the magnetic coupling 3610, a portion of the mounting flange 3632, and/or a portion of the pump housing 3608. In the illustrated example of FIG. 36, the motor housing 3630 includes different parts manufactured separately (e.g., via additive manufacturing and/or subtractive manufacturing) and assembled together (e.g., via bolts, adhesives, dowels, pins, and/or interference fits) to accommodate the stator 3624, the rotors 3626, the radial motor bearings 3628, the rotor shaft 3620, the coupling shaft 3618, the barrier can 3616, the outer hub 3614, the inner hub 3612, the magnetic coupling 3610, a portion of the mounting flange 3632, and/or a portion of the pump housing 3608 without interfering with the stator 3624, the rotors 3626, the radial motor bearing 3628, the motor housing 3630, and/or the mounting flange 3632.

The example pump system 3600 illustrated in FIG. 36 includes the mounting flange 3632 to mount the example pump system 3600 to a surface (e.g., wall, assembled bars, beam(s), etc.). The example mounting flange 3632 includes holes through which fasteners (e.g., bolts, pins, clamps, etc.) can fit and attach the mounting flange 3632 to the mounting surface. The mounting flange 3632 of FIG. 36 is made of materials (e.g., aluminum, steel, titanium, etc.) that are strong enough to withstand bending and/or shearing stresses the pump system 3600 may impose on the mounting flange 3632 during operation and/or non-operation. The motor housing 3630 is connected to the mounting flange 3632 via one or more fasteners (e.g., bolts, adhesives, interference fits, etc.), and may be fastened to the mounting flange 3632 before the example mounting flange 3632 is mounted to the mounting surface. In some examples, the motor housing 3630 and the mounting flange 3632 are the same part via additive manufacturing and/or subtractive manufacturing. In some examples, the mounting flange 3632 is not included in the pump system 3600, and the motor housing 3630 directly contacts the mounting surface. Additionally or alternatively, the example motor housing 3630 includes holes (e.g., threaded holes, clearance holes, etc.) in which one or more fasteners (e.g., bolts, dowels, interference fits, etc.) can fit to attach the pump system 3600 to the mounting surface.

Figure 37:
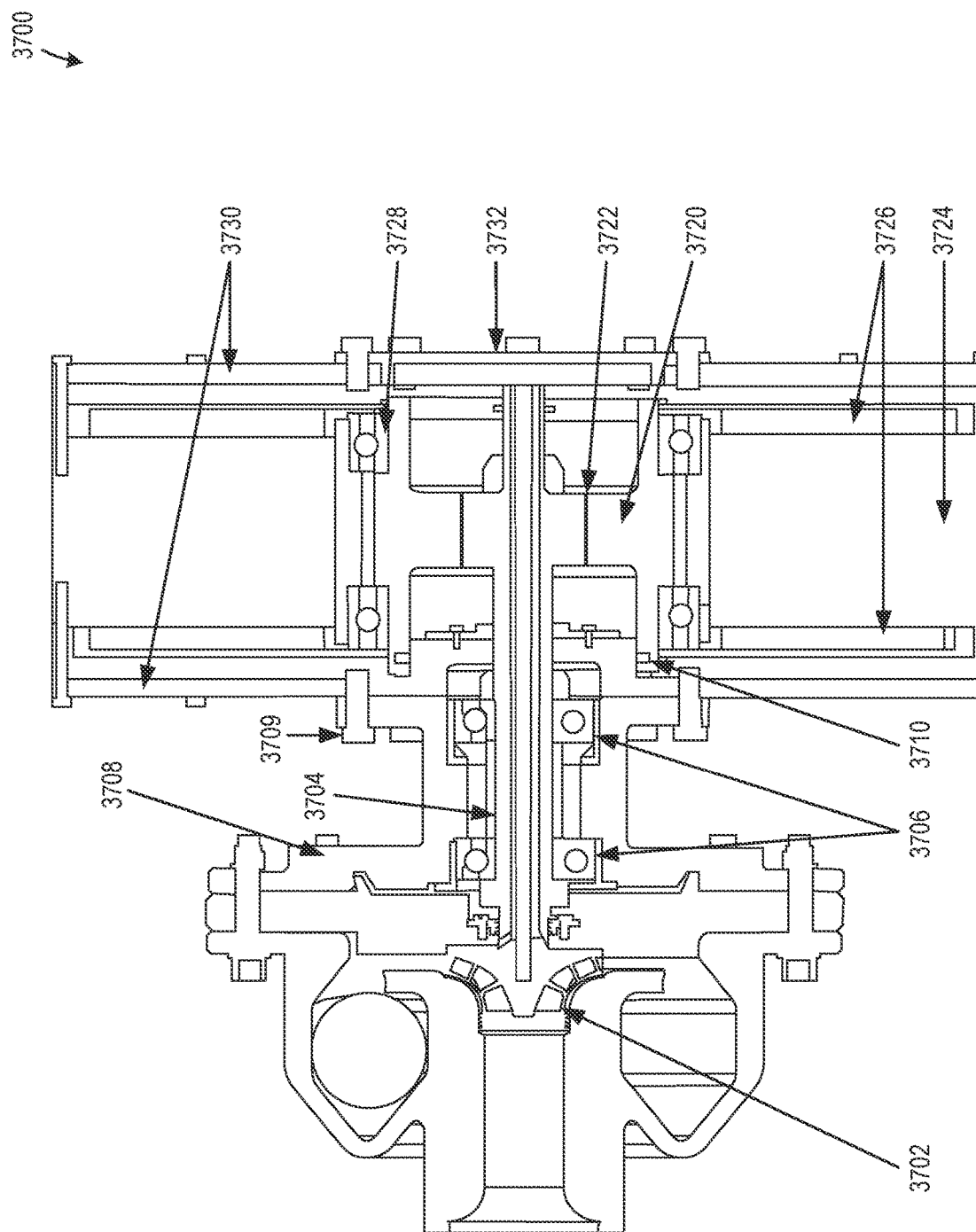
FIG. 37 illustrates a second example axial flux motor driven pump system for pressurizing fluid in closed loop systems in accordance with the teachings of this disclosure.

FIG. 37 illustrates a cross-sectional view of an axial flux motor driven pump system 3700 ("pump system 3700") for pressurizing fluid (e.g., supercritical fluid (sCO2)) in a closed loop system (e.g., thermal management system 200 of FIG. 3). In some examples, the pump system 3700 is used to pump sCO2 through a thermal management system on an aircraft (e.g., aircraft 10 of FIG. 1) and/or a gas turbine engine (e.g., gas turbine engine 100 of FIG. 2). As shown in FIG. 37, the pump system 3700 includes an impeller 3702, an impeller shaft 3704, radial impeller bearings 3706, a pump housing 3708, housing bolts 3709, a piston seal 3710, a rotor shaft 3720, a splined interface 3722, a stator 3724, rotors 3726, radial motor bearings 3728, a motor housing 3730, and a mounting flange 3732.

The example pump system 3700 illustrated in FIG. 37 includes the impeller 3702 to pressurize the example fluid (e.g., sCO2) in the example closed loop system (e.g., the thermal management system 200 of FIG. 3). The example impeller 3702 is a component of the pump system 3700 that is connected to the impeller shaft 3704 and rotates at a same rotational speed as the impeller shaft 3704. In some examples, the impeller 3702 is same as or similar to impellers used in centrifugal pumps and includes vanes and/or blades to deflect flow of the incoming fluid radially outward into outlet flowlines. The example impeller 3702 converts mechanical power of the motor (e.g., the stator 3724 and the rotors 3726) into hydrodynamic power of the flowing fluid.

The example pump system 3700 illustrated in FIG. 37 includes the impeller shaft 3704 to transfer torque from the motor (e.g., the stator 3724, the rotors 3726, and the rotor shaft 3720) to the impeller 3702. In some examples, the impeller shaft 3704 is a hollow shaft to conserve mass and includes a central rod along the axis of rotation of the impeller shaft 3704 to maintain axial alignment of the impeller shaft 3704. In some examples, the impeller shaft 3704 is manufactured with metallic materials (e.g., titanium, aluminum alloys, etc.) and/or composite materials (e.g., carbon fiber, Kevlar®, etc.) via additive manufacturing and/or subtractive manufacturing. The example impeller shaft 3704 is constructed as multiple parts included in an assembly, however, in some examples, the impeller shaft 3704 is fabricated as a single part and/or a preassembled structure.

The example pump system 3700 illustrated in FIG. 37 includes radial impeller bearings 3706 to support radial loads (e.g., weight, forced oscillations, etc.) of the impeller shaft 3704. The example radial impeller bearings 3706 illustrated in FIG. 37 are rolling-element bearings that include an inner race, an outer race, and rolling elements (e.g., balls, cylinders, etc.). The example radial impeller bearings 3706 can support the radial loads and thrust loads of the impeller shaft 3704 since the radial impeller bearings 3706 illustrated in FIG. 37 are rolling element bearings. For example, the impeller shaft 3704 may be attached to the inner races of the radial impeller bearings 3706 such that the impeller shaft 3704 could not move significantly far (e.g., less than 0.005 inches) in the axial direction. The example radial impeller bearings 3706 include dry lubricants (e.g., silver coating, graphite, molybdenum disulfide, etc.) to reduce frictional forces between the inner ring, the outer ring, and the rolling elements without a risk of contaminating the fluid that the pump system 3700 pressurizes. In some examples, the radial impeller bearings 3706 include liquid lubricants (e.g., oil-based lubricants, water-based lubricants, silicone-based lubricants, etc.) to reduce frictional forces between the inner ring, the outer ring, and the rolling elements, and the pump system 3700 includes an oil separator (e.g., oil separator 3216 of FIGS. 32-35) to remove liquid lubricants of the radial impeller bearings 3706 from the fluid (e.g., the sCO2).

In some examples, the radial impeller bearings 3706 are foil bearings that support the radial loads of the impeller shaft 3704. For examples in which the radial impeller bearings 3706 are foil bearings, the radial impeller bearings 3706 include a journal lining and a spring-loaded foil. For examples in which the radial impeller bearings 3706 are foil bearings, the spring-loaded foil supports the radial loads of the impeller shaft 3704 during start-up and stopping of the pump system 3700. For examples in which the radial impeller bearings 3706 are foil bearings, as the angular velocity of the impeller shaft 3704 increases, a working fluid (e.g., air, nitrogen, argon, etc.) gets pulled into the journal lining due to viscosity effects of the working fluid and a working fluid pressure within the example radial impeller bearings 3706 increases. For examples in which the radial impeller bearings 3706 are foil bearings, once the working fluid pressure within the journal lining increases to a certain threshold (e.g., 100 force-pounds per square inch (psi)), the spring-load foil gets pushed outward, and the working fluid pressure fully supports the radial loads of the impeller shaft 3704. For examples in which the radial impeller bearings 3706 are foil bearings, the radial impeller bearings 3706 do not support axial loads of the impeller shaft 3704, and no liquid lubricants are used. Therefore, if the example radial impeller bearings 3706 are foil bearings, the example impeller shaft 3704 includes one or more shafts and/or one or more disks attached to the impeller shaft 3704, oriented perpendicular to the axis of rotation, and protruding radially outward from the impeller shaft 3704, similar to thrust shafts 532, 632, 742 of FIGS. 5, 6, and/or 7. In some examples, if the radial impeller bearings 3706 are foil bearings, the example pump system 3700 includes thrust bearings (e.g., thrust bearings 534, 634, 744 of FIGS. 5, 6, and/or 7) to support axial loads of the impeller shaft via interfacing with the example thrust shafts.

The example pump system 3700 illustrated in FIG. 37 includes the pump housing 3708 to support the radial impeller bearings 3706. The example pump housing 3708 prevents the radial impeller bearings 3706 from moving significantly far (e.g., less than 0.005 inches) in the radial direction or axial direction. In the illustrated example of FIG. 37, the pump housing 3708 includes three separate parts assembled together via fasteners (e.g., bolts, screws, adhesives, etc.). In some examples, the parts of the pump housing 3708 are fabricated separately via additive manufacturing and/or subtractive manufacturing prior to assembly. In some examples, the pump housing 3708 is a single part fabricated via additive manufacturing and/or subtractive manufacturing. The example pump housing 3708 is fastened to the example motor housing 3730 via housing bolts 3709. Although two housing bolts 3709 are illustrated in FIG. 37, two or more housing bolts 3709 may be included in the pump system 3700.

The example pump system 3700 illustrated in FIG. 37 includes the piston seal 3710 to seal the fluid from the axial flux motor including the stator 3724, the rotors 3726, the radial motor bearings 3728, the motor housing 3730, and/or the mounting flange 3732. In some examples, the piston seal 3710 prevents fluid from entering the axial flux motor and/or the motor housing 3730, and in some examples, the piston seal 3710 permits a significantly small amount of fluid (e.g., less than 0.01 fluid ounces) into the motor housing 3730 while the example pump system 3700 operates. In some examples, the piston seal 3710 of example pump system 3700 is a single-acting piston seal that contains pressure on one side of the seal and blocks fluid from flowing from the high pressure side to the low pressure side. The example piston seal 3710 is located in and/or attached to a notch cut into the inner surface of the rotor shaft 3720. In some examples, the fluid is sCO2 pressurized to at least 1000 pounds per square inch (psi), and the piston seal 3710 is included in the rotor shaft 3720 to withstand the pressure differential between the fluid and the air pressure within the axial flux motor and to prevent and/or inhibit the fluid from contacting the stator 3724 and/or the rotors 3726.

The example pump system 3700 illustrated in FIG. 37 includes the rotor shaft 3720 to transfer torque from the axial flux motor (e.g., the rotors 3726) to the impeller shaft 3704 via the splined interface 3722. In some examples, the impeller shaft 3704 and the rotor shaft 3720 include splines (e.g., teeth, keys, ridges, v-cuts, etc.) and/or serrations that physically interlock creating the splined interface 3722. The splined interface 3722 is a physical connection at which the rotor shaft 3720 splines apply a force to the impeller shaft 3704 splines and, in turn, transfer a torque from the rotor shaft 3720 to the impeller shaft 3704. The example splined interface 3722 causes the impeller shaft 3704 to rotate at a same rate as the rotor shaft 3720.

The example pump system 3700 illustrated in FIG. 37 includes the stator 3724, the rotors 3726, and the radial motor bearings 3728 to provide mechanical power to the pump system 3700. The stator 3724, the rotors 3726, and the radial motor bearings 3728 of the example pump system 3700 are included in an axial flux motor of the system, which operates in accordance with the previous description above. In some examples, the stator 3724 includes electromagnetic coils that are wrapped around cores of ferrous material (e.g., soft iron, nickel, cobalt, etc.) such that the electromagnetic coils are aligned perpendicular to the axis of rotation and generate a magnetic flux parallel to the axis of rotation. The example stator 3724 supports and/or houses the example radial motor bearings 3728 such that the radial motor bearings 3728 do not move significantly far (e.g., less than 0.005 inches) from the intended position of the radial motor bearings 3728 in the pump system 3700 due to radial forces and/or axial forces that the rotors 3726 and/or the rotor shaft 3720 generate. The example rotors 3726 include a first rotor disk positioned on a front side of the stator 3724 and a second rotor disk positioned on a back side of the stator 3724. The example first rotor disk and the example second rotor disk include permanent magnets, and the magnetic flux(es) that the example stator 3724 generates attract and/or repel the permanent magnets. The example stator 3724 generates heat due to electrical resistances in the electromagnetic coils. In some examples, cooling channels, linings, pipes, jackets, etc. with flowing liquid coolants (e.g., water, oil, deionized water, inhibited glycol, dielectric fluids, heat exchange fluids such as supercritical fluids (e.g., sCO2, etc.)) are included in and/or surrounding the stator 3724 to transfer heat to the liquid coolants. In some examples, cooling fins and/or vents are fixed to the stator 3724 to transfer heat to ambient air.

The example rotors 3726 of the pump system 3700 are attached to the example rotor shaft 3720 via fasteners (e.g., bolts, pins, dowels, adhesives, magnetic forces, interference fits, etc.). In some examples, the rotors 3726 are also attached to inner race(s) and/or an outer race(s) of the radial motor bearings 3728. The example pump system 3700 illustrated in FIG. 37 includes the example radial motor bearings 3728 to support radial loads (e.g., weight, forced oscillation, etc.) that the rotor shaft 3720 generates. The example radial motor bearings 3728 of FIG. 37 also support radial loads of the rotors 3726 via the mechanical connection(s) (e.g., fasteners, adhesives, magnetic forces, interference fits, etc.) between the rotors 3726 and the rotor shaft 3720. The example radial motor bearings 3728 are rolling-element bearings that use liquid lubricants (e.g., oil-based lubricants, water-based lubricants, silicone-based lubricants, etc.) to reduce friction between the inner race, the outer race, and/or rolling elements of the radial motor bearings 3728. The example rotors 3726 and/or the example rotor shaft 3720 produce radial loads and axial loads that the radial motor bearings 3728 support. Additionally or alternatively, the axial flux motor may include thrust bearings to support the axial loads that the rotors 3726 and/or the rotor shaft 3720 produce.

The example pump system 3700 illustrated in FIG. 37 includes the motor housing 3730 to support the stator 3724 and/or the pump housing 3708 of the pump system 3700. In some examples, the motor housing 3730 is one additively manufactured and/or subtractive manufactured part to accommodate the stator 3724, the rotors 3726, the radial motor bearings 3728, the rotor shaft 3720, the piston seal 3710, a portion of the impeller shaft 3704, a portion of the mounting flange 3732, and/or a portion of the pump housing 3708. In the illustrated example of FIG. 37, the motor housing 3730 includes different parts manufactured separately (e.g., via additive manufacturing and/or subtractive manufacturing) and assembled together (e.g., via bolts, adhesives, dowels, pins, and/or interference fits) to accommodate the stator 3724, the rotors 3726, the radial motor bearings 3728, the rotor shaft 3720, the piston seal 3710, a portion of the impeller shaft 3704, a portion of the mounting flange 3732, and/or a portion of the pump housing 3708 without interfering with the stator 3724, the rotors 3726, the radial motor bearing 3728, the motor housing 3730, and/or the mounting flange 3732 in a way that would detract from a best mode use case of the example pump system 3700.

The example pump system 3700 illustrated in FIG. 37 includes the mounting flange 3732 to mount the example pump system 3700 to a surface (e.g., wall, assembled bars, beam(s), etc.). The example mounting flange 3732 includes holes through which fasteners (e.g., bolts, pins, clamps, etc.) can fit and attach the mounting flange 3732 to the mounting surface. The mounting flange 3732 of FIG. 37 is made of materials (e.g., aluminum, steel, titanium, etc.) that are strong enough to withstand bending and/or shearing stresses the pump system 3700 may impose on the mounting flange 3732 during operation and/or non-operation. The motor housing 3730 is connected to the mounting flange 3732 via one or more fasteners (e.g., bolts, adhesives, interference fits, etc.), and may be fastened to the mounting flange 3732 before the example mounting flange 3732 is mounted to the mounting surface. In some examples the motor housing 3730 and the mounting flange 3732 are the same part via additive manufacturing and/or subtractive manufacturing. In some examples, the mounting flange 3732 is not included in the pump system 3700, and the motor housing 3730 directly contacts the mounting surface. Additionally or alternatively, the example motor housing 3730 includes holes in which one or more fasteners (e.g., bolts, dowels, interference fits, etc.) can fit to attach the pump system 3700 to the mounting surface.

In some examples, the pump systems 3600, 3700 include means for increasing kinetic energy of a fluid. For example, the means for increasing may be implemented by the impellers 3602, 3702 and/or the impeller shafts 3604, 3704 of FIGS. 36 and/or 37. In some examples, the means for increasing may include an electric motor, an impeller shaft, and/or an impeller.

In some examples, the pump systems 3600, 3700 include means for providing torque. For example, the means for providing torque may be implemented by the stators 3624, 3724, the rotors 3626, 3726, and/or the coupling shaft 3618 of FIGS. 36 and/or 37. In some examples, the means for providing torque may include an electric motor, a stator, and/or a rotor.

In some examples, the pump systems 3600, 3700 include means for mounting the pump systems 3600, 3700. For example, the means for mounting may be implemented by the mounting flanges 3632, 3732 and/or the motor housings 3630, 3730 of FIGS. 36 and/or 37. In some examples, the means for mounting may include a flange, a housing, a plate, fasteners, and/or support structures.

In some examples, the pump systems 3600, 3700 include means for sealing. For example, the means for sealing may be implemented by the barrier can 3616 of FIG. 36 and/or the piston seal 3710 of FIG. 37. In some examples, the means for sealing may include a barrier can, a shroud, a piston seal, a hermetic seal, a gasket, and/or a diaphragm.

In some examples, the pump systems 3600, 3700 include means for first connecting. For example, the means for first connecting may be implemented by the magnetic coupling 3610 of FIG. 36 and/or the splined interface 3722 of FIG. 37. In some examples, the means for first connecting may include a magnetic coupling, a mechanical coupling, fasteners (e.g., bolts, adhesives, interference fits, welds, etc.), and/or a splined interface.

In some examples, pump systems 3600, 3700 include means for coupling. For example, the means for coupling may be implemented by the magnetic coupling 3610 of FIG. 36. In some examples, the means for coupling may include a magnetic coupling and/or a mechanical coupling (e.g., fasteners, adhesives, interference fits, etc.).

In some examples, the pump systems 3600, 3700 include means for second connecting. For example, the means for second connecting may be implemented by the splined interface 3622 of FIG. 36. In some examples, the means for second connecting may include a splined interface, a mechanical coupling, a magnetic coupling, and/or a mechanical fastener.

In some examples, the pump systems 3600, 3700 include means for supporting. For example, the means for supporting may be implemented by the pump housings 3608, 3708, the motor housings 3630, 3730, the radial impeller bearings 3606, 3706, and/or the radial motor bearings 3628, 3728 of FIGS. 36 and/or 37. In some examples, the means for supporting may include additively manufactured housings, subtractive manufactured housings, rolling-element bearings, and/or foil bearings.

In some examples, the pump systems 3600, 3700 include means for transferring heat. In some examples, the means for transferring may include a cooling jacket (e.g., cooling jacket 416 of FIG. 4, cooling jackets 514, 614, 714 of FIGS. 5-7, etc.), cooling fins, cooling vents, and/or coolant flowlines.

In some examples, the pump systems 3600, 3700 include means for attaching. In some examples, the means for attaching may include mechanical fasteners (e.g., bolts, dowels, screws, etc.) and/or magnetic couplings. In some examples, the means for attaching include a configuration of a first housing (e.g., the pump housings 3608, 3708 of FIGS. 36, 37) to be removable from a second housing (e.g., the motor housings 3630, 3730 of FIGS. 36, 37).

In some examples, pump systems 3600, 3700 include means for separating. For example, the means for separating may be implemented by the oil separator 3216 of FIGS. 32-35. In some examples, the means for separating may include an oil separator, a filter, an extractor, and/or a purifier.

Example axial flux motor driven pump systems for pressurizing fluid in closed loop systems are disclosed herein. The example axial flux motor driven pump systems disclosed herein include an axial flux motor to provide torque to a pump while reducing the axial length of the pump system relative to example radial flux motor driven pump systems and moving the center of gravity closer to a mounting flange. The example axial flux motor driven pump systems disclosed herein thereby reduce the moment forces acting on the pump systems and/or the mounting flanges due to weight, forced oscillations, and/or vibrations, which, in turn, reduces wear and/or damage to the pump systems. The example axial flux motor driven pump systems disclosed herein include pumps that are designed as line replaceable units, which include a pump housing that is removable from the pump system without having to remove the entire pump system from the mounting surface. The example axial flux motor driven pump systems are, therefore, easier to maintain and/or repair than radial flux motor driven pump systems.

From the foregoing, it will be appreciated that example systems, methods, apparatus, and articles of manufacture have been disclosed that increase a pressure and/or a flow rate at which a fluid pump can drive a fluid (e.g., a heat transfer fluid such as a supercritical fluid (e.g., sCO2, etc.)). Specifically, the example systems, methods, apparatus, and articles of manufacture disclosed herein enable the impeller to be driven with a greater angular velocity that, in turn, enables the fluid to reach higher pressures and/or flow rates. Furthermore, the examples disclosed herein enable the pumps and/or pump systems to operate with fewer components and/or smaller components that enable a cost of the pump or pump system to be minimized or otherwise reduced.

The foregoing examples of the pumps can be used with thermal transport systems. Although each example pump or pump system disclosed above has certain features, it should be understood that it is not necessary for a particular feature of one example pump or pump system to be used exclusively with that example. Instead, any of the features described above and/or depicted in the drawings can be combined with any of the examples, in addition to or in substitution for any of the other features of the examples. Features of one example are not mutually exclusive to features of another example. Instead, the scope of this disclosure encompasses any combination of any of the features.

Further aspects of the present disclosure are provided by the subject matter of the following clauses:

Example methods, apparatus, systems, and articles of manufacture to pressurize fluid in closed loop systems are disclosed herein. Further examples and combinations thereof include the following:

Example 1 includes a pump system to pressurize a fluid within a closed loop transport bus, the pump system comprising an electric motor including a rotor shaft and a stator, a pump including an impeller coupled to an impeller shaft, a driver wheel attached to the rotor shaft, wherein the driver wheel is radially connected to a follower wheel, and a co-axial magnetic coupling to connect at least one of the follower wheel to the impeller shaft or the driver wheel to the rotor shaft, wherein the co-axial magnetic coupling includes an outer hub, an inner hub, and a barrier can, the barrier can to hermetically seal a portion of the pump system from the fluid.

Example 2 includes the pump system of any preceding clause, wherein the rotor shaft is to generate a first torque, the driver wheel is to transmit the first torque to the follower wheel, the follower wheel is to generate a second torque.

Example 3 includes the pump system of any preceding clause, wherein the driver wheel has a first diameter, wherein the follower wheel has a second diameter, and wherein the first diameter is greater than the second diameter.

Example 4 includes the pump system of any preceding clause, wherein the driver wheel is a first gear, wherein the follower wheel is a second gear, and wherein the first gear is radially connected to the second gear via interlocking gear teeth.

Example 5 includes the pump system of any preceding clause, wherein the driver wheel is a first pulley, wherein the follower wheel is a second pulley, and wherein the first pulley is radially connected to the second pulley via a drive belt.

Example 6 includes the pump system of any preceding clause, wherein the stator is inside of the rotor shaft, the rotor shaft is configured to be the driver wheel to transmit a first torque to the follower wheel, the follower wheel is to generate a second torque.

Example 7 includes the pump system of any preceding clause, wherein the pump system includes one or more additively manufactured housings to frame at least one of the stator, the rotor shaft, the impeller, the impeller shaft, or the co-axial magnetic coupling, the one or more additively manufactured housings to support at least one or more radial bearings or one or more thrust bearings, the one or more additively manufactured housings to configure an impeller shaft axis and a rotor shaft axis to be parallel and to be on separate planes.

Example 8 includes the pump system of any preceding clause, wherein the one or more radial bearings include at least one of foil bearings, rolling element bearings, hydrostatic bearings, or hydrodynamic bearings, the one or more radial bearings to support one or more radial loads produced by at least one of the impeller shaft, the rotor shaft, the co-axial magnetic coupling, the driver wheel, or the follower wheel.

Example 9 includes the pump system of any preceding clause, wherein the one or more thrust bearings include at least one of foil bearings, rolling element bearings, hydrostatic bearings, or hydrodynamic bearings, the one or more thrust bearings to support one or more thrust loads produced by at least one of the impeller shaft, the rotor shaft, the co-axial magnetic coupling, the driver wheel, or the follower wheel.

Example 10 includes the pump system of any preceding clause, wherein the one or more additively manufactured housings include one or more cooling jackets to dissipate heat from the electric motor to at least one of ambient air or fluid coolant.

Example 11 includes a pump system to pressurize a fluid within a closed loop transport bus, the pump system comprising an electric motor including a rotor shaft and a stator, wherein the stator is to induce a first angular velocity of the rotor shaft, a pump including an impeller coupled to an impeller shaft, wherein the impeller shaft is to rotate at a second angular velocity, and wherein the pump is to increase a kinetic energy of the fluid, a driver wheel fixed to the rotor shaft, wherein the driver wheel is radially connected to a follower wheel, and a co-axial magnetic coupling to couple at least one of the follower wheel to the impeller shaft or the driver wheel to the rotor shaft, wherein the co-axial magnetic coupling includes an outer hub, an inner hub, and a barrier can, the barrier can to hermetically seal a portion of the pump system from the fluid.

Example 12 includes the pump system of any preceding clause, wherein the driver wheel is to transfer the first angular velocity to the follower wheel, the follower wheel to rotate at the second angular velocity.

Example 13 includes the pump system of any preceding clause, wherein the driver wheel has a first diameter, wherein the follower wheel has a second diameter, and wherein the first diameter is greater than the second diameter.

Example 14 includes the pump system of any preceding clause, wherein the driver wheel is a first gear, wherein the follower wheel is a second gear, and wherein the first gear is radially connected to the second gear via interlocking gear teeth.

Example 15 includes the pump system of any preceding clause, wherein the driver wheel is a first pulley, wherein the follower wheel is a second pulley, and wherein the first pulley is radially connected to the second pulley via a drive belt.

Example 16 includes the pump system of any preceding clause, wherein the stator is inside of the rotor shaft, wherein the rotor shaft includes one or more gear teeth protruding outward on the rotor shaft, the driver wheel to transfer the first angular velocity to the follower wheel, the follower wheel to rotate at the second angular velocity.

Example 17 includes the pump system of any preceding clause, wherein the pump system includes one or more additively manufactured housings to frame at least one of the stator, the rotor shaft, the impeller, the impeller shaft, or the co-axial magnetic coupling, the one or more additively manufactured housings to support at least one or more radial bearings or one or more thrust bearings, the one or more additively manufactured housings to configure an impeller shaft axis and a rotor shaft axis to be parallel and to be on separate planes.

Example 18 includes the pump system of any preceding clause, wherein the one or more radial bearings include at least one of foil bearings, rolling element bearings, hydrostatic bearings, or hydrodynamic bearings, the one or more radial bearings to support one or more radial loads produced by at least one of the impeller shaft, the rotor shaft, the co-axial magnetic coupling, the driver wheel, or the follower wheel.

Example 19 includes the pump system of any preceding clause, wherein the one or more thrust bearings include at least one of foil bearings, rolling element bearings, hydrostatic bearings, or hydrodynamic bearings, the one or more thrust bearings to support one or more thrust loads produced by at least one of the impeller shaft, the rotor shaft, the co-axial magnetic coupling, the driver wheel, or the follower wheel.

Example 20 includes the pump system of any preceding clause, wherein the one or more additively manufactured housings include a cooling jacket to dissipate heat from the electric motor to at least one of ambient air or fluid coolant.

Example 21 includes a pump system to pressurize a fluid within a closed loop transport bus, the pump system comprising means for rotating a driver wheel, wherein the means for rotating is to exert a first torque on the driver wheel, and wherein the means for rotating is to generate a first angular velocity of the driver wheel based on the first torque, means for accelerating a flow rate of the fluid, wherein the means for accelerating is to rotate an impeller shaft at a second angular velocity based on a second torque, means for converting the first torque of the driver wheel into the second torque of a follower wheel, wherein the means for converting is to generate the second angular velocity of the follower wheel based on the second torque, and means for connecting at least one of the follower wheel to the impeller shaft or the driver wheel to a rotor shaft, wherein the means for connecting is to hermetically seal a portion of the pump system from the fluid.

Example 22 includes the pump system of any preceding clause, wherein the means for connecting is to transfer at least one of the first torque or the second torque from a first shaft to a second shaft.

Example 23 includes the pump system of any preceding clause, further including means for framing at least one of a stator, the rotor shaft, an impeller, the impeller shaft, or a co-axial magnetic coupling, wherein the means for framing is to support at least one or more radial bearings or one or more thrust bearings, and wherein the means for framing is to configure an impeller shaft axis and a rotor shaft axis in parallel and on separate planes.

Example 24 includes the pump system of any preceding clause, wherein the means for framing is to transfer heat from an electric motor to at least one of ambient air or fluid coolant.

Example 25 includes a pump system to pressurize a fluid within a closed loop transport bus, the pump system comprising a pump, including an impeller, an electric motor, including a rotor shaft connected to the impeller, a first bearing to support the rotor shaft at a first operational speed range, the first bearing coupled to an inner race, a second bearing to support the rotor shaft at a second operational speed range, the rotor shaft coupled to an outer race, and one or more sprag elements configured to engage the inner race with the outer race at the first operational speed range, and disengage the inner race from the outer race at the second operational speed range.

Example 26 includes the pump system of any preceding clause, wherein the first bearing is a rolling element bearing including at least one of an angular contact ball bearing, a hybrid ceramic bearing, a taper roller bearing, a deep groove single ball bearing, a duplex ball bearing, or a spherical bearing.

Example 27 includes the pump system of any preceding clause, wherein the first bearing is to be lubricated by an oil lubricant, further including a separator to separate the oil lubricant from the fluid, a portion of the oil lubricant to be mixed with the fluid.

Example 28 includes the pump system of any preceding clause, wherein the second bearing is a foil bearing.

Example 29 includes the pump system of any preceding clause, wherein, in response to the rotor shaft rotating in a first direction about a rotor axis at the first operational speed range, the one or more sprag elements rotate in a second direction about a sprag rotation axis, the second direction different than the first direction.

Example 30 includes the pump system of any preceding clause, wherein, in response to the rotor shaft rotating in a first direction about a rotor axis at the second operational speed range, the one or more sprag elements rotate in a second direction about a sprag rotation axis, the second direction same as the first direction.

Example 31 includes the pump system of any preceding clause, wherein the one or more sprag elements are configured to rotate in the second direction in response to a centrifugal force acting on a portion of the one or more sprag elements, the centrifugal force generated in response to the pump system operating at the second operational speed range.

Example 32 includes the pump system of any preceding clause, wherein the one or more sprag elements include at least one of a solid lubricant or an oil mist lubricant, the solid lubricant including a silver coating.

Example 33 includes the pump system of any preceding clause, wherein the first operational speed range includes tangential velocities that are less than a foil bearing lift off speed.

Example 34 includes the pump system of any preceding clause, wherein the second operational speed range includes tangential velocities that are greater than a foil bearing lift off speed.

Example 35 includes the pump system of any preceding clause, further including a thrust bearing to support a thrust load generated by the rotor shaft, the thrust bearing including at least one of a thrust foil bearing or a thrust magnetic bearing.

Example 36 includes an integrated bearing system to dynamically support shafts in a pump system, the pump system to pressurize a fluid within a closed loop transport bus, the integrated bearing system comprising a shaft connected to an impeller of the pump system, a first bearing to support the shaft at a first operational speed range, the first bearing coupled to an inner race, a second bearing to support the shaft at a second fluid speed range, the shaft coupled to an outer race, and one or more sprag elements configured to engage the inner race with the outer race at the first operational speed range, and disengage the inner race from the outer race at the second operational speed range.

Example 37 includes the integrated bearing system of any preceding clause, wherein the first bearing is a rolling element bearing including at least one of an angular contact ball bearing, a hybrid ceramic bearing, a taper roller bearing, a deep groove single ball bearing, a duplex ball bearing, or a spherical bearing.

Example 38 includes the integrated bearing system of any preceding clause, wherein the first bearing is to be lubricated by an oil lubricant, further including a separator to separate the oil lubricant from the fluid, a portion of the oil lubricant to be mixed with the fluid.

Example 39 includes the integrated bearing system of any preceding clause, wherein the second bearing is a foil bearing.

Example 40 includes the integrated bearing system of any preceding clause, wherein, in response to the shaft rotating in a first direction about a shaft axis at the first operational speed range, the one or more sprag elements rotate in a second direction about a sprag rotation axis, the second direction different than the first direction.

Example 41 includes the integrated bearing system of any preceding clause, wherein, in response to the shaft rotating in a first direction about a rotor axis at the second operational speed range, the one or more sprag elements rotate in a second direction about a sprag rotation axis, the second direction same as the first direction.

Example 42 includes the integrated bearing system of any preceding clause, wherein the one or more sprag elements are configured to rotate in the second direction in response to a centrifugal force acting on a portion of the one or more sprag elements, the centrifugal force generated in response to the pump system operating at the second operational speed range.

Example 43 includes the pump system of any preceding clause, wherein the one or more sprag elements include at least one of a solid lubricant or an oil mist lubricant, the solid lubricant including a silver coating.

Example 44 includes the pump system of any preceding clause, wherein the first operational speed range includes tangential velocities that are less than a foil bearing lift off speed.

Example 45 includes the pump system of any preceding clause, wherein the second operational speed range includes tangential velocities that are greater than a foil bearing lift off speed.

Example 46 includes a pump system to pressurize a fluid within a closed loop supercritical transport bus, the pump system comprising means for increasing kinetic energy of the fluid flowing through the pump system, means for providing torque to a rotor shaft of the pump system, means for first supporting the rotor shaft at a first operational speed range, means for second supporting the rotor shaft at a second operational speed range, and means for engaging an inner race with an outer race at the first operational speed range.

Example 47 includes the pump system of any preceding clause, wherein the means for engaging is to, in response to the rotor shaft rotating in a first direction about a rotor axis at the second operational speed range, disengage the inner race from the outer race based on a centrifugal force generated by the rotor shaft.

Example 48 includes the pump system of any preceding clause, wherein, in response to the rotor shaft rotating in a first direction about a rotor axis at the second operational speed range, the means for engaging is to rotate in a second direction about a sprag rotation axis, the second direction same as the first direction.

Example 49 includes the pump system of any preceding clause, further including means for separating one or more liquids from the fluid, the one or more liquids including oil.

Example 50 includes a shroud for a pump comprising an inner shell including a first non-metallic material, an outer shell including the first non-metallic material or a second non-metallic material, and a metal core shell positioned between the inner shell and the outer shell.

Example 51 includes the shroud of any preceding clause, wherein the metal core shell is electroformed.

Example 52 includes the shroud of any preceding clause, wherein at least one of the inner shell or the outer shell is formed via thermal spraying.

Example 53 includes the shroud of any preceding clause, wherein the inner shell is formed via at least one of molding or casting.

Example 54 includes the shroud of any preceding clause, wherein the first non-metallic material and the second non-metallic material include at least one of a ceramic, a polymer, or a composite.

Example 55 includes the shroud of any preceding clause, wherein the inner shell includes a first thickness, the outer shell includes the first thickness or a second thickness, and the metal core shell includes a third thickness greater than the first thickness and the second thickness.

Example 56 includes the shroud of any preceding clause, wherein the inner shell includes ridges extending away from a cavity defined by the shroud, the ridges spaced apart along a circumference of the inner shell.

Example 57 includes the shroud of any preceding clause, wherein an outer surface of the metal core shell is fully in contact with an inner surface of the outer shell.

Example 58 includes a canned motor pump comprising a first shaft, a second shaft at least partially positioned around the first shaft, the second shaft magnetically engaged with the first shaft, and a shroud positioned between the first shaft and the second shaft, the shroud including a metallic core layer, a first non-metallic layer positioned between the metallic core layer and the first shaft, and a second non-metallic layer positioned between the metallic core layer and the second shaft.

Example 59 includes the canned motor pump of any preceding clause, wherein the metallic core layer includes at least one of nickel or cobalt.

Example 60 includes the canned motor pump of any preceding clause, wherein the first non-metallic layer includes a first portion having a first thickness and a second portion having a second thickness greater than the first thickness.

Example 61 includes the pump system of any preceding clause, wherein the metallic core layer includes a first portion having a first outer diameter and a second portion having a second outer diameter.

Example 62 includes the canned motor pump of any preceding clause, wherein the first non-metallic layer and the second non-metallic layer include at least one of a ceramic material, a composite material, or a polymer material.

Example 63 includes the canned motor pump of any preceding clause, wherein the first non-metallic layer and the second non-metallic layer include at least one of alumina, zirconia, or silicon.

Example 64 includes the canned motor pump of any preceding clause, wherein the shroud includes a flange, further including a retainer ring to secure the flange against a housing of the canned motor pump.

Example 65 includes a magnetically driven pump comprising means for housing a fluid, means for compressing the fluid, and means for sealing the means for housing, the means for sealing including first means for insulating to define an inner surface of the means for sealing, second means for insulating to define an outer surface of the means for sealing, and means for supporting the first means for insulating and the second means for insulating, the means for supporting to fill an area defined between the first means for insulating and the second means for insulating.

Example 66 includes the magnetically driven pump of any preceding clause, wherein the means for supporting is electroformed over the first means for insulating.

Example 67 includes the magnetically driven pump of any preceding clause, wherein at least one of the first means for insulating or the second means for insulating is formed via thermal spraying.

Example 68 includes the magnetically driven pump of any preceding clause, wherein at least one of the first means for insulating or the means for supporting includes means for stiffening.

Example 69 includes the magnetically driven pump of any preceding clause, wherein the fluid is a first means for dissipating heat in contact with the first means for insulating, further including a second means for dissipating heat in contact with the second means for insulating Example 70 includes a method of manufacturing a shroud for a canned motor pump comprising forming an inner shell, electroforming a core shell on an outer surface of the inner shell, and forming an outer shell on an outer surface of the core shell.

Example 71 includes a method of manufacturing a shroud for a canned motor pump comprising forming an inner shell, forming an outer shell, and electroforming a core shell on an outer surface of the inner shell or on an inner surface of the outer shell.

Example 72 includes the method of any preceding clause, wherein forming the inner shell includes at least one of molding, casting, or thermal spraying the inner shell.

Example 73 includes the method of any preceding clause, wherein forming the inner shell includes forming ribs protruding from an outer surface of the inner shell.

Example 74 includes the method of any preceding clause, wherein forming the outer shell includes thermal spraying the outer shell on the outer surface of the core shell.

Example 75 includes the method of any preceding clause, wherein at least one of forming the inner shell or forming the outer shell includes machining or grinding an inner surface of the inner shell or an outer surface of the outer shell.

Example 76 includes the canned motor pump of any preceding clause, wherein the first non-metallic layer includes a first thickness and a second thickness greater than the first thickness, the first thickness and the second thickness alternating in a circumferential direction defined by the first non-metallic layer.

Example 77 includes the canned motor pump of any preceding clause, further including an O-ring positioned between the barrier can and the retainer ring Example 78 includes the canned motor pump of any preceding clause, wherein the retainer ring is coupled to the housing via bolts.

Example 79 includes the canned motor pump of any preceding clause, wherein the retainer ring includes a first portion having a first diameter and a second portion having a second diameter smaller than the first diameter, the flange including a third diameter between the first diameter and the second diameter.

Example 80 includes the canned motor pump of any preceding clause, wherein the first portion of the retainer ring is to interface with the housing, and the second portion of the retainer ring is separated from the housing by a distance corresponding to a thickness of the flange such that the second portion of the retainer ring presses the flange against the housing when the retainer ring is coupled to the housing.

Example 81 includes the canned motor pump of any preceding clause, wherein the first non-metallic layer is in contact with a first fluid and the second non-metallic layer is in contact with a second fluid different from the first fluid, wherein the barrier can is to exchange thermal energy with at least one of the first fluid or the second fluid.

Example 82 includes the magnetically driven pump of any preceding clause, wherein the first means for insulating includes circumferentially spaced ribs extending away from a cavity defined by the means for sealing.

Example 83 includes the shroud of any preceding clause, wherein the metal core shell includes a thickness as small as 0.005 inches.

Example 84 includes the shroud of any preceding clause, wherein an inner surface of the metal core shell is fully in contact with an outer surface of the inner shell.

Example 85 includes a shroud for a fluid pump comprising an inner shell including a thermoplastic composite or a metal, and an outer shell including a composite material.

Example 86 includes the shroud of any preceding clause, wherein the inner shell includes a nickel-based alloy.

Example 87 includes the shroud of any preceding clause, wherein the thermoplastic composite is a polyamide-imide Example 88 includes the shroud of any preceding clause, wherein the thermoplastic composite is a polyetheretherketone.

Example 89 includes the shroud of any preceding clause, wherein the inner shell is formed via machining rods of the thermoplastic composite.

Example 90 includes the shroud of any preceding clause, wherein the outer shell is formed in layers on the inner shell.

Example 91 includes the shroud of any preceding clause, wherein the inner shell is electroformed on an inner surface of the outer shell.

Example 92 includes the shroud of any preceding clause, wherein the composite material includes an epoxy resin.

Example 93 includes the shroud of any preceding clause, wherein the composite material includes at least one of carbon fibers or graphite fibers.

Example 94 includes the shroud of any preceding clause, wherein at least one of the carbon fibers or the graphite fibers are positioned in more than one orientation.

Example 95 includes the shroud of any preceding clause, wherein the composite material includes fibers positioned in a first orientation, a second orientation different from the first orientation, a third orientation different from the first orientation and the second orientation, and a fourth orientation different from the first orientation, the second orientation, and the third orientation.

Example 96 includes the shroud of any preceding clause, wherein the first orientation is substantially orthogonal to the second orientation.

Example 97 includes the shroud of any preceding clause, wherein the third orientation is substantially orthogonal to the fourth orientation.

Example 98 includes the shroud of any preceding clause, wherein the outer shell includes a thickness between 25 mils and 150 mils.

Example 99 includes a magnetically driven pump comprising a first shaft, a second shaft at least partially positioned around the first shaft, the second shaft magnetically engaged with the first shaft, and a shroud positioned between the first shaft and the second shaft, the shroud including a composite shell, and a liner positioned along an inner surface of the composite shell, the liner including a thermoplastic or a metal.

Example 100 includes the magnetically driven pump of any preceding clause, wherein the composite shell includes pores.

Example 101 includes the magnetically driven pump of any preceding clause, wherein the composite shell includes fibers and an epoxy resin.

Example 102 includes the magnetically driven pump of any preceding clause, wherein the fibers are positioned in at least three distinct orientations.

Example 103 includes the magnetically driven pump of any preceding clause, wherein the fibers include at least one of carbon or graphite.

Example 104 includes the magnetically driven pump of any preceding clause, wherein a ratio of eddy current loss caused by the shroud to a thickness of the liner is less than 0.06.

Example 105 includes the magnetically driven pump of any preceding clause, wherein the liner includes a nickel-chromium based alloy.

Example 106 includes a shroud for a canned motor pump, the shroud comprising a composite shell including first fibers in a first orientation and second fibers in a second orientation, the first orientation substantially orthogonal to the second orientation, and an inner shell including a thermoplastic or a metal.

Example 107 includes the shroud of any preceding clause, wherein the composite shell includes third fibers in a third orientation and fourth fibers in a fourth orientation, the third orientation substantially orthogonal to the fourth orientation.

Example 108 includes a method for forming a shroud for a magnetically driven pump, the method comprising forming a shell, machining an inner surface of the shell, and forming a liner along the inner surface of the shell.

Example 109 includes the method of any preceding clause, wherein forming the shell includes molding the shell.

Example 110 includes the method of any preceding clause, wherein forming the shell includes orienting fibers in more than one orientation.

Example 111 includes the method of any preceding clause, wherein forming the shell includes binding the fibers via an epoxy resin.

Example 112 includes the method of any preceding clause, wherein forming the liner includes electroforming the liner on the inner surface of the shell.

Example 113 includes the method of any preceding clause, wherein forming the liner includes injection molding the liner on the inner surface of the shell.

Example 114 includes a method for forming a shroud for a magnetically driven pump, the method comprising forming an inner shell, and layering an outer shell on an outer surface of the inner shell.

Example 115 includes the method of any preceding clause, wherein the inner shell is formed via machining rods of thermoplastic.

Example 116 includes the method of any preceding clause, wherein layering the outer shell includes layering a first layer of the outer shell on the outer surface of the inner shell, and layering a second layer of the outer shell on the first layer.

Example 117 includes the method of any preceding clause, further including thermosetting the first layer in advance of layering the second layer on the first layer.

Example 118 includes the method of any preceding clause, further including orienting fibers in at least one of the first layer or the second layer.

Example 119 includes the method of any preceding clause, further including orienting fibers in more than one orientation in at least one of the first layer or the second layer.

Example 119 includes the method of any preceding clause, wherein orienting the fibers includes positioning a first set of fibers in a first orientation, and positioning a second set of fibers in a second orientation substantially orthogonal to the first orientation.

Example 120 includes the method of any preceding clause, wherein orienting the fibers further includes positioning a third set of fibers in a third orientation different from the first orientation and the second orientation, and positioning a fourth set of fibers in a fourth orientation substantially orthogonal to the third orientation.

Example 121 includes the method of any preceding clause, wherein the inner shell is formed via electroforming.

Example 122 includes the shroud of any preceding clause, wherein the inner shell includes a thickness as small as 2 mils.

Example 123 includes the magnetically driven pump of any preceding clause, wherein the shroud is to withstand a pressure of 6400 pounds per square inch absolute.

Example 124 includes the magnetically driven pump any preceding clause wherein the fibers are positioned in at least three distinct orientations.

Example 125 includes a pump system to pressurize a supercritical fluid within a closed loop thermal transport bus, the pump system comprising a pump housing, a duct fluidly coupled to the pump housing, a first portion of the duct to include a mixture of an oil and the supercritical fluid, a second portion of the duct to include the supercritical fluid, and a separator positioned in a third portion of the duct between the first portion of the duct and the second portion of the duct, the separator to separate the oil in the mixture from the supercritical fluid.

Example 126 includes the pump system of any preceding clause, wherein the separator includes a rotatable shaft and vanes extending from the rotatable shaft.

Example 127 includes the pump system of any preceding clause, wherein the separator includes a conical swirler, the conical swirler including open axial ends and holes in a surface between the open axial ends.

Example 128 includes the pump system of any preceding clause, wherein the separator includes a rotatable shaft including vanes, and a casing positioned around the rotatable shaft, the casing including holes facing the rotatable shaft.

Example 129 includes the pump system of any preceding clause, wherein the casing is stationary within the duct.

Example 130 includes the pump system of any preceding clause, wherein the rotatable shaft rotates in a first direction and the casing rotates in a second direction opposite the first direction.

Example 131 includes the pump system of any preceding clause, wherein the separator includes a swirler and a filter positioned in series in the third portion of the duct.

Example 132 includes the pump system of example 1, wherein the duct is fluidly coupled to a first portion of the pump housing and a second portion of the pump housing.

Example 133 includes the pump system of any preceding clause, further including a rotatable shaft disposed in the pump housing, a motor coupled to the rotatable shaft, and an impeller coupled to an end of the rotatable shaft.

Example 134 includes the pump system of any preceding clause, wherein the rotatable shaft is mounted in the pump housing via rolling element bearings, wherein the rolling element bearings are lubricated with the oil.

Example 135 includes the pump system of any preceding clause, wherein the end of the rotatable shaft is a first end, wherein the rotatable shaft includes a second end opposite the first end, a first portion of the rotatable shaft disposed between the first end and the motor, a second portion of the rotatable shaft disposed between the second end and the motor, further including a first bearing coupled to the first portion of the rotatable shaft, the first bearing including a first stiffness, and a second bearing coupled to the second portion of the rotatable shaft, the second bearing including a second stiffness greater than the first stiffness.

Example 136 includes the pump system of any preceding clause, further including a first rotatable shaft disposed in the pump housing, a motor coupled to the first rotatable shaft, a second rotatable shaft disposed in the pump housing, a gearbox to rotatably couple the first rotatable shaft and the second rotatable shaft, wherein the gearbox is lubricated with the oil, and an impeller coupled to an end of the second rotatable shaft.

Example 137 includes a pump system to pressurize a supercritical fluid within a closed loop thermal transport bus, the pump system comprising a pump housing, a duct fluidly coupled to the pump housing to transport the supercritical fluid and an oil, and a separator including an oil absorbent material positioned in the duct to separate the oil from the supercritical fluid.

Example 138 includes the pump system of any preceding clause, wherein the oil absorbent material includes at least one of a polymer or a powder.

Example 139 includes the pump system of any preceding clause, wherein the separator includes baffles.

Example 140 includes the pump system of any preceding clause, wherein the baffles are formed via sheet metals or additive manufacturing.

Example 141 includes the pump system of any preceding clause, wherein the separator includes a first conduit fluidly coupled to a second conduit below the first conduit, the second conduit including the oil absorbent material.

Example 142 includes the pump system of any preceding clause, wherein the oil is mixed with an additive to increase a viscosity of the oil.

Example 143 includes a pump system to pressurize a supercritical fluid within a closed loop thermal transport bus, the pump system comprising means for compressing fluid, wherein the fluid includes a supercritical fluid and an oil, means for housing the means for compressing fluid, means for transporting the fluid coupled to the means for housing, and means for separating the supercritical fluid and the oil positioned in the means for transporting.

Example 144 includes the pump system of any preceding clause, further including means for rotating the means for compressing fluid, and means for increasing an angular velocity of the means for compressing fluid relative to the means for rotating.

Example 145 includes the pump system of any preceding clause, further including an eductor in the first portion of the duct.

Example 146 includes the pump system of any preceding clause, wherein the vanes are helical vanes.

Example 147 includes the pump system of any preceding clause, wherein the first portion of the duct is fluidly coupled to the first portion of the pump housing and the second portion of the pump housing.

Example 148 includes the pump system of any preceding clause, wherein the first portion of the duct is fluidly coupled to the first portion of the pump housing, and wherein the second portion of the duct is fluidly coupled to the second portion of the pump housing.

Example 149 includes the pump system of any preceding clause, wherein the end of the rotatable shaft is a first end, wherein the rotatable shaft includes a second end opposite the first end, a first portion of the rotatable shaft disposed between the first end and the motor, a second portion of the rotatable shaft disposed between the second end and the motor, further including a squirrel cage coupled to the first portion of the rotatable shaft, and a damper coupled to the second portion of the rotatable shaft.

Example 150 includes the pump system of any preceding clause, wherein the oil absorbent material includes at least one of polyurethane, polypropylene, polyethylene, cross-linked polymers, talc, aluminum starch, rice starch, or silica.

Example 151 includes the pump system of any preceding clause, further including means for rotating the means for compressing, wherein the means for rotating is separated from the means for compressing by a first distance, first means for supporting the means for rotating, the first means for supporting including a first stiffness, wherein the first means for supporting is separated from the means for compressing by a second distance greater than the first distance, and second means for supporting the means for rotating, the second means for supporting including a second stiffness different from the first stiffness, wherein the second means for supporting is separated from the means for compressing by a third distance less than the first distance.

Example 152 includes a pump system comprising a pump housing a rotatable shaft disposed in the pump housing, a motor coupled to the rotatable shaft in the pump housing, an impeller coupled to an end of the rotatable shaft, oil lubricated bearings to mount the rotatable shaft, a duct fluidly coupled to the pump housing, and a separator positioned in the duct to separate oil from other fluid transported via the duct.

Example 153 includes a pump system to pressurize a fluid within a closed loop fluid transport bus, the pump system comprising an impeller coupled to an impeller shaft, an axial flux electric motor including rotors, a rotor shaft connected to the rotors, wherein the rotor shaft is coupled to the impeller shaft, a seal to inhibit contact between the fluid and the axial flux electric motor, a first housing to frame the impeller shaft, and a second housing to frame the axial flux electric motor, wherein the second housing is separate from the first housing.

Example 154 includes the pump system of any preceding clause, wherein the rotor shaft is connected to the impeller shaft via a splined interference.

Example 155 includes the pump system of any preceding clause, wherein the seal is a piston seal ring mounted on the second housing, wherein the impeller shaft is configured to fit within the piston seal ring.

Example 156 includes the pump system of any preceding clause, wherein the impeller shaft is a first shaft, wherein a second shaft is coupled to the first shaft, and wherein the second shaft is connected to the rotor shaft via a splined interference.

Example 157 includes the pump system of any preceding clause, wherein the first shaft is coupled to the second shaft via a co-axial magnetic coupling, wherein the co-axial magnetic coupling includes an outer hub and an inner hub, wherein the outer hub and the inner hub include one or more permanent magnets.

Example 158 includes the pump system of any preceding clause, wherein the seal is a barrier can that is mounted between the inner hub and the outer hub of the co-axial magnetic coupling, the barrier can including at least one of a metallic material and a non-metallic material.

Example 159 includes the pump system of any preceding clause, further including one or more rolling element bearings to support a radial load and a thrust load generated by the rotor shaft in the second housing, wherein the one or more rolling element bearings are lubricated via at least one of an oil lubricant or a solid lubricant.

Example 160 includes the pump system of any preceding clause, wherein the rolling element bearings are lubricated via the oil lubricant, further including a separator to separate the oil lubricant from the fluid, a portion of the oil lubricant to be mixed with the fluid.

Example 161 includes the pump system of any preceding clause, further including at least one or more rolling element bearings or one or more gas foil bearings to support a radial load and a thrust load generated by the impeller shaft in the first housing, wherein the one or more rolling element bearings are lubricated via at least one of an oil lubricant or a solid lubricant.

Example 162 includes the pump system of any preceding clause, wherein heat produced by the stator is transferred to at least one of oil or water.

Example 163 includes a pump system to pressurize a fluid within a closed loop fluid transport bus, the pump system comprising means for increasing kinetic energy of the fluid flowing through the pump system, means for providing torque to a rotor shaft of the pump system, means for mounting the pump system, wherein the means for mounting is to frame an axial flux motor, wherein the means for mounting is to frame at least one of an impeller, an impeller shaft, or a co-axial magnetic coupling separate from the axial flux motor, and means for sealing the fluid from contacting the axial flux motor.

Example 164 includes the pump system of any preceding clause, further including means for first connecting the impeller shaft and the rotor shaft.

Example 165 includes the pump system of any preceding clause, wherein the impeller shaft is a first shaft, further including means for coupling the first shaft to a second shaft.

Example 166 includes the pump system of any preceding clause, further including means for second connecting the second shaft and the rotor shaft.

Example 167 includes the pump system of any preceding clause, further including means for supporting at least one of a radial load or a thrust load generated by at least one of the rotor shaft, the impeller shaft, or the co-axial magnetic coupling.

Example 168 includes the pump system of any preceding clause, further including means for transferring heat from the axial flux motor to at least one of oil, water, or ambient air.

Example 169 includes the pump system of any preceding clause, further including means for attaching a first housing to a second housing, wherein the means for attaching is to configure the first housing to be removable from the second housing.

Example 170 includes the pump system of any preceding clause, further including means for separating one or more liquids from the fluid, the one or more liquids including oil.

Example 171 includes a pump system to pressurize a fluid within a closed loop fluid transport bus, the pump system comprising an impeller coupled to an impeller shaft, an axial flux electric motor including rotors, a rotor shaft connected to the rotors, wherein the rotor shaft is coupled to the impeller shaft, a seal to inhibit contact between the fluid and the axial flux electric motor, a first housing to frame the impeller shaft, and a second housing to frame the axial flux electric motor, wherein the second housing is separate from the first housing.

Example 172 includes the pump system of any preceding clause, wherein the second housing includes a mounting flange to mount the pump system to a mounting surface.

Example 173 includes the pump system of any preceding clause, further including a first line replaceable unit fixed to the second housing, the first line replaceable unit including at least one of the impeller, the impeller shaft, the first housing, a co-axial magnetic coupling, and a second shaft, wherein the second shaft is coupled to the impeller shaft via the co-axial magnetic coupling, wherein the second housing is a second line replaceable unit, the second line replaceable unit including at least one of the axial flux electric motor or the rotor shaft, and wherein the first line replaceable unit is configured to be removable from the second line replaceable unit.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A shroud for a pump comprising:
   an inner shell including a first non-metallic material, wherein the inner shell includes ridges extending away from a cavity defined by the shroud, wherein the ridges are spaced apart in a circumferential direction defined by the pump;
   an outer shell including the first non-metallic material or a second non-metallic material; and
   a metal core shell positioned between the inner shell and the outer shell, wherein the metal core shell spans an axial direction defined by the pump, wherein a span of the metal core shell in the axial direction extends from a first axial end to a second axial end, wherein the metal core shell is in contact with the outer shell at the first axial end and the second axial end.

2. The shroud of claim 1, wherein the metal core shell is electroformed.

3. The shroud of claim 1, wherein at least one of the inner shell or the outer shell is formed via thermal spraying.

4. The shroud of claim 1, wherein the inner shell is formed via at least one of molding or casting.

5. The shroud of claim 1, wherein the first non-metallic material and the second non-metallic material include at least one of a ceramic, a polymer, or a composite.

6. The shroud of claim 1, wherein the inner shell includes a first thickness, the outer shell includes the first thickness or a second thickness, and the metal core shell includes a third thickness greater than the first thickness and the second thickness.

7. The shroud of claim 1, wherein an outer surface of the metal core shell is fully in contact with an inner surface of the outer shell.

8. The shroud of claim 1, wherein the inner shell includes a base portion from which the ridges extend, wherein the base portion defines a first outer diameter of the inner shell, wherein the ridges define a second outer diameter of the inner shell, wherein the metal core shell includes a first portion and a second portion, wherein the first portion is aligned with the ridges in the circumferential direction, and wherein the second portion is positioned between the ridges in the circumferential direction, wherein the first portion includes a third outer diameter, and wherein the second portion includes a fourth outer diameter different than the third outer diameter.

9. A canned motor pump comprising:
   a first shaft including a first magnet;
   a second shaft at least partially positioned around the first shaft, the second shaft including a second magnet, the second magnet magnetically engaged with the first magnet; and
   a shroud positioned between the first shaft and the second shaft, the shroud including:
      a metallic core layer, wherein the metallic core layer is positioned between the first magnet and the second magnet in a radial direction defined by the canned motor pump, wherein a first portion of the metallic core layer includes a first outer diameter, wherein a second portion of the metallic core layer includes a second outer diameter different than the first outer diameter, and wherein the first portion and the second portion of the metallic core layer are defined at a same position along an axial direction defined by the canned motor pump;
      a first non-metallic layer positioned between the metallic core layer and the first shaft; and
      a second non-metallic layer positioned between the metallic core layer and the second shaft.

10. The canned motor pump of claim 9, wherein the metallic core layer includes at least one of nickel or cobalt.

11. The canned motor pump of claim 9, wherein the first non-metallic layer includes a first portion having a first thickness and a second portion having a second thickness greater than the first thickness.

12. The canned motor pump of claim 9, wherein the first non-metallic layer and the second non-metallic layer include at least one of a ceramic material, a composite material, or a polymer material.

13. The canned motor pump of claim 9, wherein the first non-metallic layer and the second non-metallic layer include at least one of alumina, zirconia, or silicon.

14. The canned motor pump of claim 9, wherein the shroud includes a flange, further including a retainer ring to secure the flange against a housing of the canned motor pump.

15. The canned motor pump of claim 9, wherein the first non-metallic layer includes a base portion and ribs extending from the base portion, wherein the first portion of the metallic core layer is aligned with the ribs in a circumferential direction defined by the canned motor pump, and wherein the second portion of the metallic core layer is positioned between the ribs in the circumferential direction.

16. A magnetically driven pump comprising:
   means for housing a fluid;
   means for compressing the fluid; and
   means for sealing the means for housing, the means for sealing including:
      first means for insulating to define an inner surface of the means for sealing, wherein the first means for insulating includes means for stiffening;
      second means for insulating to define an outer surface of the means for sealing; and
      means for supporting the first means for insulating and the second means for insulating, the means for supporting to fill an area defined between the first means for insulating and the second means for insulating, wherein the means for supporting forms a portion of a means for coupling the means for sealing to the means for housing.

17. The magnetically driven pump of claim 16, wherein the means for supporting is electroformed over the first means for insulating.

18. The magnetically driven pump of claim 16, wherein at least one of the first means for insulating or the second means for insulating is formed via thermal spraying.

19. The magnetically driven pump of claim 16, wherein the means for supporting forms a portion of the means for stiffening.

20. The magnetically driven pump of claim 16, wherein the fluid is a first means for dissipating heat in contact with the first means for insulating, further including a second means for dissipating heat in contact with the second means for insulating.

* * * * *